(12) United States Patent
Wilcox et al.

(10) Patent No.: US 6,678,891 B1
(45) Date of Patent: Jan. 13, 2004

(54) NAVIGATIONAL USER INTERFACE FOR INTERACTIVE TELEVISION

(75) Inventors: Scott Wilcox, Longwood, FL (US); Robert A Montgomery, Longwood, FL (US); Thomas McDonald, Winter Park, FL (US); Praveen Roa, Longwood, FL (US); Deborah A Spencer, Apopka, FL (US)

(73) Assignee: Prasara Technologies, Inc., Cupertino, CA (US)

( * ) Notice: Subject to any disclaimer, the term of this patent is extended or adjusted under 35 U.S.C. 154(b) by 0 days.

(21) Appl. No.: 09/195,167

(22) Filed: Nov. 19, 1998

(51) Int. Cl.[7] .......................... H04N 5/445; G06F 3/00; G06F 13/00
(52) U.S. Cl. ........................ 725/42; 725/44; 725/52; 725/61; 345/721
(58) Field of Search ........................ 725/39, 40, 42, 725/43, 44, 52, 60, 61; 348/14.07; 345/767, 854, 720, 721; 715/501.1

(56) References Cited

U.S. PATENT DOCUMENTS

| | | | |
|---|---|---|---|
| 4,706,121 A | 11/1987 | Young | 358/142 |
| 4,751,578 A | 6/1988 | Reiter et al. | 358/183 |
| 4,885,775 A | 12/1989 | Lucas | 380/10 |
| 4,908,713 A | 3/1990 | Levine | 358/335 |
| 4,949,187 A | 8/1990 | Cohen | |
| 4,963,994 A | 10/1990 | Levine | 358/335 |
| 4,991,011 A | 2/1991 | Johnson et al. | 358/141 |
| 5,038,211 A | 8/1991 | Hallenbeck | 358/142 |
| 5,293,357 A | 3/1994 | Hallenbeck | 348/734 |
| 5,477,262 A | 12/1995 | Banker et al. | 348/7 |
| 5,508,815 A | 4/1996 | Levine | 358/335 |
| 5,568,272 A | 10/1996 | Levine | 386/48 |
| 5,583,560 A | 12/1996 | Florin et al. | |
| 5,589,892 A | 12/1996 | Knee et al. | 348/731 |
| 5,619,249 A * | 4/1997 | Billock et al. | 725/5 |
| 5,621,456 A | 4/1997 | Florin et al. | |
| 5,624,265 A * | 4/1997 | Redford et al. | 340/825.72 |
| 5,646,676 A | 7/1997 | Dewkett et al. | |
| 5,676,738 A | 10/1997 | Cioffi et al. | |
| 5,682,511 A * | 10/1997 | Sposato et al. | 345/716 |
| 5,721,815 A | 2/1998 | Ottesen et al. | |
| 5,721,827 A | 2/1998 | Logan et al. | |
| 5,721,829 A | 2/1998 | Dunn et al. | |
| 5,748,898 A | 5/1998 | Ueda | |
| 5,752,160 A | 5/1998 | Dunn | |
| 5,754,938 A | 5/1998 | Herz et al. | |
| 5,754,939 A | 5/1998 | Herz et al. | |
| 5,768,539 A | 6/1998 | Metz et al. | |
| 5,774,664 A | 6/1998 | Hidary et al. | |
| 5,778,181 A | 7/1998 | Hidary et al. | |
| 5,781,228 A | 7/1998 | Sposato | |
| 5,781,734 A | 7/1998 | Ohno et al. | |
| 5,801,787 A | 9/1998 | Schein et al. | |
| 5,808,608 A | 9/1998 | Young et al. | |
| 5,809,204 A | 9/1998 | Young et al. | |
| 5,812,123 A * | 9/1998 | Rowe et al. | 725/43 |
| 5,841,542 A | 11/1998 | Milana et al. | |
| 5,886,690 A * | 3/1999 | Pond et al. | 345/720 |
| 5,940,073 A * | 8/1999 | Klosterman et al. | 345/721 |
| 5,956,025 A * | 9/1999 | Goulden et al. | 345/716 |
| 5,986,650 A * | 11/1999 | Ellis et al. | 345/721 |
| 6,005,601 A * | 12/1999 | Ohkura et al. | 348/906 |
| 6,023,267 A * | 2/2000 | Chapuis et al. | 345/712 |

(List continued on next page.)

*Primary Examiner*—Andrew Faile
*Assistant Examiner*—Jason Salce
(74) *Attorney, Agent, or Firm*—Kenneth M. Massaroni; Hubert J. Bernhardt, III; Shelley L. Couturier

(57) ABSTRACT

The present invention is a navigational user interface for interactive television. The invention uses an intuitive interactive interface for navigating through service options preferably offered by a cable television service. Services offered such as video on demand, purchasing delivery foods, restaurant selection, banking and community events is all navigated using the present invention.

31 Claims, 126 Drawing Sheets

U.S. PATENT DOCUMENTS

| | | | |
|---|---|---|---|
| 6,028,600 A | * | 2/2000 | Rosin et al. ................. 345/718 |
| 6,037,933 A | * | 3/2000 | Blonstein et al. ........... 345/721 |
| 6,057,890 A | * | 5/2000 | Virden et al. ............... 345/716 |
| 6,122,011 A | * | 9/2000 | Dias et al. .................. 348/569 |
| 6,151,059 A | * | 11/2000 | Schein et al. ............... 345/721 |
| 6,172,677 B1 | * | 1/2001 | Stautner et al. ............. 345/716 |
| 6,177,931 B1 | * | 1/2001 | Alexander et al. .......... 345/721 |
| 6,199,206 B1 | * | 3/2001 | Nishioka et al. ............ 709/219 |
| 6,266,814 B1 | * | 7/2001 | Lemmons et al. ............ 725/44 |
| 6,347,400 B1 | * | 2/2002 | Ohkura et al. ................ 725/39 |
| 6,373,528 B1 | * | 4/2002 | Bennington et al. ........ 348/569 |

* cited by examiner

FIGURE 56

Please confirm...

You will pick up your order at:

Plaza Crowne Shopping Plaza
1820 Lake Road Drive
Amaretto, TX 12345

```
   Subtotal: $17.70
Delivery Fee:  $0.00
    Tax (7%):  $1.24
       Total: $18.94
```

B Complete the Order        C Return to Main Menu

FIGURE 5 9

Order Confirmed!
Confirmation #8675-309

Your order will be delivered to:

1920 Lake Road Drive
Amaretto, TX 12345

```
   Subtotal:  $17.70
Delivery Fee:  $2.00
    Tax (7%):  $1.24
       Total: $20.94
```

Thanks for your order!

110

Dieters are welcome and well-fed at our fine establishment.

MMM... Fresh Fruit!

Grapes Galore!

We also have:
- Apples
- Cantaloupe
- Other Seasonal Fruits

Page 4 of 4

Find – a – Restaurant
*Restaurant Details*

**Checkerboard
Pasta
House**

"Brockway's tastiest pasta!"
Fred Drew, *The Timely Examiner*

△

*1234 Main Street – Village Plaza
Shopping Suites; Ogdenville*

14 Brockway Blvd
  Behind the old mall
Brockway (434) 555-1213

122 — *14 Brockway Blvd; Brockway*

Hours:
  Hours vary – please call
  for details.

*1910 West Overland Drive; North
Haverbrook*

*Reservations are
recommended*

▽

C  Return to list

NAVIGATIONAL USER INTERFACE FOR INTERACTIVE TELEVISION

BACKGROUND

Over the past twenty years, computers and telecommunications have radically improved. Hardware costs continue to decline while functionality and performance has multiplied. Cable television providers and the telecommunication industry have taken advantage of computer and communication advancements by providing an ever-increasing array of services to their customers. Primarily, recent advancements in technology have enabled the cable service industry to increase channel capacity and provide some degree of interactive television service. This advancement is due in large part by the industry combining the processing power of a computer in the form of a cable box and cable's large capacity to carry information. Such cable boxes have successfully been used by the industry to provide both a greater selection of channels and some degree of interactivity.

Among such boxes are advanced analog cable boxes. Unlike older analog cable boxes which simply tuned television channels, advanced boxes are capable of overlaying the current time and channel number on top of a television program being viewed. Advanced analog cable boxes also provide an on-screen interface for examining a list of television programs being broadcast at the current time or some time in the near future. The on-screen interface is referred to as an "Interactive Program Guide" (IPG). Additionally, some advanced analog cable boxes enable the ordering of Pay-Per-View movies using only the cable box and its remote controller.

Digital cable boxes are personal computing devices designed to connect to a television set. Digital cable boxes utilize the high quality of digitized audio and video television signals to access a large number of broadcast television channels. They also provide an IPG and allow a cable subscriber to order a Pay-Per-View movie directly using the cable box and its remote controller. Digital broadcast satellite systems also utilize digital video technology to provide hundreds of channels to a subscriber via a relatively small (eighteen-inch) satellite dish. These systems typically include an IPG.

Internet and web access boxes also connect to a television set. Web access boxes enable the television owner to attach the device to the television, and through the device's modem, to a service provider to access the Internet and World Wide Web services. The television then serves as a display monitor for viewing various Web sites.

All of these devices, with varying levels of sophistication, have memory, a central processing unit (CPU) and video-graphics capabilities similar to those of a personal computer. That is, while a personal computer can execute a computer program generating a display to a computer monitor, any of these devices can run a computer program that generates a display to a television, often allowing a consumer to interact with the program via, for example, a remote controller. An example of a computer program running on an advanced analog or digital cable box would be one which displays a list of television programs currently being broadcast and allows the consumer to scroll through the listing.

All of these devices use their memory, CPU and video-graphics capabilities to provide on-screen television interfaces to the consumer that the consumer can use to manipulate the manner in which the device is functioning. Typically, each device is designed and built independently by the device's manufacturer, of which there are hundreds, each of whom operates independently. The result of this independent product development is that each device has its own unique on-screen television interface which the consumer must learn to operate. Additionally, the on-screen interfaces themselves are often non-intuitive, clumsy or difficulty to operate.

A well-known example of a non-intuitive, inconsistent on-screen interface is the interface for setting the time on a VCR. Many consumers never discover their particular VCR-manufacturer's preferred method for setting the time, and if they do determine how to operate the interface, it is often difficult and frustrating to repeatedly use the interface. In addition, if the consumer uses a different VCR, typically the method for setting the time is significantly different than in the previous VCR. The present invention overcomes such interface problems by providing a consistent, intuitive interface for accessing, setting and ordering information and services on a television.

SUMMARY

The present invention provides a set of on-screen interface components which may be used in various combinations and arrangements to provide an easy-to-use consumer interface. Each individual component has very specific behavior characteristics with certain, finite configurable parameters that determine the exact look and feel of the user interface. Each individual component will be described in exacting detail, describing its complete range of behavior based on its configurable parameters. Additionally, when one component has the capabilities of interacting with or being used in combination with any other components, this will be fully described.

Included in the present invention are both category items and menu items, with each being displayed on a separate axis. The category items contain the menu items and display related menu items when in focus. Menu items display drawables containing information about the menu item when a menu item is in focus. The present invention also includes a grid display, pages, and a numeric entry display.

BRIEF DESCRIPTION OF THE DRAWINGS

In the Drawings:

FIG. 32 illustrates the screen activated after the viewer "selects " the menu item "Large (13 inch)" from the previously active screen with the screen containing only a list of menu items and a textual string area which now contains text indicating the selection made by the viewer on the previously active screen;

FIG. 56 illustrates the screen activated as a result of the viewer completing entry of the data on FIG. 50 or after FIG. 49 or after FIG. 47 or after FIG. 45, the screen indicates the viewer has selected "PickUp" and summarizes the total giving the viewer the address of where to pick up the order;

FIG. 59 illustrates the screen activated as a result of the viewer having confirmed the order presented in FIG. 58;

FIG. 103 illustrates the screen originally presented in FIG. 102 after the viewer has scrolled once in the list of locations for the restaurant;

FIG. 120 is a flow-chart of the input handler code for the cell;

FIG. 121 is a flow-chart of the input handler code for the page;

FIG. 122 is a flow-chart of the input handler code for the numeric entry;

FIG. 123 is a flow-chart of the input handler code for the screen;

FIG. 124 is a flow-chart of the timeout event handler;

FIG. 125 is a flow-chart of the "push-screen" procedure; and

FIG. 126 is a flow-chart of the "pop-screen" procedure.

DETAILED DESCRIPTION OF THE INVENTION

Figure 1:
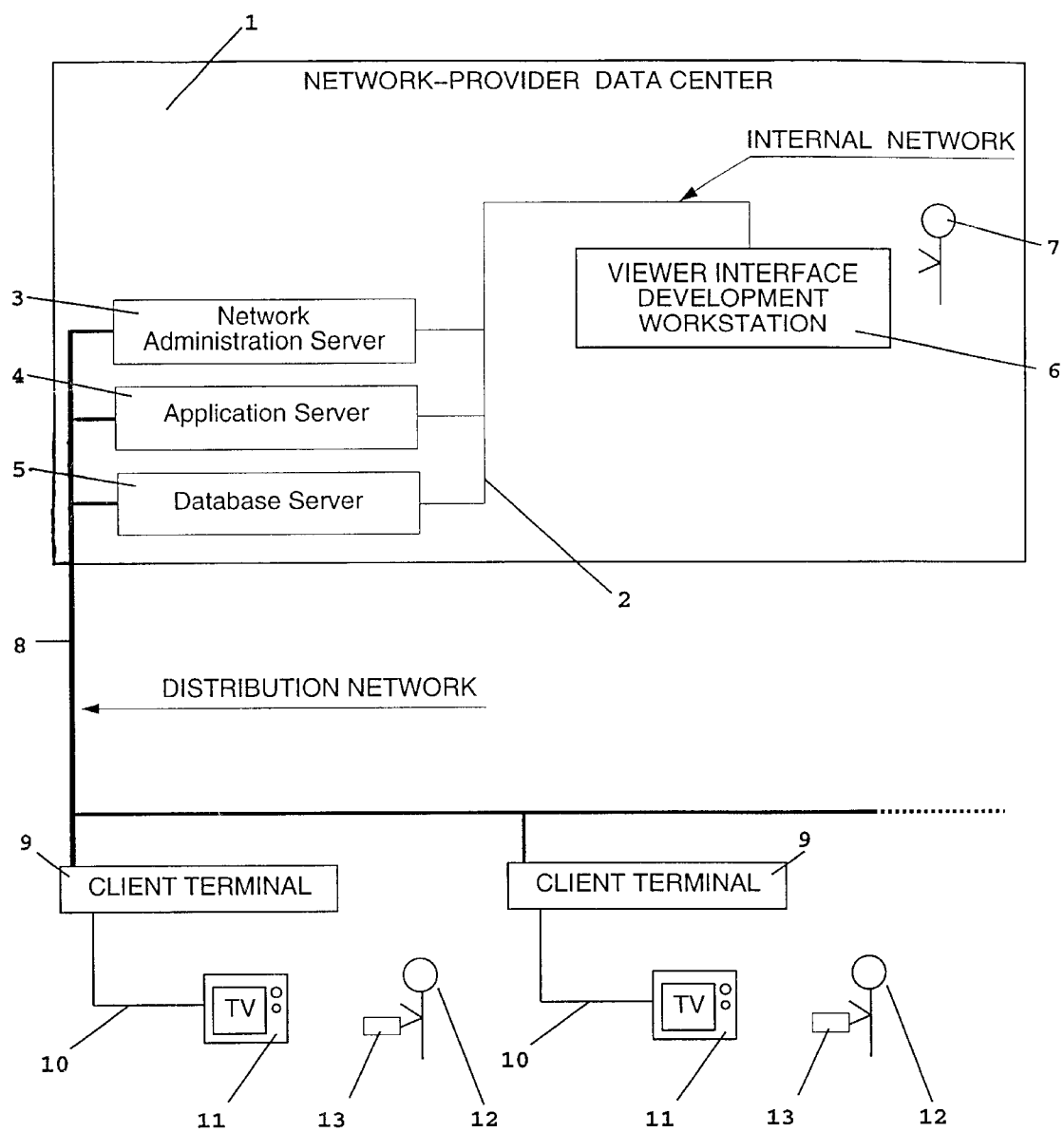
FIG. 1 is a functional block diagram illustrating the preferred network and network provider data center to which the client terminal on which the present invention will execute may be attached.

The invention summarized above and defined by the enumerated claims may be better understood by referring to the following detailed description, which should be read in conjunction with the accompanying figures. This detailed description of a particular preferred embodiment, set out below to enable one to build and use one particular implementation of the invention, is not intended to limit the enumerated claims, but to serve as a particular example thereof The particular example set out below is the preferred specific implementation of the navigational TV interface.

In accordance with the preferred implementation of the present invention, the navigational interface is a software library that executes on a client terminal to generate TV displays to a consumer or viewer. The navigational interface provides an on-screen interface for the viewer to access, set, and order information, goods, and services (such as banking, ordering food items or merchandise, and selecting a restaurant) through a TV.

The viewer interacts with the TV display through an input device such as a remote control device. Based on the viewer's interaction, the navigational interface modifies the TV displays and may communicate across a distribution network to provide the information, goods, and services to the viewer.

The details of the present invention are presented in several sections. The first section describes a typical environment in which the navigational interface may operate. The remaining sections describe the components of the navigational interface, each section including a general definition of the component and examples of how the component may be used.

The following terms are defined to more clearly define and describe the present invention. In addition to the following defined terms common meanings, the following terms will also have all the characteristics set forth in the following definitions.

Application: shall mean a computer program for performing a specific task, or an executable program that provides a specific set of functions to the viewer. The application may make use of various libraries that are part of the application itself or contained elsewhere in the computer executing the application.

Display: shall mean the video-graphics the viewer sees on the TV attached to the client device.

Electronic Commerce (e-commerce): shall mean commercial activity, such as purchasing merchandise, that occurs between a user or viewer and a vendor through the viewer's TV and the client device.

Hardware Server: shall mean a computer system having one or more central processing units, system memory, persistent data storage capabilities (for example, hard drives and non-volatile random access memory (RAM)), and a particular operating system (for example, Windows 98, Windows NT, UNIX, and VMS).

Input Device: shall mean the hardware the viewer uses to control the client device, such as a remote control.

Network Provider: shall mean a company or organization, or multiple companies or organizations, responsible for the maintenance, upgrading, and general administration of the equipment in the data center, the distribution network, and, in some cases, the client terminals. The network provider may be a cable company, a local telephone company, a long-distance telephone company, a direct broadcast satellite company, or any company or organization owning or building the type of distribution network described herein.

Pop shall mean retrieving and removing the top or most recently added element of a stack.

Push: shall mean adding a new element to a stack.

Render: shall mean the process of placing pixels from image, text, or both into the video output buffer. Once placed in the video output buffer, the image and text appear on the TV display.

Stack: shall mean a last-in first-out data structure for holding a list of elements (such as records), in which the elements are added to the stack by being "pushed" onto the stack and removed from the stack by being "popped" from the stack. The most recently added element to the stack, the top element, is the element popped from the stack. Stacks are commonly used in the data processing and computing industries.

Typical Execution Environment

In accordance with one aspect of the present invention, the environment in which the navigational interface may operate is comprised of a network provider data center 1, a distribution network 8, a client terminal 9, a TV connection cable 10, a TV display device 11, a viewer 12, and a viewer input device 13 as illustrated in: FIG. 1. The distribution network interfaces between the data center and the client terminal. The navigational interface executes on the client terminal.

The data center 1 is comprised of an internal network 2, a network administration server 3, an application server 4, a database server 5, and a viewer interface development workstation 6. The data center shown in FIG. 1 represents a typical data center configured by the network provider that owns and operates the data center. The elements within the data center may be contained at a single site or distributed to multiple sites. In the latter case, the internal network includes industry-standard wide-area-network communications equipment to facilitate communications between the remotely-located elements of the data center.

The network administration server 3, application server 4, database server 5, and development workstation 6 each provide specific functions in the typical data center 1. Although represented as separate elements, the specific functions of more than one element may be performed by a single hardware server. The primary function of the network administration server is to allow personnel in the data center to manage and control the distribution network 8. This functionality typically includes management and configuration of all components in the distribution network, including client terminals 9, as well as components in the data center.

The primary function of the application server 4 is to execute software modules related to any specific viewer-oriented service. For example, if an email service is provided to viewers 12 via the client terminal 9, the client terminal uses the distribution network 8 to communicate with the application server, which runs a specific software module whose primary responsibility is to provide the client terminal with the viewer's current email. The application server can run multiple, unrelated software modules or programs for facilitating any service the network provider wishes to provide.

The primary function of the database server 5 is to execute software implementing a data storage and retrieval system. Many standard software packages for data storage and retrieval are available, including Oracle, Sybase, Interbase, Ingres, Informix, SQL Server, and the like. The services provided by the database server may be used by the network administration server 3, the application server 4, the development workstation 6, or by any of the client terminals 9 attached to the distribution network 8.

The primary function of the development workstation 6 is to provide a computer at which a viewer interface developer 7 may manually configure and control the specific behaviors of the applications developed using the navigational interface. The development workstation is optional and thus may or may not be used by the network provider. The software executing on the development workstation, which is used by the viewer interface developer, has the capability to update the configuration files used by the navigational interface.

The network administration server 3, the application server 4, and the database server 5 may directly communicate with each other via the internal network 2. In addition, the client terminals 9, through the distribution network 8, may directly communicate with these servers. The development workstation 6 may directly communicate with the servers as needed to relay changes or modifications in any application-specific configurations.

The network provider provides the distribution network 8 to the viewer 12. This network may be implemented over, for example, a standard telephone system, advanced versions of a telephone system (such as the Integrated Services Digital Network (ISDN) and asymmetric digital subscriber line (ADSL)), a cable television network, a direct broadcast satellite network, or any other network technology which is capable of, minimally, providing one-way communication, or preferably two-way communication, from the data center 1 to the client terminal 9. The navigational interface is not dependent on a specific network technology, except that the network technology must be sufficient to provide the navigational interface with its configuration parameters through one-way communication.

The client terminal 9 is connected to the distribution network 8, allowing the client terminal to, minimally, receive data from the elements of the data center 1 or, preferably, send and receive data to and from the elements of the data center. Specification of the types of hardware and operating systems that are to be used on the client terminals, which may vary for different client terminals, is typically the responsibility of the network provider. The distribution network may include, potentially, millions of client terminals.

A standard TV connection cable 10 connects the client terminal 9 to a TV display device 11, which is a standard, consumer television set. The viewer 12 communicates with the client terminal through a viewer input device 13, such as a remote control, that may be either wireless (such as an infrared remote control) or wired to the client terminal by a cable or by direct physical attachment (see FIG. 2). Additionally, the input device can be a wired or wireless computer keyboard or similar device possessing comparable functions.

Figure 2:
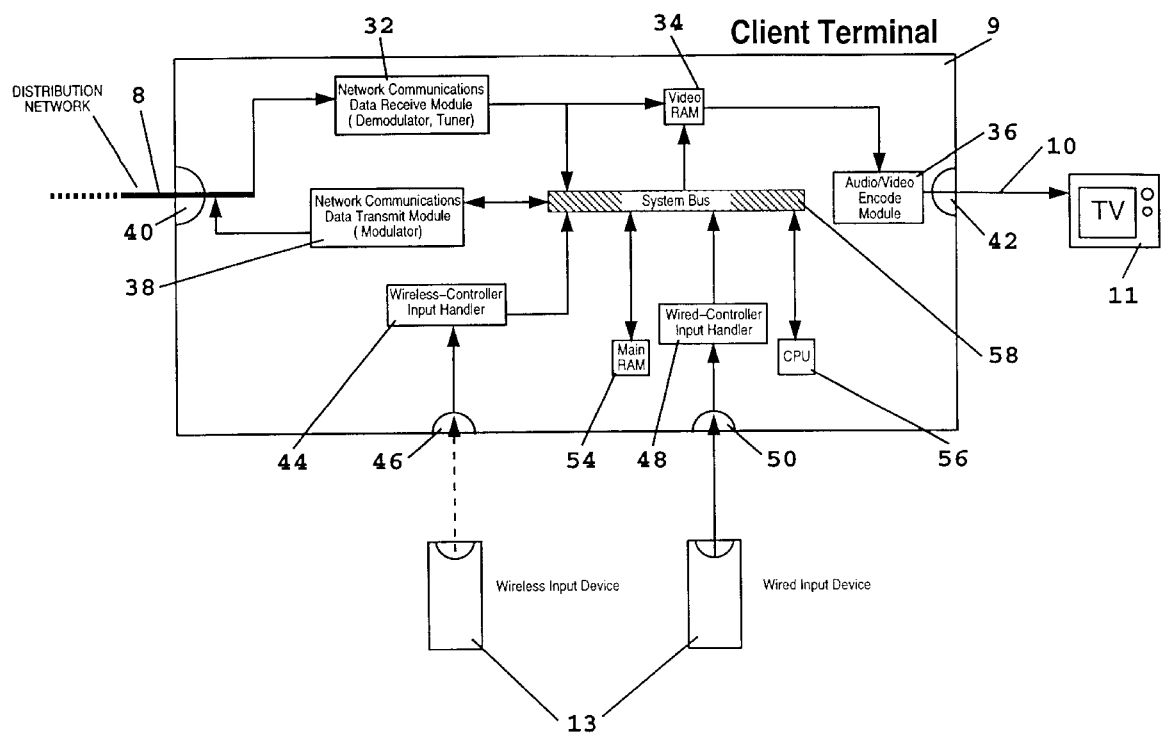
FIG. 2 is a functional block diagram illustrating the major components of the client terminal on which the present invention may run.

The major hardware components in the client terminal 9 that are relevant to the navigational interface are shown in FIG. 2. The client terminal may contain other hardware components, depending on the specific configuration of the client terminal, including persistent storage devices (such as hard drives, nonvolatile RAM, and the like), other output devices (such as printers), and other input devices (such as card readers and microphones).

In accordance with one aspect of the present invention, the client terminal 9 is attached to the distribution network 8 at a network-terminal connection 40. A network communications data receive module 32 (including a demodulator and a tuner), receives data from the distribution network, decodes it, and feeds the decoded data to a system bus 58 in the client terminal. From the system bus, the data is typically written into main random access memory (RAM) 54. The central processing unit (CPU) 56 interprets the data and handles it accordingly. For example, if the data is an executable version (or application) of the navigational interface, then the CPU may execute the application.

Figure 8:
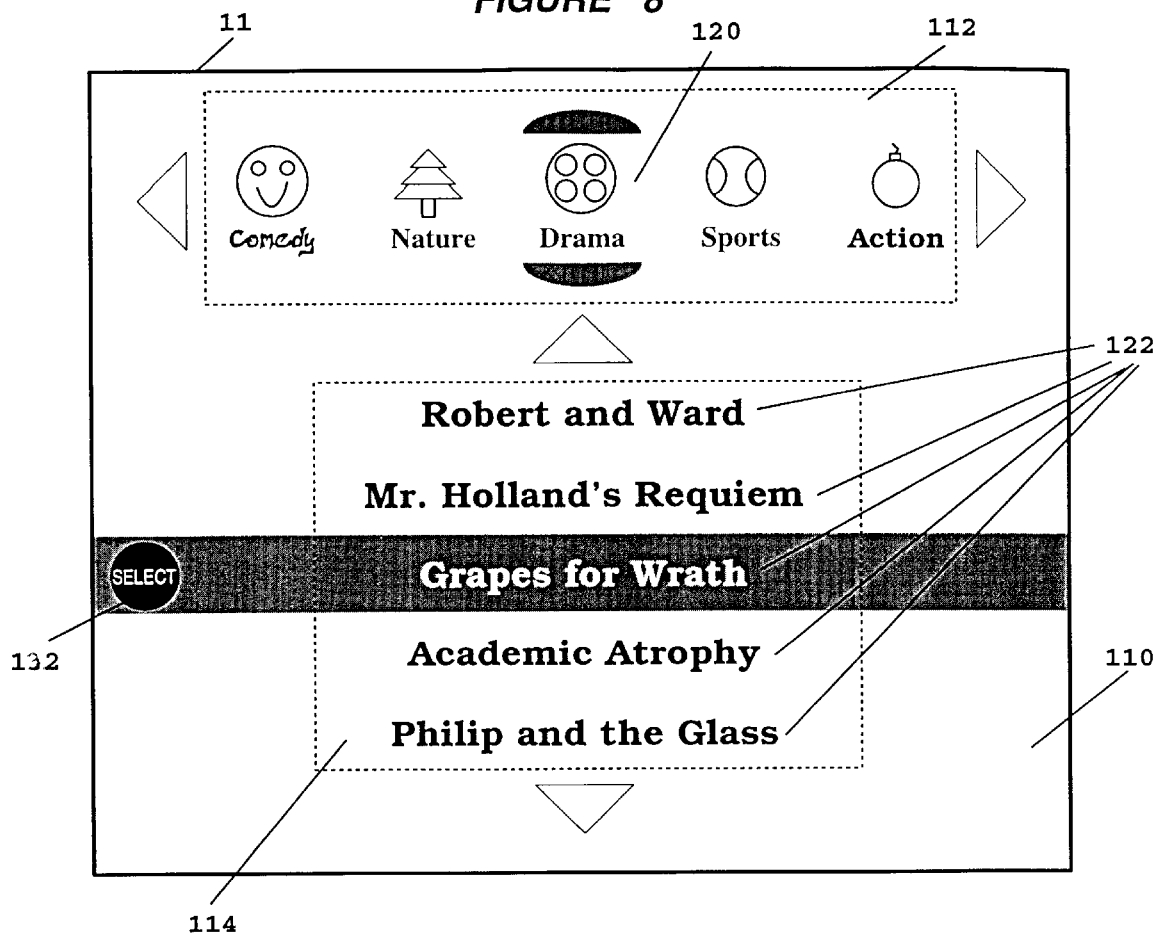
FIG. 8 illustrates both the menu item and category item components, with the category items represented as both image-based icons and textual strings and the menu item represented as textual strings only.

The pixels for generating a particular display of text and graphics to the viewer 12 are stored in a video output buffer within video RAM 34. One example of what the viewer might see based on the contents of the video output buffer is illustrated in FIG. 8. Typically, an application currently running in main ram 54 writes image data across the system bus 58 into the video ram, which makes the pixel data available to an audio/video (A/V) encode module 36. The A/V encode module produces a standard television signal accessible from a TV-output connection 42 of the client terminal 9 to the TV display device 11 through the TV connection cable 10.

A network communications data transmit module (including a modulator) 38 sends data onto the distribution network 8. The data transmit module receives the data to send from the system bus 58 and sends the data back out onto the distribution network through the network-terminal connection 40. Alternatively, the client terminal 9 may only be capable of receiving data.

A wireless-controller input handler 44 decodes viewer input received from the wireless input device 13. The wireless input device.transmits data via infrared light-emitting diodes (LEDs) or aerial radio frequency (RF) into the client terminal 9 at a wireless port 46. The wireless port forwards the input data to the wireless-controller input handler, where the data is prepared for transmission across the system bus 58 and into main ram 54, where it may be interpreted by any currently running applications or by the operating system. A wired-controller input handler 48 functions similarly to the wireless-controller input handler, except that it decodes viewer input received from the wired input device connected directly to the client terminal at a wired port 50.

The navigational interface executes on the client terminal 9 as an application capable of receiving and handling viewer input from the input device 13. As the input is received, the navigational interface interprets the input, modifies the contents of the video RAM 34 when necessary, and transmits data from the client terminal through the data transmit module 38 to the data center 1. Also, interpretation of the viewer input may result in receipt of data through the data receive module 32 from the distribution network 8.

Figure 3:
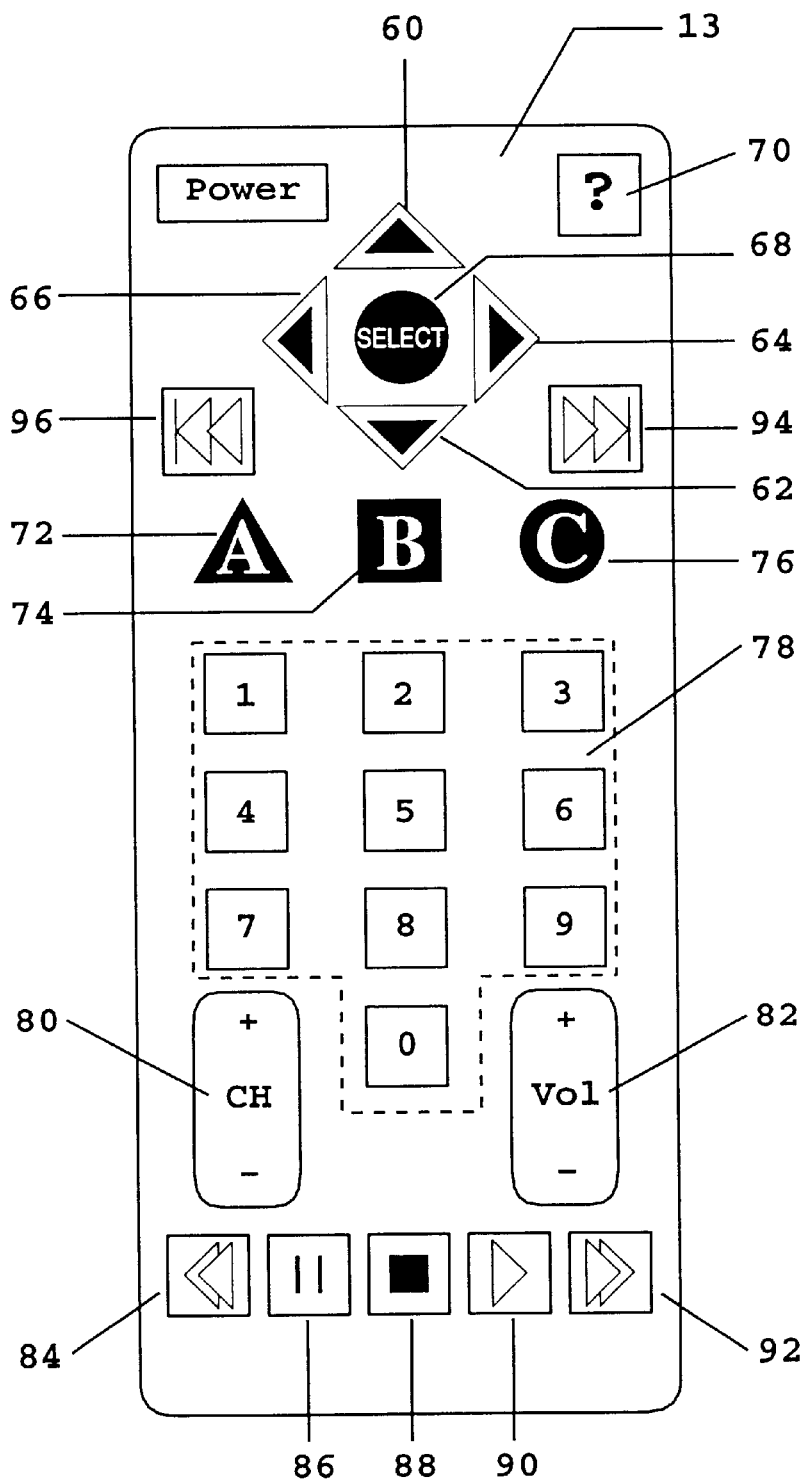
FIG. 3 is an artist's rendering of one possible configuration of a viewer input device, in this case, an infrared remote control for interacting with the client terminal.

One possible configuration of the viewer input device 13 is shown in FIG. 3. The exact appearance of the input device 13 is not critical to the present invention. Because the components responsible for the internal operation of the input device 13 are conventional, details of the internal components, including power source and hardware for communicating with the client terminal 9 (such as an infrared transmitter or a physically connecting cable), which may be used herein have been omitted.

The viewer 12 pushes particular keys on the input device 13 and the information associated with the pressed keys is transmitted to the client terminal 9. Typically, input devices used in conjunction with the present invention have directional or navigational indicators for moving to various areas of the TV display device 11. The directional indicators include an up key 60, a down key 62, a right key 64, and a left key 66. The input devices also typically include a selection key 68 for permitting the viewer to make a choice among possible alternatives (for example, a key marked with text such as "select," "enter," "choose," and "this one"), and an information key 70 for permitting the viewer to ask for more information or help (for example, a key marked with text such as "?," "info," "more info," and "help").

In addition, a plurality of optional function keys may be included on the input device 13 for providing the viewer 12 with additional features. In one embodiment of the present invention, shown in FIG. 3, the input device includes an "A" function key 72, a "B" function key 74, and a "C" function key 76. For example., the "A" function key may add a food item to an order, the "B" function key may complete the order, and the "C" function key may remove a previously selected item from the order. The functionality of these keys does not have to be indicated on the key itself. Rather, functionality may vary depending on what the viewer is attempting to accomplish, with the navigational interface communicating to the viewer through the TV display device 11 the exact functionality of each function key.

The input device 13 may also include a numeric key-pad 78 for entering numbers of channels or other numbers as required by the current display on the TV display device 11. For example, the viewer 12 may be prompted to enter an account number. In addition, the input device typically includes standard TV-oriented controls such as a channel selector 80 and a volume control 82. Also, the input device may include keys similar to those found on a video cassette recorder (VCR) control panel or remote control, such as a rewind key 84, a pause key 86, a stop key 88, a play key 90, and a fast forward key 92, and these keys may be identified by well-known, consumer-oriented icons. Finally, the input device may include keys typically found on a compact disc player or laser disc player, such as a jump forward key 94 and a jump backward key 96, and these keys may also be identified by industry-standard icons.

Figure 4:
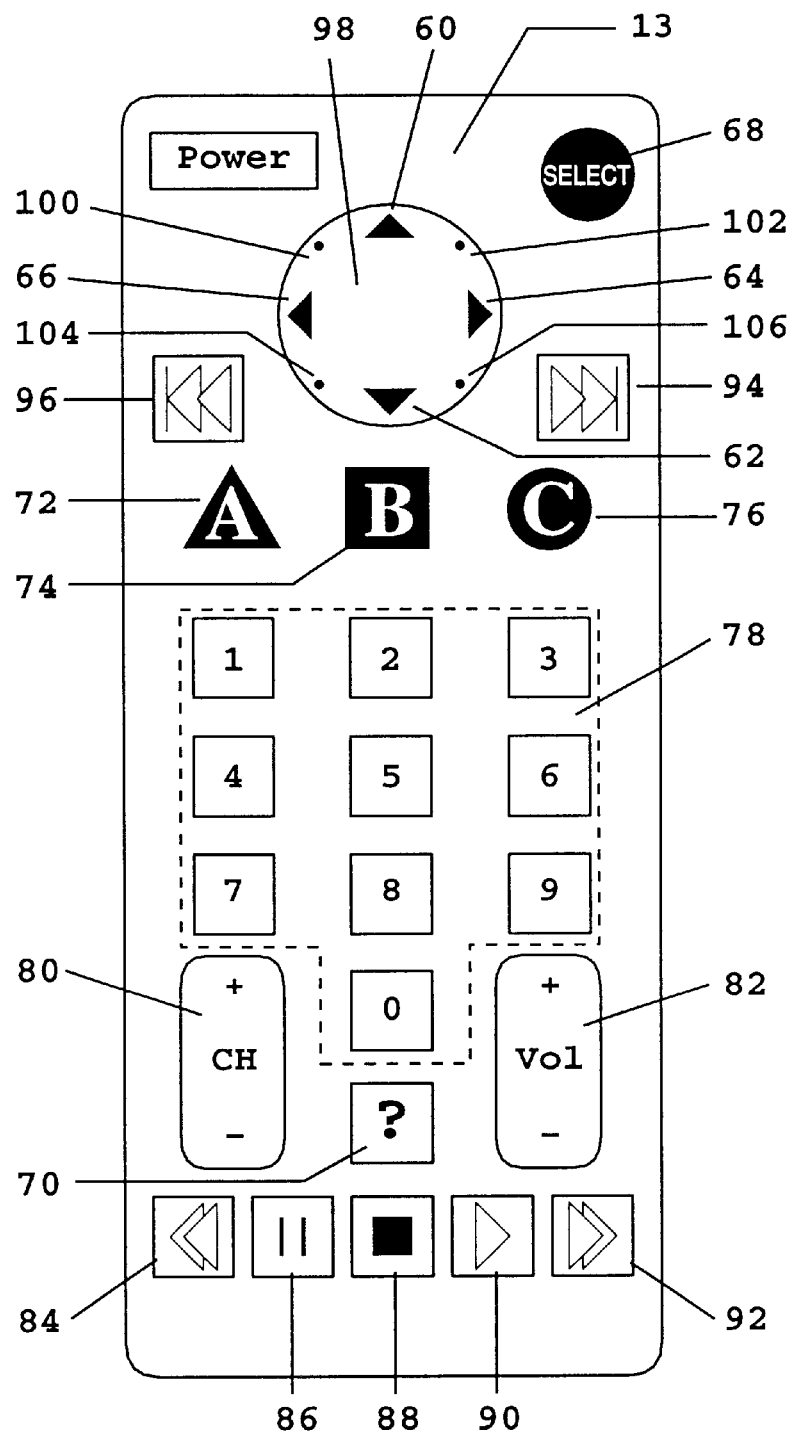
FIG. 4 is an artist's rendering of another possible configuration of a viewer input device, in this case, an infrared remote control for interacting with the client terminal.

An alternative configuration for the input device 13 is shown in FIG. 4. The selection key 68 and the information key 70 are in different locations from those of FIG. 3. Also, the directional indicator keys (the up key 60, the down key 62, the right key 64 and the left key 66) of FIG. 3 are replaced with a single, larger rocker-type directional button 98. The directional button provides the same navigational capabilities as those of the indicator keys, but it also has the capability of moving at angles, that is, up and to the left 100, up and to the right 102, down and to the left 104, and down and to the right 106, as indicated by the dots positioned between the ordinary up, down, left, and right arrows on the directional button.

The Software Library

The navigational interface is a software library executing on the client terminal 9 that generates displays to the viewer 12, communicates various information and functionality available to the viewer, enables the viewer to interact with the displays through the input device 13, modifies the displays based on the viewer's input, and, when necessary, communicates across the distribution network 8. The software library containing the navigational interface may be pre-loaded on the client terminal by being stored in a persistent memory device inside the client terminal. Alternatively, the software library may be downloaded from the distribution, network by the operating system or another application running on the client terminal. The software library is used by an application, such as an application which allows a viewer to order a pizza, to perform the functions contained within the software library. The software library provides a set of highly configurable elements which are displayed to the viewer on the TV display device 11. A particular application using the software library may not need to use all of the elements contained within the software library, and the application displays the elements it does need to use in a way specific to that application. A configuration file indicates to the software library which elements should be used and how they should operate and interact with each other. The configuration file is originally written as a plain-text, readable file which is converted into a highly-compressed, binary file called the Viewer Interface Configuration File (VICF). Once compressed, the software library reads the VICF and constructs the display shown to the viewer on the TV display device. Thus, the software library contains the source code for presenting an interface whose definition is contained in the VICF.

A resident application is a software module executing: on the client terminal 9 responsible for providing consistent, predictable behavior for the viewer 12 regardless of the state of the set-top. For example, when the viewer presses a "Channel Up" button on the input device 13, the resident application is responsible for taking the viewer from the current channel to the next channel. Other basic features such as displaying the time and/or channel number on the client terminal's top's front panel LEDs, reacting to power on/off requests, volume control, mute enable/disable, direct channel tuning using the numeric keypad, channel up/down support and rendering of the channel number on top of the analog or digital video coming out of the set-top to the TV are also provided by the resident application.

The resident application is also responsible for executing various applications such as the present invention. The manner in which the viewer requests the application varies depending upon the implementation of the resident application. Some resident applications assign a channel number to each individual application. For example, an application which allows a viewer to order a pizza could be assigned to channel 105. When the viewer enters "105" on the remote control or accesses channel "105" by pressing channel up/down, the resident application loads the code to the pizza application (if the code was not already present on the set-top) and executes it. Once executed, both the resident application and the pizza application run concurrently on the client terminal 9. If the viewer presses a key assigned to the resident: application, the resident application would handle such an event. If the pressed key is not assigned to the resident application, the resident application forwards the key press event to the pizza application giving it the opportunity to react. For example, if the viewer pressed the "Channel Up" key, the resident application would react by messaging the pizza application that it must exit. Then the resident application would change the channel from the current channel to the next channel, which might be another application or could b.e a broadcast TV channel. Additionally, the viewer may press the "Select" key, which would require the resident application to look at the key press event and decide it is unable to handle it. The key press event would then be forwarded to the pizza application which, depending on the state of the application, would make a selection of a specific pizza topping.

The present invention currently supports the model described above wherein a specific channel number is assigned to each application of the present invention. Alternatively, the present invention also supports a model in which applications are requested through a series of on-screen displays not related to channel numbers. For example, a display prompts the viewer to choose a specific application from a list of many applications. How the viewer accesses this list of available applications is dependent upon the implementation of the resident application. Typically, resident applications have achieved this by providing this list on a specific, well-known channel like "0". When the viewer turns to channel "0", the list of applications is presented.

When the viewer selects an application, the channel number remains "0".

The resident application may be provided by the manufacturer of the set-top, by the developer of the operating system executing on the set-top or by a third party. In some cases, the functionality of the resident application as described herein will actually be implemented in the operating system itself, in these cases, the resident application may or may not be identified as a separate element by the operating system developer.

The Node

A node is any element, such as a menu item, or screen, that may be displayed on the TV display device 11. The general or overarching node has a basic set of properties. All types of the general node have this common set of properties, plus any special properties unique to a specific type of node. For example, a screen 110 (e.g., see FIG. 8), is a type of node, or node element, that has all of the properties of the general node plus properties unique to screens. Other types of node include a "category item" 112 comprising a list of "category item icon nodes" 120 (e.g., see FIG. 8), a "menu item" 114 comprising a list of "menu item icon nodes" 122 that all types of the general node inherit (e.g., see FIG. 8), a "cell" 160 (e.g., see FIG. 60), a "page" 170 (e.g., see FIG. 73), and a "numeric field" 150 (e.g., see FIG. 48).

The general node has several properties. First, nodes may "have focus." The node having focus is one the viewer 12 is currently able to manipulate using the input device 13. The node that does not have focus cannot be manipulated or selected by the viewer using the input device until it does have focus. Second, nodes may store a list of particular input device keys needed and what actions to perform when the viewer presses a specific input device key. Additionally, nodes may include device keys which trigger a custom action defined by the program. Third, only the general node that has been enhanced to become a specialized .node, such as the screen 110, is displayed to the viewer on the TV display device 11.

The fourth property is that all nodes, except the screen 110, are children of another node. The screen is always owned by a component of the software library called a hierarchy manager. Fifth, nodes may contain lists of "drawables." The "drawable" 134 (see FIG. 11) is an image, text, or both that may be shown to the viewer 12 at a specific location on the TV display device 11 when the node element has focus. Finally, nodes have the capability of responding to viewer input. If the node has focus, a key pressed on the input device 13 is inspected and the list of input device keys is searched. If a match is found, the node performs the action associated with the input device key.

Actions Supported By Nodes

Figure 43:
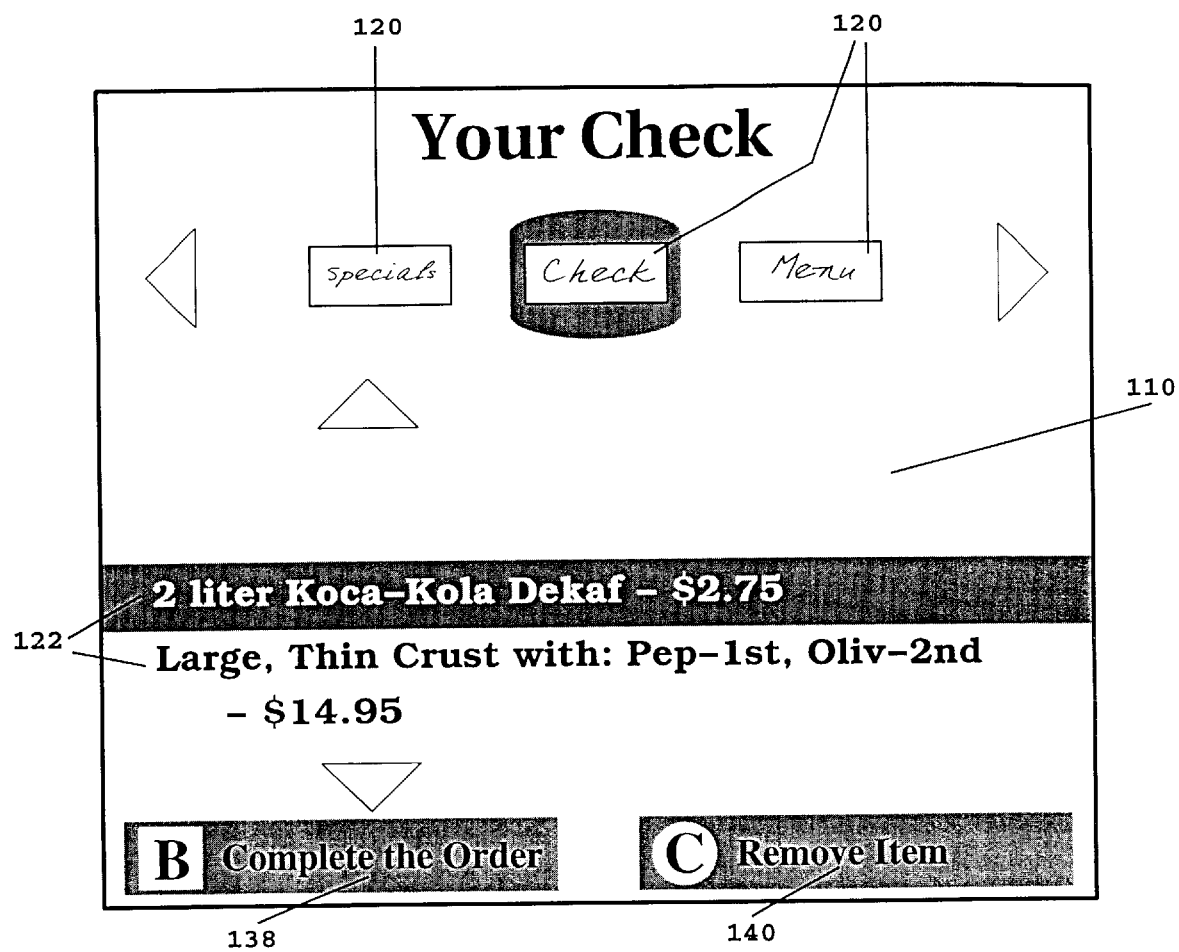
FIG. 43 illustrates the previously active and now reactivated screen last illustrated in FIG. 30 with the "Check" being displayed to the viewer.

"Custom" actions are supported by all types of node. This special action is used when the behaviors of a particular node are insufficient to handle a particular function. For example, the code required to transmit a food-service order may be specialized and thus unnecessary to include in the software library because not all applications using the navigational interface are likely to use this specific functionality. Therefore, a special segment of code is included in the navigational interface application that executes when the viewer requests this action. For example, as illustrated in FIG. 43, the viewer is informed that pressing the "B" function key 74 on the input device 13 completes the order. The action associated with the "B" function key can be established as a custom action which executes the order transmit code.

Movement is accomplished by various move actions, which are supported by cells 160 and numeric fields 150. "Move-down" actions are supported by cells and numeric fields, and focus is moved from the current node to the node directly beneath the current node element. "Move-left" actions are supported by cells and focus is moved from the current cell to the cell directly to the left of the current cell. "Move-right" actions are supported by cells and focus is moved from the current cell to the cell directly to the right of the current cell. "Move-up" actions are supported by cells and numeric fields and focus is moved from the current node to the node directly above the current node.

"Page-back" and "Page-forward" actions are supported by page 170. "Page-back" actions move focus from the current page to the previous page, when a previous page exists. "Page-forward" actions move focus from the current page to the next page, when a next page exists.

"Pop-Screen," "Play-Media," and "Push-Screen" actions are supported by all node types. Focus is moved from the current screen 110 to the screen below it on the screen stack when a "Pop-Screen" action is initiated. "Play-Media" actions indicate that the viewer has requested a video clip with audio, a video clip without audio, or an audio clip is to be played. If the clip has a video component, the video may be displayed fullscreen or in a limited portion of the screen. Focus is moved from the current screen to the specified new screen, pushing the new screen onto the screen stack when a "Push-screen" action is initiated.

"Append-Digit" and "Remove-Digit" actions are each supported by the numeric fields 150. "Append-Digit" actions indicate that the viewer has pressed a number button on the input device. "Remove-Digit" actions indicate the most recently entered digit in the numeric field be removed.

"Scroll-Down" and "Scroll-Up" actions are supported by the menu item 114. Focus is moved from the current menu item icon node 122 to the next menu item icon node on the list when a "Scroll-Down" action is initiated. Focus is moved from the current menu item icon node to the previous menu item icon node in the list when a "Scroll-Up" action is initiated.

"Scroll-Left" and "Scroll-Right" actions are supported by the category item 112. Focus is moved from the current category item icon node 120 to the previous category item icon node in the list when a "Scroll-Left" action is initiated. Focus is moved from the current category item icon node to the next category item icon node in the list when a "Scroll-Right" action is initiated.

The Hierarchy Manager

The hierarchy manager keeps track of all screens 110 and other nodes having focus. The hierarchy manager owns all screens, and the screen may contain all other node types. One screen is active at all times during the execution of any application using the navigational interface. The currently active screen is the only screen that is presented to the viewer 12 via the TV display device 11. If the active screen changes, the information presented to the viewer is updated to show only the contents of the newly activated screen.

The hierarchy manager also keeps track of the node having focus. At least one node will have focus at any time. Only nodes having focus may display any associated drawables 134. If the node has focus, then its parent node also has focus. If the node loses focus, then all of the node's child nodes lose focus. The screen that has focus is always the active screen.

In addition, the hierarchy manager maintains a "screen stack." The screen stack is a list of the screens 110 through which the viewer 12 has navigated using the input device 13. When an application using the navigational interface begins to execute, an initial screen, specified in the VICF, is pushed onto the screen stack, becoming the first or top record on the screen stack. If the viewer, via the input device, wishes to view another screen, the second screen is pushed onto the screen stack. If the viewer then wishes to return to the initial screen, which is the record next to the top of the stack, the current screen is popped from the screen stack and the screen now at the top of the screen stack (the initial screen) becomes the currently displayed screen.

The Screen

The screen 110 is the most fundamental type of node provided by the software library. All other types of node are contained by the screen. Pixels displayed on the TV display device 11 by the software library are drawn by the active screen or one of its child nodes. The screen inherits all the properties of the general node, plus additional properties specific to screens nodes. First, the screen may contain a background image.

The background image may be specified independently of the drawables 134 associated with the screen to facilitate displaying the background image beneath all other nodes, images, and textual strings on the screen. Second, the screen may contain a list of child nodes, including the category item 112, the menu item 114, the cell 160, the page 170, and the numeric field 150. Third, when the screen has focus, its background image, list of child nodes, and drawables are displayed. Finally, the screen has the capability of responding to "custom," "push-screen," "pop-screen," and "play-media" actions.

Various combinations of nodes may be displayed on the screen 110. For example, the screen may contain a list of category item icon nodes 120 with associated menu item icon nodes 122, or menu item nodes without category item nodes. In addition, the screen could contain just numeric fields 150, or pages 170, or cells 160. Furthermore, the screen could contain a list of pages with related cells on various pages. Finally, the screen could contain only drawables 134 with no nodes being displayed at all. Drawables may be displayed with any type of node to provide additional information to the viewer 12.

Overview of Navigational Interface Application Execution

Figure 110:
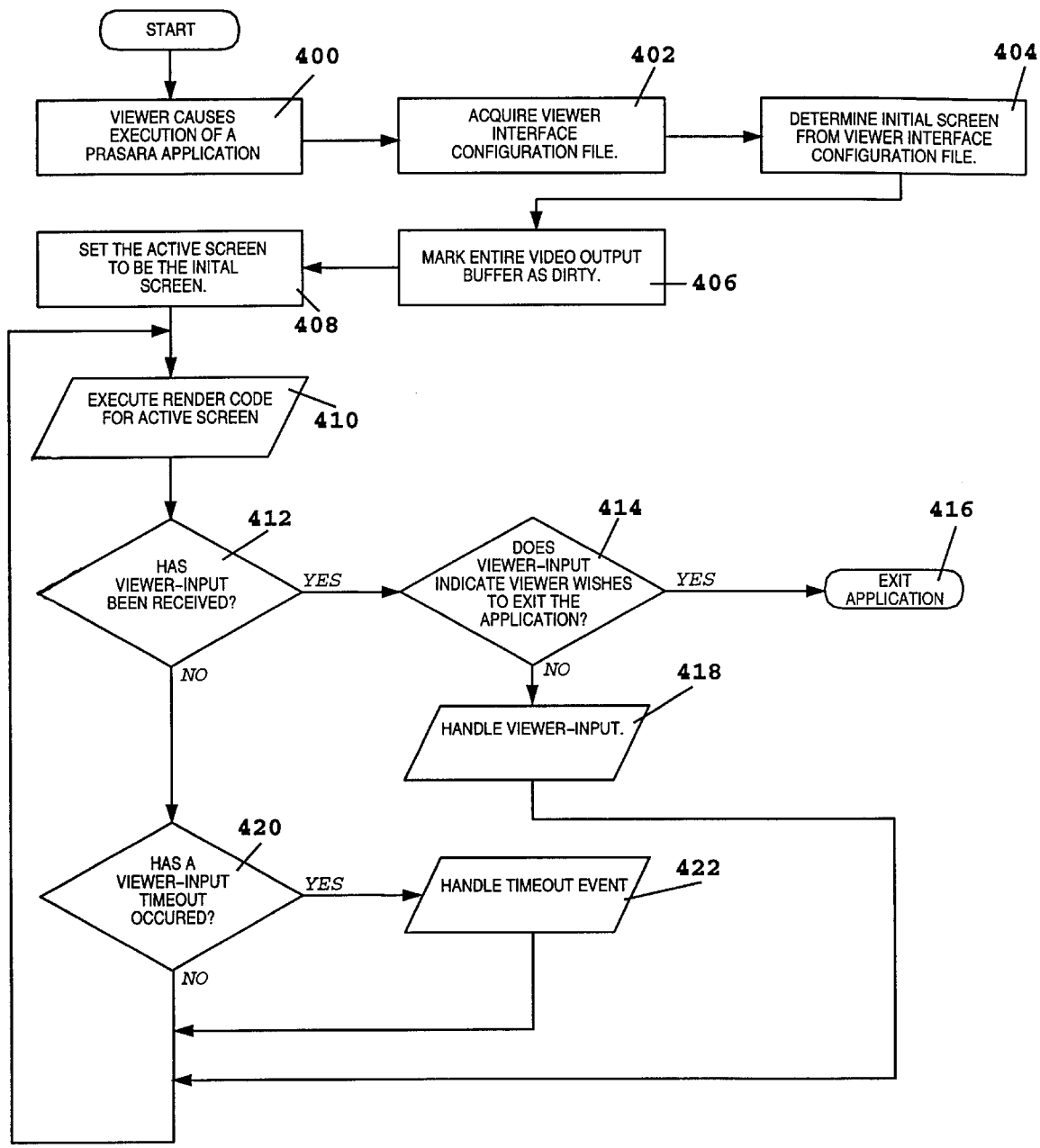
FIG. 110 is a flow-chart detailing the major functions and procedures performed and used by the present invention.

In accordance with one aspect of the present invention, the major functions performed when an application uses the navigational interface are depicted in FIG. 110. When the viewer 12 triggers operation of the navigational interface application, the operating system running on the client terminal 9 loads the binary code to enable the application to start executing 400. The software library obtains the VICF 402, for example, by receiving it from the distribution network 8 or extracting it from another part of the binary code, or by other methods dependent on the technologies implemented in the data center 1.

The activation of the initial screen 110 is determined by inspecting the VICF 404. Before making this screen active, the entire video output buffer is marked as "dirty" 406. In the preferred execution of the present invention, the video output buffer is inspected after each remote event and after each timer event to determine if any portions of the buffer are "dirty." Those portions marked as "dirty" are completely redrawn to guarantee the viewer is presented with the freshest state of all visible nodes. Initially, the entire TV display device 11 is redrawn to contain the text and images specified by the VICF. Subsequently, only the parts of the video output buffer that are marked as "dirty" are redrawn, facilitating code and run-time optimization. The hierarchy manager then makes the initial screen active and gives the screen focus 408, and directs the active screen to display or "render" itself 410 on the TV display device (see FIG. 111).

Figure 111:
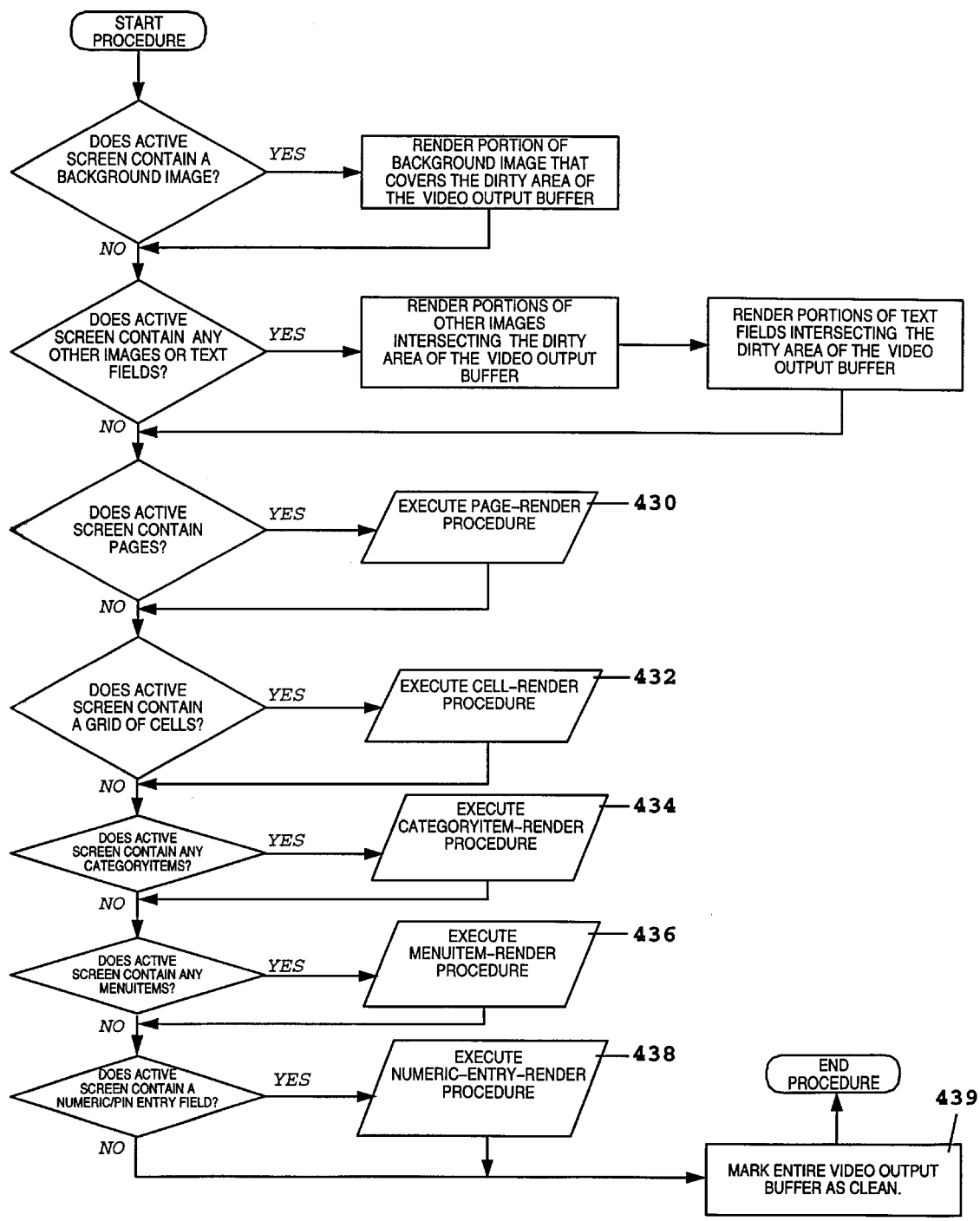
FIG. 111 is a flow-chart of the render code used with the active screen.
Figure 112:
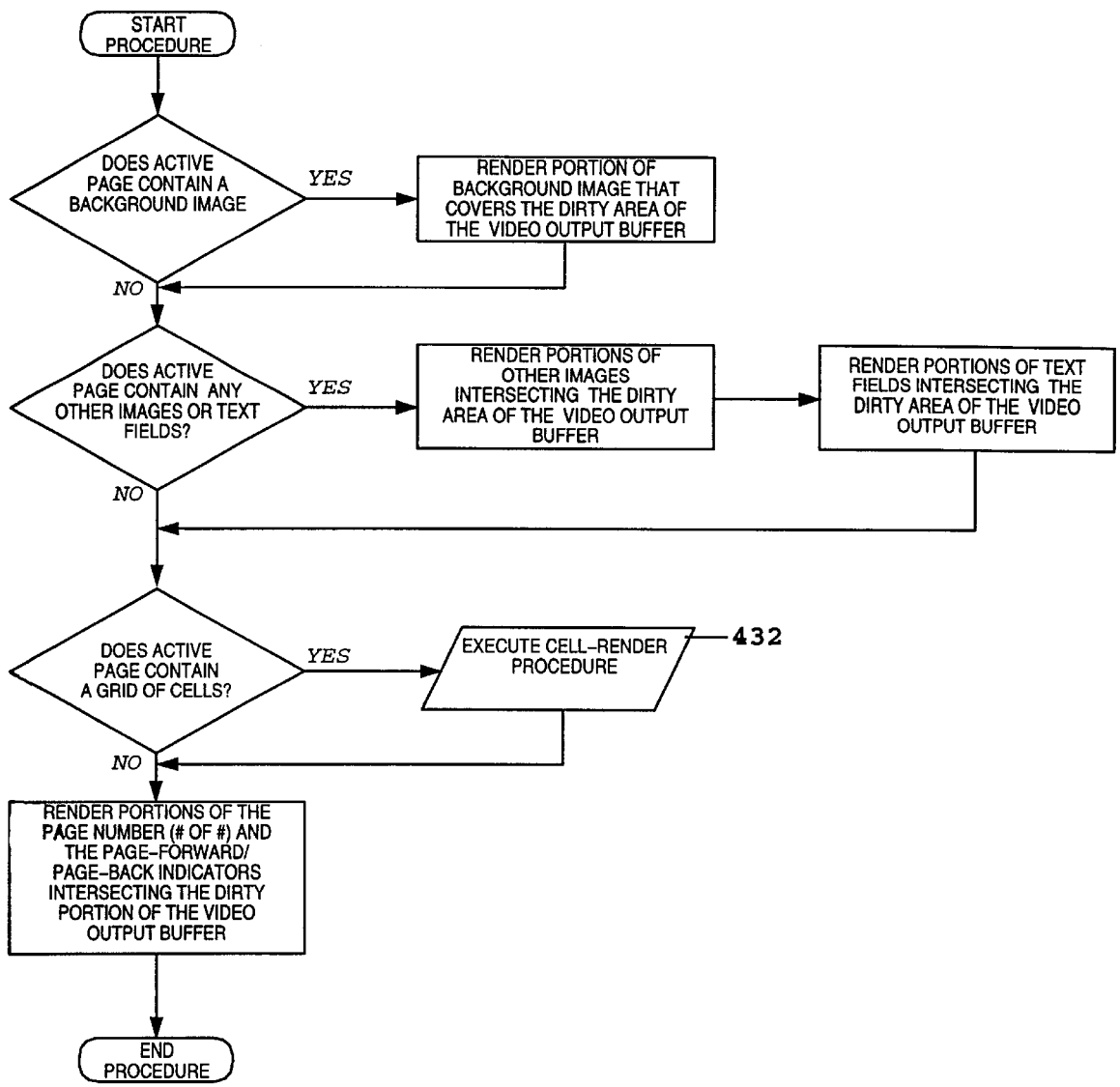
FIG. 112 is a flow-chart of the render code for the page node.
Figure 113:
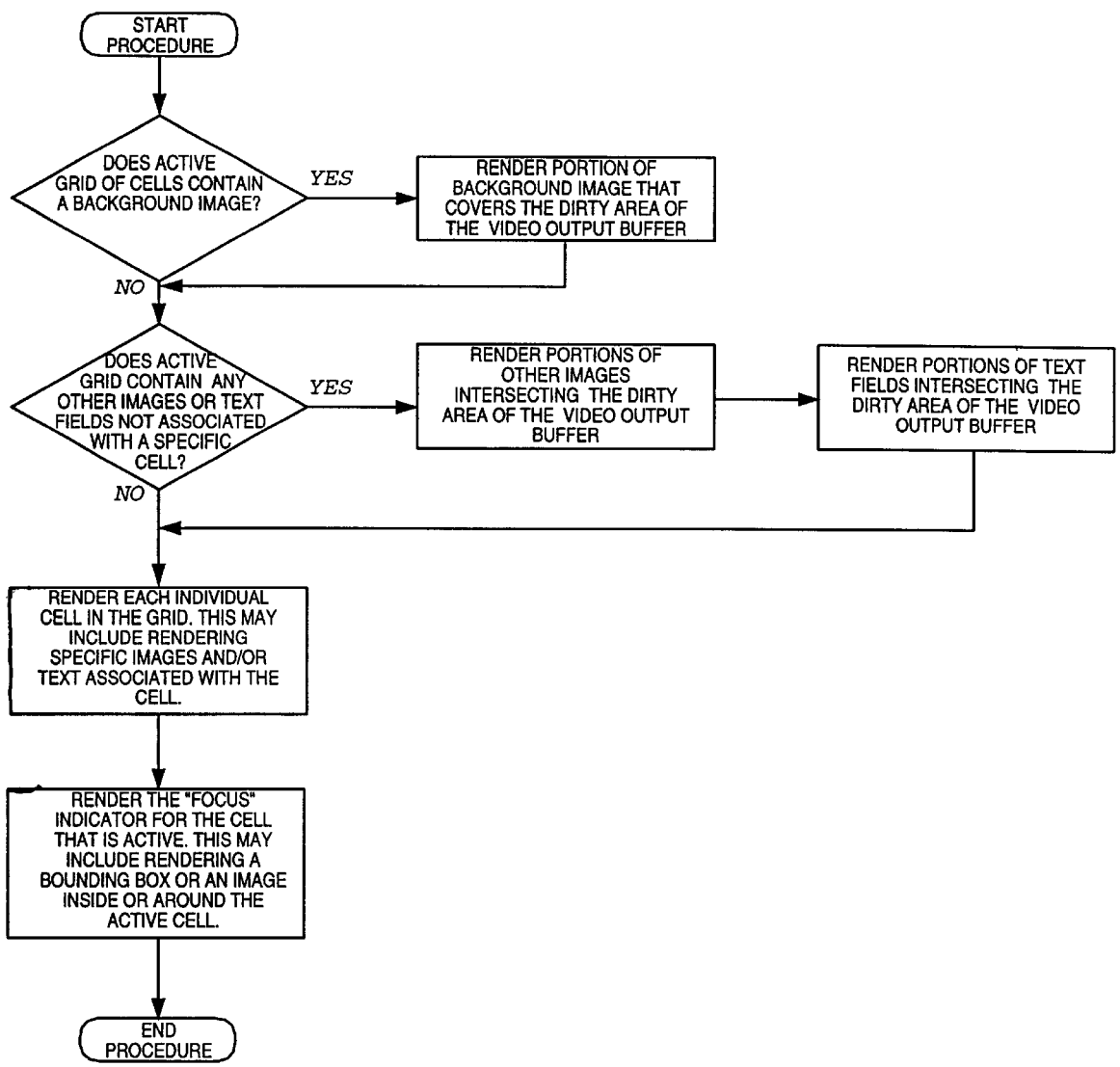
FIG. 113 is a flow-chart of the render code for the cell node.
Figure 114:
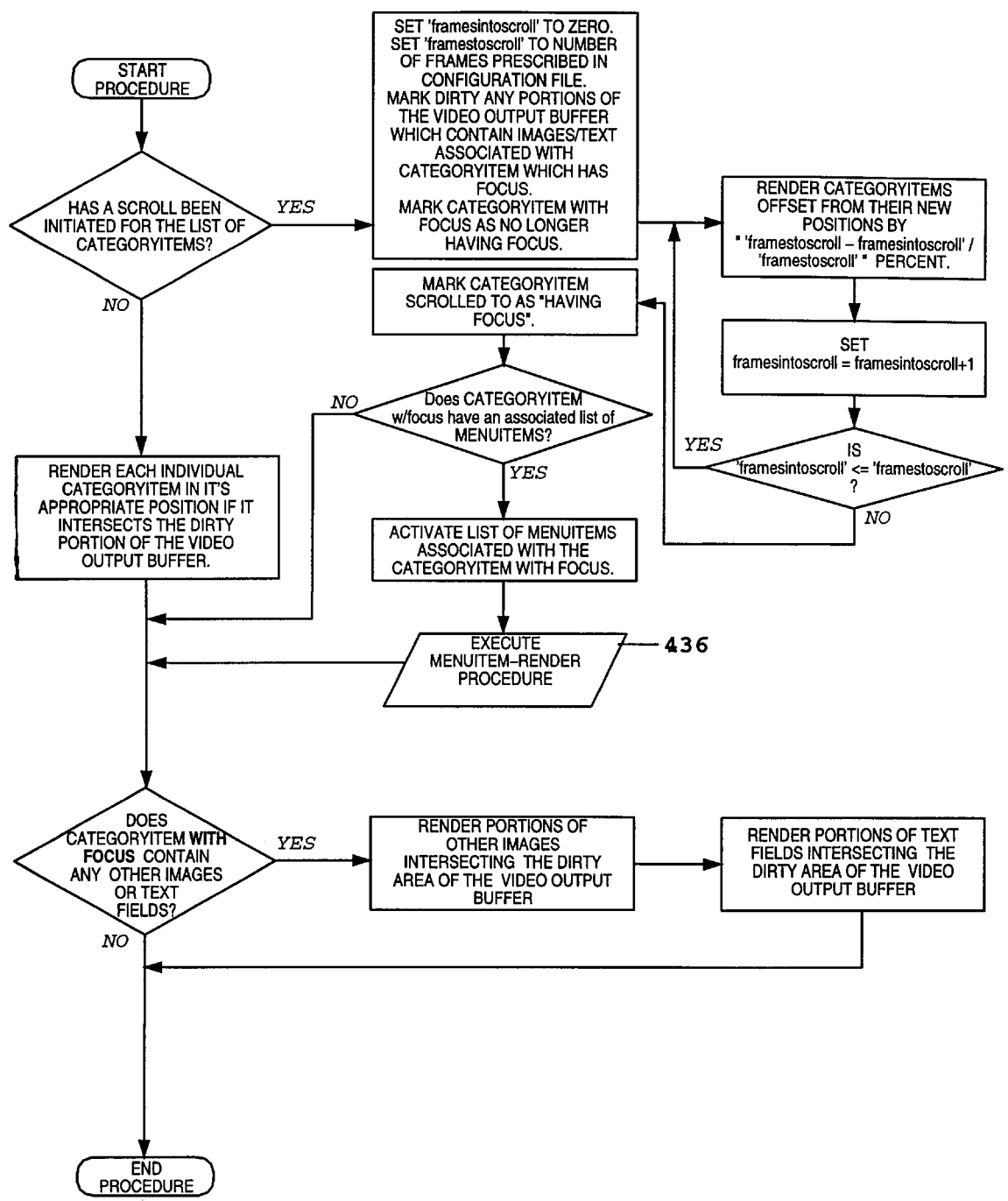
FIG. 114 is a flow-chart of the render code for the category item.
Figure 115:
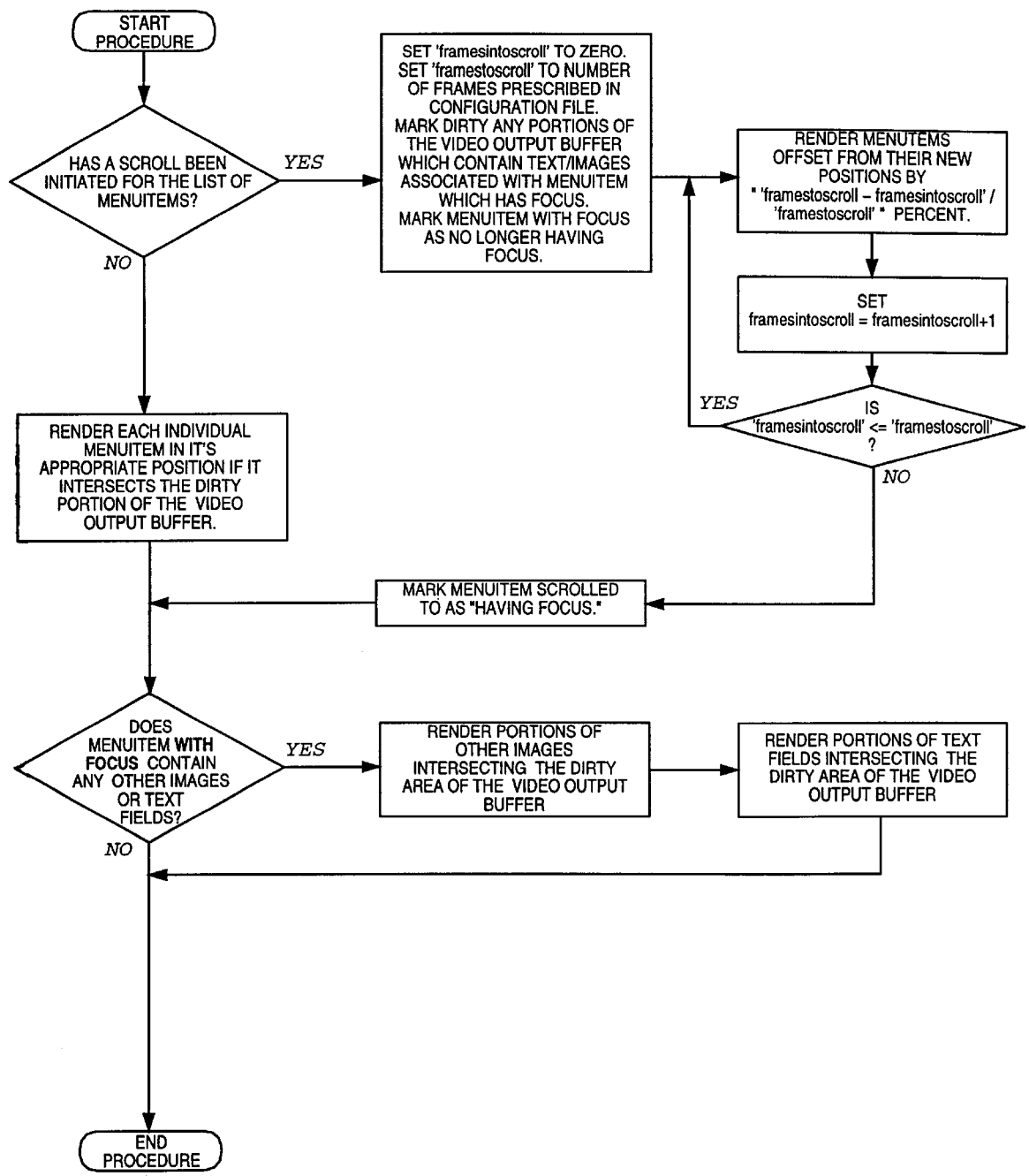
FIG. 115 is a flow-chart of the render code for the menu item.

As illustrated in FIG. 111, the render code procedure, options (430–438) for the active screen 110 are shown. The render code provides the background of the current screen and other drawables 134 in addition to other nodes which may be present on the active screen. The render logic for each individual node is illustrated in FIGS. 112–116. The page's 170 render code, FIG. 112, is performed in 430. The cell's 160 render code, FIG. 114, is 434. The menu item's 114 render code, FIG. 115, is performed in 436. After the screen's render code procedure options (430–438) have been performed, the video output buffer is marked as "clean" 439 and the procedure ends.

Figure 116:
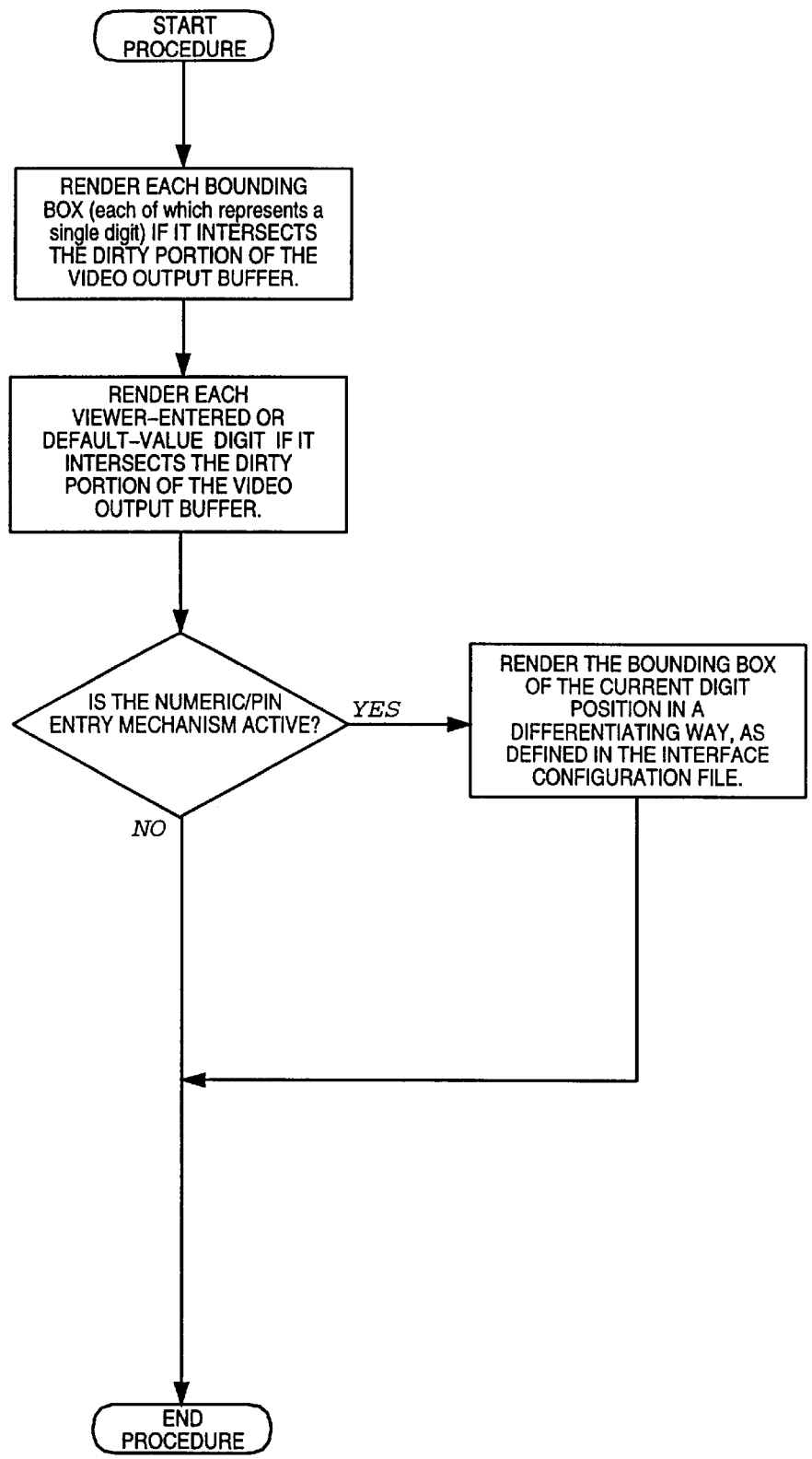
FIG. 116 is a flow-chart of the render code for the numeric entry node.

The render code procedures for the various node options are illustrated in FIGS. 112–116. The page 170 node render code is illustrated in FIG. 112, which also makes use of the cell's 160 render code if the page contains any cells. The render code for the category item 112 contains the logic for implementing the scrolling effect for category items (FIG. 114). The render code for the category item also makes use of the menu item's 114 render code or procedures if the category item has an associated list of menu item icon nodes. The render code for the menu item contains the logic for implementing the scrolling effect for menu item icon nodes (FIG. 115). The numeric field field's 150 render code is illustrated in FIG. 116.

Figure 117:
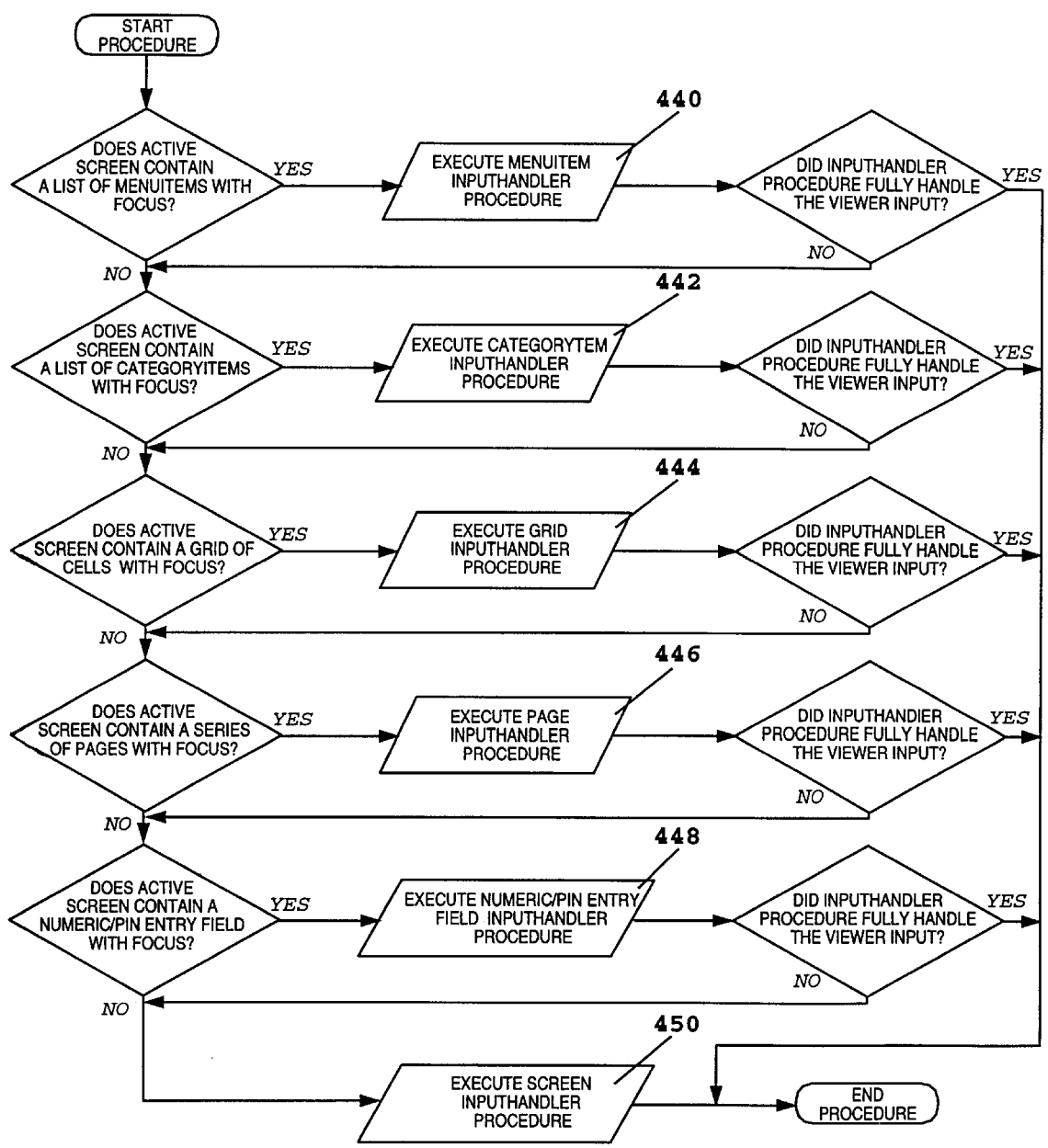
FIG. 117 is a flow-chart detailing how viewer input is handled.
Figure 118:
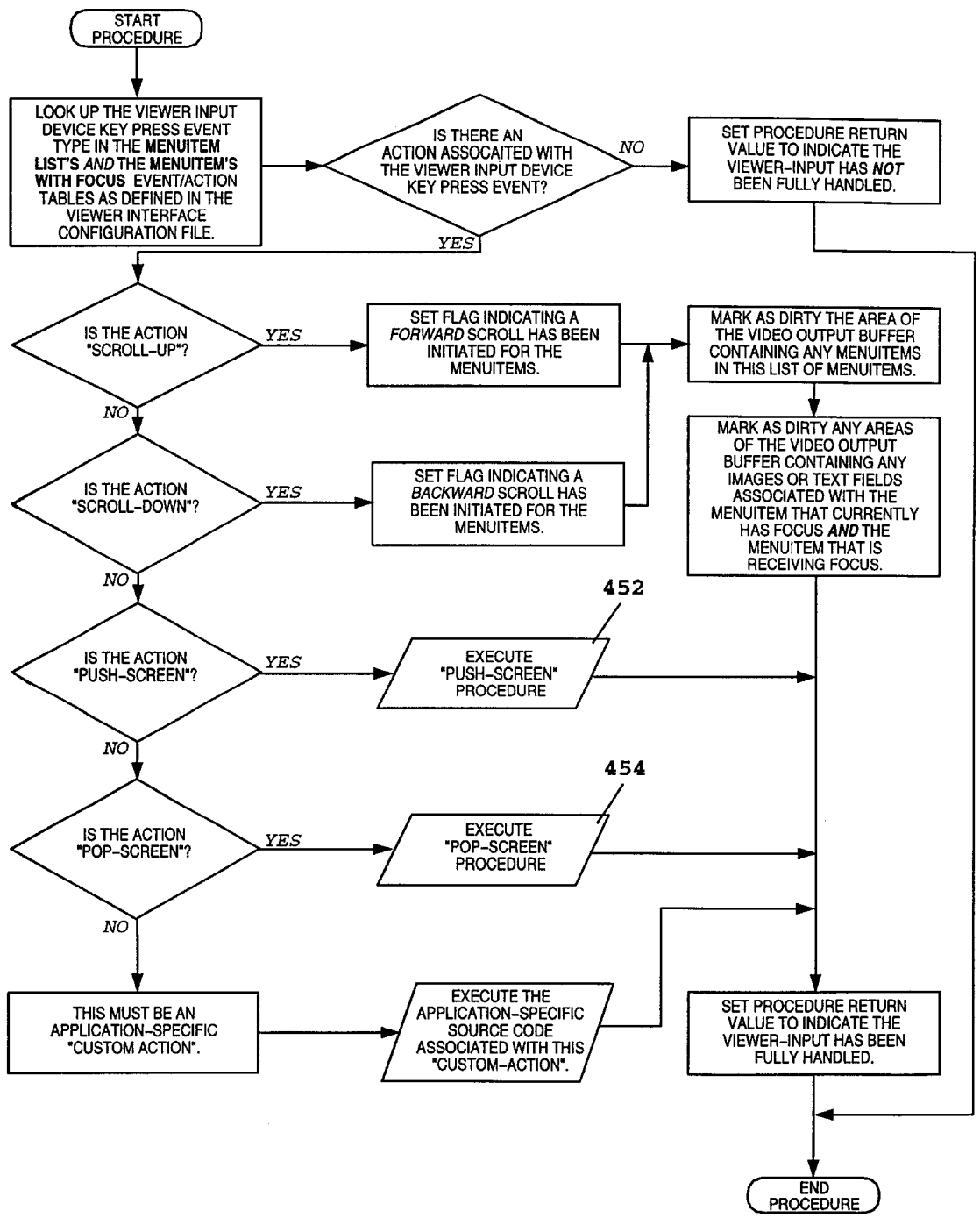
FIG. 118 is a flow-chart of the input handler code for the menu item.
Figure 119:
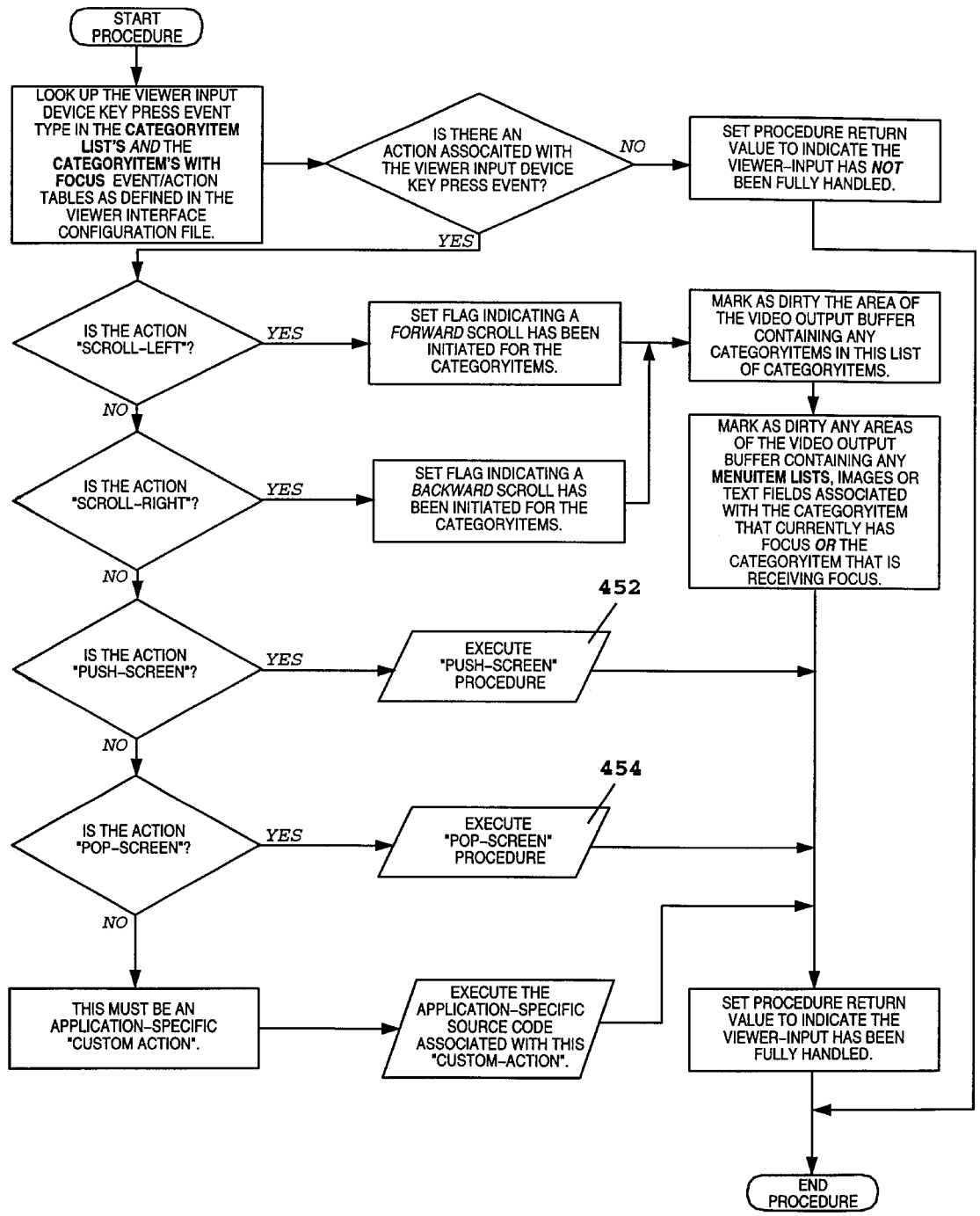
FIG. 119 is a flow-chart of the input handler code for the category item.
Figure 120:
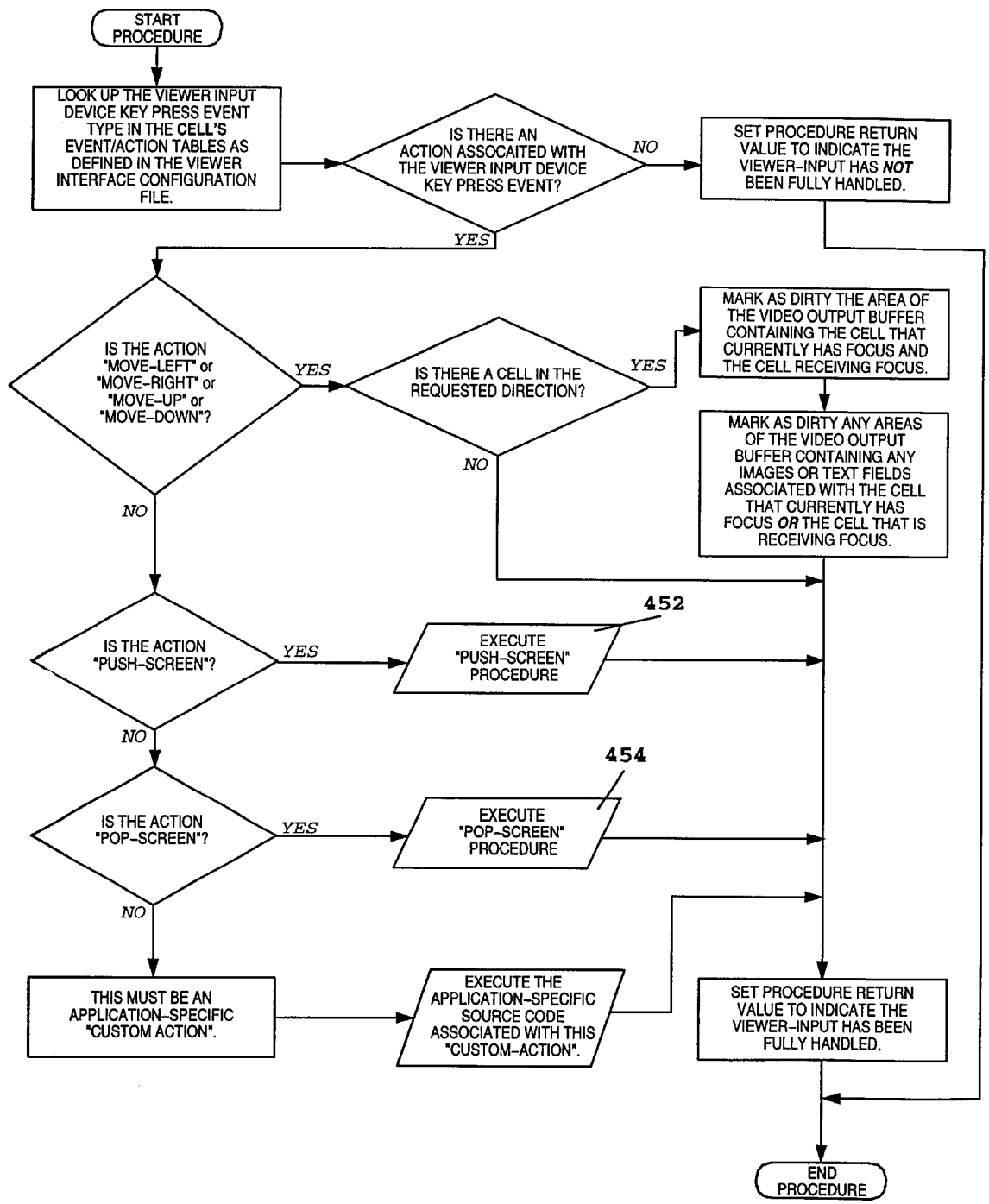
Figure 121:
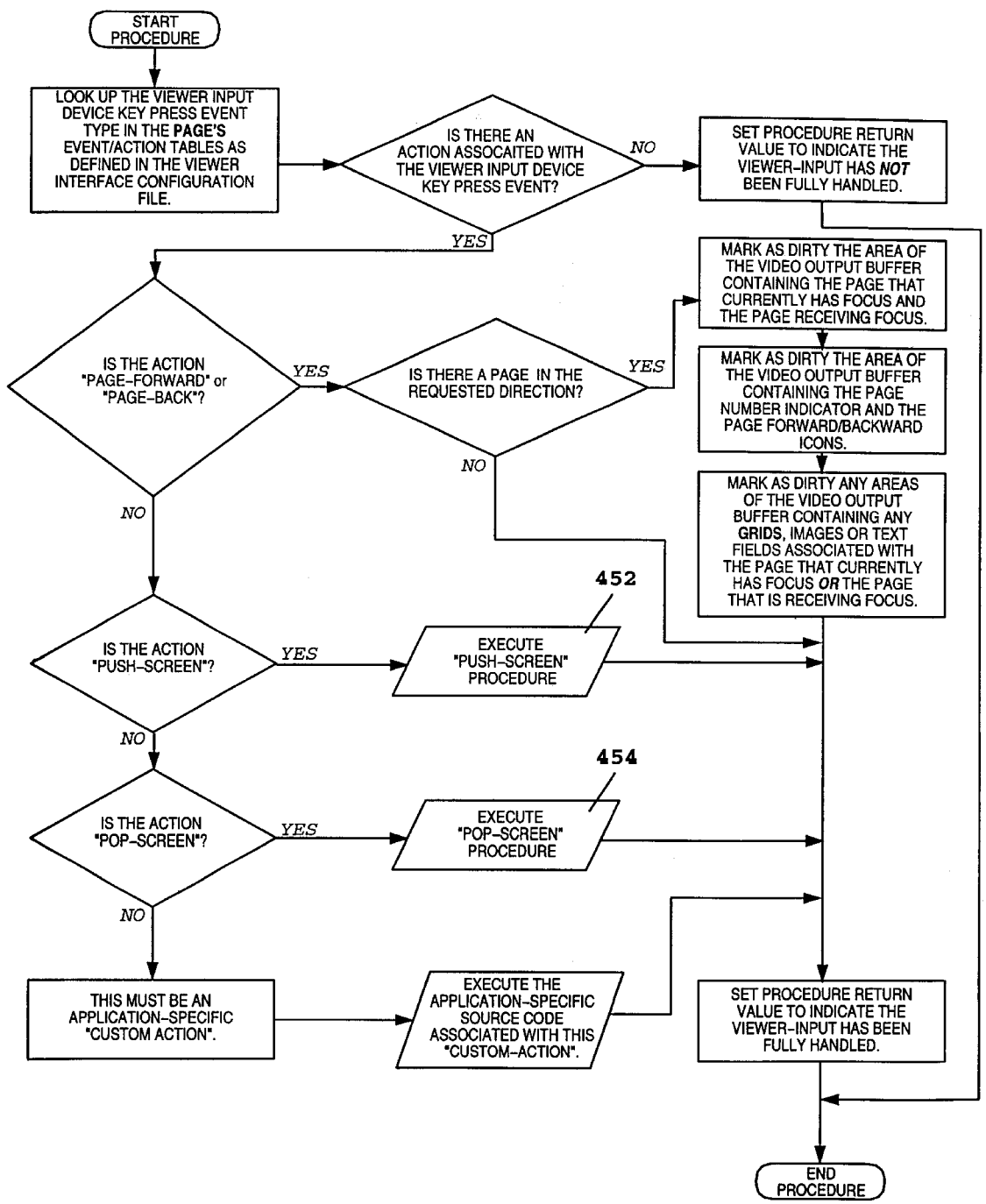
Figure 122:
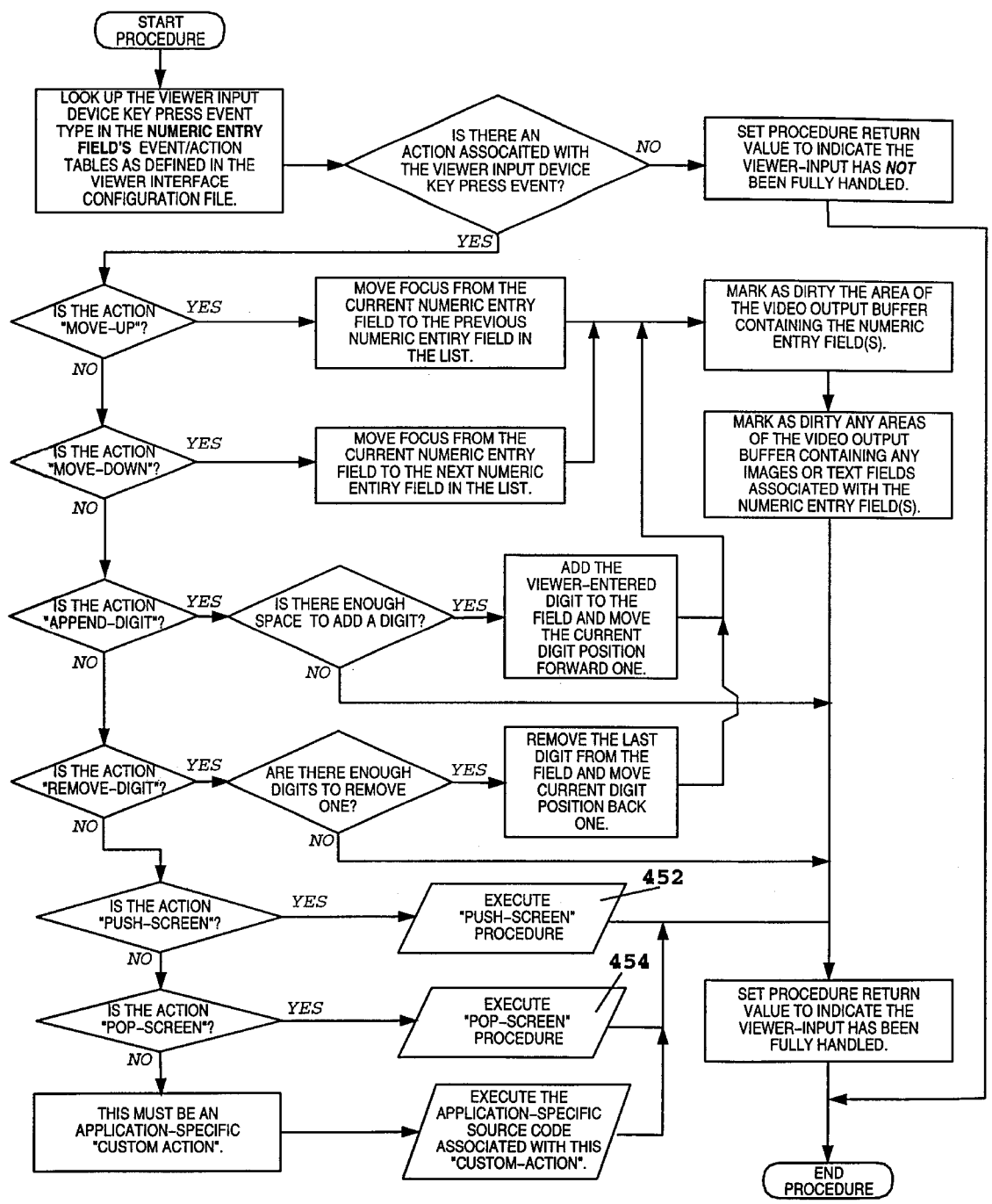
Figure 123:
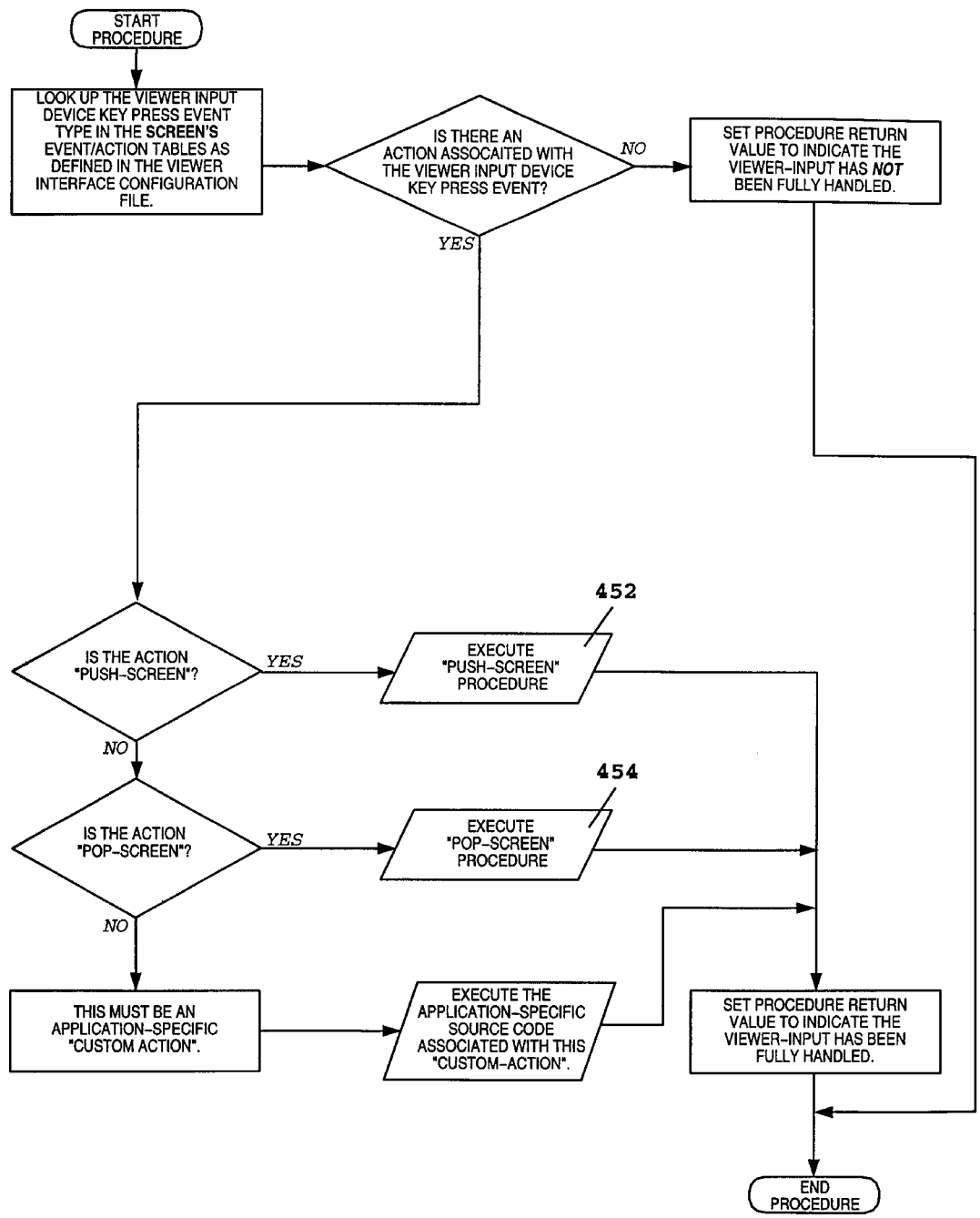

The detailed functions of the handle viewer-input 418, which handles viewer 12 inputs for the present invention, are illustrated in FIG. 117. Preferably, the handle viewer-input procedure examines the screen 110 currently active to see if it contains a list of nodes. If a list of nodes is found, a designated method for handling the viewer input for each particular node (440–450) is called. If a viewer input can be fully handled by any single handler for a particular node, then the viewer input is considered handled and will no longer be considered by any node for handling.

Figure 124:
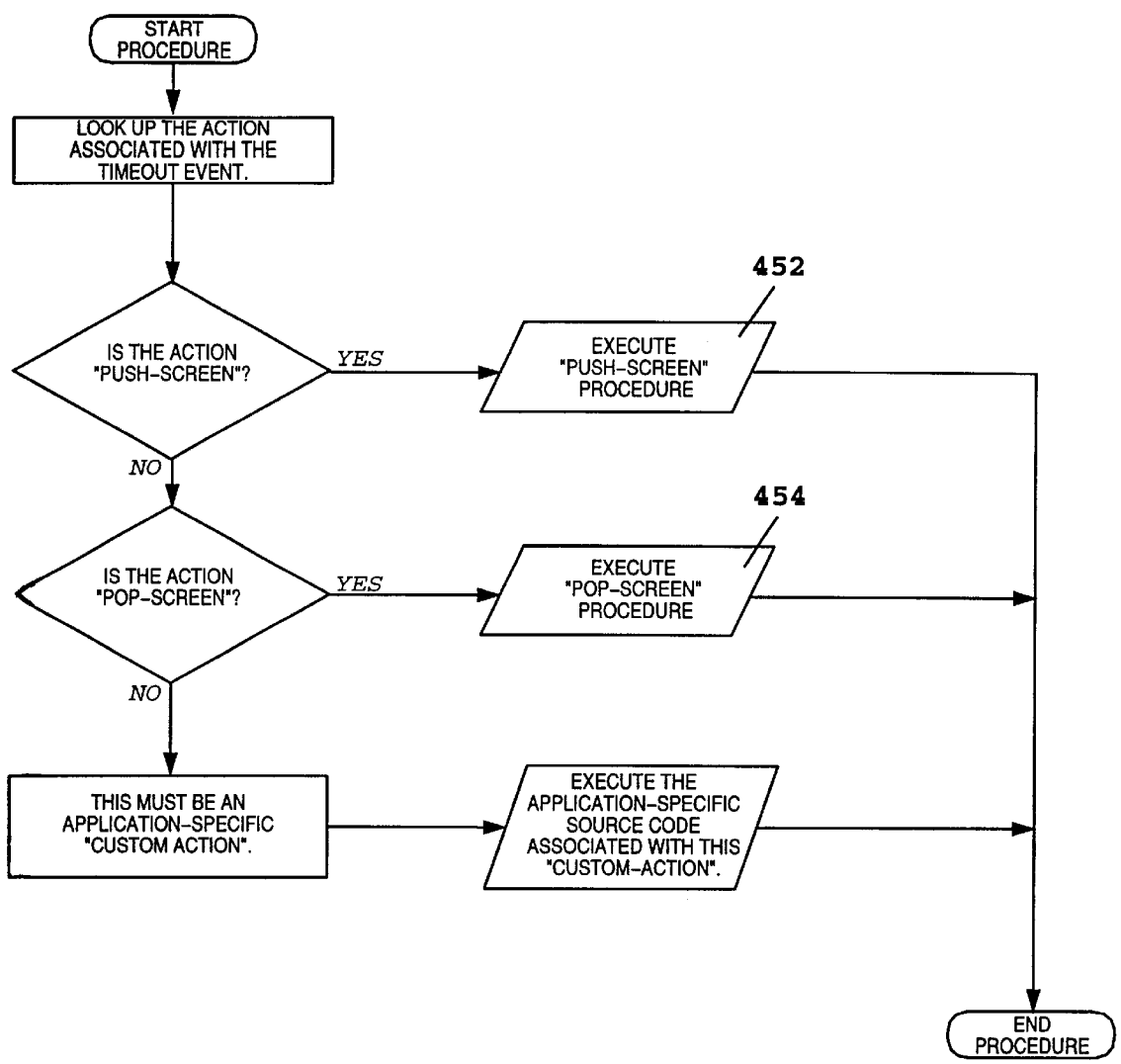
Figure 125:
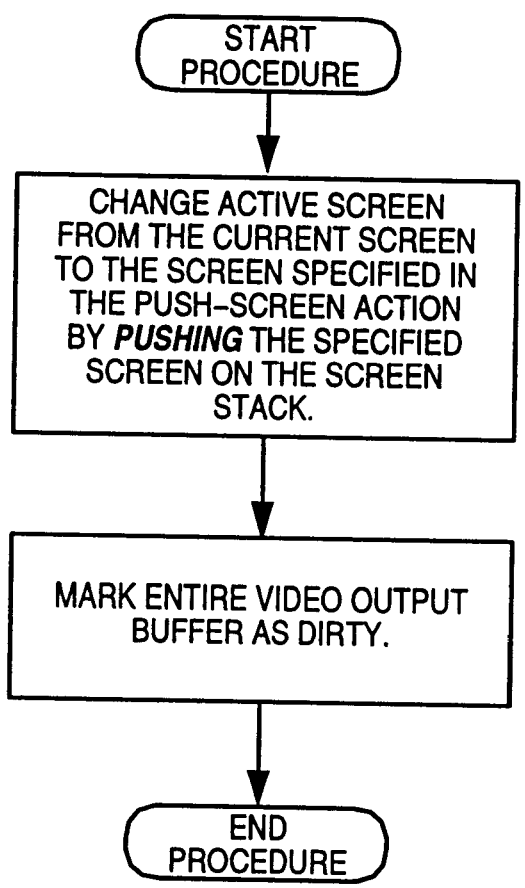
Figure 126:
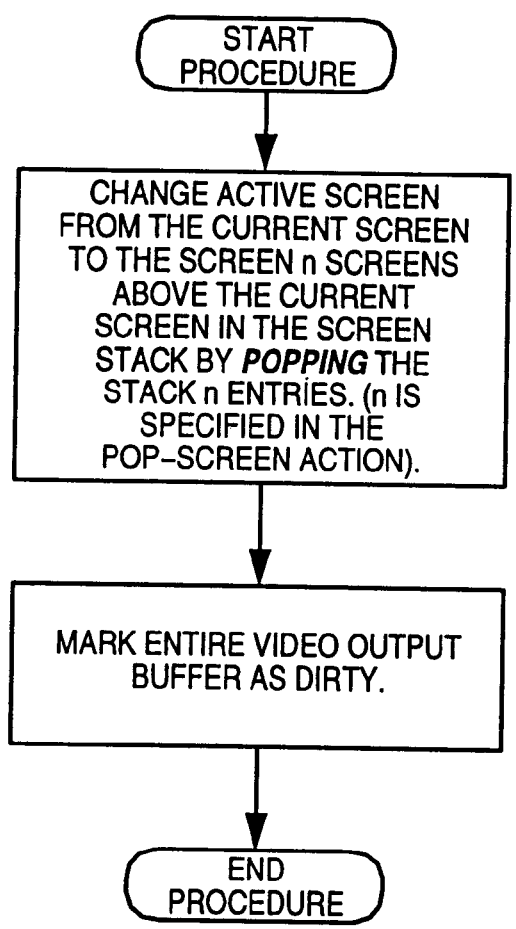

The methods for handling the viewer input handling procedures for menu items 114, category item 112, cell grids 160, pages 170, numeric fields 150 and screens 110 for each particular node are illustrated in FIGS. 118–123. The input handler codes for the menu items, category items, grids of cells, pages, numeric fields and screens make use of the "push-screen" procedure 452, which is illustrated in FIG. 125, and the "pop-screen" procedure 454, which is detailed in FIG. 126. The timeout event handler also makes use of the "push-screen" procedure and "pop-screen" procedure (see FIG. 124).

The operating system informs the navigational interface application 412 whether or not the viewer 12 pressed a key on the input device 13 (see FIG. 110). If the viewer did press a key, the hierarchy manager inspects the viewer input and determines whether the viewer wishes to exit the navigational interface application 414. If the viewer wants to exit, then the application ends 416. If the viewer wants to continue, then the viewer input is handled by the software library 418 (see FIG. 117). If the viewer input changes the video output buffer, then the modified portions of the video output buffer are marked as "dirty", prompting the active screen's 110 render methods to execute again 410, followed by another check for viewer input 412. Thus, the main loop of the navigational interface application comprises displaying the active screen by rendering the video output buffer, getting input from the viewer, reacting to the viewer input, and rendering the video output buffer if it is changed by the viewer input. If no viewer input is received and a viewer input timeout occurs 420, a particular action may occur depending on the amount of time that passes with no viewer interaction 422 (see FIG. 124). After handling the timeout event, the main loop of the application re-executes 410.

The Category Item

The category item 112 type of node contains a list of category item icon nodes 120 (see FIG. 5) representing categories of items for the viewer 12 to choose from, such as drama or sports (e.g., see FIG. 8). The list of category item nodes is rendered as a series of choices in a list which the viewer may scroll to the left or right using the input device 13.

The list of category item icon nodes 120 may be rendered within any specified region on the TV display device 11. The region is referred to as a category "extent-box" 116 (see FIG. 5). The category extent-box is defined in the VICF. An area inside the category extent-box, referred to as a category "focus-box" 118, lets the viewer 12 know which of the category item nodes has focus. The category focus-box is also defined in the VICF. The category item nodes not having focus are rendered to the left and right of the category focus-box, fitting as many as possible within the category extent-box while maintaining even spacing between the category item nodes. The number of category item nodes may vary depending on the particular navigational interface application. If not enough space is available to render all of the category item nodes, then the ones that do not fit within the category extent-box are not rendered. If there are fewer category item nodes in the list than the maximum number (dependent on factors such as the size of the category extent-box and the sizes of the category item nodes) that will fit in the category extent-box, then all of the category item nodes are rendered, leaving blank the portions of the category extent-box not containing category item nodes.

Figure 9:
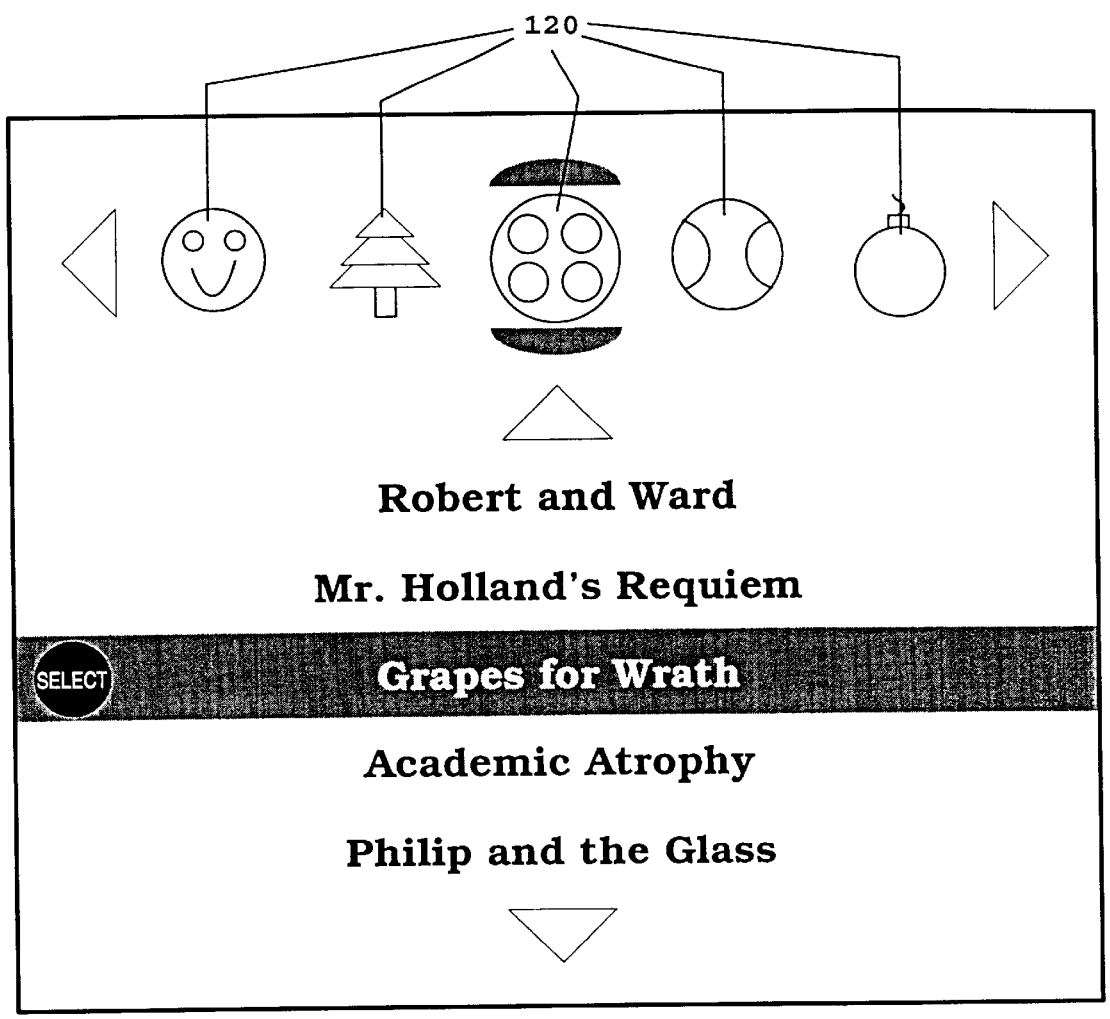
FIG. 9 illustrates both the menu item and category item components, with the category items represented as image-based icons only and the menu items represented as textual strings only.

The category item 112 inherits the basic properties of the general node, plus properties specific to the category item type of node. First, as described above, the list of category item icon nodes 120 is displayed to the viewer 12 within the category extent-box 116, with the category item node having focus displayed within the category focus-box 118. Second, the category item nodes may be represented by an image (e.g., see FIG. 9), by text only, or by a combination of image and text (e.g., see FIG. 8). The image and text are specified independently of the drawables 134 associated with the category item nodes. Third, the category item nodes may contain the menu item 114 with a list of specific menu item icon nodes 122 for the viewer to choose from, such as a particular movie (e.g., see FIG. 8). The menu item nodes contained by a category item node are visible only if that particular category item node has focus. Fourth, when a category item node has focus, its image and text are rendered inside the category focus-box, and any associated drawables and menu item nodes are displayed. Fifth, the category item is capable of handling "scroll-left," "scroll-right," "play-media," "push-screen," and "pop-screen" actions.

Finally, the list of category item icon nodes 120 may be defined as "circular" (the default) or "non-circular." If the list of category item nodes is circular, then a category item node that scrolls to the left or right edge of the category extent-box 116 is rendered on the opposite side of the category extent-box if the viewer 12 continues scrolling in the same direction. If the list of category item nodes is non-circular, then the viewer may scroll to the left or right only until the last category item node in the list of category item nodes is rendered inside the category focus-box 118.

Figure 5:
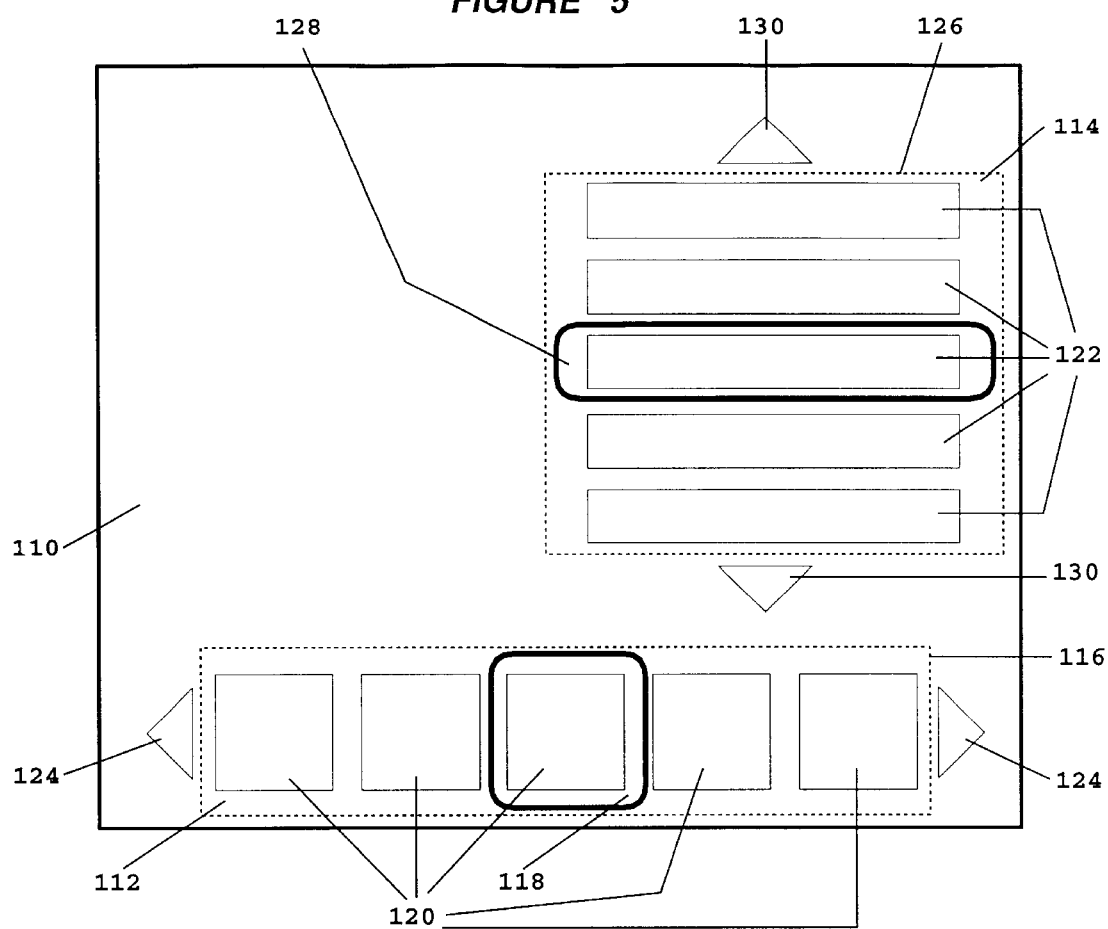
FIG. 5 illustrates, in wire frame format, three of the basic interface components of the present invention the screen, category item and menu item.

In one embodiment of the present invention, as illustrated in FIG. 5, five category item icon nodes 120 are currently visible. Although the category item nodes shown are square in shape, the nodes may be any shape depending on the contents of the images and text rendered to represent the category item nodes. If the list of category item nodes contains more than five category item nodes, then the additional nodes are not visible because of the size of the nodes and the category extent-box 116. Stationary visual cues 124 inform the viewer 12 that the viewer may scroll the list of category item nodes to the left and right. The menu item icon nodes 122 displayed are associated with the category item node currently having focus within the category focus-box 118. The category focus-box remains stationary during scrolling. Thus, as the viewer scrolls left or right, the category item nodes all move in the same direction until another category item node is centered within the category focus-box. While the category item nodes are scrolling, if a particular category item node reaches the edge of the category extent-box, the entire category item node is marked as non-visible and will not be rendered to the viewer until it scrolls back inside the category extent-box.

If there are fewer category item icon nodes 120 than are required to fill the category extent-box 116, then the category item nodes are rendered as evenly as possible (or balanced) around the category focus-box 118. For example, if three or five category item nodes are displayed, then the category focus-box will be located in the center of the category extent-box with an even number of category item nodes displayed on either side of the category focus-box (e.g., see FIGS. 8 and 23). However, if four category item nodes are displayed, then in one embodiment, the category focus-box may be centered on the second category item node with one of the remaining nodes being located to the left and two nodes to the right of the category focus-box (e.g., see FIG. 83).

If the list of category item icon nodes 120 is circular and there are fewer category item nodes than are required to fill the category extent-box 1!16, then, during scrolling, the category item node reaching one extreme side of the category extent-box is moved to the other side as the viewer 12 continues to scroll. For example, when scrolling left, the leftmost category item node would move to the rightmost side of the category extent-box. In circular mode, the list of category item nodes is seen from the viewer's perspective as having no beginning or end. The list continuously loops through all choices from beginning to end and then back to the beginning again.

If the list of category item icon nodes 120 is non-circular, then the category item nodes are initially rendered with the first category item node inside the category focus-box 118 and all other category item nodes to the right of the category focus-box. The viewer 12 cannot scroll left because there are no category item nodes to the left of the first category item node in the list. The viewer may scroll right and continue scrolling right until the last category item node in the list is rendered inside the category focus-box. At this point, the viewer may no longer scroll right. In non-circular mode, the viewer perceives the list of category item nodes as having a distinct beginning and end.

The Menu Item

The menu item 114 type of node may present any number of services to the viewer 12, including playing an audio/video clip, transferring focus from the current screen 110 to a different screen, ordering a product, and changing a viewer preference. The list of menu item icon nodes 122 is rendered as a series of choices in a list which the viewer may scroll up or down using the input device 13.

The list of menu item icon nodes 122 may be rendered within any specified region on the TV display device 11. The region is referred to as a menu extent-box 126 (see FIG. 5). The menu extent-box is defined in the VICF. An area inside the menu extent-box, referred to as a menu focus-box 128, lets the viewer 12; know which of the menu item nodes has focus. The menu focus-box is also defined in the VICF. The menu item nodes not having focus are rendered above and below the menu focus-box, fitting as many as possible within the menu extent-box. If not enough space is available to render all of the menu item nodes, then the ones that do not fit within the menu extent-box are not rendered. If there are fewer menu item nodes in the list than the maximum number that will fit in the menu extent-box, then all of the menu item nodes are rendered, leaving blank the portions of the menu extent-box which do not contain menu item nodes.

Figure 10:
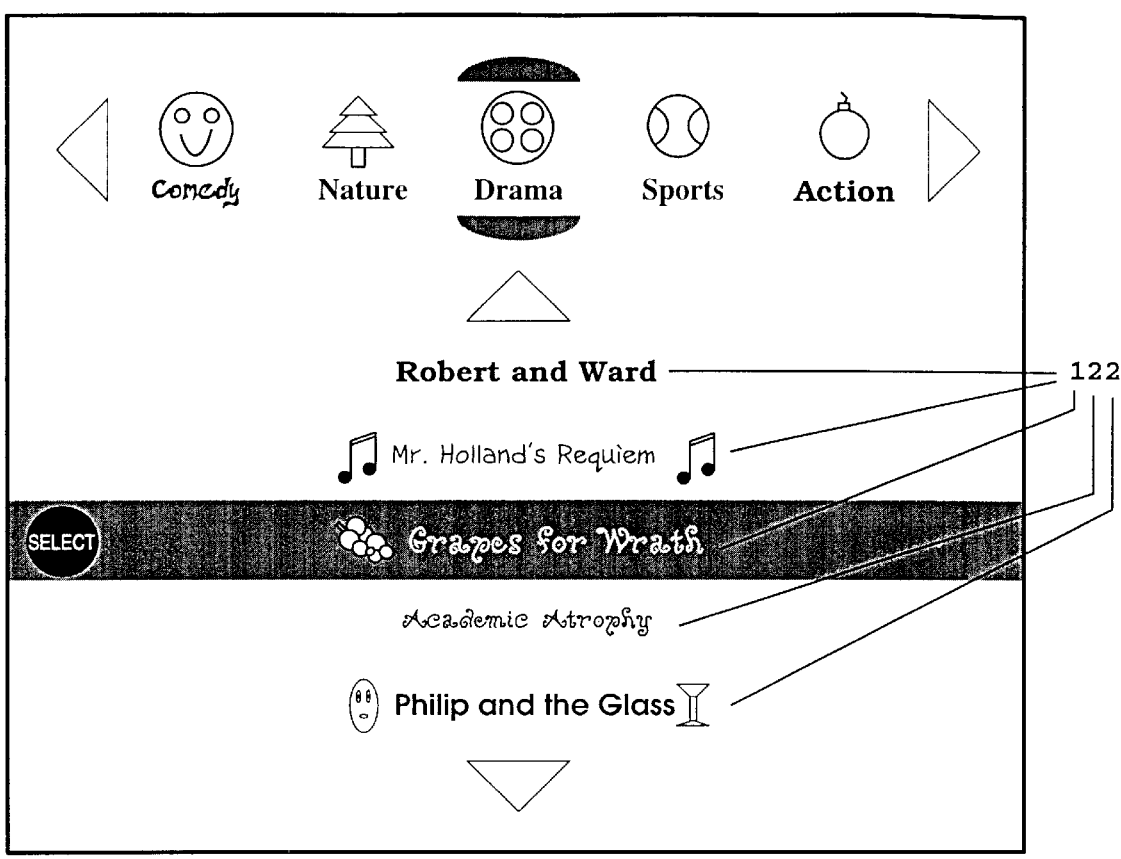
FIG. 10 illustrates both the menu item and category item components, with the category items represented as both image-based icons and textual strings and the menu items represented as both image-based icons and textual strings.

The menu item 114 type of node inherits basic properties of the general node, plus properties specific to the menu item type of node. First, as described above, the list of menu item icon nodes 122 is displayed to the viewer 12 within the menu extent-box 126, with the menu item node having focus displayed within the menu focus-box 128. Second, the menu item nodes may be represented by an image, by text (e.g., see FIG. 8), or by a combination of image and text (e.g., see FIG. 10). The image and text are specified independently of the drawables 134 associated with the menu item nodes. Third, when a menu item node has focus, its image and text are rendered inside the menu focus-box, and any associated drawables are displayed. Fourth, the menu item is capable of handling actions to "scroll-up," "scroll-down," "push-screen," and "play media." Finally, the list of menu item nodes may be defined as circular (the default) or non-circular. Circular and non-circular modes for the menu item function similarly to those for the category item 112, the difference being scrolling up and down as opposed to left and right.

Figure 22:
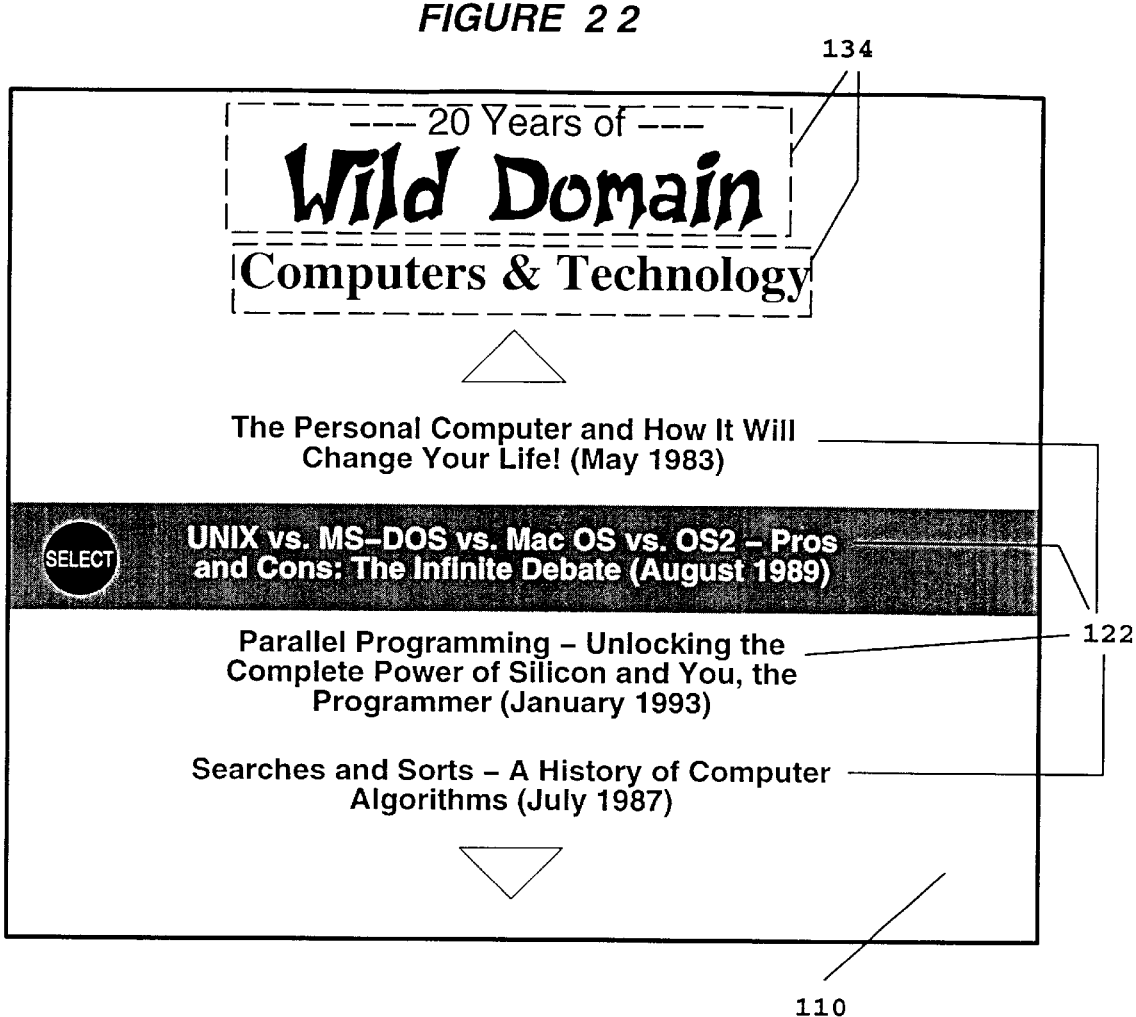
FIG. 22 illustrates another change in screens with the original screen, presented in FIG. 21 replaced with a new screen containing a background .image ("—20 Years of—" and the "Wild Domain" logo) and a list of menu items without contain category items.

In one embodiment of the present invention, illustrated in FIG. 5, five menu item icon nodes 122 are currently visible. Although the menu item nodes shown are rectangular in shape, the nodes may be any shape depending on the contents of the images and text rendered to represent the menu item nodes. If the list of menu item nodes contains more than five menu item nodes, then the additional nodes are not visible because of the size of the nodes and the menu extent-box 126. Stationary visual cues 130 inform the viewer 12 that the list of menu item nodes may be scrolled up and down. The menu item nodes displayed are associated with the category item icon node 120 currently having focus within the category focus-box 118. The category item node having focus is the parent or owner of the list of menu item nodes. The screen 110 may contain a list of menu item nodes directly without containing the list of category item nodes (e.g., see FIG. 22).

The menu focus-box 128 remains stationary during scrolling. Thus, as the viewer scrolls up or down, the menu item icon nodes 122 all move in the same direction until another menu item node is centered within the menu focus-box. While the menu item nodes are scrolling, if a particular menu item node reaches the edge of the menu extent-box, the entire menu item node is marked as non-visible and is not rendered to the viewer 12 until it scrolls back inside the menu extent-box.

The Numeric Field

The numeric field 150 is a type of node for allowing the viewer 12 to enter a number that may be interpreted by the navigational interface application. The screen 110 may contain a list of numeric fields, enabling the viewer to enter multiple numbers on a single screen. Only one numeric field has focus at a time, and the numeric field having focus is the one the viewer is currently editing.

The numeric field 150 inherits the basic properties of the general node, plus properties specific to numeric fields. First, the numeric field may contain a certain number of digits as specified in the VICF. Second, the numeric field may be positioned anywhere on the screen 110. Third, the numeric field is displayed as a series of boxes, each box corresponding to one digit. Items such as the spacing between the boxes, the color of the boxes, and the size of the boxes are configurable in the VICF. Preferably, the box of the digit currently being entered is displayed in a different color to indicate to the viewer 12 that this box is for holding the current digit.

Fourth, the numeric field 150 allows digits to be entered from left to right or from the right. When entered from left to right, the new digits are appended to the end of the already entered digits and the current digit indicator moves to the right one digit at a time. When entered from the right, all the digits move one digit to the left each time an additional digit is entered and the current digit indicator always stays over the right-most digit. Entering digits from the right is useful, for example, when entering numeric dollar values that include cents.

Fifth, the numeric field 150 has a "pin" mode in which the digits the viewer enters are not displayed on the TV display device 11. Instead, the digits entered are represented by symbols such as an asterisk (*) or a circle to maintain security of the number entered. Sixth, if the numeric field does not have focus, then all the digit boxes are displayed in the same color. If the numeric field has focus, thereby allowing the entering of digits, the box for the current digit is displayed in a different color as specified in the VICF for highlighting the box. Seventh, the numeric field is capable of handling the "append-digit," "play-media," "pop-screen," "remove-digit," "push-screen," "move-up," and "move-down" actions.

Finally, if the screen 110 contains a list of numeric fields 150, focus may change between each numeric field by automatically transferring to the next numeric field when the viewer 12 finishes entering the last digit in the current numeric field. Focus is automatically transferred back to the first numeric field in the list or a "custom" action is performed when the viewer enters the last digit of the last numeric field. If a "custom" action is defined, the present invention executes specific code stored in the software library when the last digit is entered. Another way focus may change is by the viewer pressing the up key 60 and down key 62 on the input device 13 to manually move focus from one numeric field to another without completely filling in all digits in a particular numeric field.

Example Configurations of Category Items and Menu Items

Figure 6:
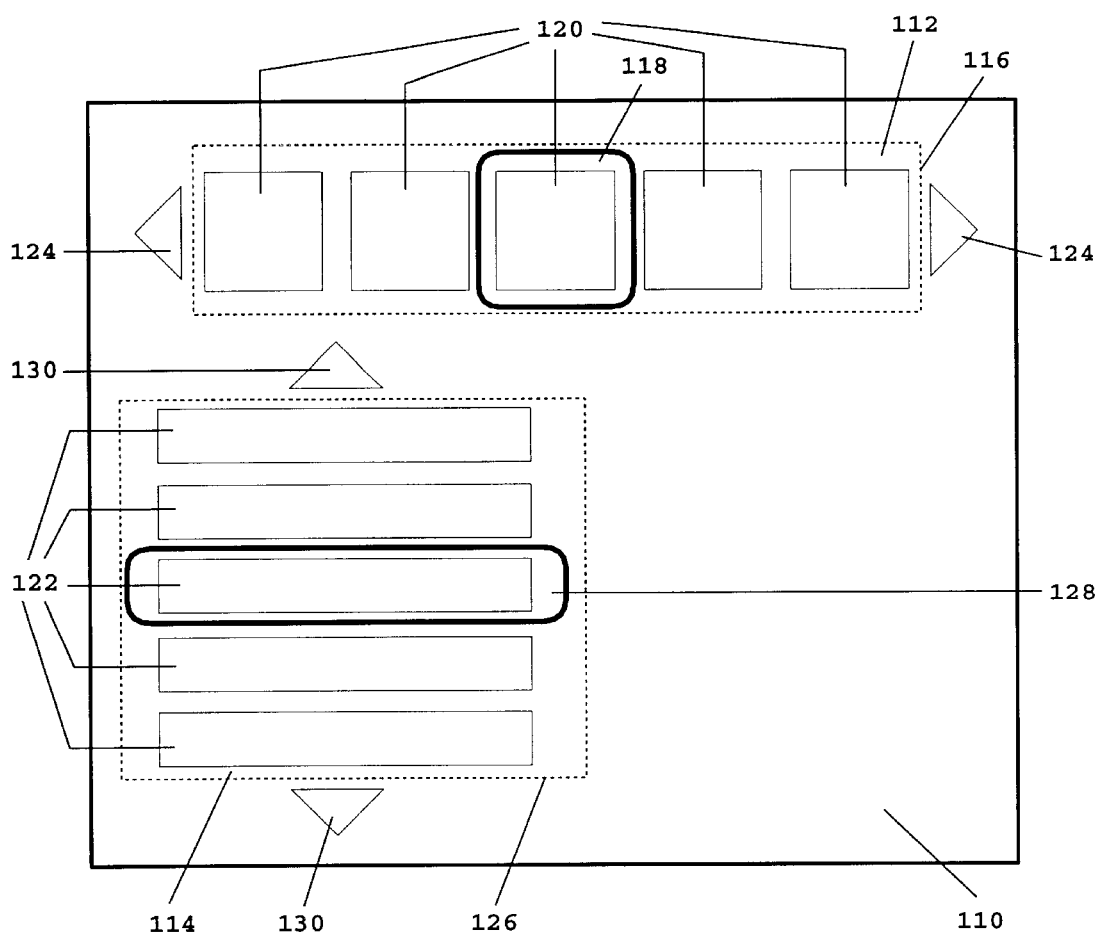
FIG. 6 illustrates, in wire frame format, the same three basic interface components illustrated in FIG. 5, and in this illustration, the category item and menu item components are arranged in a different fashion on the screen.
Figure 7:
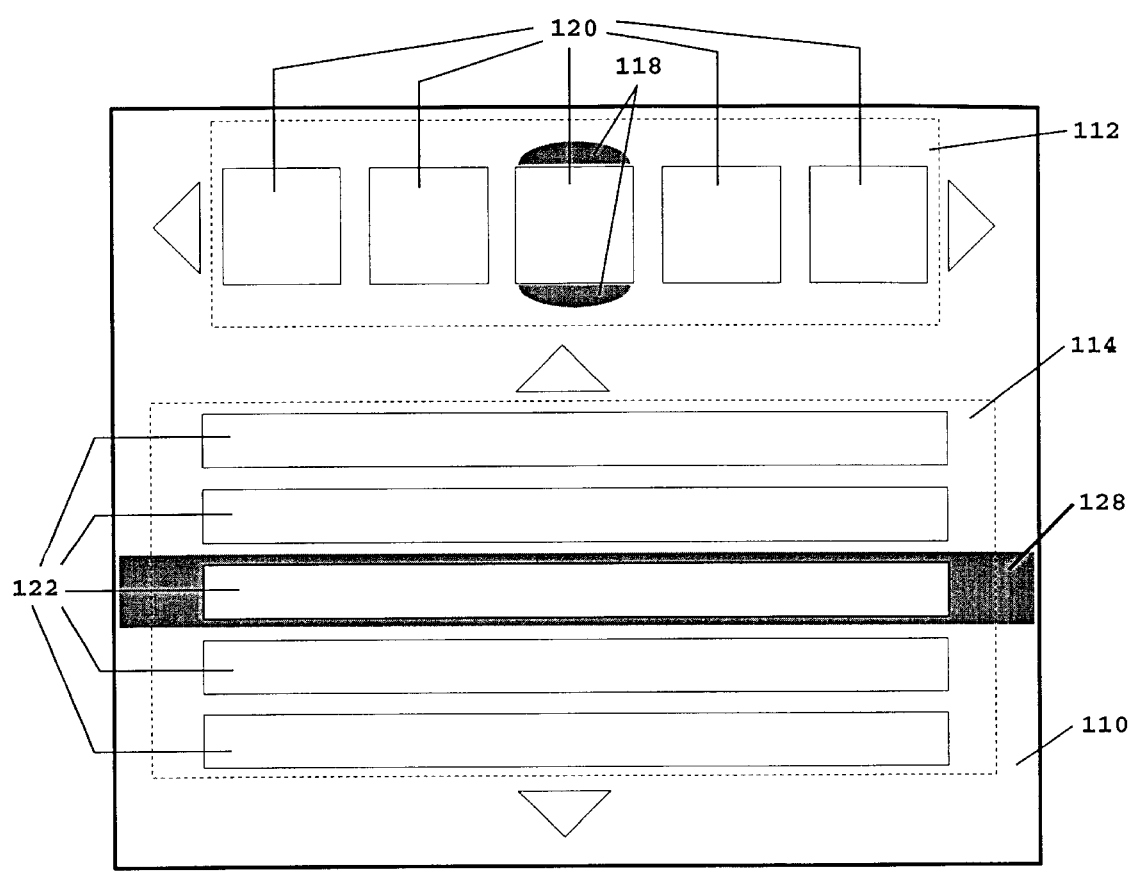
FIG. 7 illustrates, in wire frame format, both the menu item and category item components with the category item being in the same configuration as they were in FIG. 6 and the menu item in a somewhat different configuration.

The category item icon nodes 120 and menu item icon nodes 122 may be placed in various locations on the TV display device 11 (see FIGS. 5. and 6). Also, the sizes of the category item and menu item nodes may vary (see FIGS. 6 and 7). In addition, which category item and menu item node having focus may be indicated in various ways. For example, in FIG. 7, the menu focus-box 128 is represented as a darkened rectangle beneath and larger than the menu item node it contains, and the category focus-box 118 is represented as a pair of half-ovals above and below the category item node having focus.

In one embodiment of the present invention, the display on the TV display device 11 might appear to the viewer 12 as shown in FIG. 8. In this representation, the category item icon nodes 120 represent various television show types or genres the viewer may wish to view, such as movies, situation comedies, sporting events, documentaries, and the like. The menu item icon nodes 122 represent shows corresponding to the various show genres of the category item nodes. In FIG. 8, the category item node labeled "Drama" currently has focus. Menu item nodes associated with the "Drama" category item node are displayed, and of these, the menu item node labeled "Grapes for Wrath" currently has focus. Also, in the figure is an image representing a selection button 132 labeled "select" that is similar in appearance to the selection key 68 on the input device 13 (see FIGS. 3 and 4). The selection button informs the viewer that pressing the selection key 68 on the input device will cause the menu item node currently having focus to be selected. The category item nodes in this figure are represented as combinations of images and text, while the menu item nodes are represented with just text. The category item nodes may also be represented with images and no text (see FIG. 9), and the menu item nodes may be represented as combinations of images and text (see FIG. 10).

Figure 11:
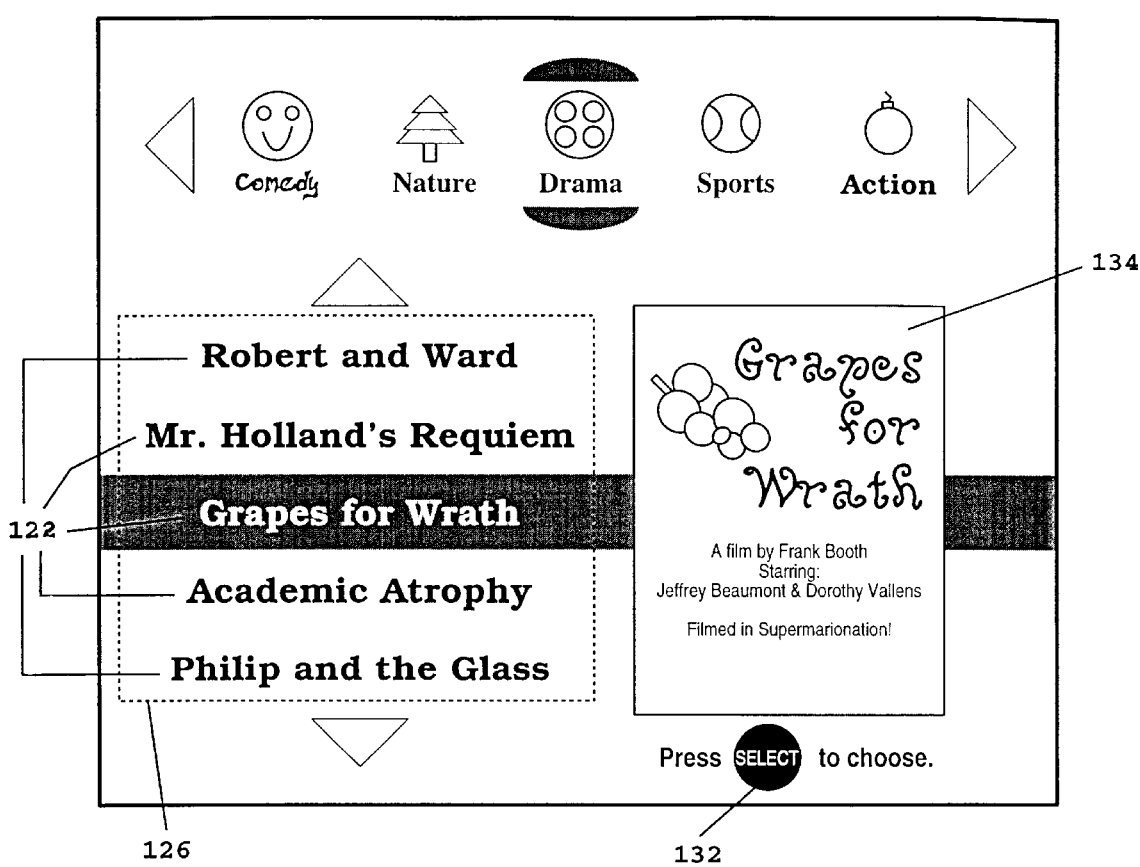
FIG. 11 illustrates both the menu item and category item components, with the menu items represented as textual strings, and having additional related images ("drawables") which show in another location on the display when the menu item with which each image is associated comes into focus.

Drawables 134 are illustrated in FIG. 11. In this figure, the menu extent-box is narrow and positioned on the, left half of the TV display device 11 to make room for the drawable. The drawable shown is associated with the menu item icon node 122 having focus, which is labeled "Grapes for Wrath." The drawable provides additional information about the menu item icon node currently having focus. In addition, the selection button 132 is in a different location than it was in FIG. 8, demonstrating that the selection button can be located in various positions on the TV display device.

The displays appearing when the viewer 12 wants to scroll up in the list of menu item icon nodes 122 from the node labeled "Grapes for Wrath" to "Mr. Holland's Requiem" are illustrated in FIGS. 12–15. In one embodiment of the present invention, the viewer presses the up key 60 on the input device 13 to scroll up. However, the keys used for scrolling a list in a particular direction are configurable and may be changed in the VICF. The menu focus-box 128 remains stationary. Thus, the list appears to move in a downward direction as the menu item node above the node currently having focus moves into the menu focus-box.

Figure 12:
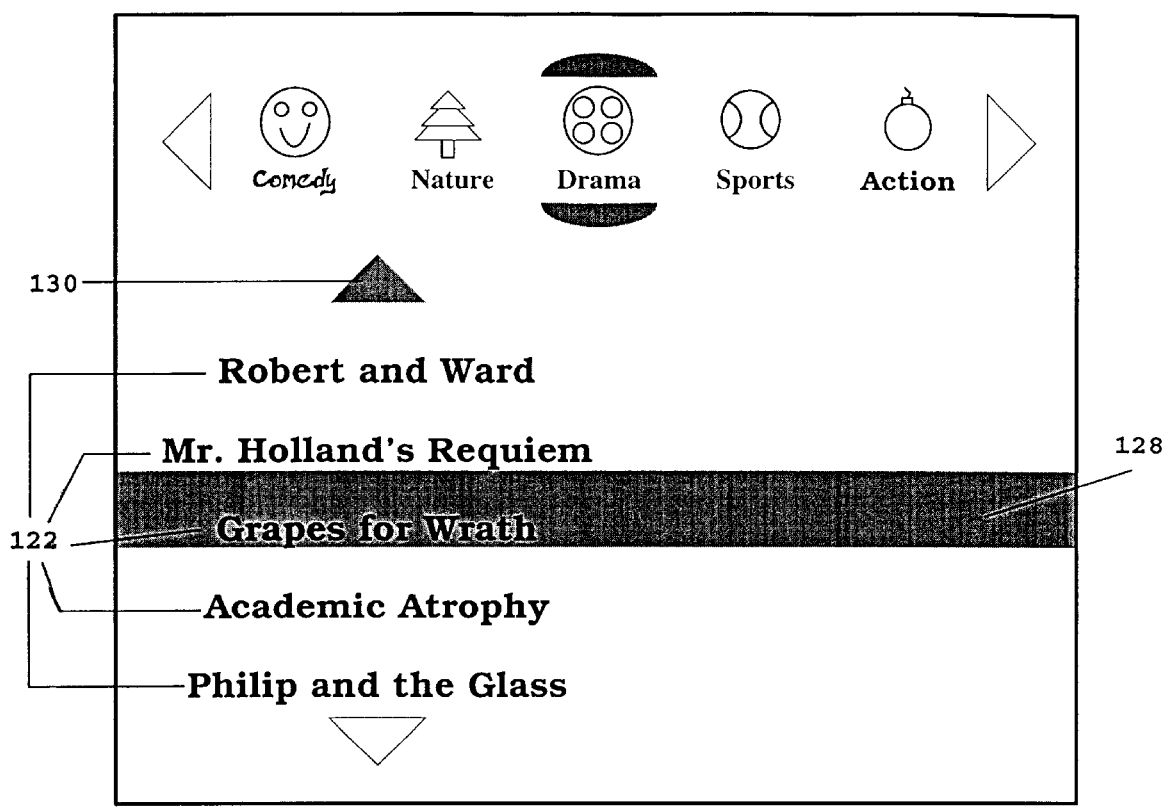
FIG. 12 illustrates the first frame in a scroll of the menu item originally presented in FIG. 11.

After the viewer 12 presses the up key 60, the menu item icon nodes 122 begin to move down, as shown in FIG. 12. Because the menu item node labeled "Grapes for Wrath" no longer has focus, its drawable 134 disappears. In the preferred embodiment, the selection button 132 disappears because during the scroll, there is no menu item node having has focus that can be selected. The selection button reappears when the scroll completes. Also, in the preferred embodiment, the visual cue 130 above the list of menu item nodes appears in a different color to inform the viewer that an upward scroll is occurring.

Figure 13:
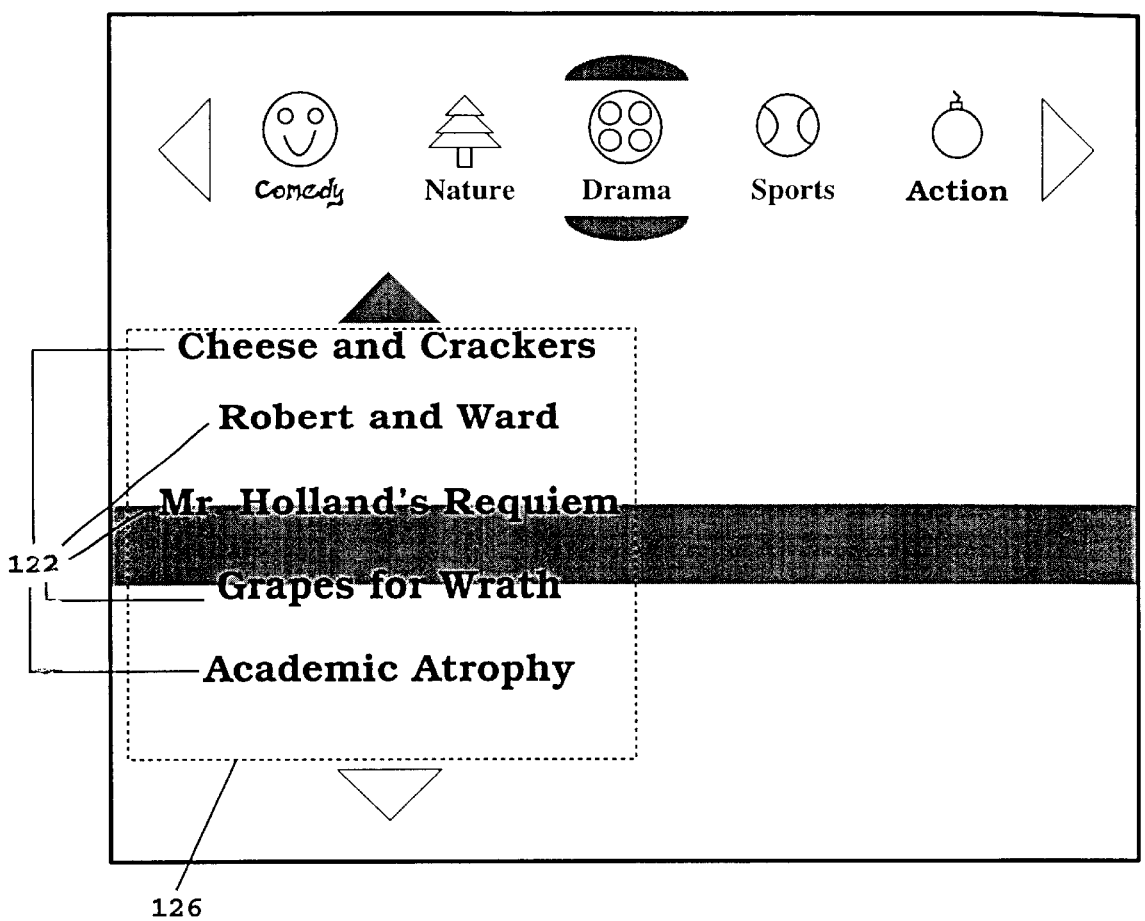
FIG. 13 illustrates the second frame in the scroll presented in FIG. 12.
Figure 14:
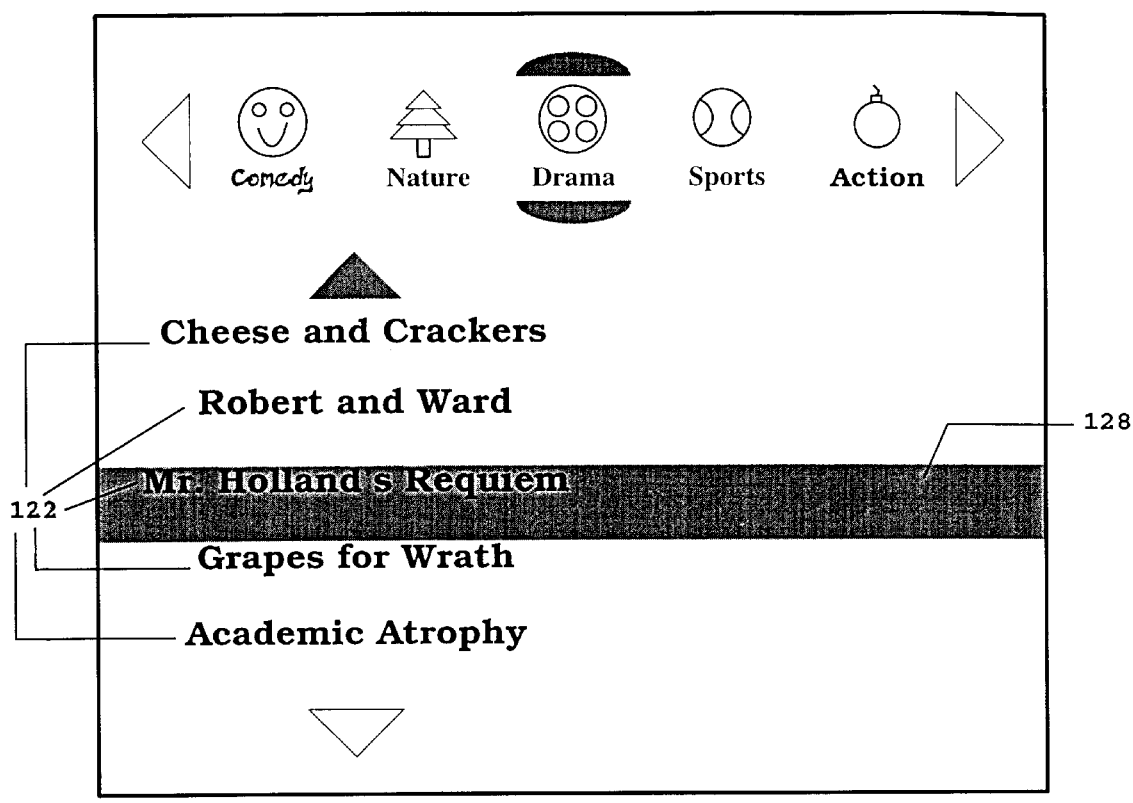
FIG. 14 illustrates the third frame in the scroll, the first frame of which is presented in FIG. 12.
Figure 15:
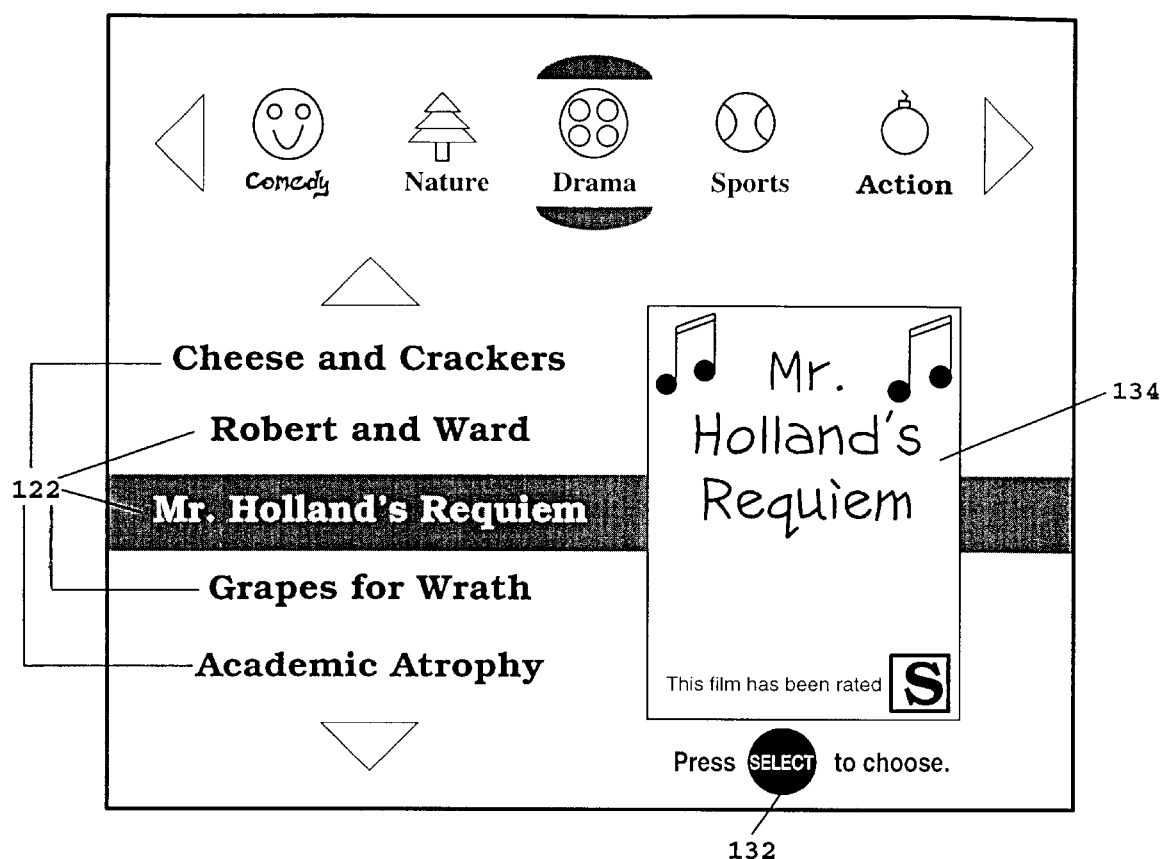
FIG. 15 illustrates the completion of the scroll, the first frame of which is presented in FIG. 12.

As the menu item icon nodes 122 move further down during the scroll, the bottom menu item node labeled "Philip and the Glass" disappears because it no longer fits within the menu extent-box 126, as shown in FIG. 13. Also, a previously non-visible menu item node labeled "Cheese and Crackers" now appears at the top of the list of menu item nodes. As the menu item nodes continue to move down, the menu item node labeled "Mr. Holland's Requiem" moves further into the menu focus-box 128 (see FIG. 14), until scrolling completes, at which point this menu item node becomes centered in the menu focus-box, as shown in FIG. 15. This node's drawable 134 is then rendered to the display. Also, the selection button 132 reappears. Typically, the entire scroll lasts for less than approximately three seconds depending on the performance of the client terminal 9 and the distribution network 8.

The displays appearing when the viewer 12 wants to scroll left in the list of category item icon nodes 120 from the node labeled "Drama" to "Nature" are illustrated in FIGS. 16–19. In one embodiment of the present invention, the viewer presses the left key 66 on the input device 13 to scroll to the left. However, the keys used for scrolling a list in a particular direction are configurable and may be changed in the VICF. The category focus-box 118 remains stationary. Thus, the list appears to move to the right as the category item node to the left of the node currently having focus moves into the category focus-box.

Figure 16:
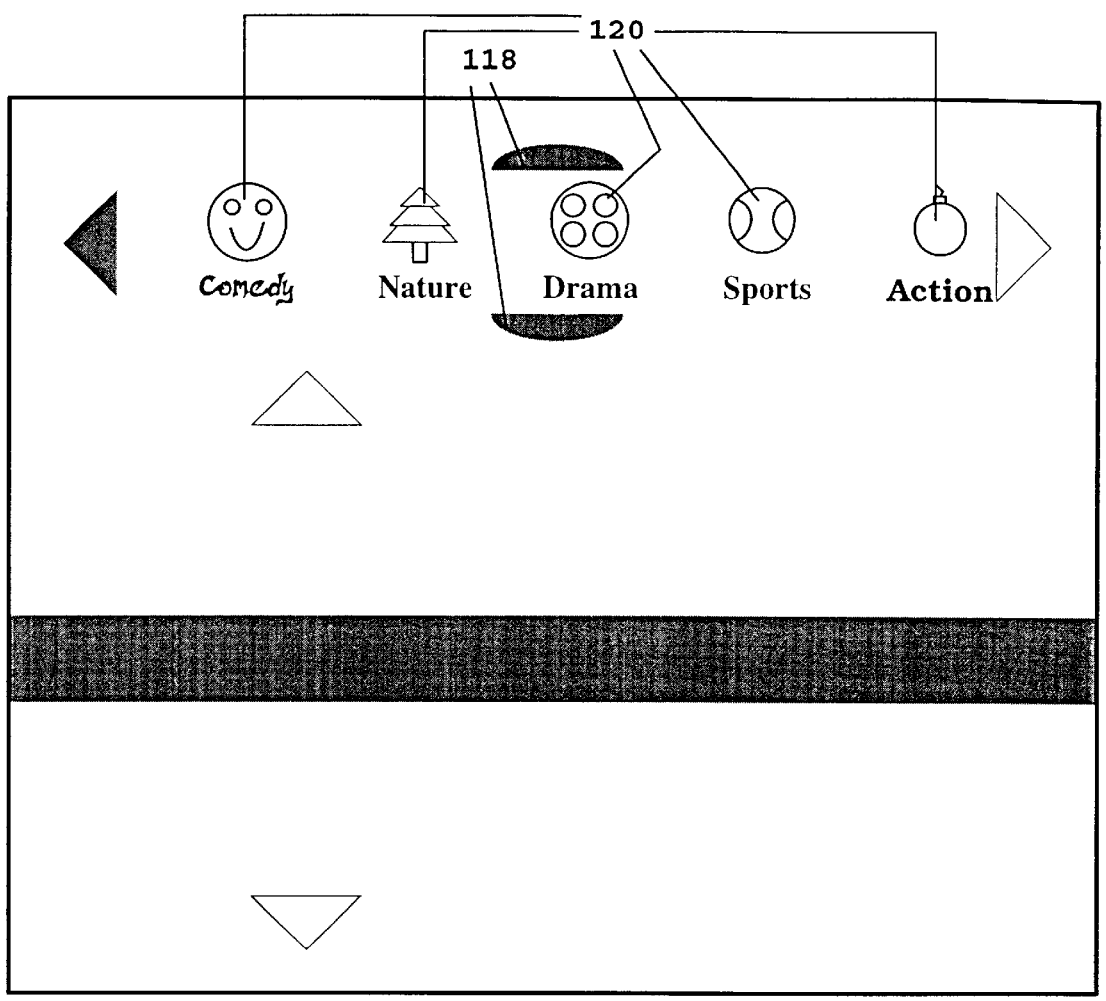
FIG. 16 illustrates the first frame in a scroll of the category items on the screen presented in FIG. 15.

After the viewer 12 presses the left key 66, the category item icon nodes 120 begin to move to the right, as shown in FIG. 16. Because the category item node labeled "Drama" no longer has focus, its associated list of menu item icon nodes 122, as well as the drawable 134 that was associated with the menu item node that had focus, have disappeared. In the preferred embodiment, the selection button 132 disappears, but reappears when the scroll completes.

Figure 17:
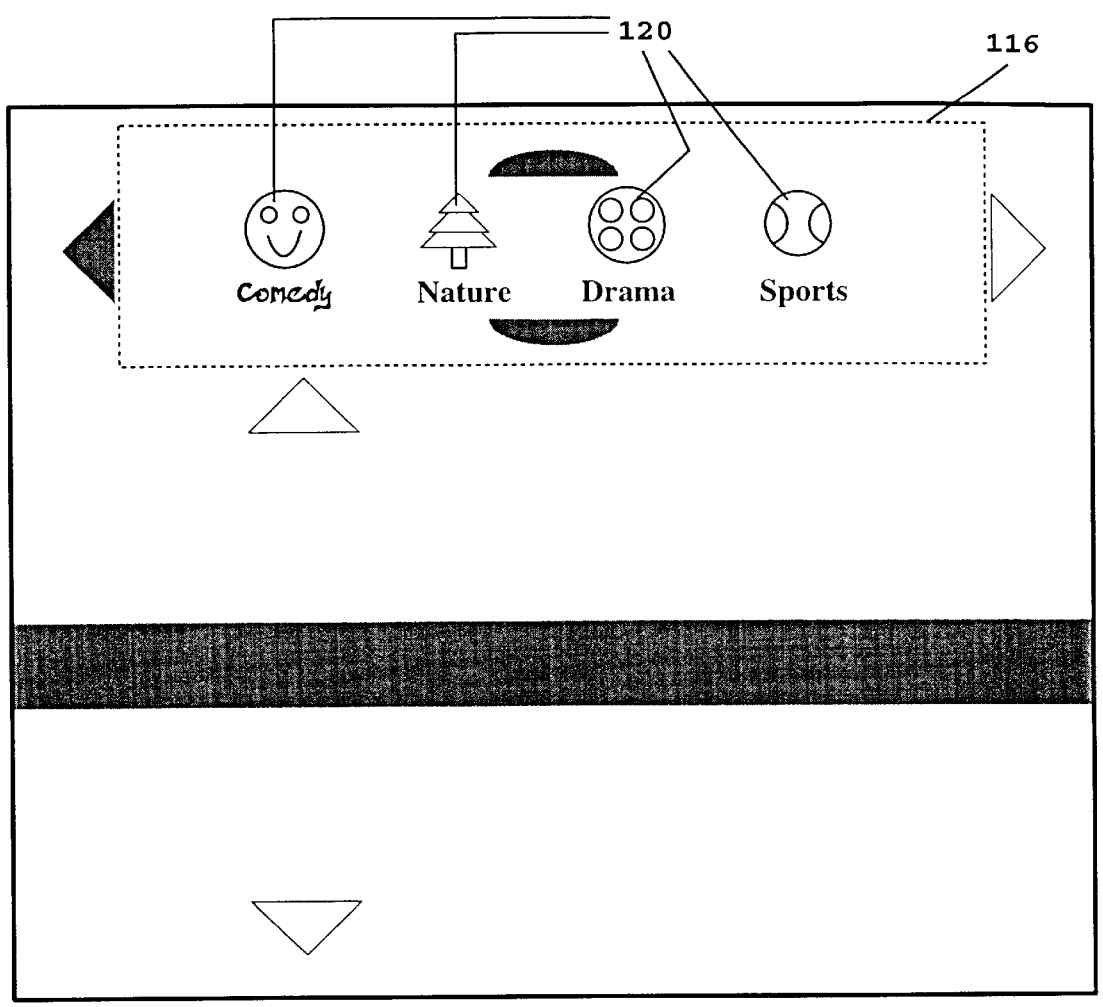
FIG. 17 illustrates the second frame in the scroll originally presented in FIG. 16.
Figure 18:
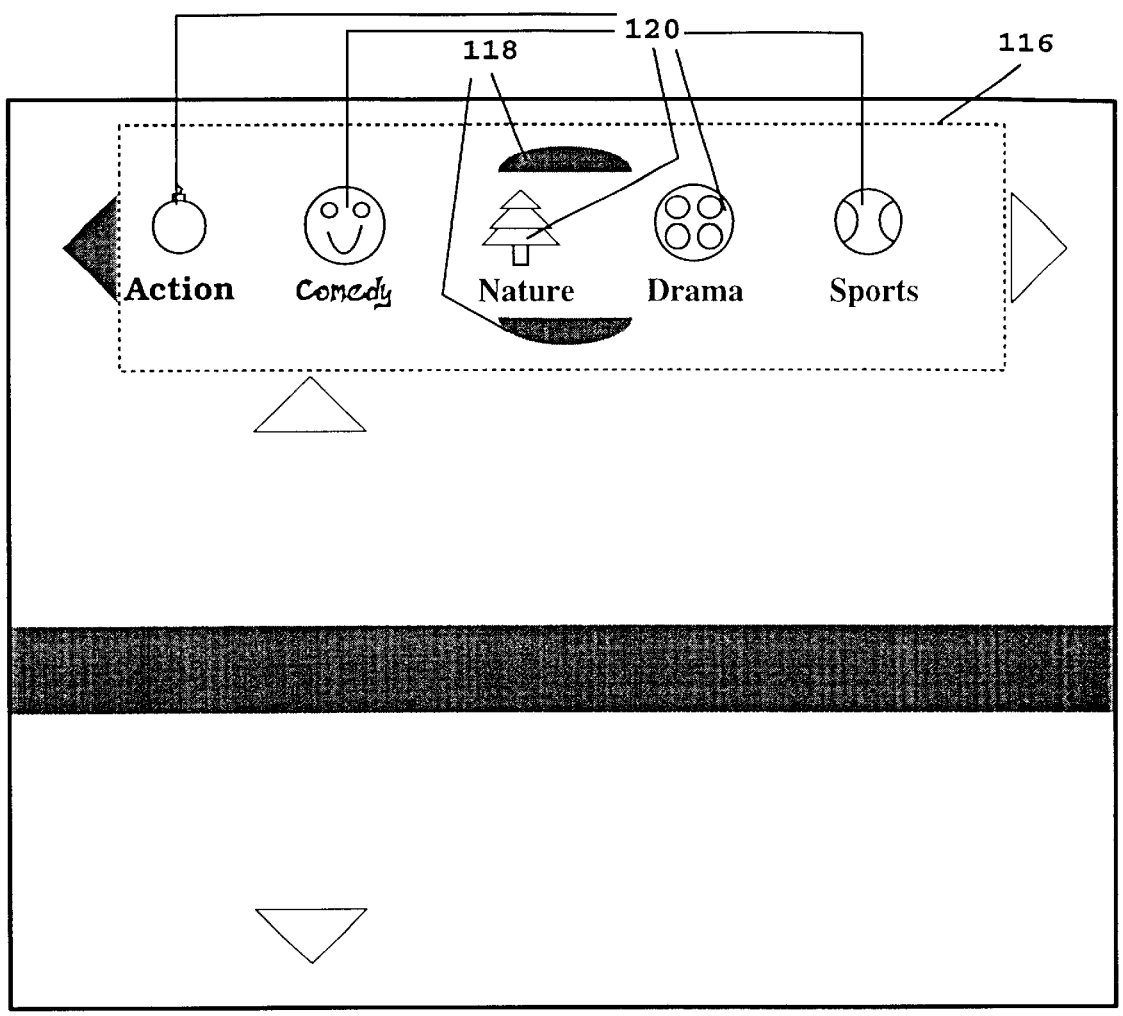
FIG. 18 illustrates the third frame in the scroll originally presented in FIG. 16.
Figure 19:
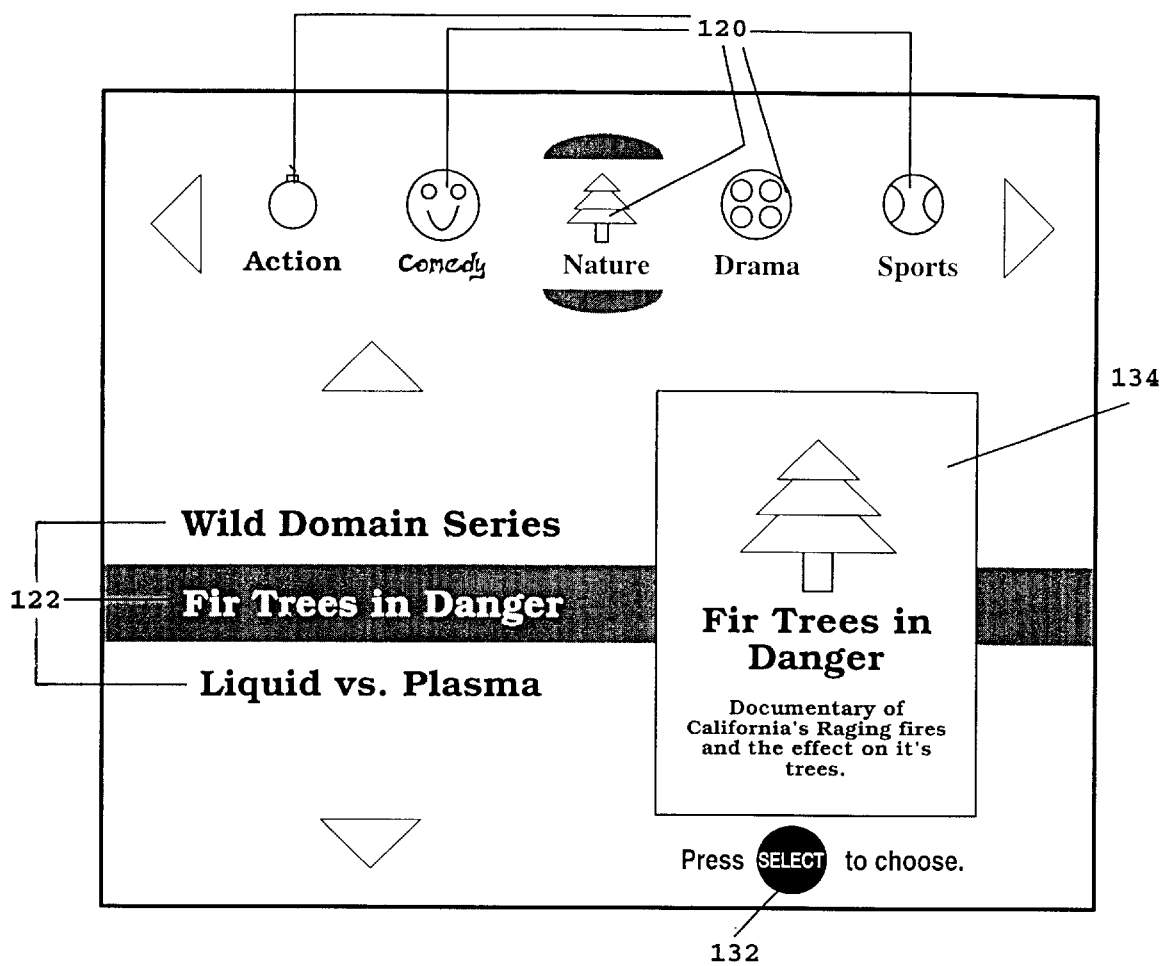
FIG. 19 illustrates the completion of the scroll originally presented in FIG. 16.

As the category item icon nodes 120 move further to the right during the scroll, the rightmost category item node labeled "Action" disappears because it no longer fits within the category extent-box 116 at either the left or right end, as shown in FIG. 17. As the category item nodes continue to move to the right, the category item node labeled "Nature" moves further into the category focus-box 118, as shown in FIG. 18. In this figure, the category item node labeled "Action" reappears on the left side of the list of category item nodes, demonstrating the circular scrolling capabilities. After scrolling is complete, the category item node labeled "Nature" has focus, as shown in FIG. 19. This node's associated list of menu item icon nodes 122 is displayed, as well as the drawable 134 associated with the menu item node having focus, labeled "Fir Trees in Danger." Also, the selection button 132 reappears.

Figure 20:
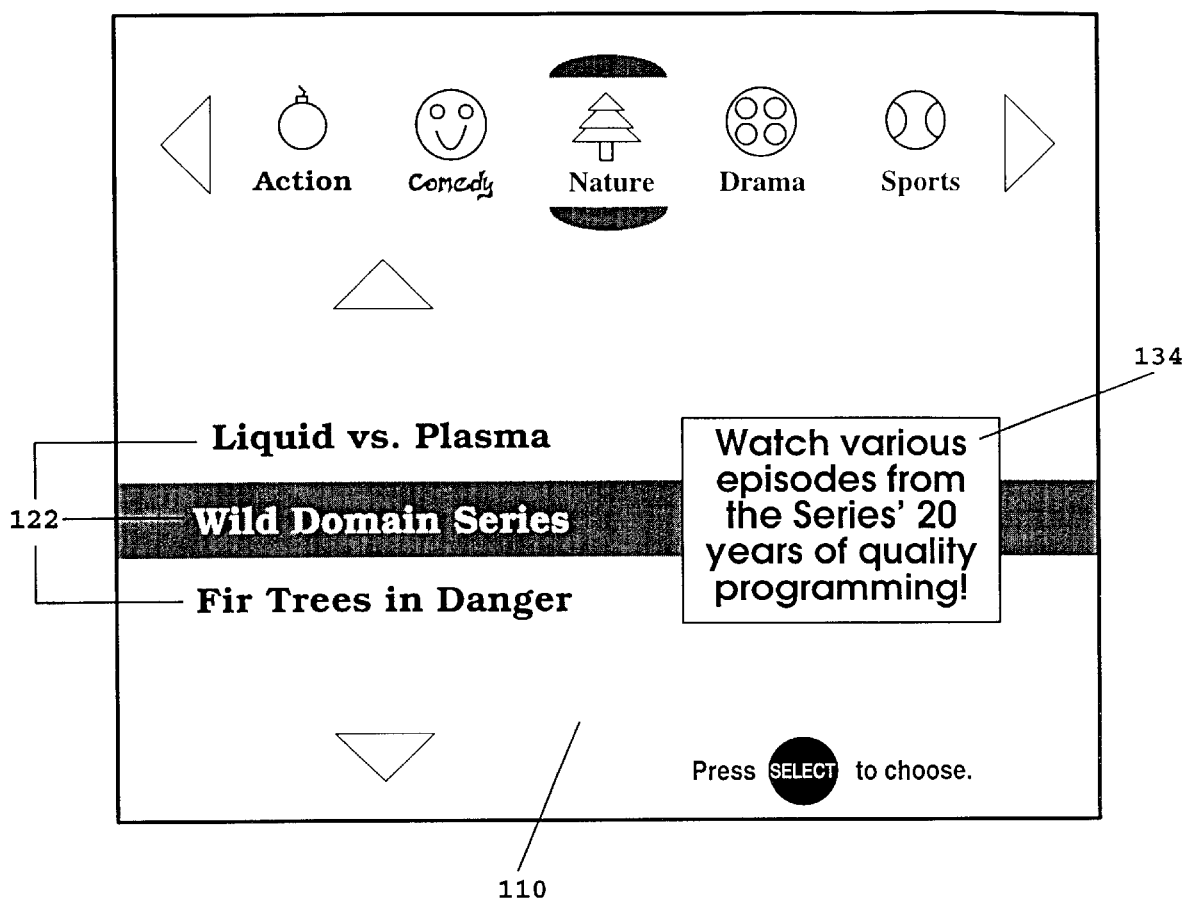
FIG. 20 illustrates a change in focus from "Fir Trees in Danger" to "Wild Domain Series," with "Wild Domain Series" having an associated text phrase (a drawable), which is displayed on the right.

If the viewer 12 scrolls up in the list of menu item icon nodes 122 to the node labeled "Wild Domain Series," the drawable 134 for that menu item node appears (see FIG. 20). The drawables may have different sizes and contain images, text, or a combination of images and text (see FIGS. 19 and 20).

Figure 21:
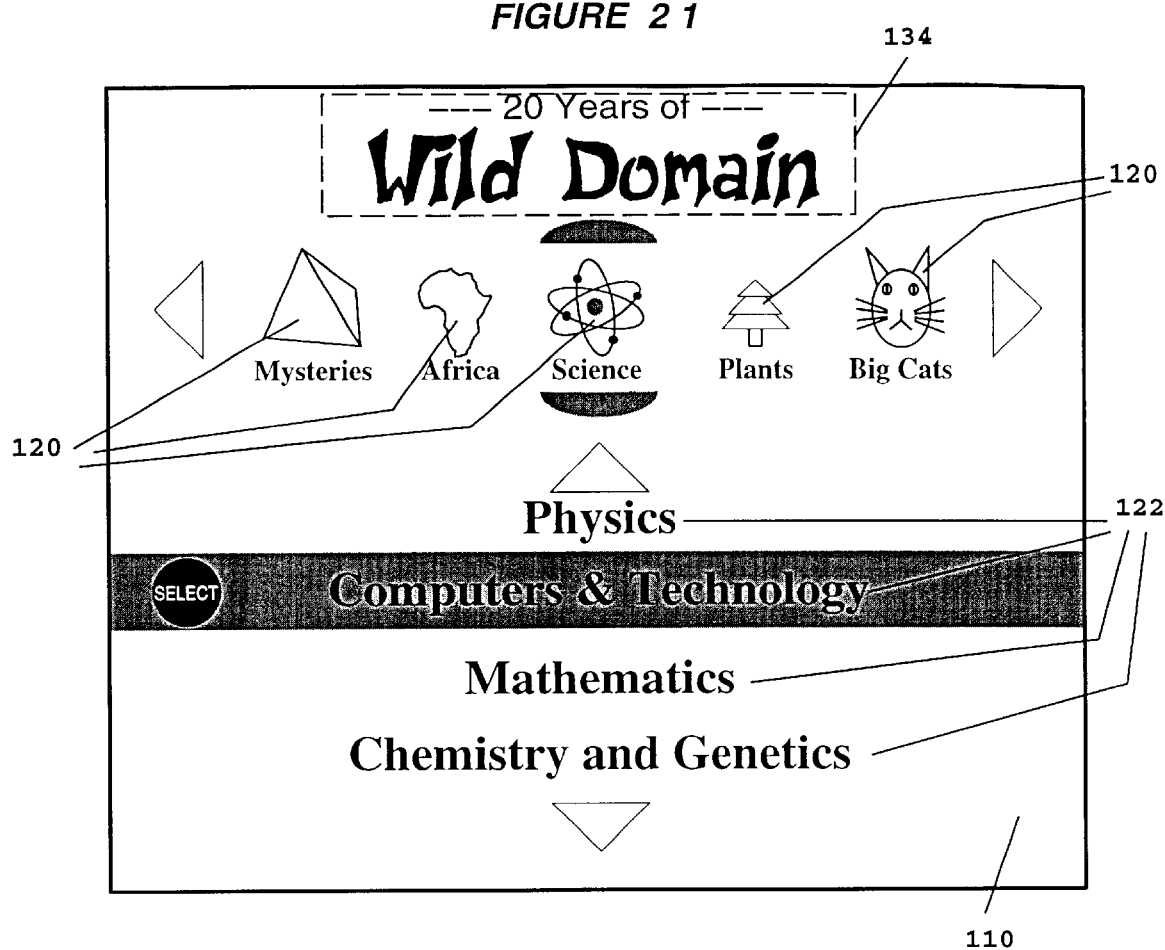
FIG. 21 illustrates a change in screens, with the original screen, containing the category items "Action," "Comedy," "Nature," "Drama," and "Sports" and each category items associated menu item have been replaced with a screen containing a background image ("—20 Years of—" and the "Wild Domain" logo) and a new list of category items with associated menu items.

The viewer 12, by pressing the selection key 68 on the input device 13, may select the menu item icon node 122 having focus in FIG. 20, which is the node labeled "Wild Domain Series." This node is configured to map the selection action to the "push-screen" action, causing the screen 110 in FIG. 20 to lose focus and the screen in FIG. 21 to be pushed onto the screen stack, thereby gaining focus. The screen in FIG. 21 contains a list of category item icon nodes 120. The category item node labeled "Science" has focus, and its associated list of menu item nodes is displayed with the menu item node labeled "Computers & Technology" having focus. The screen also contains its own drawable 134 at the top of the display. If the viewer again selects the menu item node having focus, labeled "Computers & Technology," the screen shown in FIG. 22 gains focus. This figure illustrates that screens may contain menu item nodes without category item nodes, the menu item nodes may contain more than one line of text, and screens may contain more than one drawable.

Figure 23:
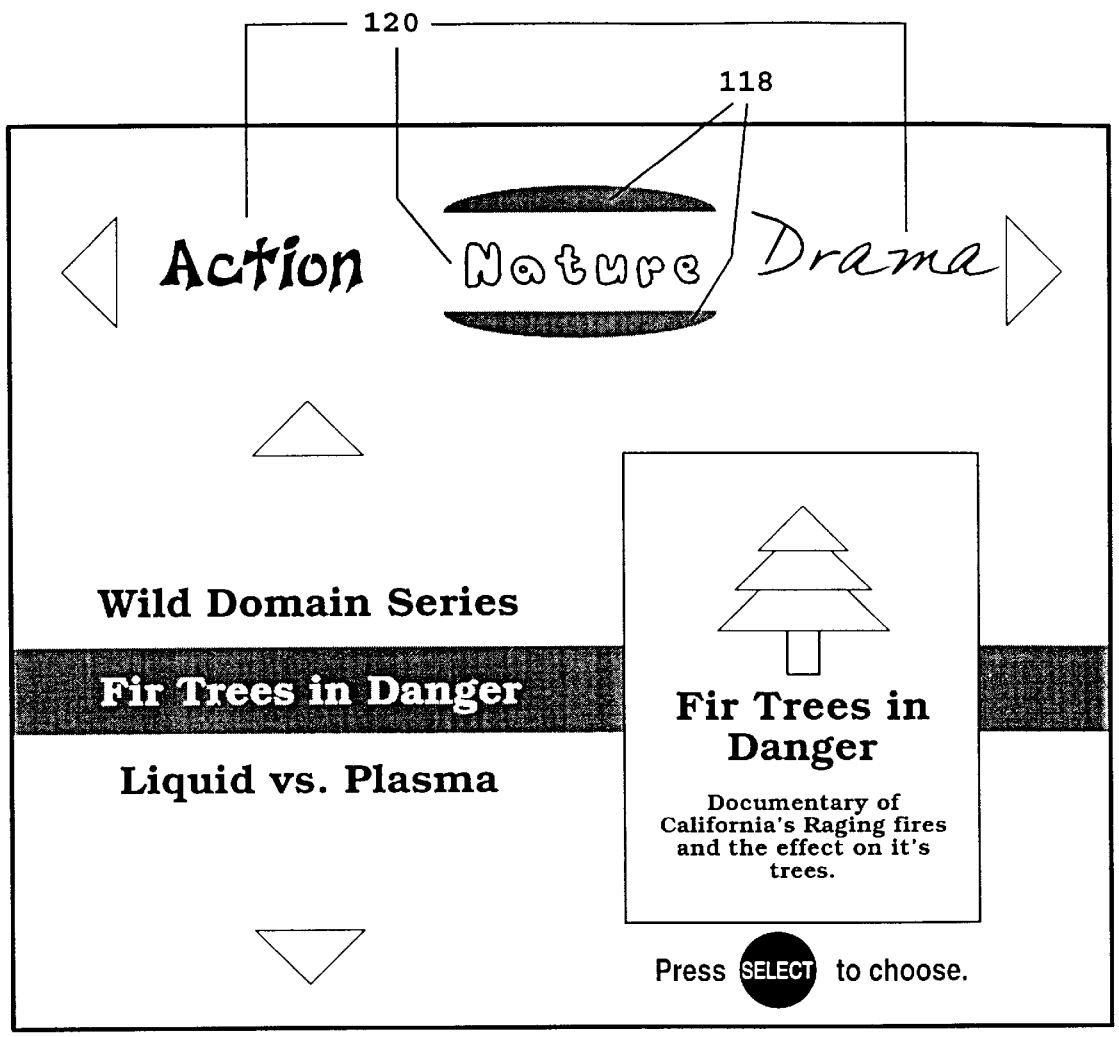
FIG. 23 illustrates a variation of the screen originally presented in FIG. 19, with the category items being wider (limiting the number of category items which may be viewed at a single time) and represented as textual strings of varying typefaces rather than a combination of textual strings and images.
Figure 24:
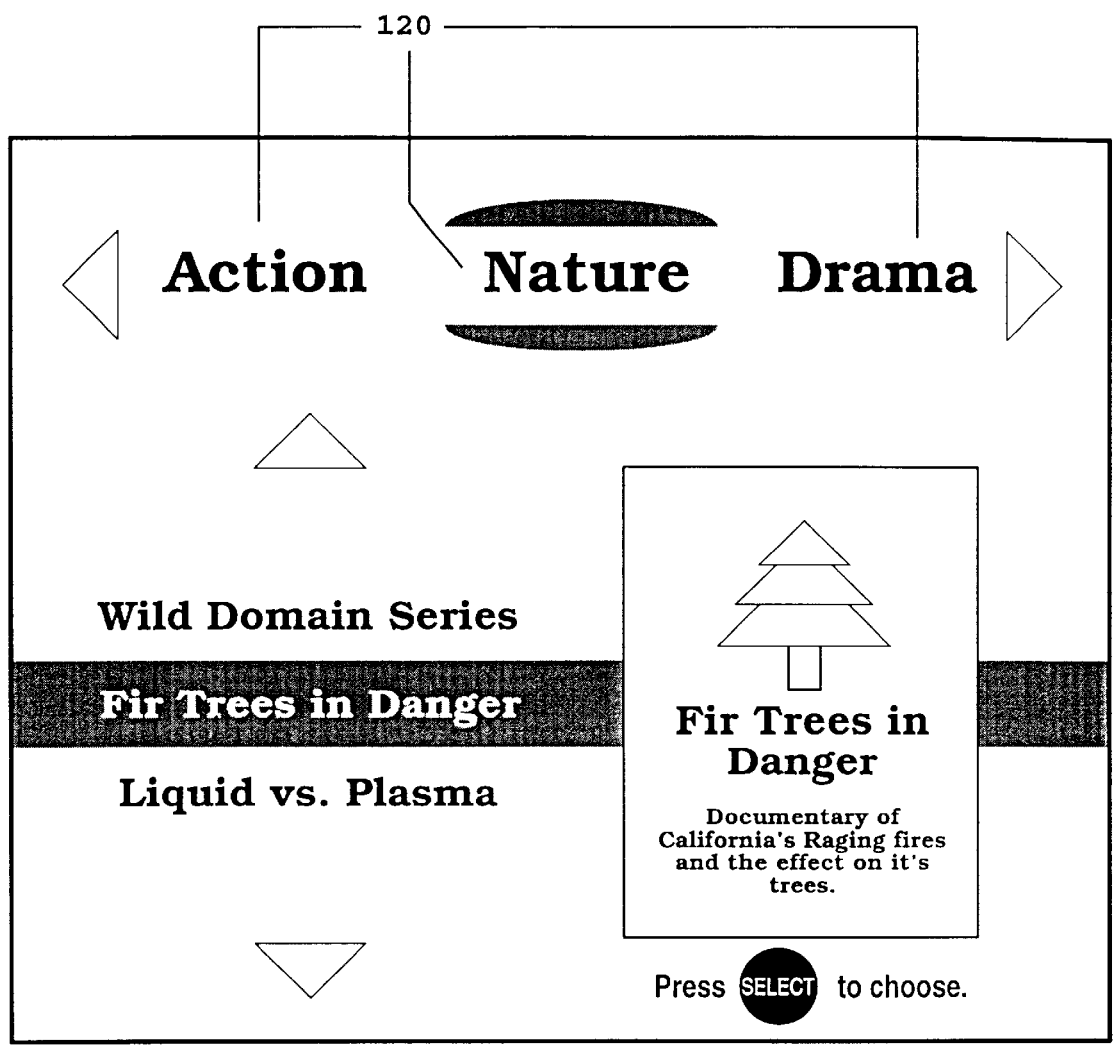
FIG. 24 illustrates a variation of the screen presented in FIG. 23 in which the category items are represented with textual strings of consistent typefaces, not varying typefaces.
Figure 25:
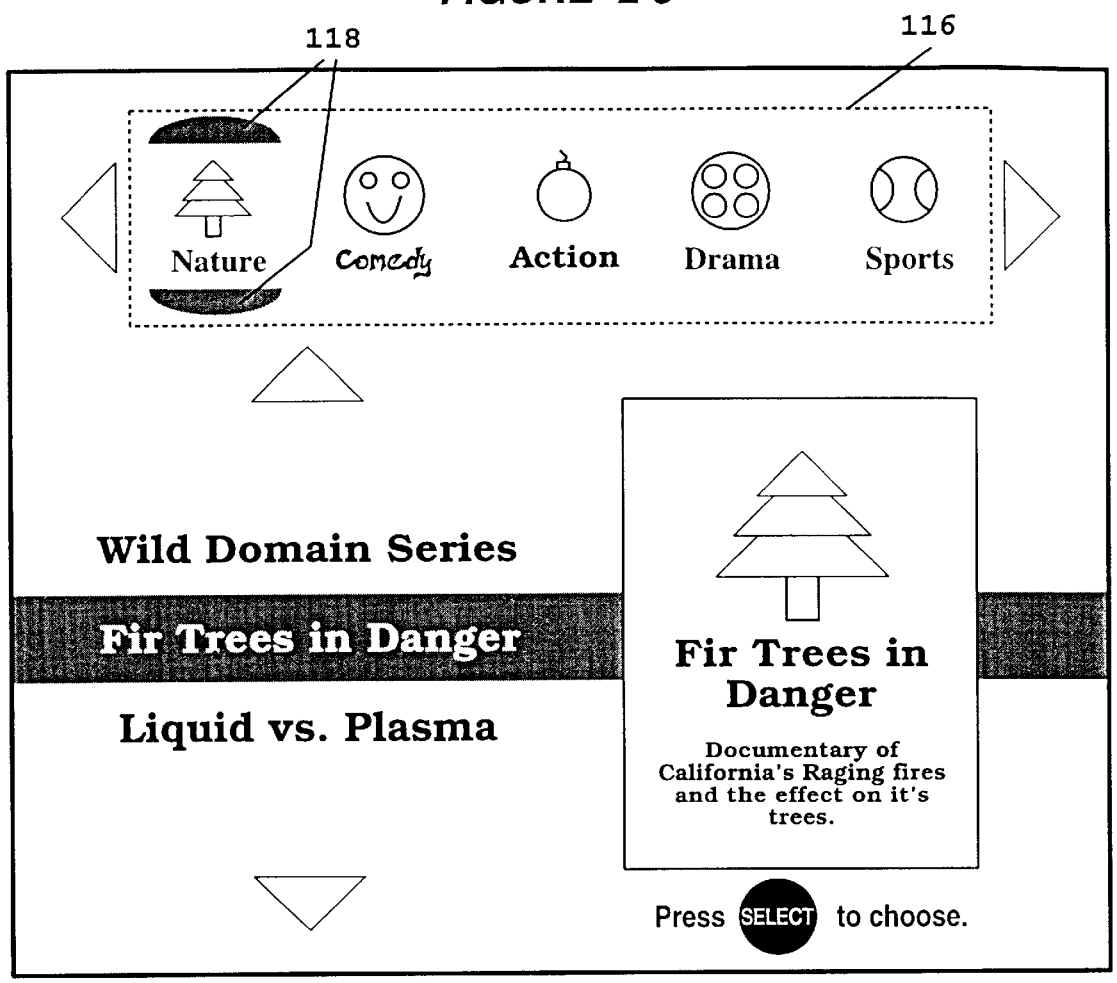
FIG. 25 illustrates a variation on the screen presented in FIG. 19, here the focus-box for the category items has been moved from the upper center of the display to the upper left of the display.

The category item icon nodes 120 may be represented as text phrases in various fonts and sizes, or as text phrases with each text phrase having the same font and size (see FIGS. 23 and 24). Also, the size of the category focus-box 118 and the number of category item nodes may vary (see FIG. 23), and the category focus-box may be placed in various locations within the category extent-box 116, rather than always being centered (see FIG. 25).

The displays the viewer 12 might see if the screen 110, category item icon nodes 120, and menu item icon nodes 122 are configured to enable the viewer to purchase food items are shown in FIGS. 26–59. In the initial screen, shown in FIG. 26, the category item node having focus is the "Menu" node and the menu item node labeled "Appetizers" has focus. If the viewer scrolls up in the list of menu item nodes, focus changes from the node labeled "Appetizers" to "Beverages," and the drawable 134 associated with the node "Beverages" displays (see FIG. 27).

Figure 28:
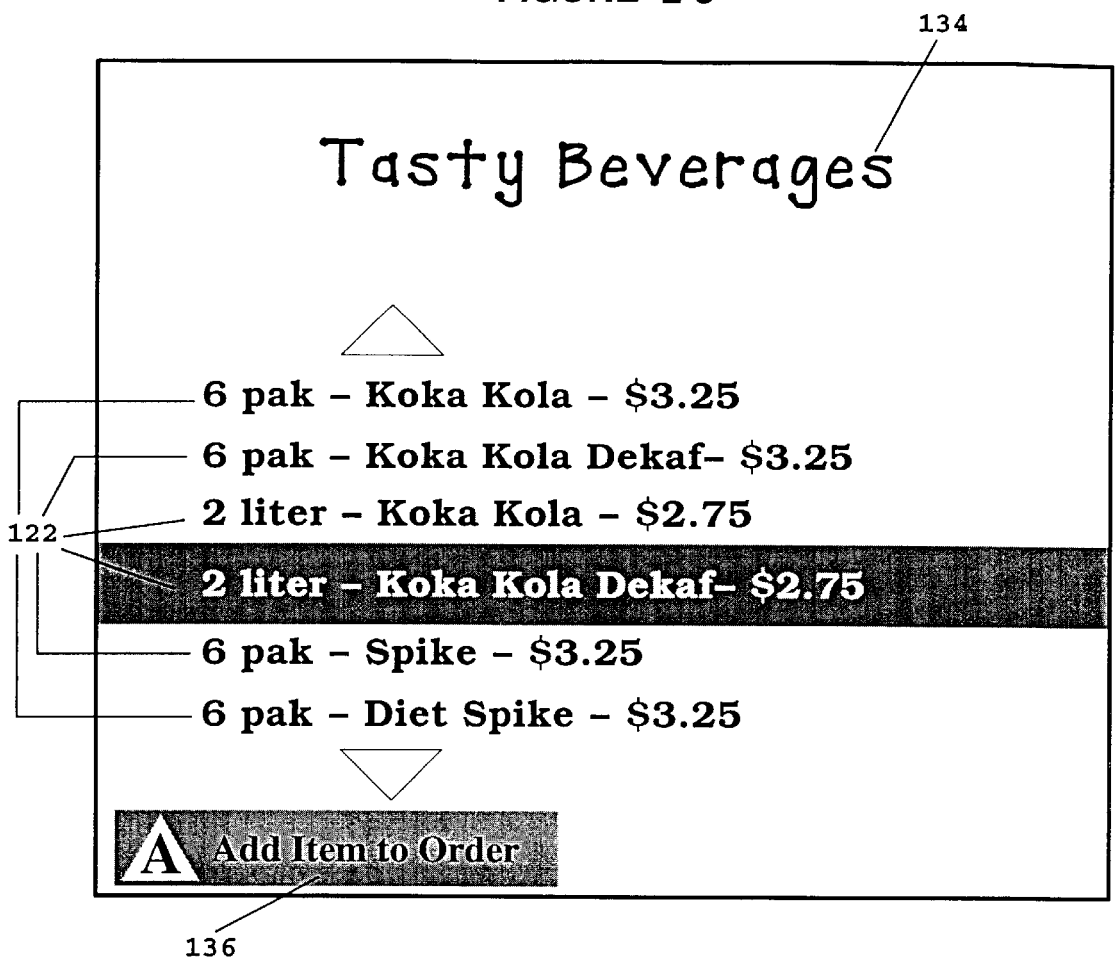
FIG. 28 illustrates the screen activated by the viewer having pressed "select" while the "Beverages" menu item had focus on the screen illustrated in FIG. 27.

If the viewer 12 selects the "Beverages" menu item icon node 122, the screen 110 shown in FIG. 28 gains focus. This screen contains a list, of menu item nodes for selecting various beverages and a drawable 134 at the top of the screen. The menu item node labeled "2 liter—Koka Kola Dekaf—$2.75" has focus. The screen also contains an "A" image 136, informing the viewer that the viewer may add the menu item node currently having focus to the viewer's order by pressing the "A" function key 72 on the input device 13. The selection button 132 image and the selection key 68 discussed previously may be used to select and add items, but, preferably, the "A" function key is used to aid the viewer in distinguishing between navigating between screens and ordering items.

Figure 26:
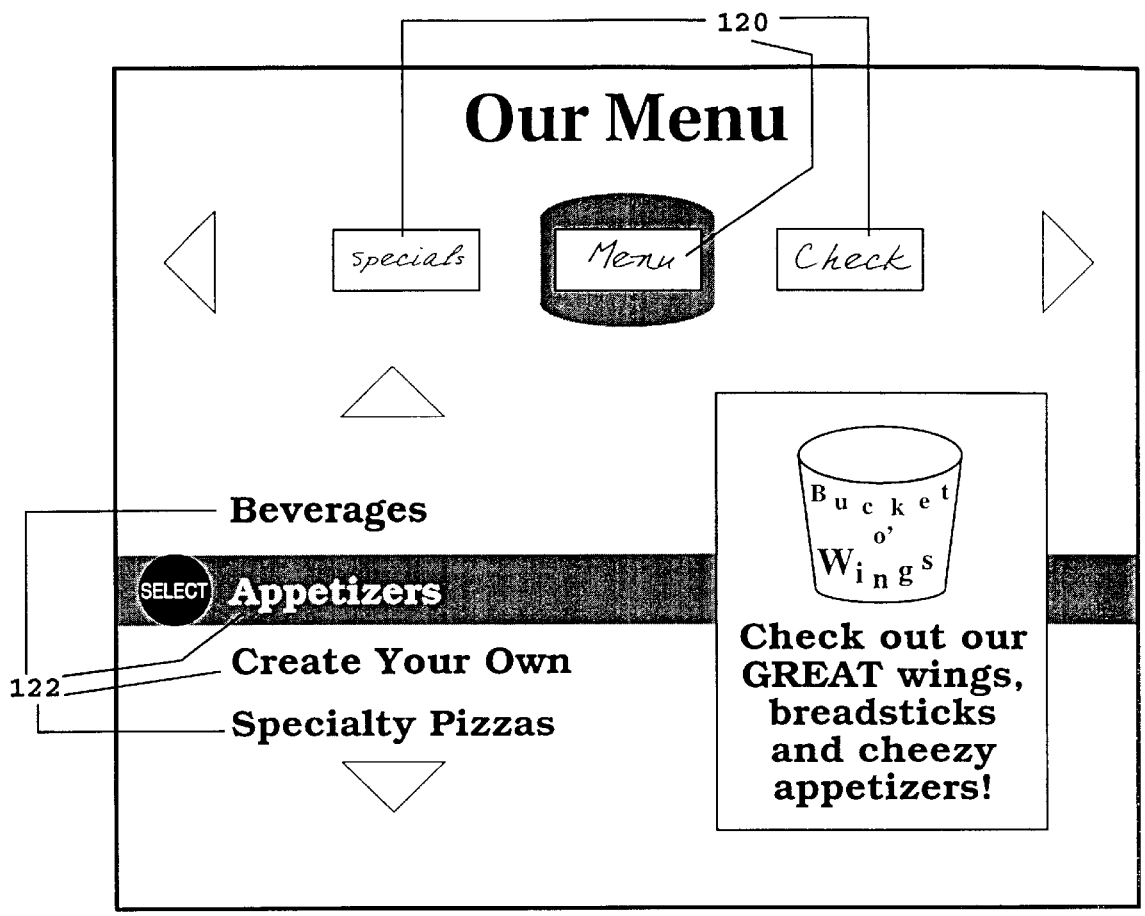
FIG. 26 illustrates a new screen containing category items and menu item which have associated images and/or textual strings.
Figure 27:
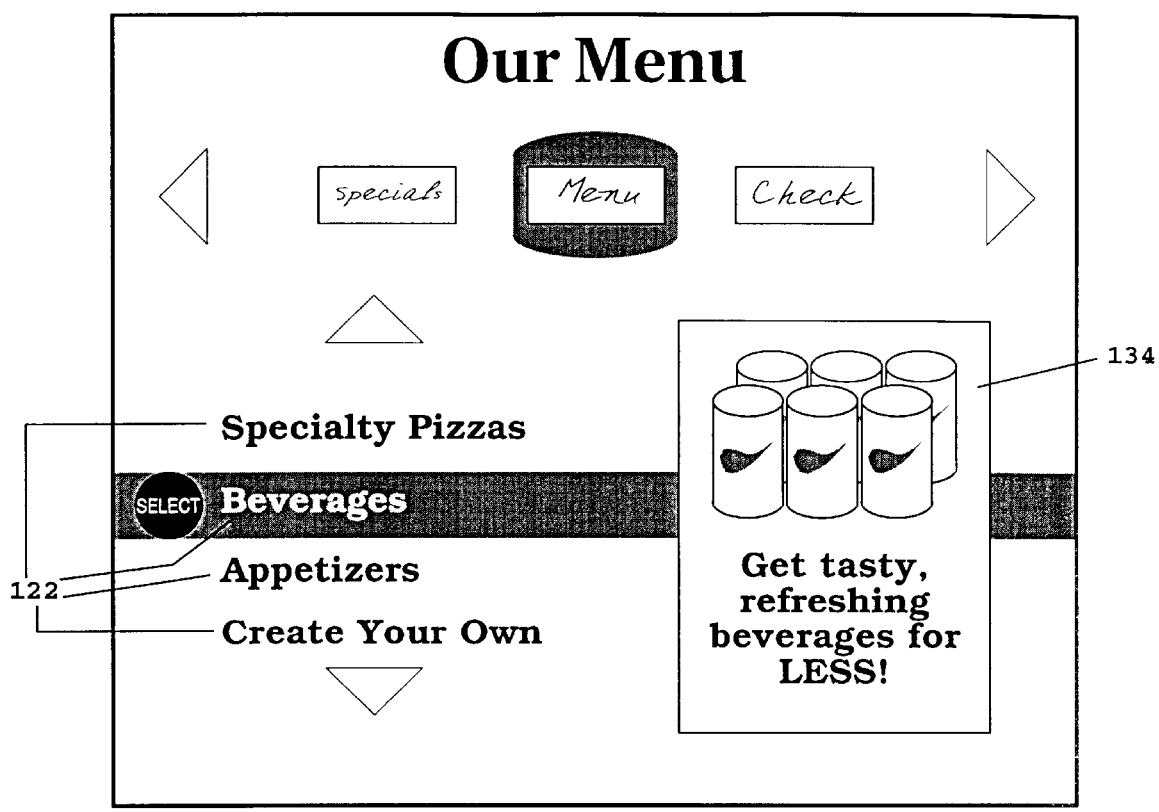
FIG. 27 illustrates the screen originally presented in FIG. 26 after the viewer used the client terminal's input device to "scroll" the menu items from "Appetizers" to "Beverages"
Figure 29:
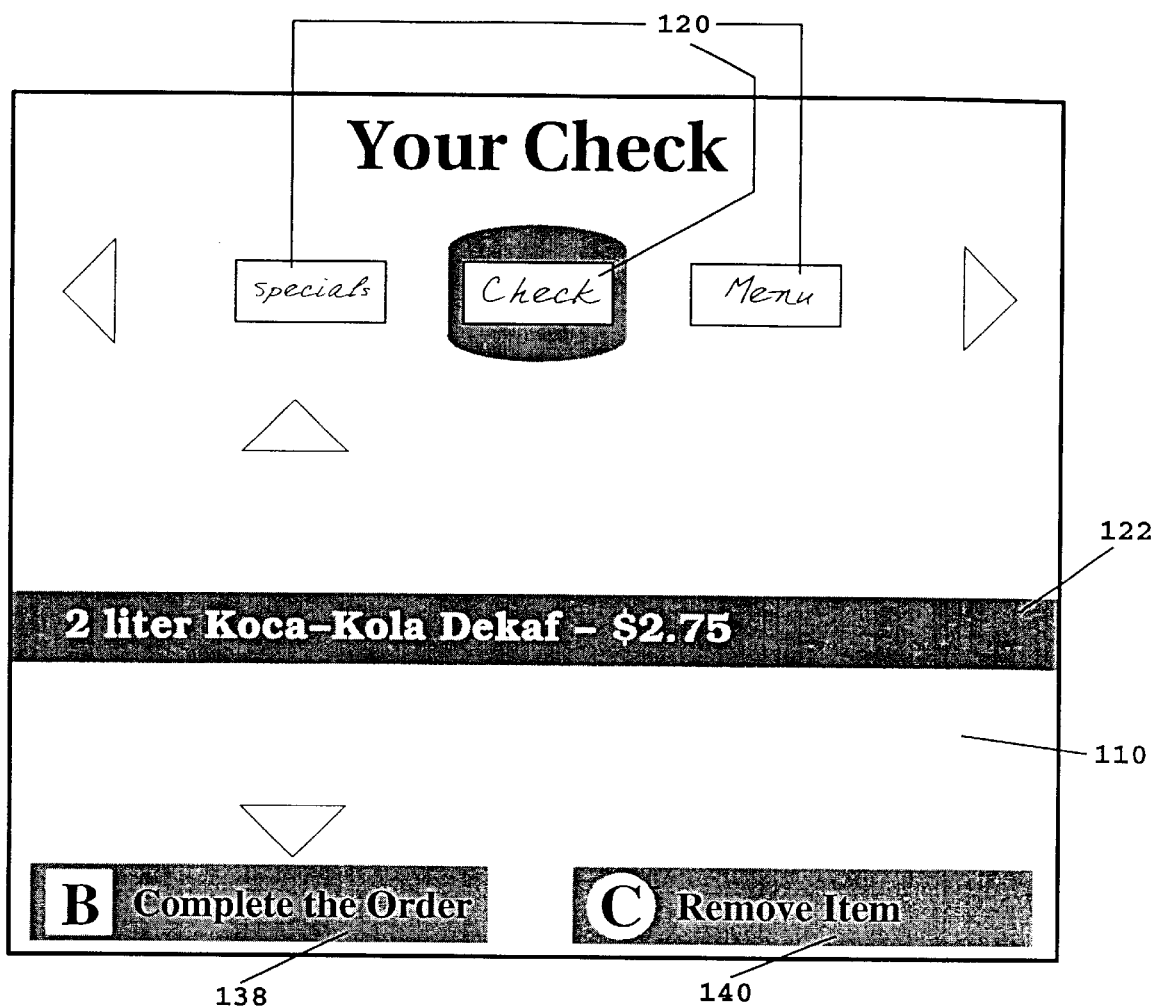
FIG. 29 illustrates the screen activated after the viewer pressed "A" while viewing the screen illustrated in FIG. 28.

After the viewer 12 presses the "A" function key 72 to select and add to the order the beverage represented by the menu item icon node 122 having focus, the original screen shown in FIG. 26 reappears, as shown in FIG. 29, but the category item icon node 120 having focus is now the "Check" node rather than the "Menu" node. The menu item node associated with the "Check" category item node is the beverage the viewer selected, illustrating the capability of the navigational interface to dynamically create and modify nodes at run-time based on viewer input. Examples presented above have demonstrated node element configuration based on the VICF, which is typically how nodes are created and configured. However, all node types may be dynamically configured in the present invention. In addition, a "B" image 138 and a "C" image 140 inform the viewer that the viewer may complete the order by pressing the "B" function key 74 on the input device 13 and remove an item from the order by pressing the "C" function key 76.

Figure 30:
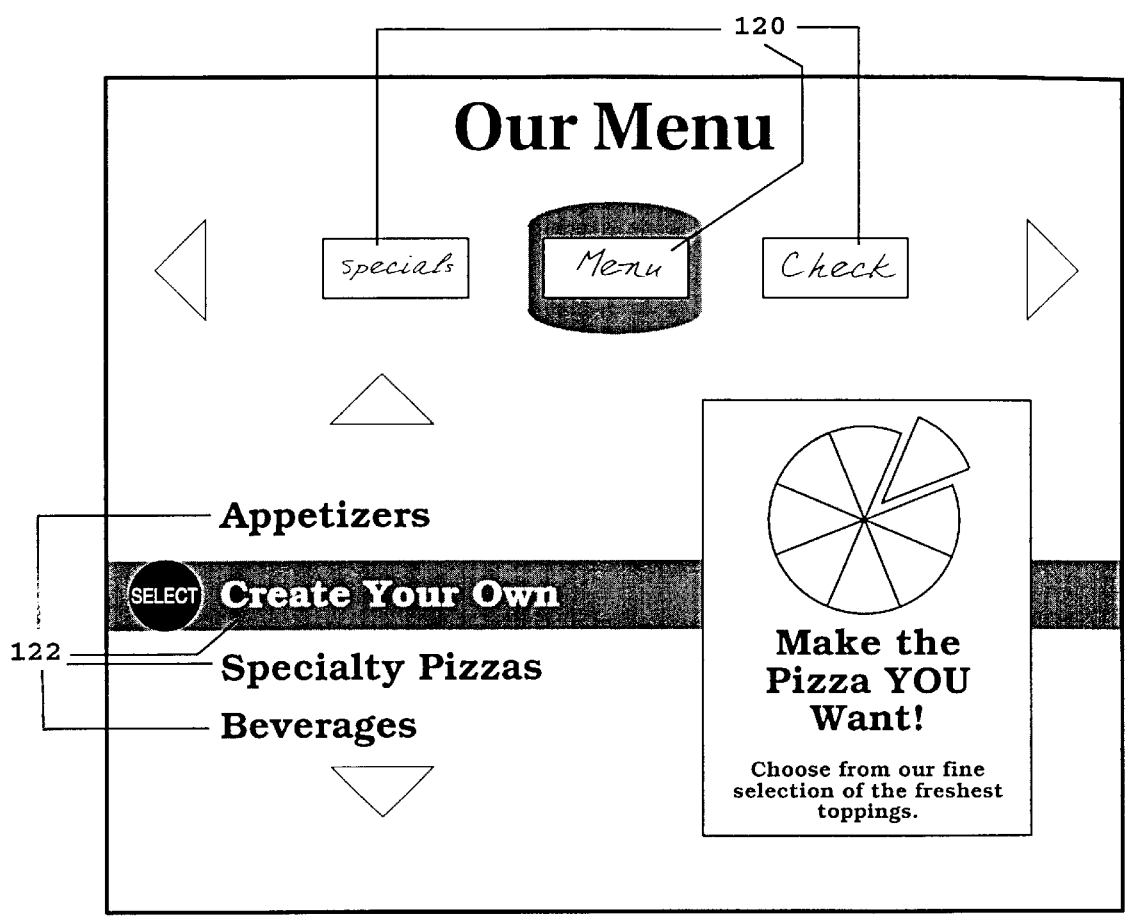
FIG. 30 illustrates the same screen after the viewer scrolled from the "Check" to the "Menu," giving focus to the "Create Your Own" menu item.
Figure 31:
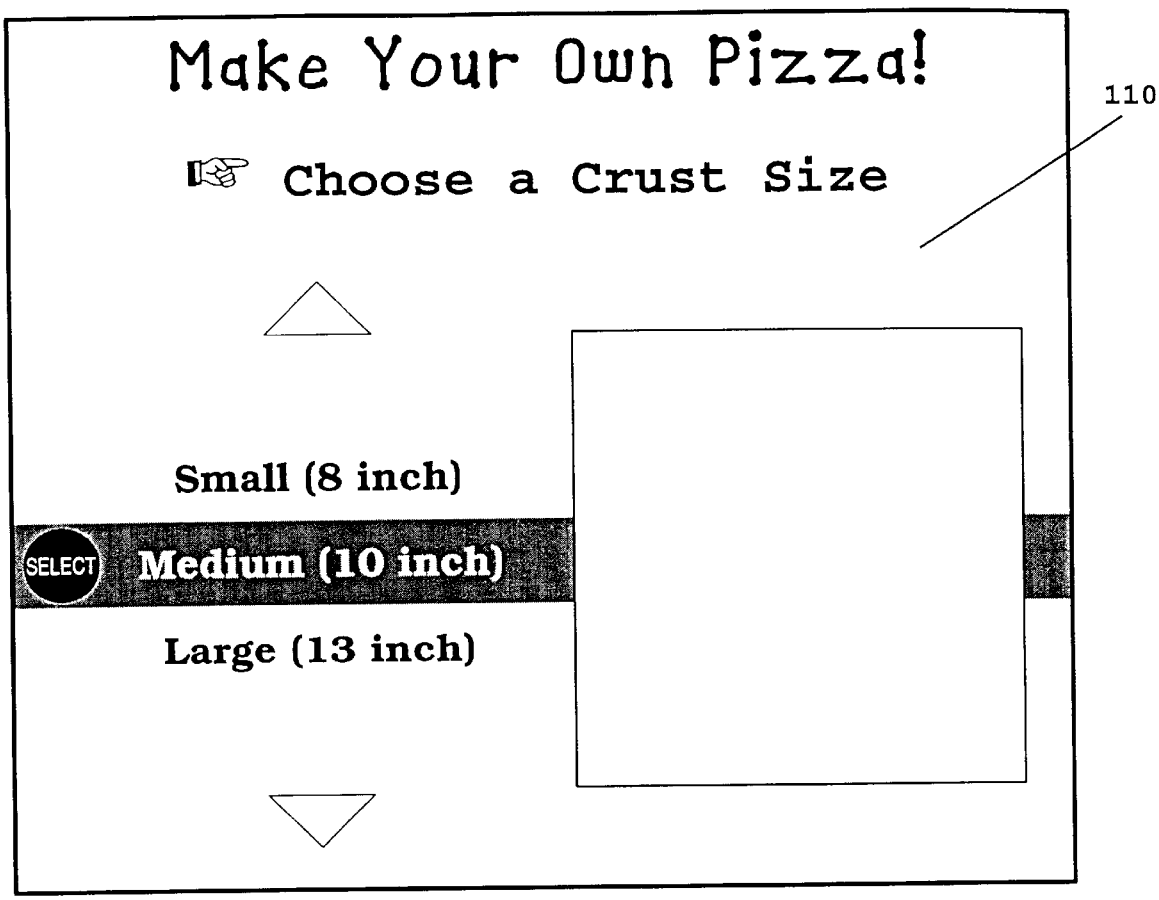
FIG. 31 illustrates the screen activated after the viewer "selects" the "Create Your Own" menu item from the previously active screen, and containing only a list of menu items and a blank textual string area on the right.
Figure 3:
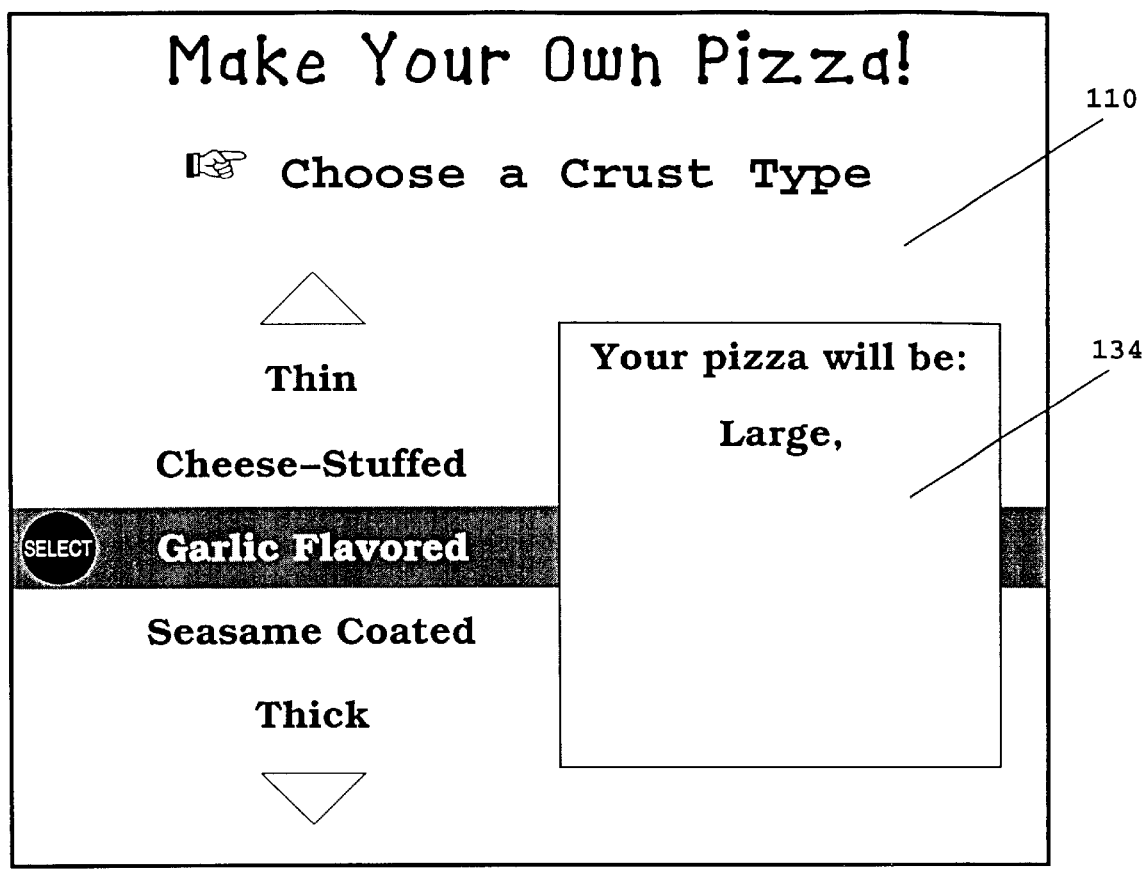

If the viewer 12 scrolls from the "Check" category item icon node 120 to the "Menu" category item node, the associated menu item icon node 122 labeled "Create Your Own" gains focus (see FIG. 30). If the viewer selects the "Create Your Own" menu item node, this node has the selection key 68 mapped to the "push-screen" action, thereby pushing the screen 110 shown in FIG. 31 onto the screen stack for display to the viewer to select a pizza crust size.

Figure 33:
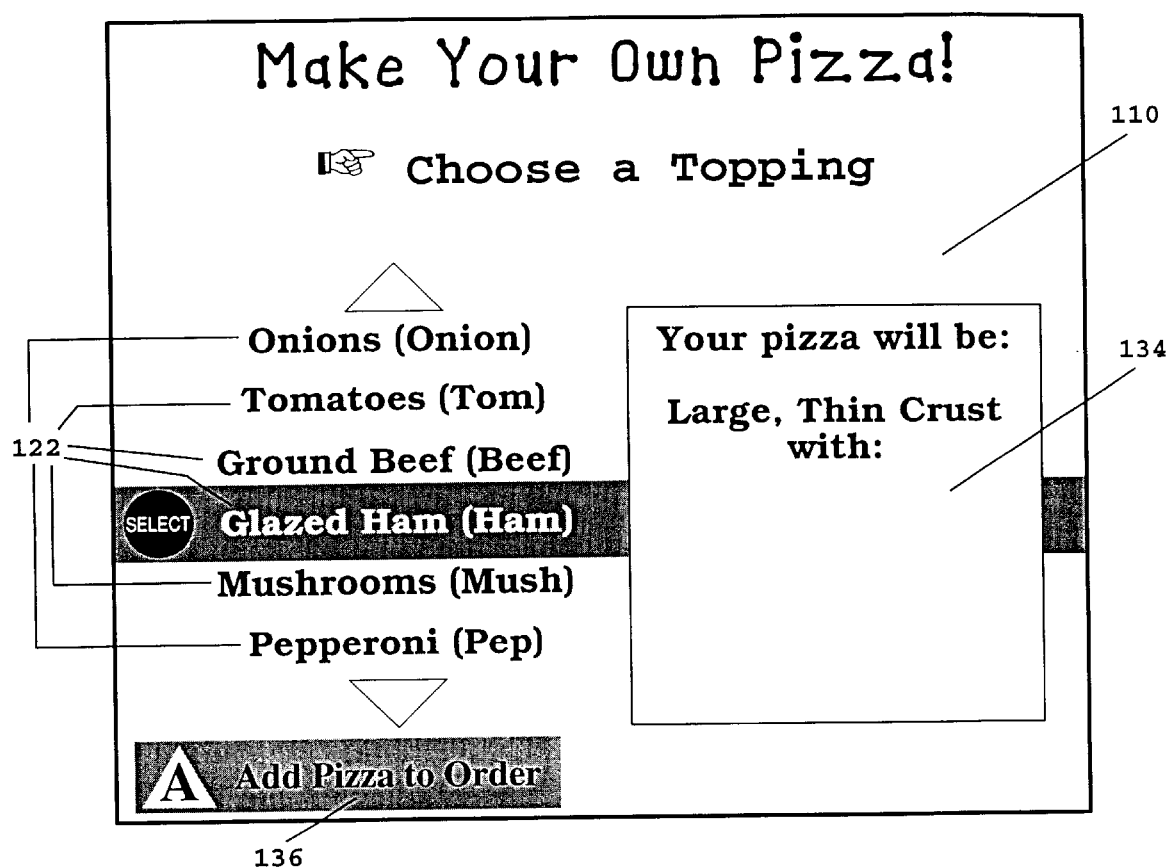
FIG. 33 illustrates the screen activated after the viewer "selects" the thin crust menu item from the previously active screen.
Figure 34:
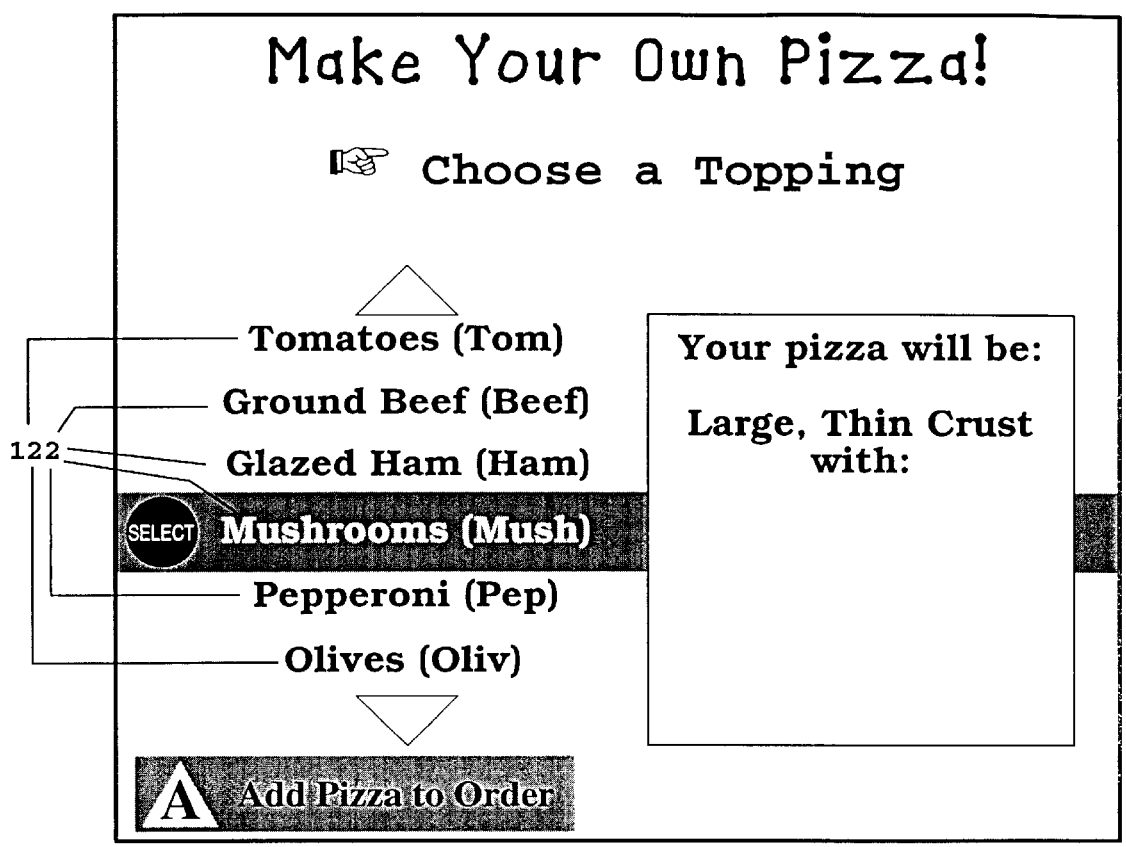
FIG. 34 illustrates the display after the viewer "Scrolls" the menu items list from "Glazed Ham (Ham)" to "Mushrooms (Mush)" on the screen illustrated in FIG. 33.

Once the viewer 12 selects the crust size, a "crust type" screen 110 is pushed, as shown in FIG. 32. The crust size the viewer selected is dynamically displayed within the drawable 134 associated with the screen. The viewer is prompted to choose a pizza crust type. Once the viewer chooses the crust type, a "topping" screen is pushed, as shown in FIG. 33, with the selection the viewer made for the crust type displayed in the drawable. The viewer is prompted to choose a pizza topping, and the menu item icon node 122 labeled "Glazed Ham (Ham)" has focus. The viewer may choose a topping or, as indicated by the "A" image 136, press the "A" function key 72 on the input device 13 when the viewer is ready to add the pizza to the viewer's order.

Figure 35:
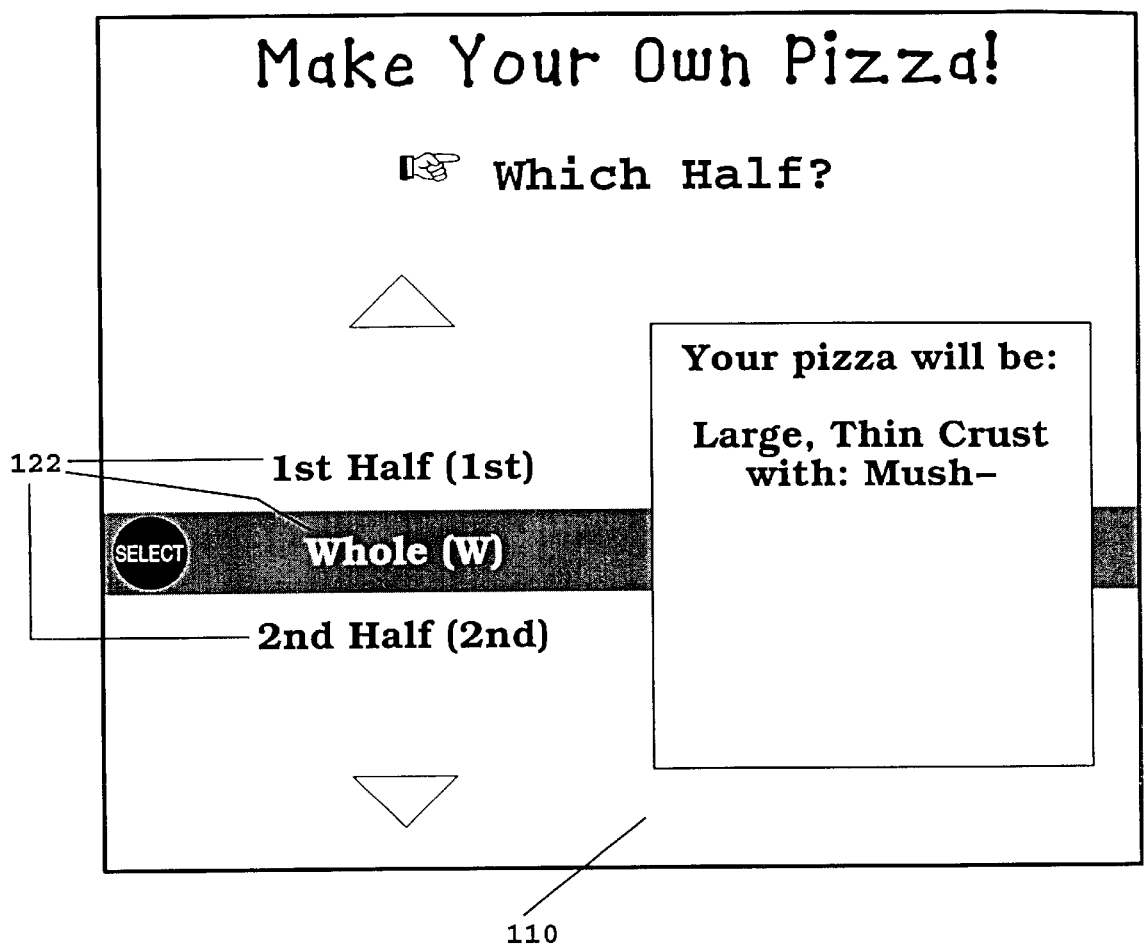
FIG. 35 illustrates the screen activated after the viewers "selects" the mushroom (Mush) menu items from the previously active screen.

If the viewer 12 scrolls down the list of menu item icon nodes 122 and selects the "Mushrooms (Mush)" node (see FIG. 34), a "which half" screen 110 displays, as shown in FIG. 35. The viewer is prompted to choose the part of the pizza on which the selected topping should be placed. The "A" image 136 for adding the pizza to the viewer's order does not appear in this display because the viewer has not yet provided all required information for adding a topping.

Figure 36:
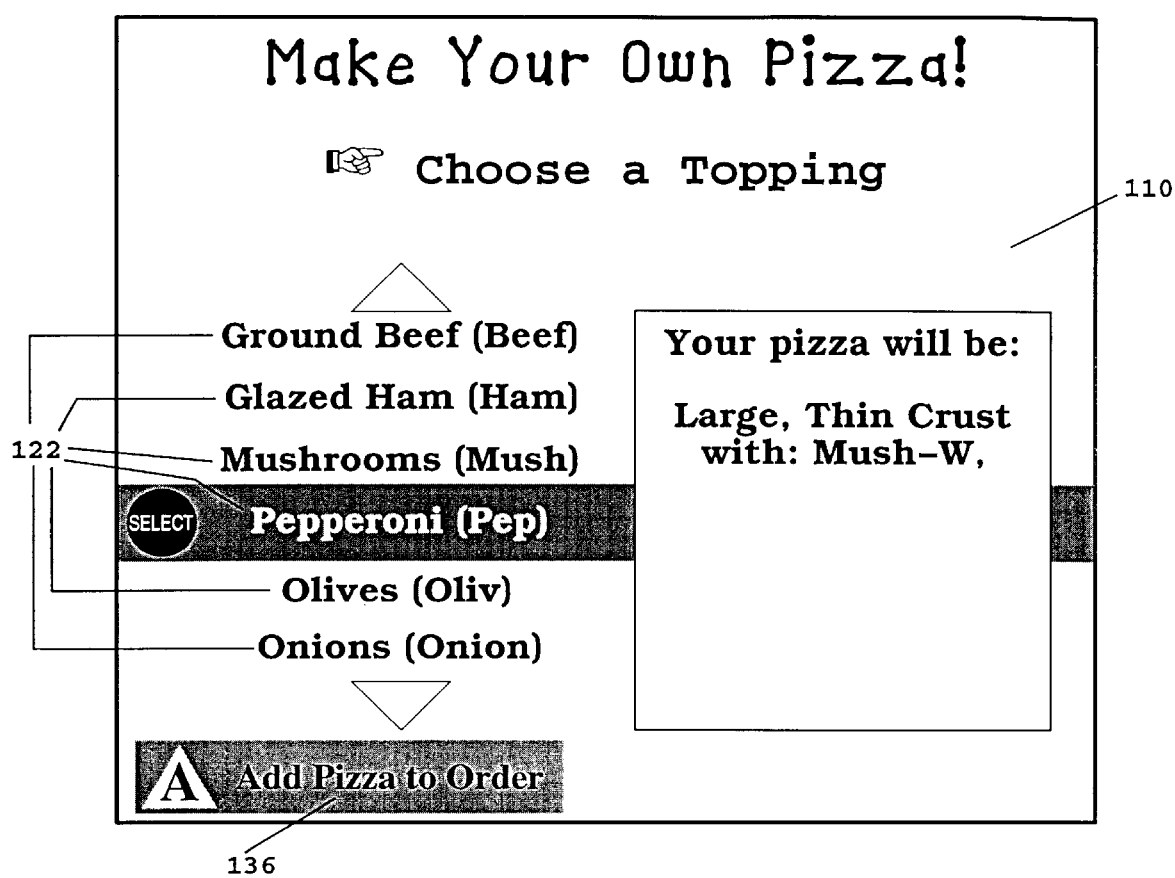
FIG. 36 illustrates the previously active and now re-activated screen, the menu item list of pizza toppings, with the contents of the textual string on the right of the screen reflecting the viewer's selection from the previously active screen.
Figure 37:
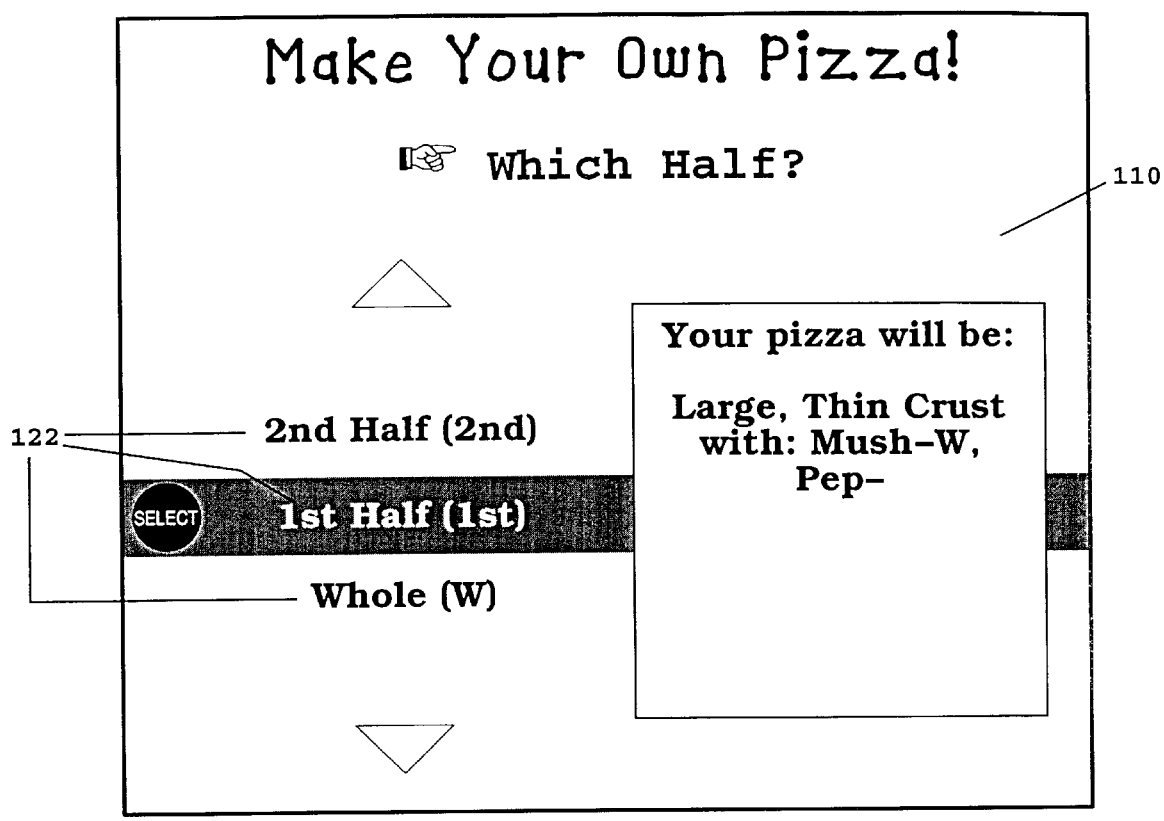
FIG. 37 illustrates the newly activated screen, again prompting the viewer to select a half on which the topping selected on the previously active screen, in this case "Pepperoni (Pep)", should be placed.
Figure 38:
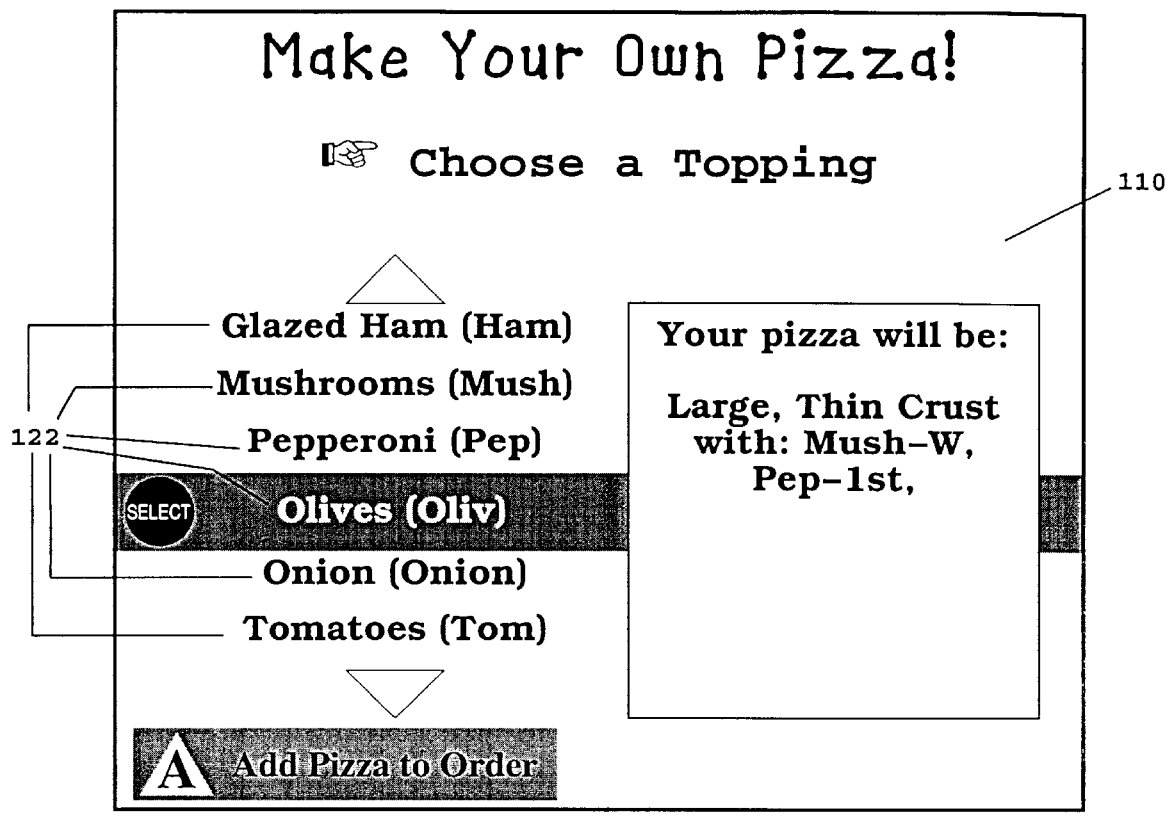
FIG. 38 illustrates the previously active and now re-activated screen with the menu item list of toppings.
Figure 39:
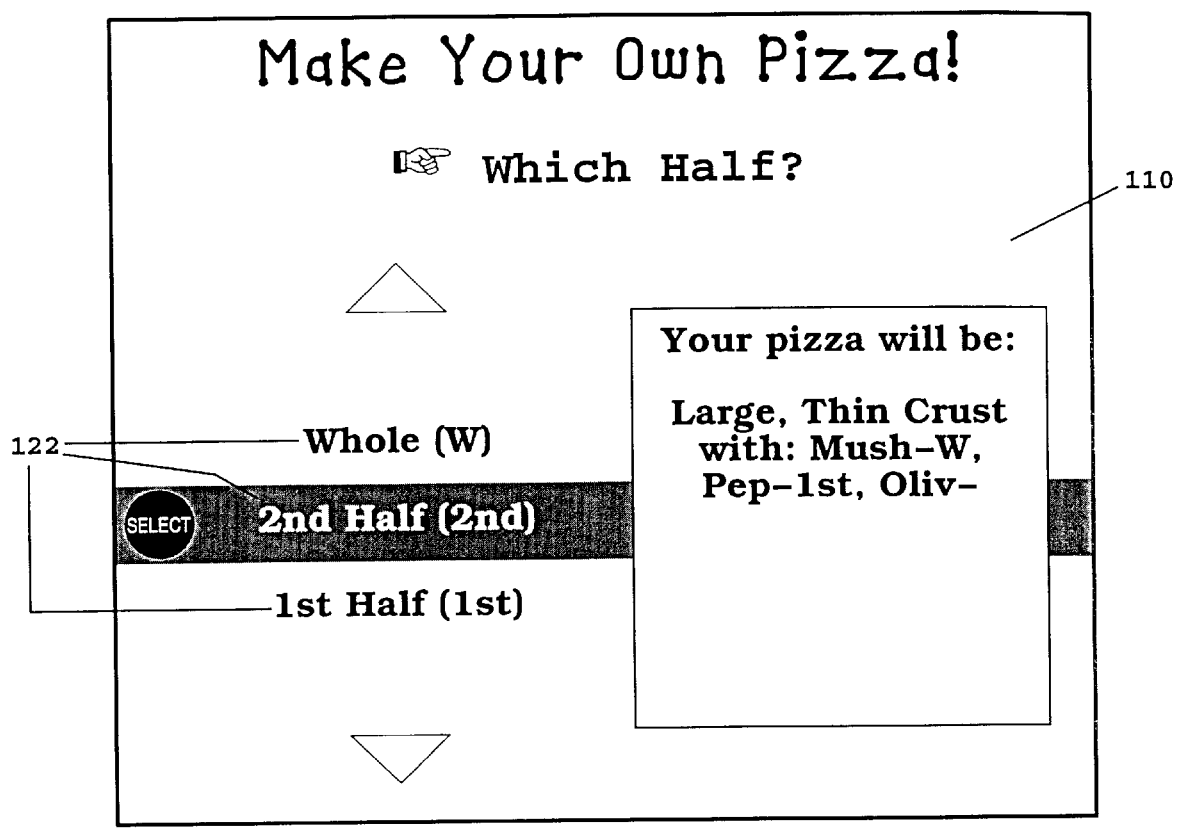
FIG. 39 illustrates the newly activated screen, again prompting the viewer to select a half on which the topping selected on the previously active screen, in this case "Olives (Oliv)", should be placed.
Figure 40:
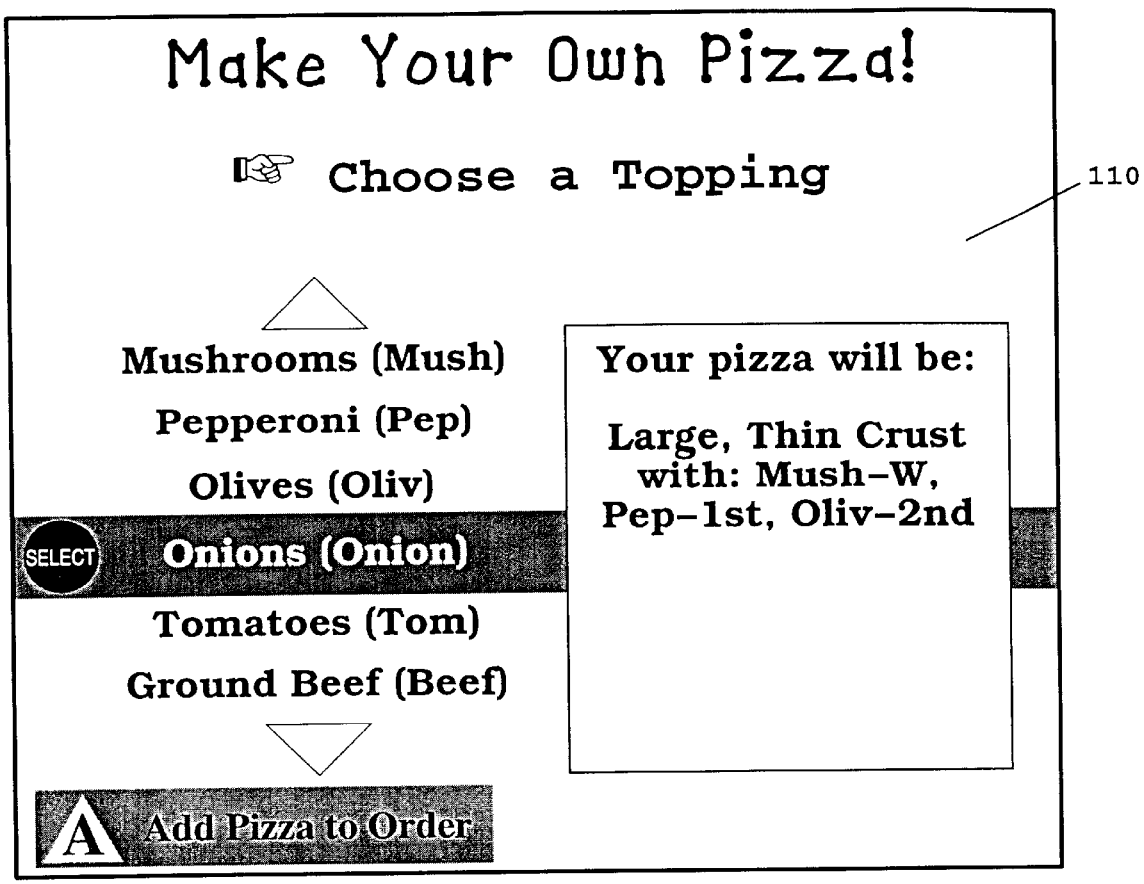
FIG. 40 illustrates the previously active and now re-activated screen with the menu item list of toppings. Again, the contents of the textual string on the right of the screen have been modified to reflect the viewer's selection of "2nd Half (2nd)" on the previously active screen.

After the viewer 12 chooses the menu item icon node 122 labeled "Whole (W)" for the placement of the topping, the "pop-screen" action executes, returning the viewer to the previous "topping" screen 110, as shown in FIG. 36. The "A" image 136, giving the viewer the option of adding the pizza to the viewer's order, reappears. After the viewer selects the "Pepperoni (Pep)" menu item node, the "which half" screen displays again (see FIG. 37). If the viewer selects the "1st Half (1st)" menu item node, the "topping" screen displays (see FIG. 38). After the viewer selects the "Olives (Oliv)" menu item node, the "which half" screen appears again (see FIG. 39), followed by the topping screen (see FIG. 40) after the viewer selects the "2nd Half (2nd)" menu item node in FIG. 39.

Figure 41:
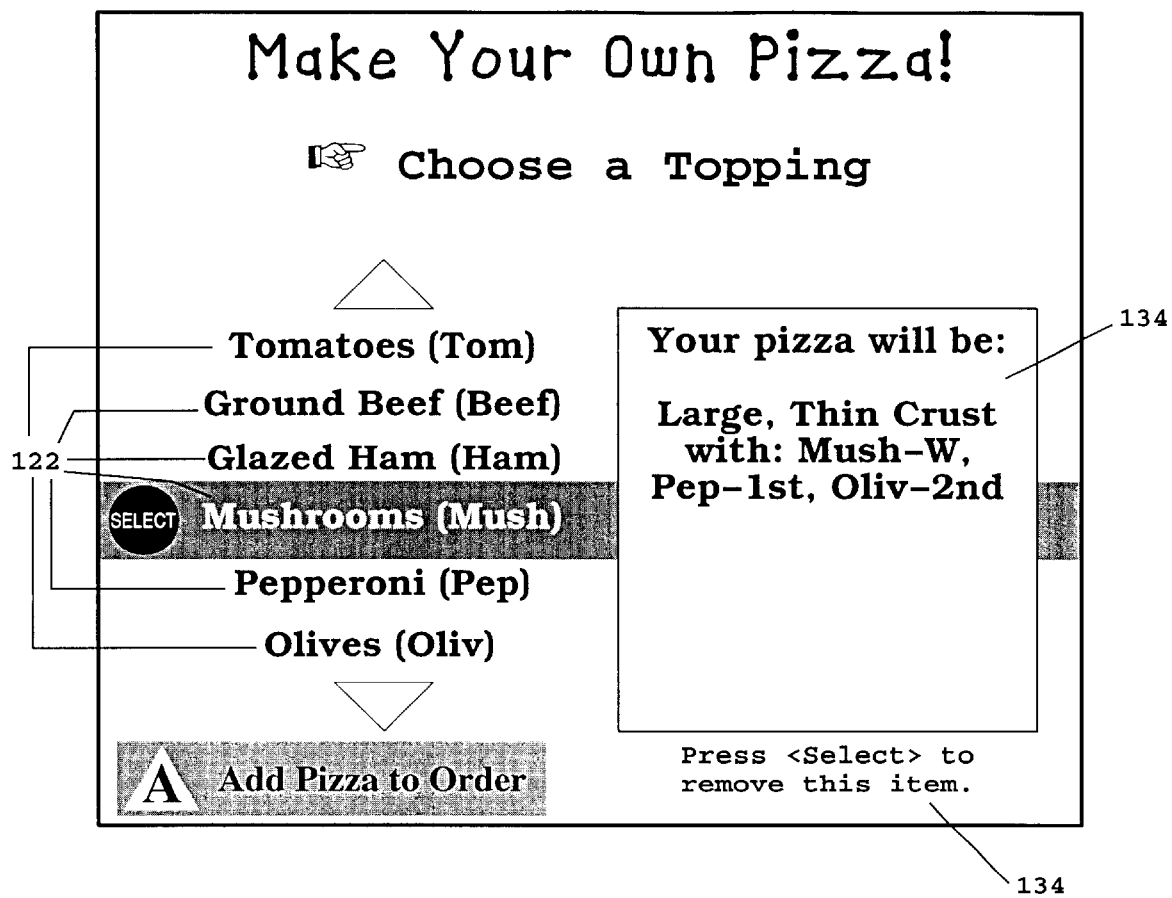
FIG. 41 illustrates the screen after the viewer has scrolled the menu item list from "Olives (Oliv)" which had focus to "Mushrooms (Mush)" now having focus.

If the viewer 12 scrolls back to the "Mushrooms (Mush)" menu item icon node 122, which is a choice previously selected, the screen 110 appears as in FIG. 41. When the viewer scrolls back to a topping that the viewer has previously selected, a drawable 134 appears informing the viewer that pressing the selection key 68 on the input device 13 removes the topping. This illustrates the dual function of the selection key—the selection key will add a topping if it has not already been added, or the selection key will remove a topping if it has already been chosen. After the viewer presses the selection key, the information regarding mushrooms is removed from the drawable containing the description of the pizza, and the note to the viewer about pressing the selection key to remove the topping disappears, as shown in FIG. 42.

Figure 42:
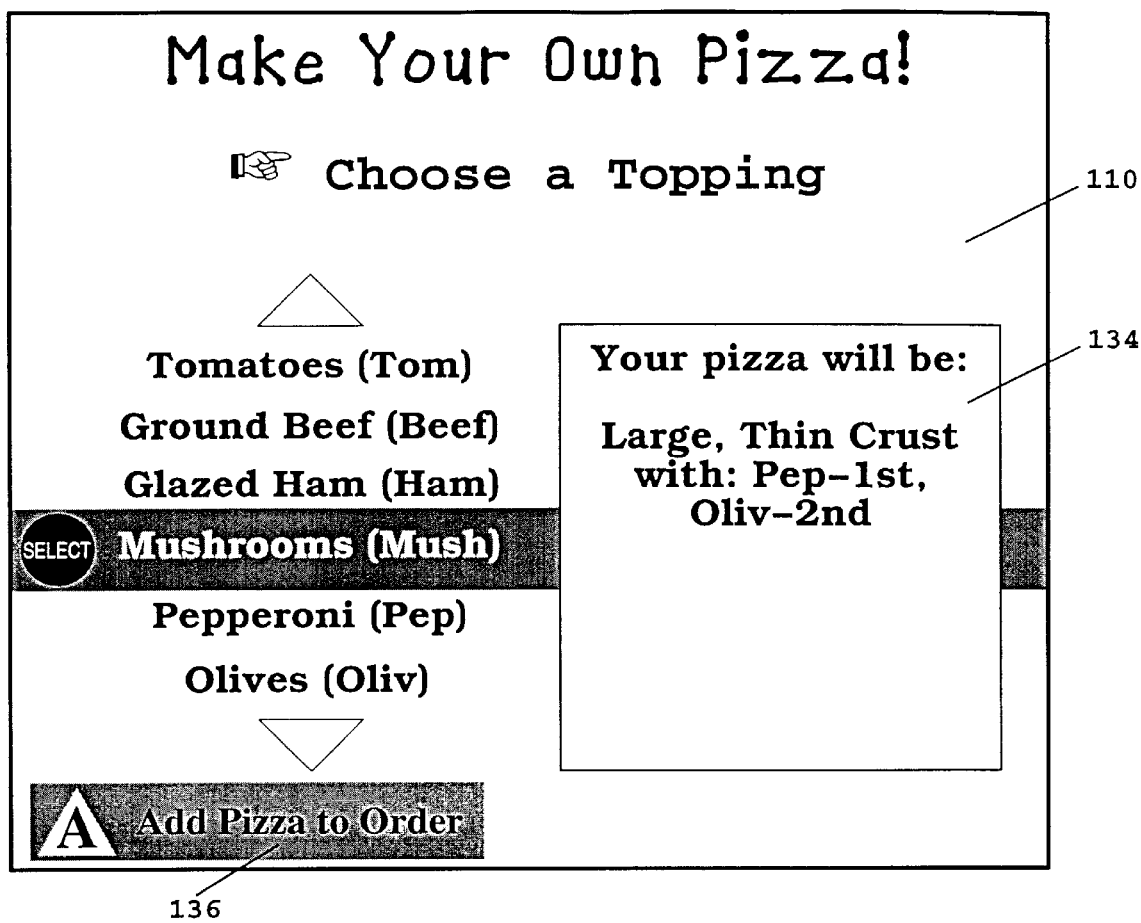
FIG. 42 illustrates the screen after the viewer has pressed "select" on the menu item "Mushrooms (Mush)"

The "A" image 136 in FIG. 42 informs the viewer 12 that the viewer may press the "A" function key 72 on the input device 13 to add the pizza to the order. After doing so, the screen 110 with focus, the "topping" screen, is popped back to the initial screen shown in FIG. 26, as illustrated in FIG. 43. The "Check" category item icon node 120 has focus, and the list of menu item icon nodes 122 the viewer selected is updated to include the pizza. The "B" image 138 and the "C" image 140 indicate that the viewer has the option of pressing the "B" function key 74 to complete the order, or the "C" function key 76 to remove from the viewer's order one of the items from the list of food items.

The displays the viewer 12 might see when completing the food order transaction via the client terminal 9 are shown in FIGS. 44–59. The process of completing an order is configurable and may change depending on environmental and regulatory capabilities and concerns. This configuration information is preferably contained in the VICF and is interpreted at run-time by the present invention, which uses this information to determine the screens and options that should be presented to the viewer.

Figure 44:
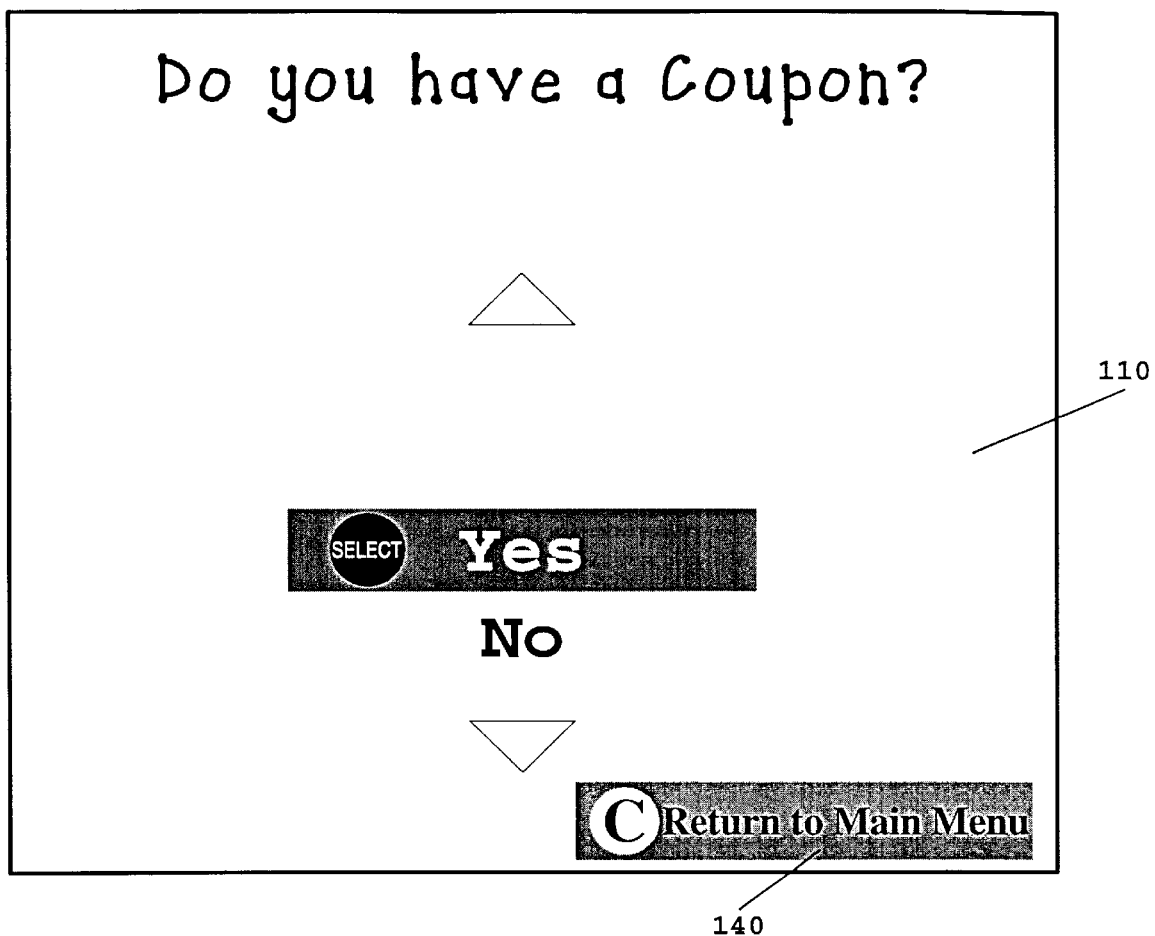
FIG. 44 illustrates the screen activated as a result of the viewer having pressed the "B" button, indicating a desire to "Complete the Order", as conveyed to the viewer on the previously active screen illustrated in FIG. 43.

After the viewer 12 presses the "A" function key 74 on the input device 13 to complete the order, an optional screen prompts the viewer to indicate whether the viewer will use a coupon with the order (see FIG. 44). The viewer is then prompted to choose between having the pizza delivered or picking up the pizza (see FIG. 45). Next, the viewer is prompted to choose a method of payment from a list of payment options (see FIG. 46). The list of payment options may vary depending on the environment.

Figure 48:
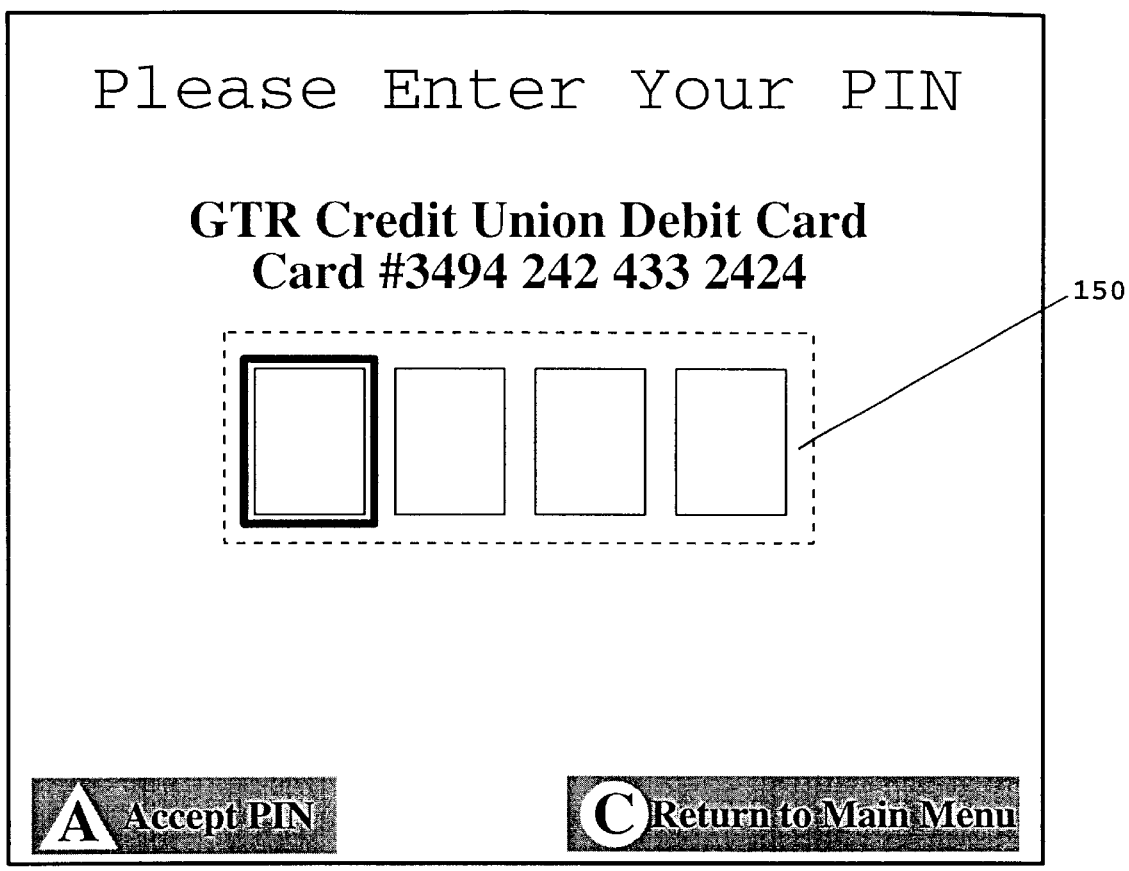
FIG. 48 illustrates the screen activated as a result of the viewer making a selection on the screen illustrated in FIG. 47. In this screen, the viewer is prompted to enter a pin number and the first illustration of a screen that does not contain either a list of menu items or category items but does contain a numeric field component.
Figure 49:
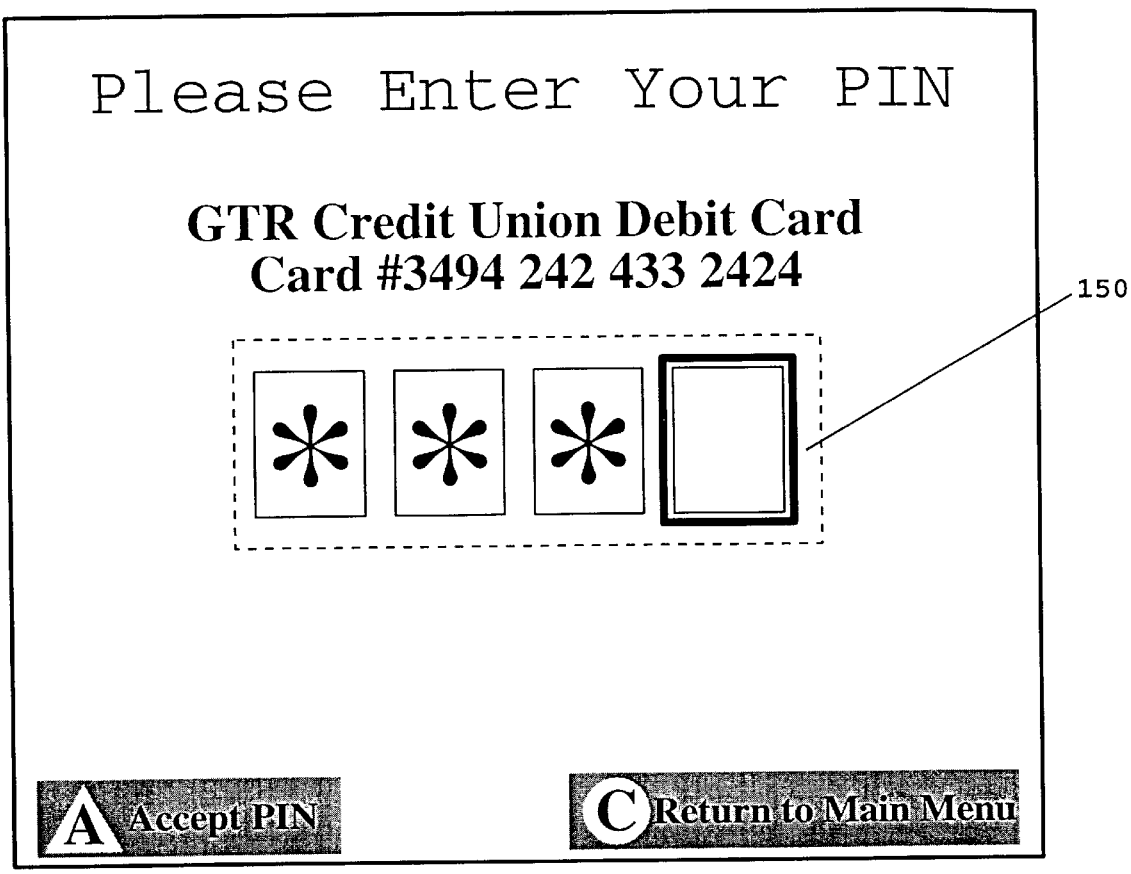
FIG. 49 illustrates the screen illustrated in FIG. 48 after the viewer has entered 3 of the 4 digits in the "pin" numeric field.

If the viewer 12 selects the "Credit/Debit Card" menu item icon node 122, the next screen 110 display shows a list of card payment options for the viewer (see FIG. 48).

If the viewer chooses the "GTR Credit Union Debit Card" menu item node, the following screen shown in FIG. 48, prompts the viewer to enter a personal identification number (PIN) in the numeric field 150. The single numeric field contains four boxes for four digits, the first box having focus. The numeric field is configured to operate in the "pin" mode, substituting display of the digits with symbols for security. After the viewer enters three of the four digits of the pin, the fourth box has focus, indicating the fourth box may be edited (see FIG. 49).

Figure 50:
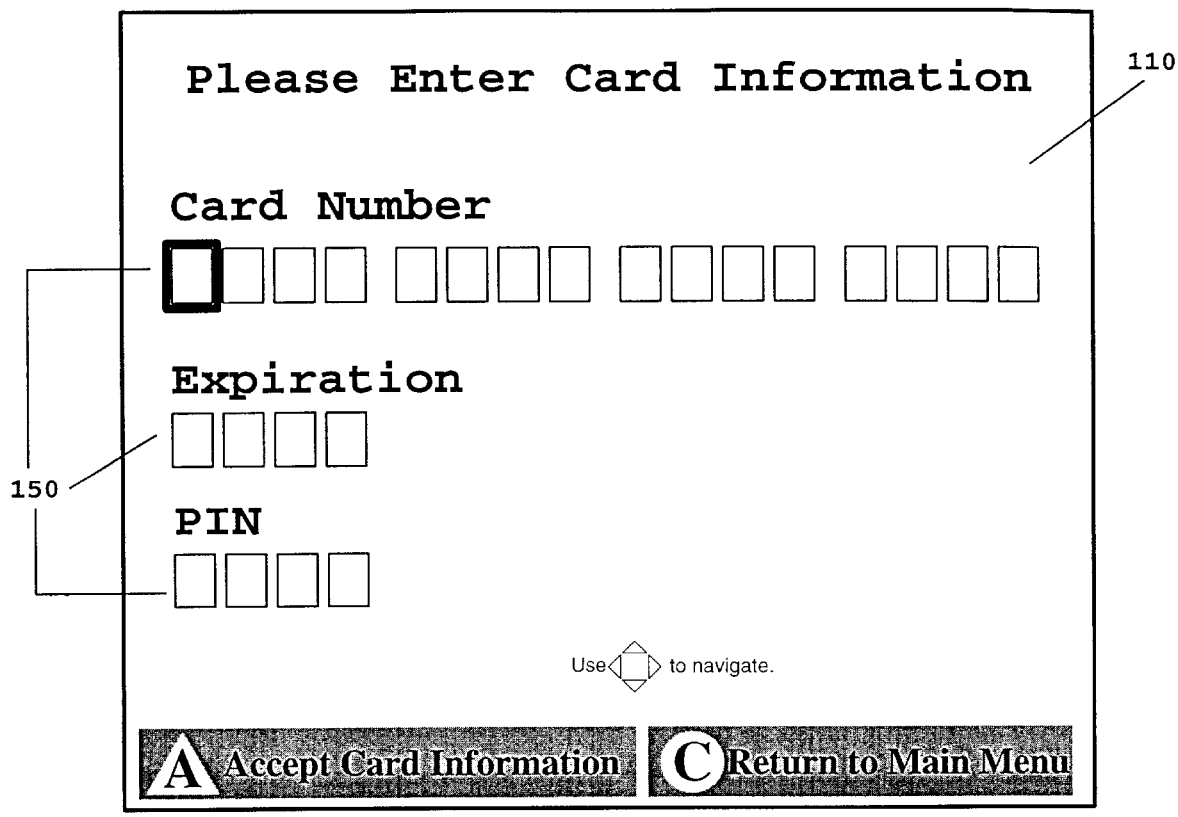
FIG. 50 illustrates the screen activated as a result of the viewer pressing "B" on the screen illustrated in FIG. 43, the first illustration of a screen that contains more than one numeric field component.
Figure 51:
FIG. 51 illustrates the screen initially presented in FIG. 50 with the viewer having partially entered a card number.
Figure 52:
FIG. 52 illustrates the screen presented in FIG. 51 with additional data having been entered by the viewer.
Figure 53:
FIG. 53 illustrates the screen presented in FIG. 52 with additional data having been entered by the viewer.
Figure 54:
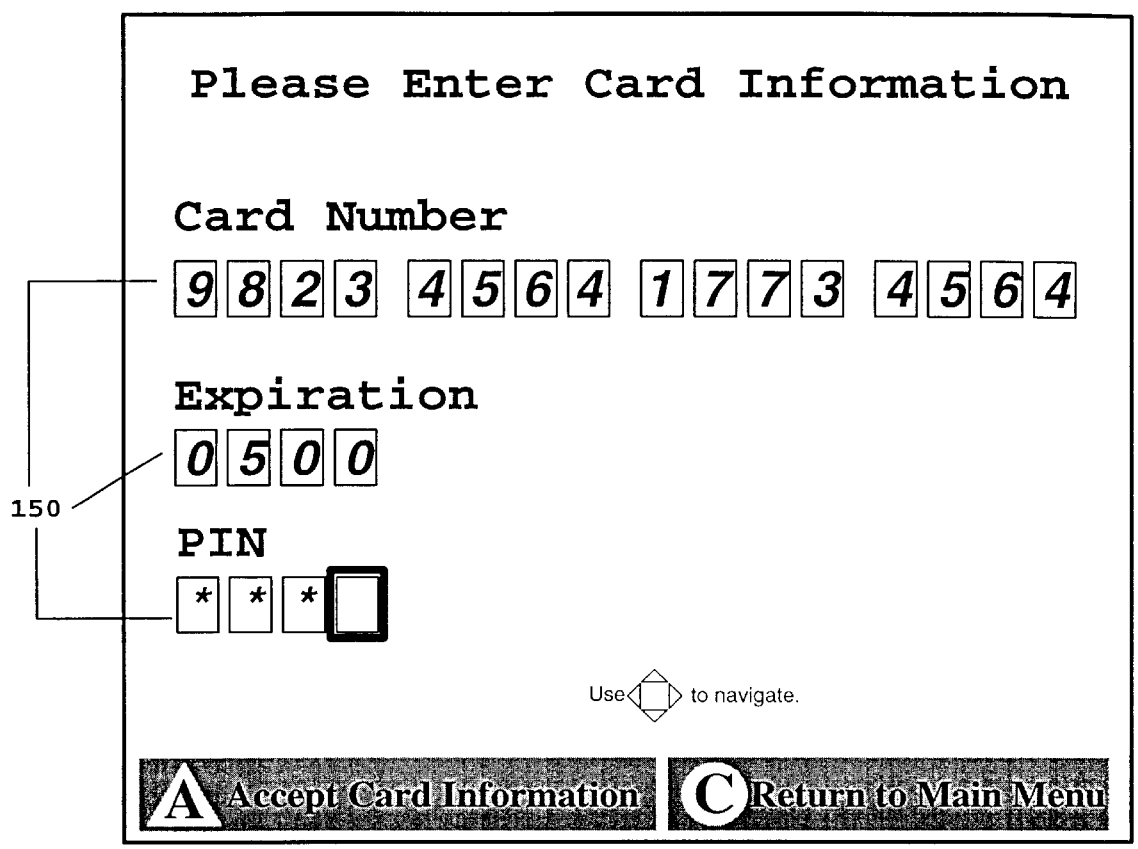
FIG. 54 illustrates the screen presented in FIG. 53 with additional data having been entered by the viewer, the additional data is the pin, the digits of which are hidden from view.
Figure 55:
FIG. 55 illustrates the screen presented in FIG. 54 with the viewer having completed entry of the pin, the current digit indicator has moved back to the first digit field, letting the viewer know the entry process is complete, if after processing the entered data, some of the data is found to be incorrect or invalid, the viewer would be returned to the screen presented in FIG. 50 to re-enter the data.
Figure 57:
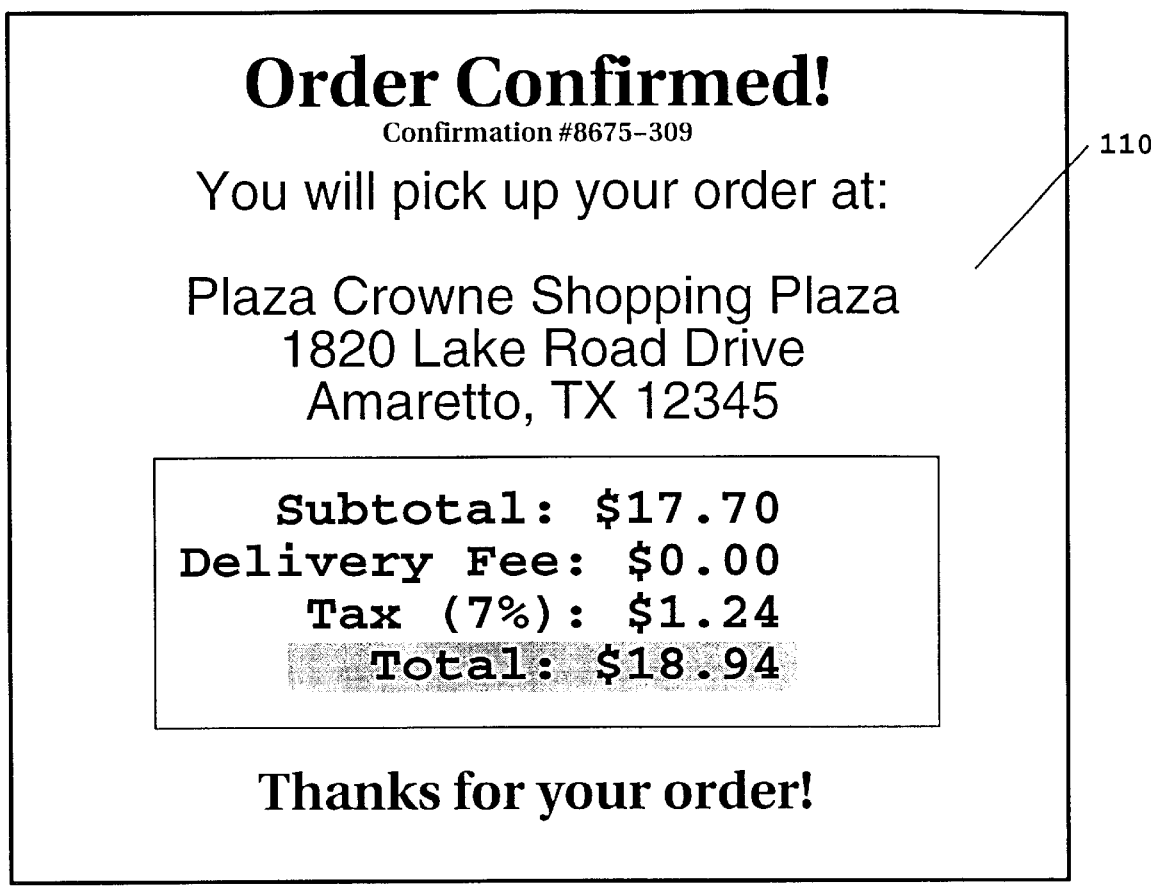
FIG. 57 illustrates the screen activated as a result of the viewer confirming the order presented in FIG. 56.

An alternative screen 110 for entering card information is shown in FIG. 50. The screen contains a list of numeric fields 150 for card number, expiration date, and pin. When the viewer enters the last digit in the card number numeric field, focus automatically transfers to the expiration numeric field. Various stages of filling in the numeric fields are shown in FIGS. 51–55.

Figure 45:
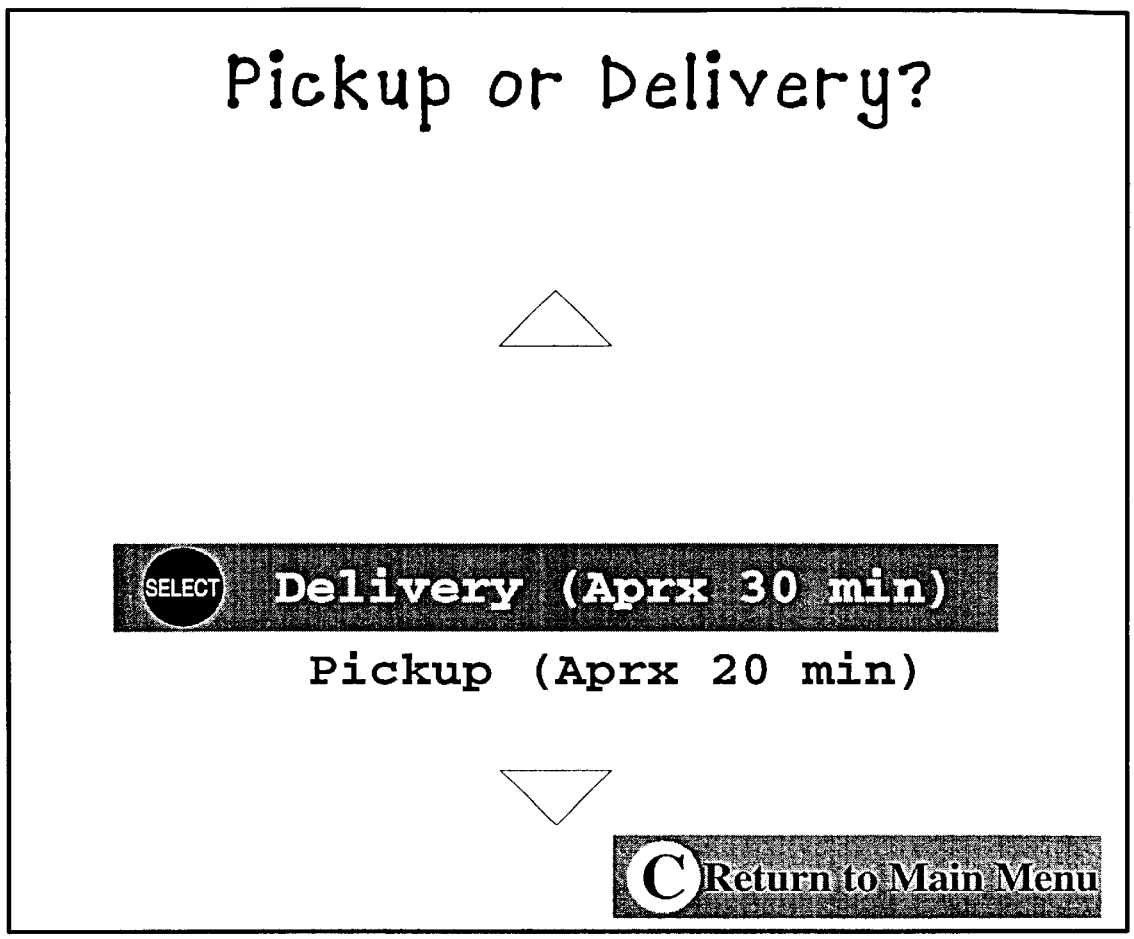
FIG. 45 illustrates another screen that may be activated directly as a result of the viewer pressing "B" while the screen illustrated in FIG. 43 was active.
Figure 46:
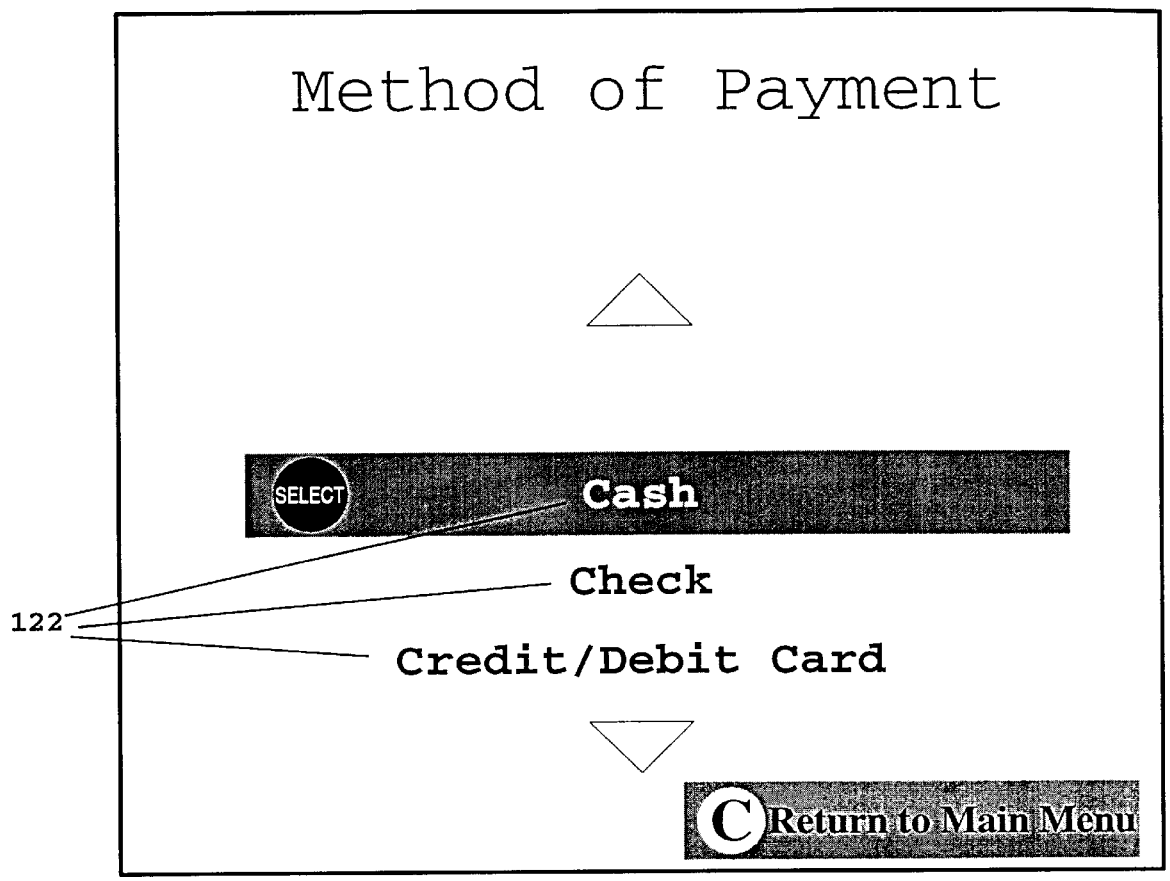
FIG. 46 illustrates the screen activated as a result of the viewer making a selection on one of the screens illustrated in FIG. 44 or 45 or by pressing "B" on the screen illustrated in FIG. 43.
Figure 47:
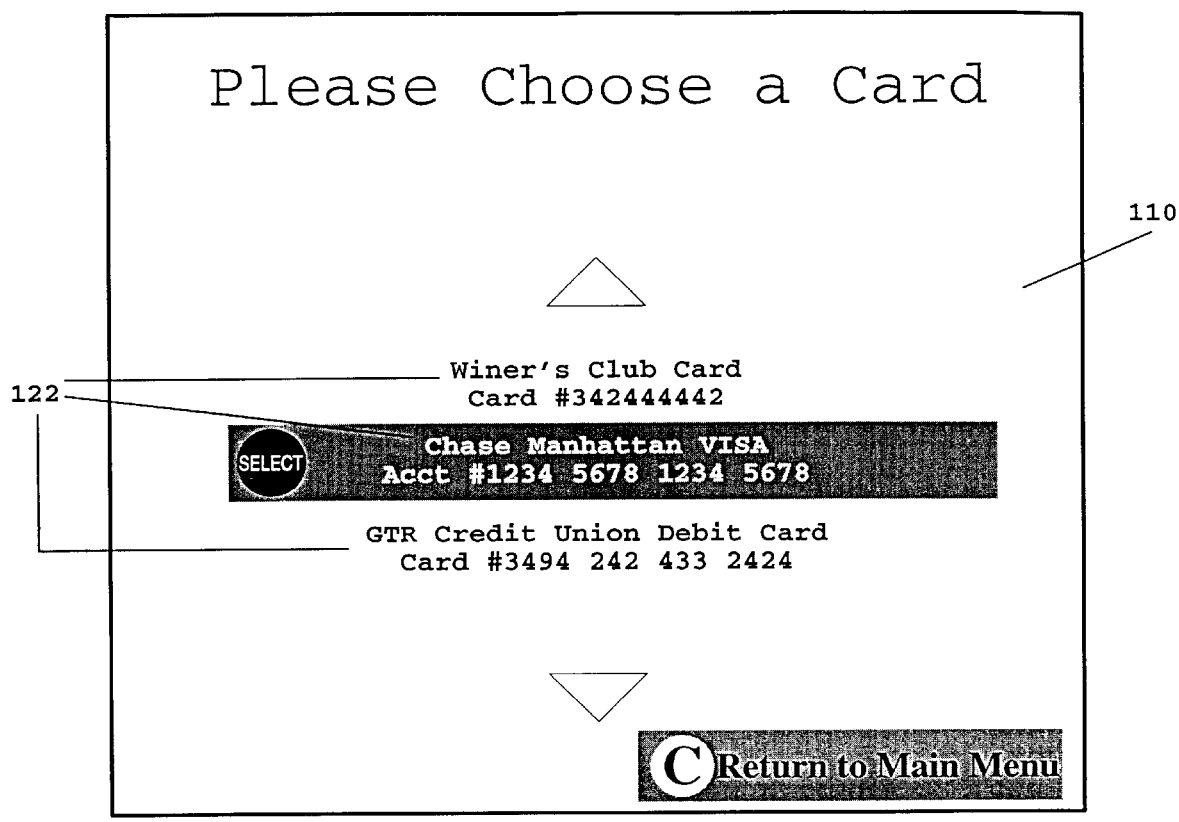
FIG. 47 illustrates the screen activated as a result of the viewer making a selection on the screen illustrated in FIG. 46.

If the viewer 12 chooses "Pickup" from the screen 110 presented in FIG. 45, a "pickup" screen, as shown in FIG. 56, may appear immediately after the viewer selects "Pickup," or after the viewer specifies the method of payment using, for example, any of the screens shown in FIGS. 46–55. The viewer may select the "B" image 138 in FIG. 56 to complete the order (by pressing the "B" function key 74 on the input device 13), or the "C" image 140 to return to the main menu (by pressing the "C" function key 76 on the input device), which is the same screen as shown in FIG. 43. If the viewer chooses to complete the order, then a "confirmation" screen displays, containing a confirmation number that may be used to cross-reference the viewer's order at various stages of fulfillment (see FIG. 57).

Figure 58:
FIG. 58 illustrates the screen activated as an alternative to the screen in FIG. 56, in this case, [the viewer has selected]

If the viewer 12 chooses "Delivery" from the screen 110 presented in FIG. 45, a "delivery" screen, as shown in FIG. 58, may appear immediately after the viewer selects "Delivery," or after the viewer specifies the method of payment using, for example, any of the screens shown in FIGS. 46–55. The viewer 12 may enter the address specified on the screen for delivery if the input device 13 has a keyboard, but, preferably, the address is obtained by the navigational interface application from the database server 5 in the data center 1, rather than being contained in the VICF or manually entered by the viewer at run-time. If the viewer selects the "B" image 138 to complete the order, then the "confirmation" screen displays (see FIG. 59).

The Cell

The cell 160 (see FIG. 60) is a type of node for presenting a single, specific choice to the viewer 12 by placing an image or text or both on the screen 110 within a fixed location that contains the cell. The screen or page 170 (see FIG. 73) may contain a list of cells displayed in a grid or table-like arrangement. The viewer navigates between the cells using the up key 60, down key 62, right key 64, and left key 66 on the input device 13. The cell having focus is displayed with a special border, such as the one shown in FIG. 60, to communicate to the viewer which cell is the current cell. The list of cells may be rendered within a grid defined to contain a specific number of columns and rows. Cells and pages may be used in conjunction with or as an alternative to the category item 112 and menu item 114.

The cell 160 inherits the basic properties of the general node, as well as properties specific to cells. First, the cell may be represented by image, text, or both, and the image and text are specified independently of the drawables 134 associated with the cell. Second, when the cell has focus, a special border appears around the cell and any associated drawables are displayed. Finally, the cell has the capability of handling "move-left," "move-right," "move-up," "move-down," "play-media," "pop-screen," and "push-screen" actions.

Figure 60:
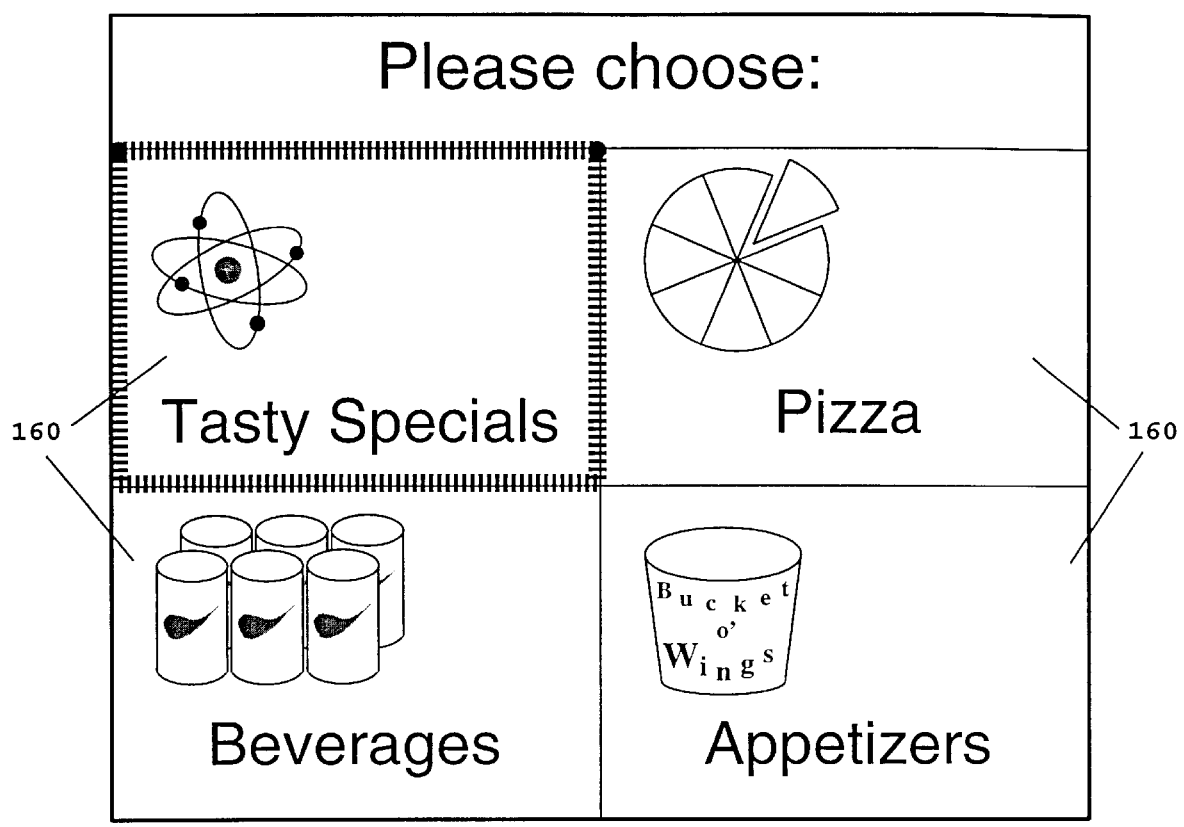
FIG. 60 illustrates the basic interface component, the cell, in this example, the cells are arranged in a grid measuring 2 columns by 2 rows.
Figure 61:
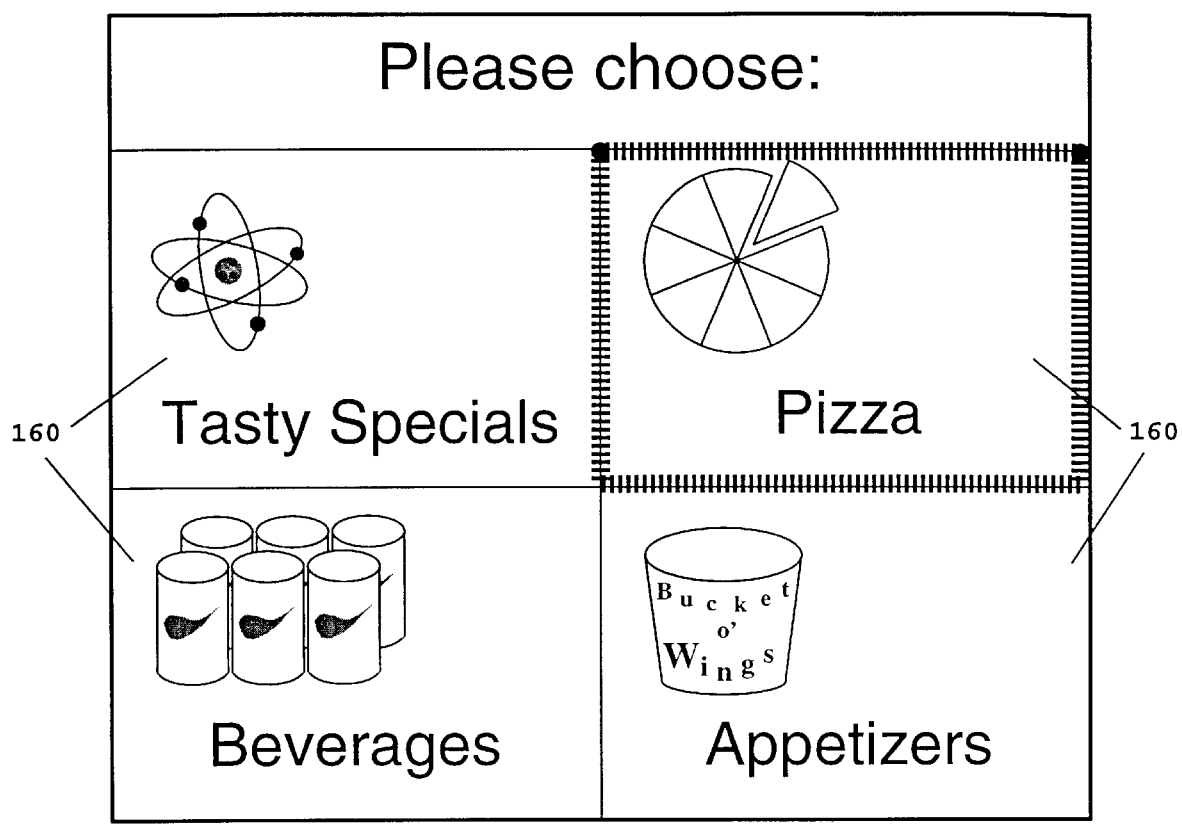
FIG. 61 illustrates the grid of cells originally presented in FIG. 60, here the viewer has moved the focus from the "Tasty Specials" cell to the "Pizza" cell.
Figure 62:
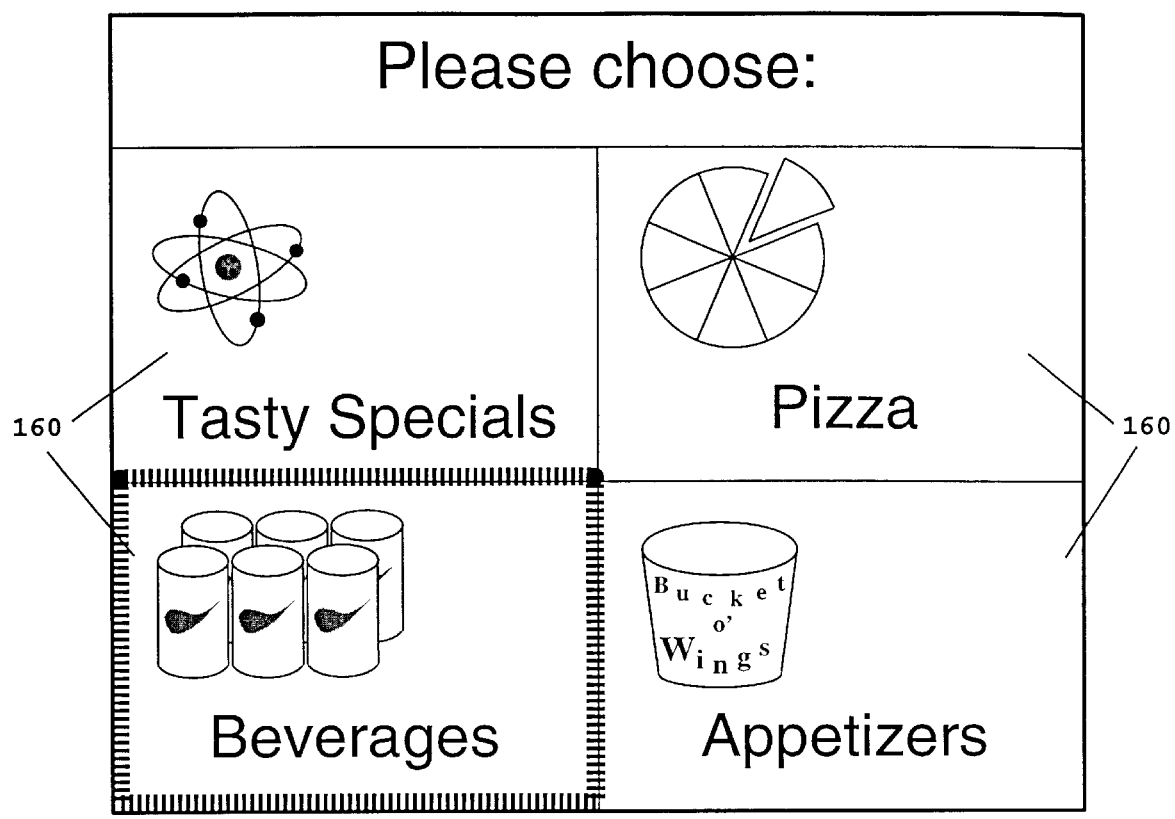
FIG. 62 illustrates the grid of cell originally presented in FIG. 60, here the viewer has moved the focus from the "Pizza" cell to the "Beverages" cell.

Various arrangements and configurations of cells 160 are illustrated in FIGS. 60–72. One example of cell configuration, shown in FIG. 60, is the screen 110 containing four cells arranged in a two-column by two-row grid. The cell labeled "Tasty Specials" has focus. If the viewer 12 presses the right key 64 on the input device 13, focus moves to the cell labeled "Pizza" (see FIG. 61). If the viewer presses the right key again, focus moves to the "Beverages" cell (see FIG. 62).

Figure 63:
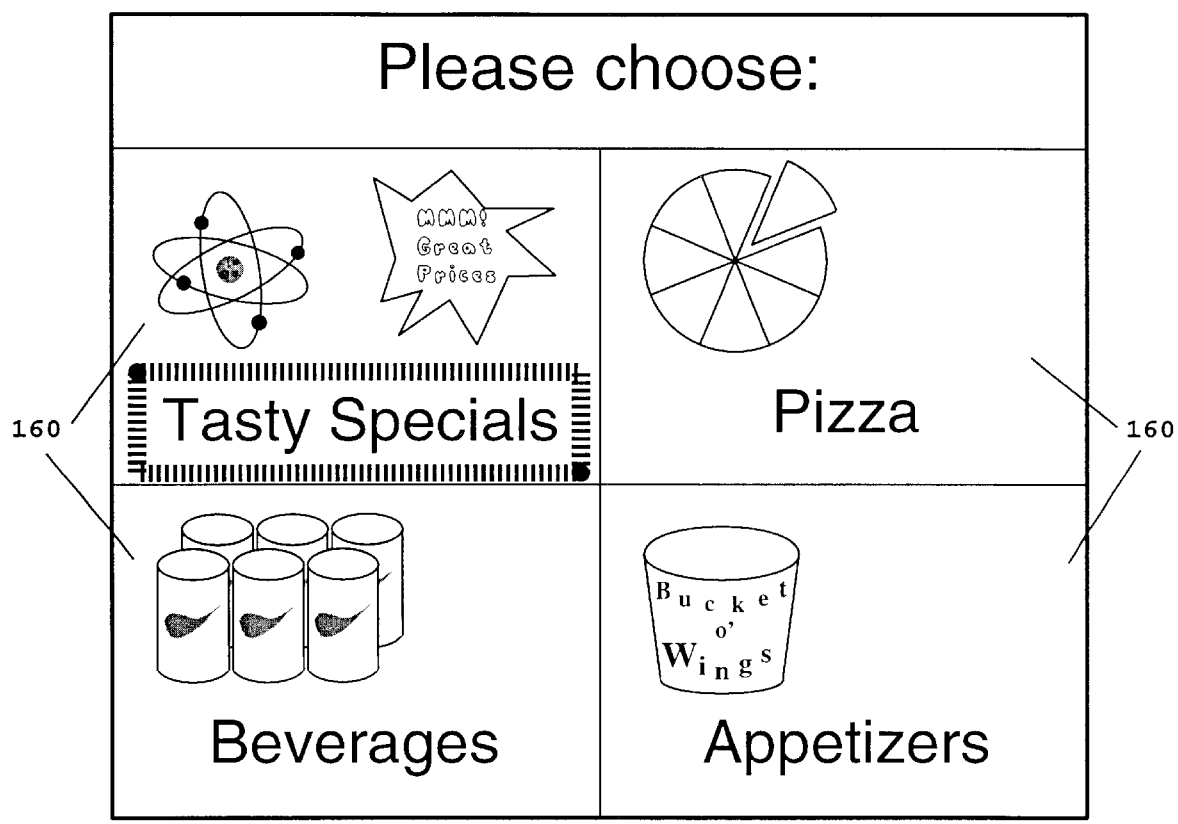
FIG. 63 illustrates another grid of cell, configured a little differently from the grid of cells illustrated in FIGS. 60–62, in this example, each cell is defined as being smaller.
Figure 64:
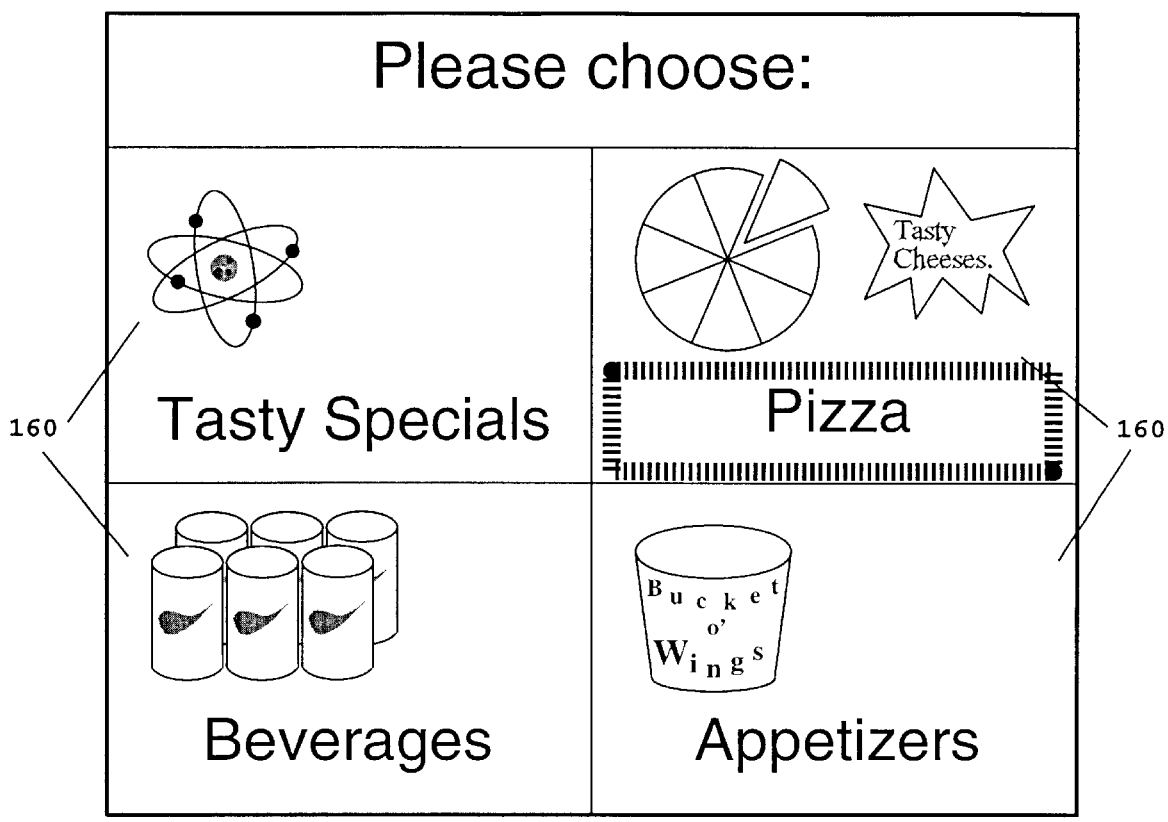
FIG. 64 illustrates the grid of cells originally presented in FIG. 63, here the viewer has moved the focus from the "Tasty Specials" cell to the "Pizza" cell.
Figure 65:
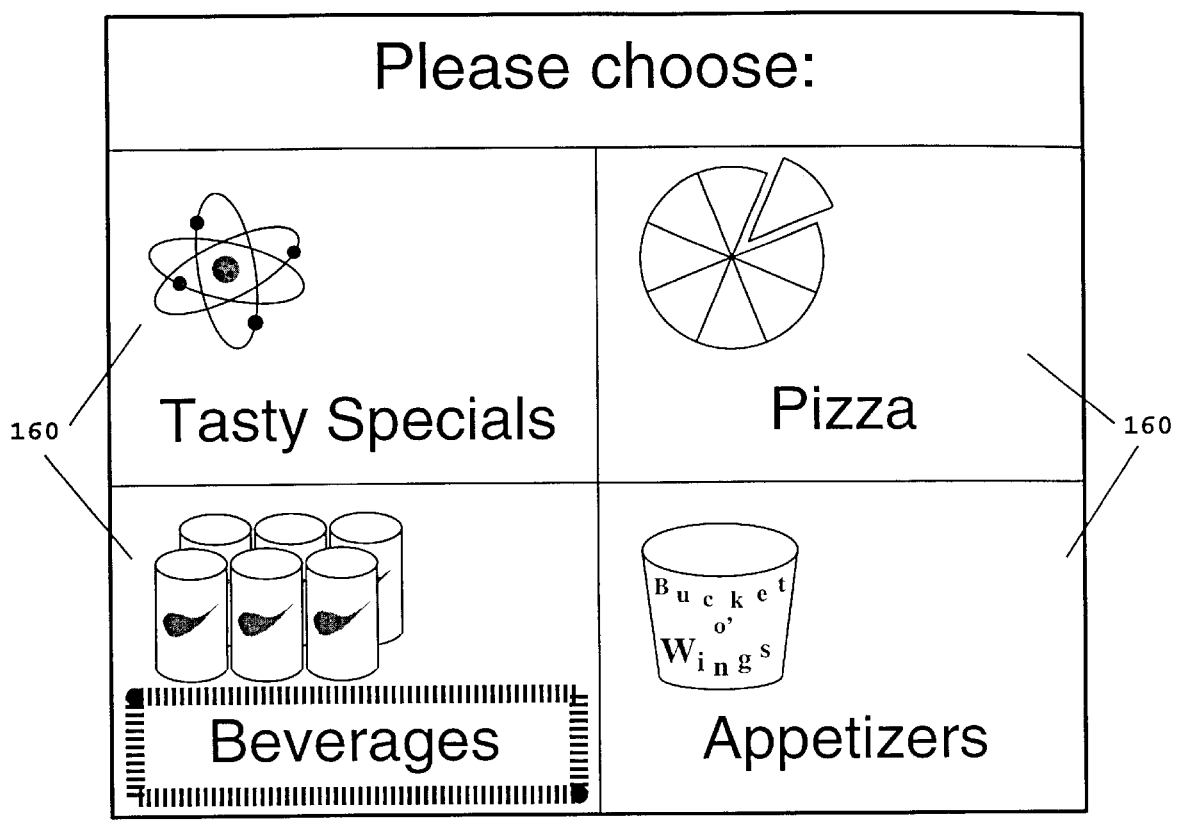
FIG. 65 illustrates the grid of cells originally presented in FIG. 63, here, the viewer has moved the focus from the "Pizza" cell to the "Beverages" cell.

An alternative way to convey to the viewer 12 which cell 160 has focus is shown in FIG. 63. In this figure, only a portion of the "Tasty Specials" cell has a special border, indicating that this cell has focus. Displays after the viewer moves focus to the "Pizza" cell and then to the "Beverages" cell are shown in FIGS. 64 and 65. FIGS. 63 and 64 illustrate that the "Tasty Specials" cell and the "Pizza" cell have related drawables that appear when either cell gains focus.

Figure 66:
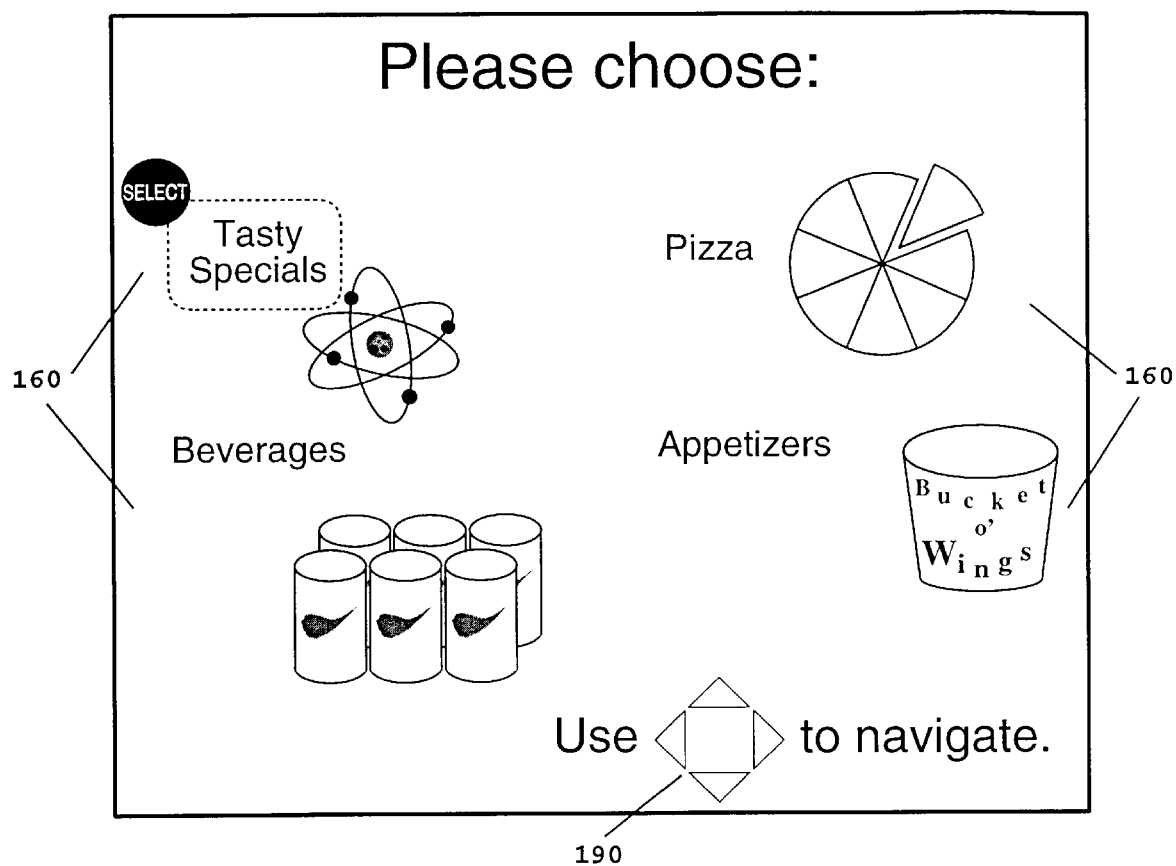
FIG. 66 illustrates another grid of cells, again configured differently, in this example, the focus-box is a smaller dashed-line box with a "select" icon attached, the individual cells are constructed in a different fashion and the viewer is given instructions on how to navigate.
Figure 67:
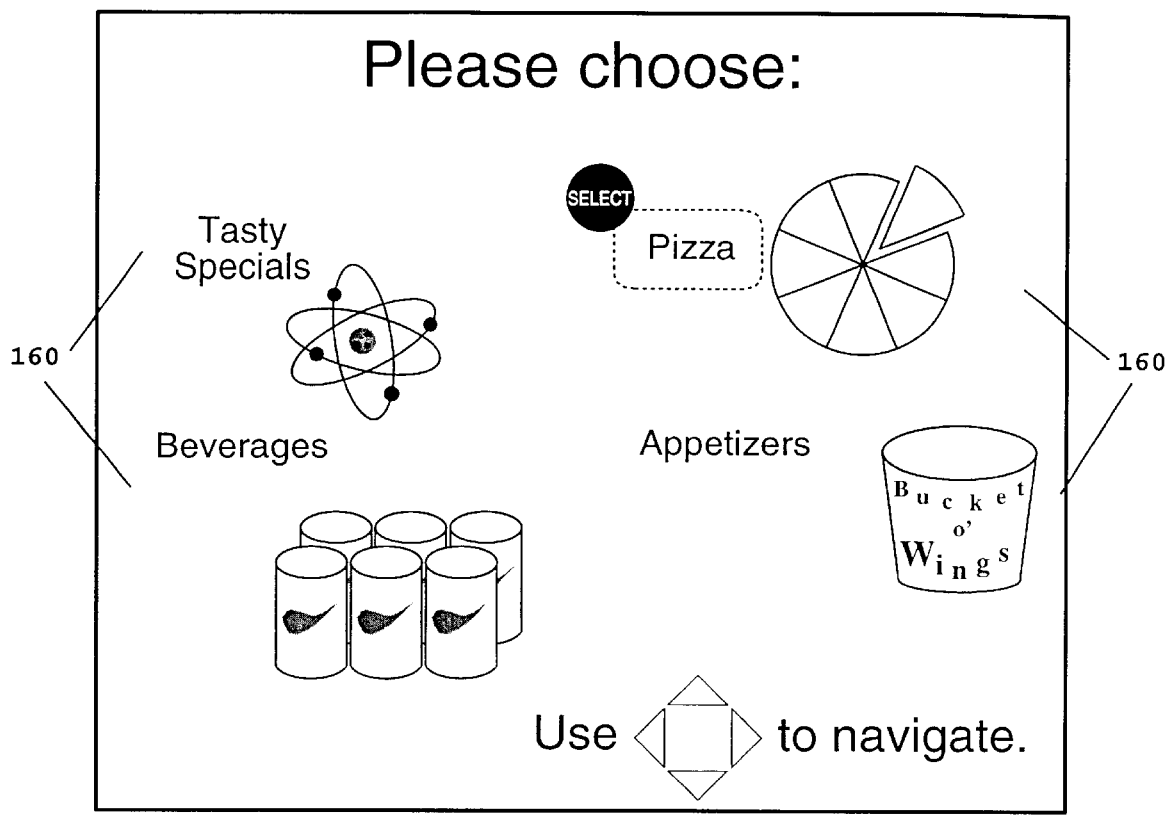
FIG. 67 illustrates the grid of cell originally presented in FIG. 66. Here, the viewer has moved the focus from the "Tasty Specials" cell to the "Pizza" cell.
Figure 68:
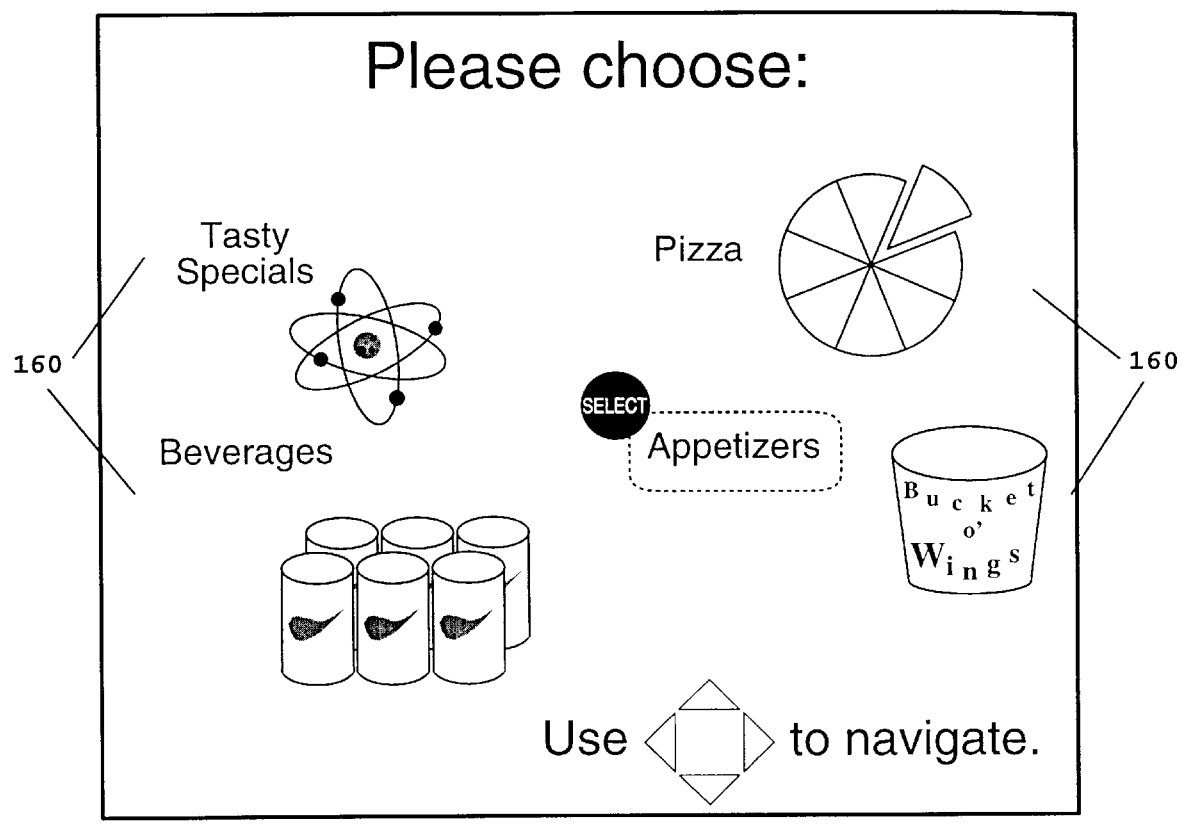
FIG. 68 illustrates the grid of cells originally presented in FIG. 66, here the viewer has moved the focus from the "Pizza" cell to the "Appetizers" cell.

An alternative way for arranging and displaying cells 160 on the screen 110 is shown in FIG. 66. In this figure, the cells are not displayed with distinct borders. The indicator for communicating that a cell has focus is a rectangle surrounding the text label with a selection button 132 in one corner that informs the viewer 12 that the cell may be chosen by pressing the selection key 68 on the input device 13. The screen also contains a navigational cue 190 in the lower right-hand corner that informs the viewer that the viewer may navigate around the cells by pressing the up key 60, down key 62, right key 64, and left key 66 on the input device. Displays after the viewer moves focus from the "Tasty Specials" cell to the "Pizza" cell and then the "Appetizers" cell are shown in FIGS. 67 and 68.

Figure 69:
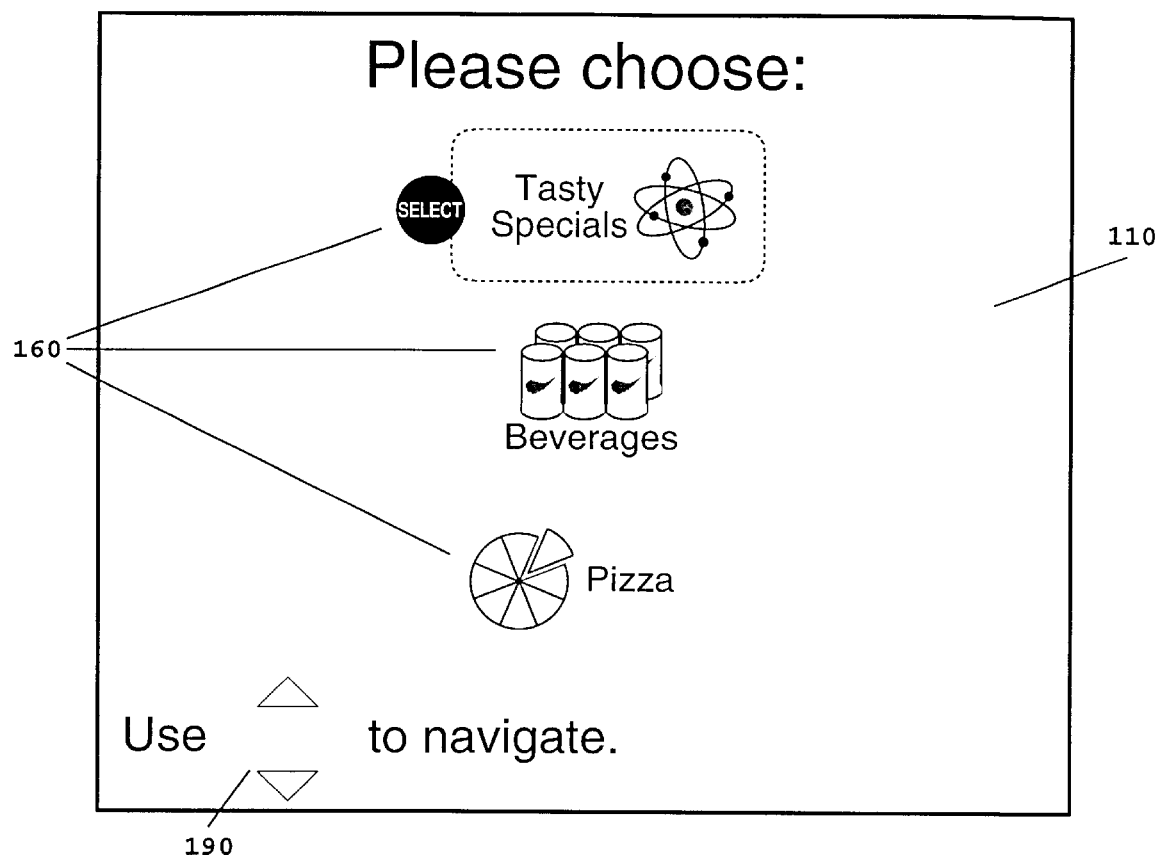
FIG. 69 illustrates another example of a grid of cells, in this case, the grid measures 1 column by 3 rows.
Figure 70:
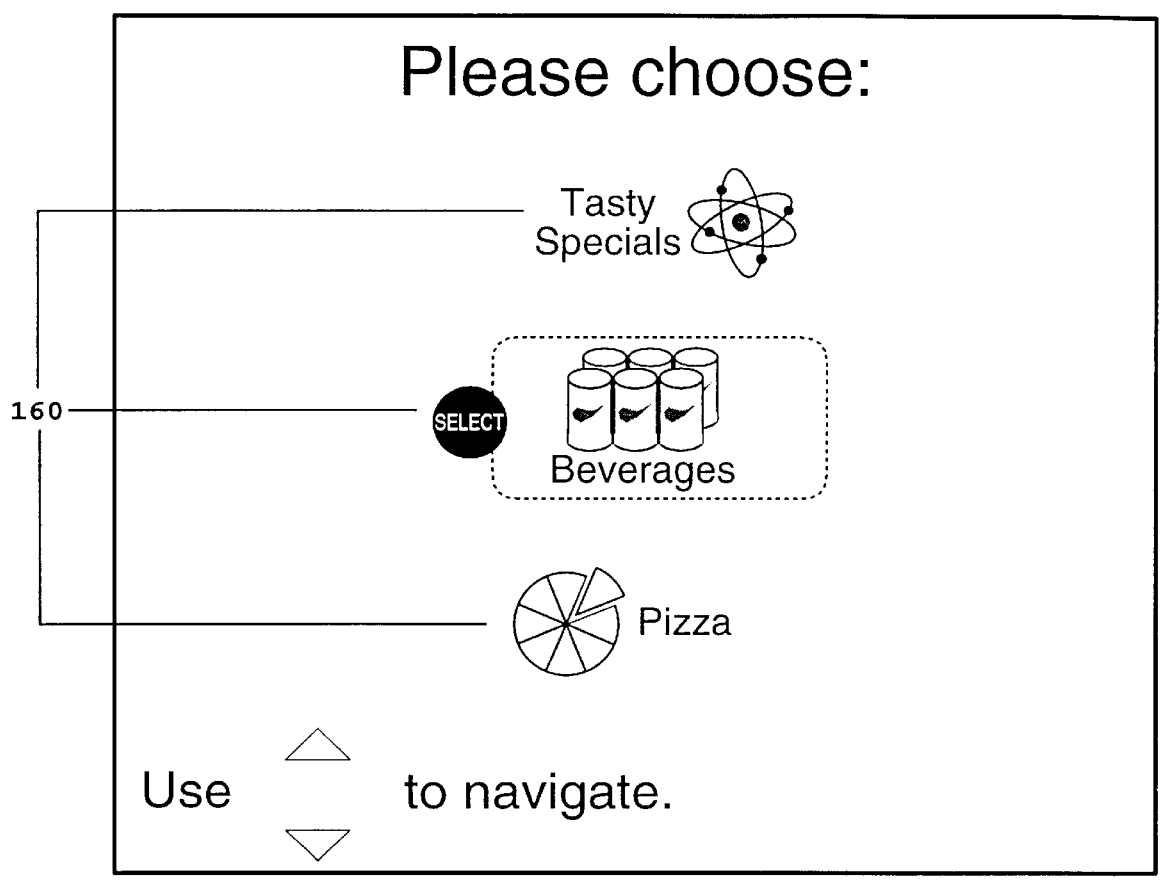
FIG. 70 illustrates the grid of cells originally presented in FIG. 69, here, the viewer has moved the focus from the "Tasty Specials" cell to the "Beverages" cell.

In another cell 160 arrangement shown in FIG. 69, the screen 110 contains a one-column by three-row grid of cells. In this configuration, the viewer 12 may navigate the cells only by pressing the up key 60 and down key 62 on the input device 13, as indicated in the navigation cue 190 at the bottom of the screen. The display in FIG. 70 results after the viewer presses the down key to move focus from the "Tasty Specials" cell to the "Beverages" cell.

Figure 71:
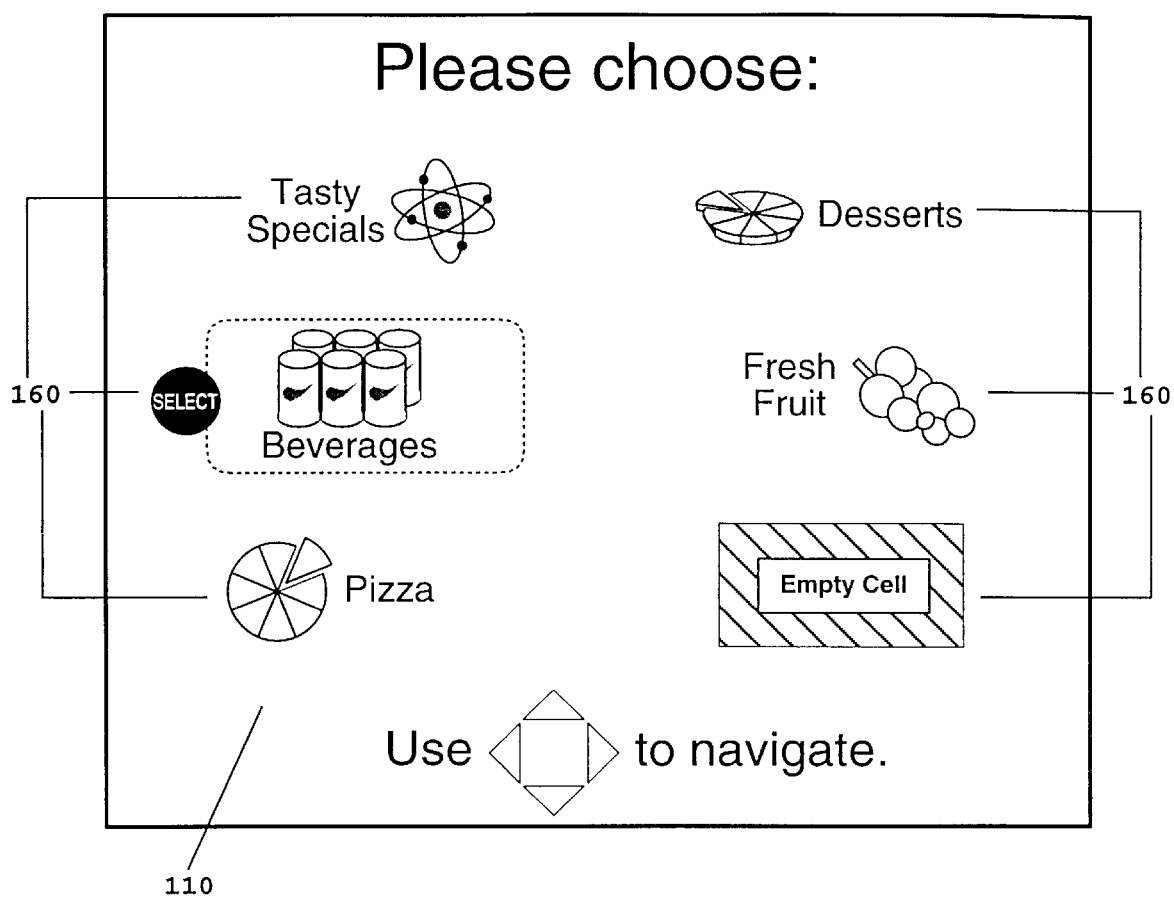
FIG. 71 illustrates another example of a grid of cells, in this case, the grid measures 2 columns by 3 rows, however, there are only 5 actual cells, this is the first example of a grid of cells which does not have a cell in every row/column pair, i.e. an empty cell.
Figure 72:
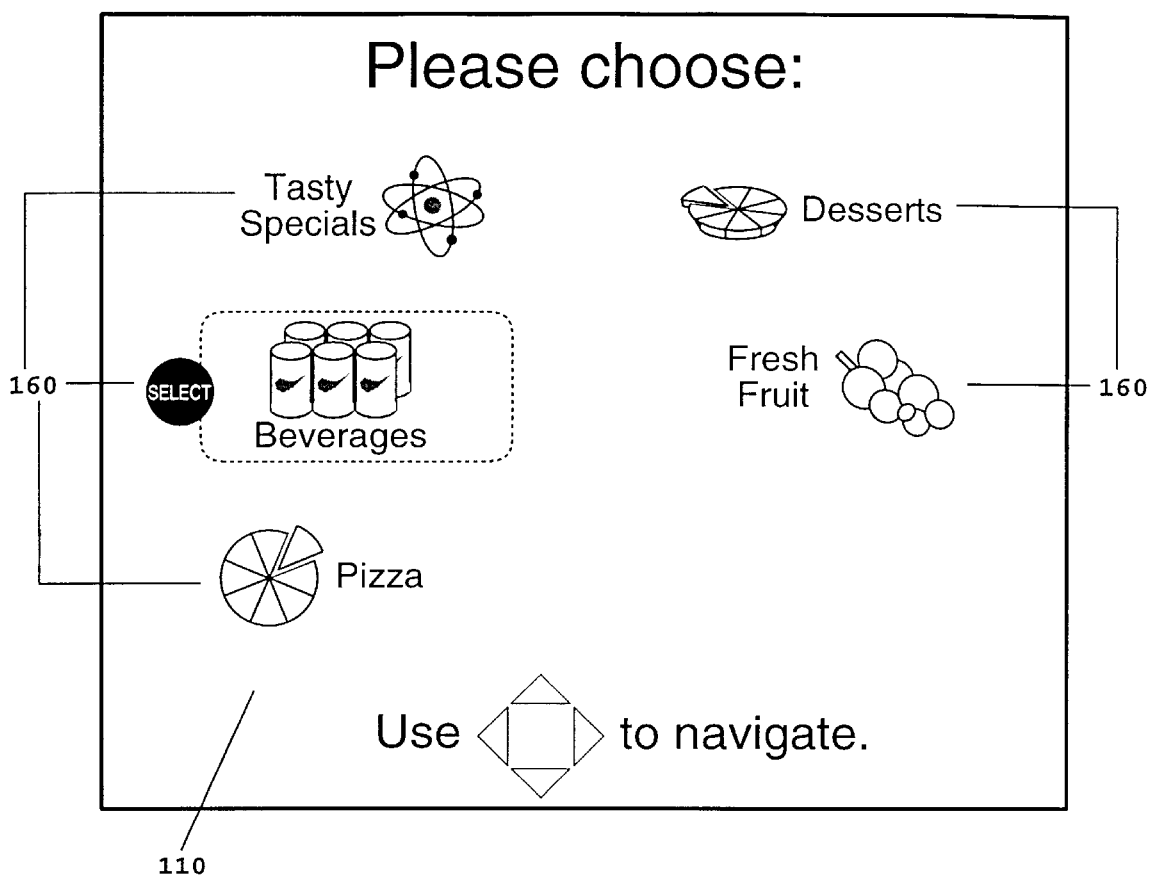
FIG. 72 illustrates the same grid presented in FIG. 71, here, the cell in the lower right is drawn empty, as it actually would be on a television display.

Another configuration, shown in FIG. 71, shows a screen 110 containing a two-column by three-row grid of cells 160. The cell located in row 3, column 2 is not defined and is shown in the figure with an "empty cell" identifier for illustration purposes only. The "empty cell" identifier would normally not be presented to the viewer 12, as shown in FIG. 72.

The Page

The page 170 is a type of node for presenting a full display of text and images. The screen 110 may contain multiple pages in the form of a list of pages with one page having focus and being displayed at any one time. The viewer 12 may navigate between the pages using keys configured on the input device 13 for moving forward (page-forward) and backward (page-back) by page. For example, the rewind key 84 and fast forward key 92 on the input device could also be configured to provide page-forward and page-back capabilities.

The page 170 inherits the basic properties of the general node, plus properties specific to pages. First, the page may be represented by an image, text, or both, and the image and text are specified independently of the drawables 134 associated with the page. Second, when the page has focus, the page's associated images, text, and drawables are displayed. Third, the page may contain a list of cells 160 that are displayed when the page has focus. Finally, the page has the capability to handle "page-forward," "page-back," "play-media," "push screen," and "pop-screen actions."

Figure 73:
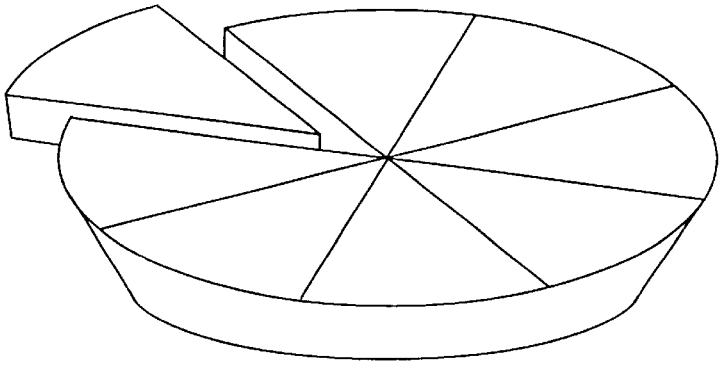
FIG. 73 illustrates another basic interface component, the page, here any amount of information may be displayed, arranged in any fashion.

Various arrangements and configurations of screens 110, pages 170, and cells 160 are demonstrated in FIGS. 73–82. One sample configuration, shown in FIG. 73, is the screen containing a list of pages. Four pages are associated with the current screen, and this information is conveyed to the viewer 12 by the "Page 1 of 4" text in the lower right hand corner of the display. Also, a page-forward image 172 in the lower right hand corner indicates the viewer may use the page-forward or fast forward key 92 on the input device 13 to move focus from the current page (page 1) to the next page (page 2).

Figure 74:
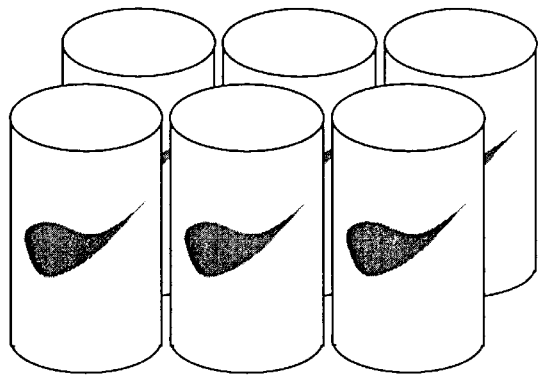
FIG. 74 illustrates another page in the list of pages originally presented in the screen from FIG. 73, here having previously been on page 1, the viewer has pressed the "page-forward" button and the second page, page 2, is now being displayed.
Figure 75:
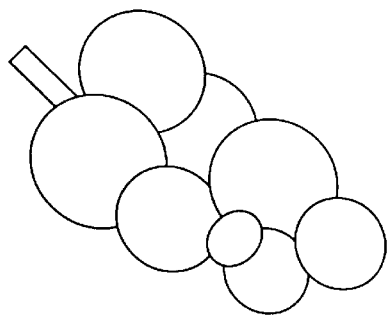
FIG. 75 illustrates the last page in the list of pages originally presented in FIG. 74.

If the viewer 12 presses the page-forward key on the input device 13, the second page 170 appears, as shown in FIG. 74. The viewer is informed that the current page is page 2, and the page-forward image 172 and a page-back image 174 in the lower right hand corner indicate the viewer may either page-forward to page 3 or page-back to page 1. After the viewer presses the page-forward key two more times to move focus to the last page (page 4) in the list of pages, the page-forward image disappears, leaving only the page-back image to indicate to the viewer that the viewer has reached the end of the list of pages (see FIG. 75).

Figure 76:
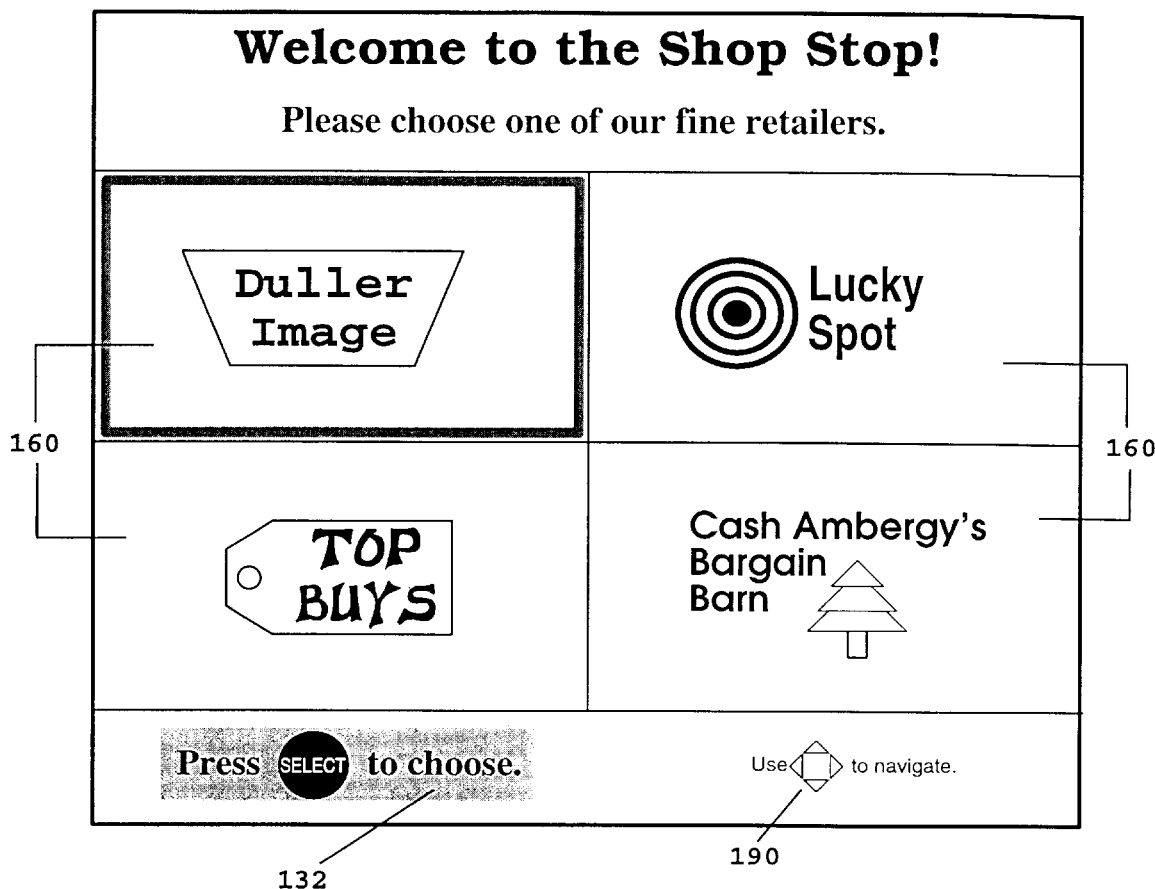
FIG. 76 illustrates another example of a grid of cells, the grid measures 2 columns by 2 rows, the viewer is prompted with instructions to Press <select> to choose and Use <arrows> to navigate.
Figure 77:
FIG. 77 illustrates the grid of cells originally presented in FIG. 76 with the focus having moved from "Duller Image" to "top-buys"

A sample configuration for ordering merchandise, through e-commerce is illustrated in FIGS. 76–82. A two-column by two-row grid of cells 160 for individual retailers is shown in FIG. 76. The navigation cue 190 reminds the viewer 12 how to move between the cells, and the selection button 132 indicates how to choose a particular retailer. For example, if the viewer presses the down key 62 on the input device 13, focus moves from the "Duller Image" cell to the "Top Buys" cell (see. FIG. 77).

Figure 78:
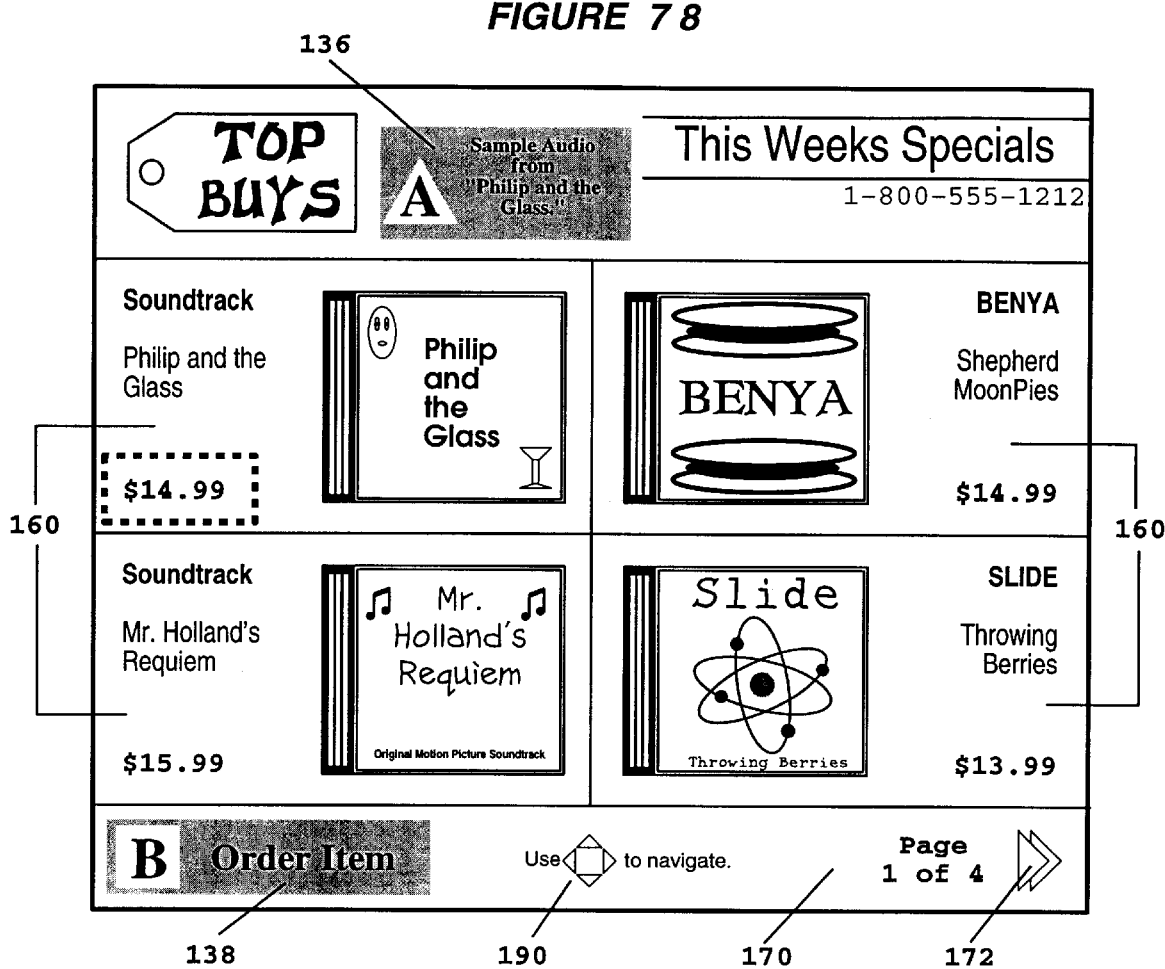
FIG. 78 illustrates a combination of the cells interface component and the page interface component, here the viewer has several options, the viewer may change the cell that has focus, "Order" the item depicted in the cell that has focus or change page, bringing up another grid of cells.

The screen 110 "pushed" after the viewer 12 selects the "Top Buys" cell 160 is shown in FIG. 78. The screen contains four pages 170. The first page, as shown in FIG. 78, contains a two-column by two-row grid of cells. The navigation cue 190 reminds the viewer how to move between the cells. The page-forward image 172 informs the viewer that the viewer may move to the next page, and the "B" image 138 informs the viewer that the viewer may order the item in the cell having focus, which, in this figure, is the "Philip and the Glass" cell. The "A" image 136 informs the viewer that the viewer may listen to sample audio from the compact disc shown in the cell having focus.

Figure 79:
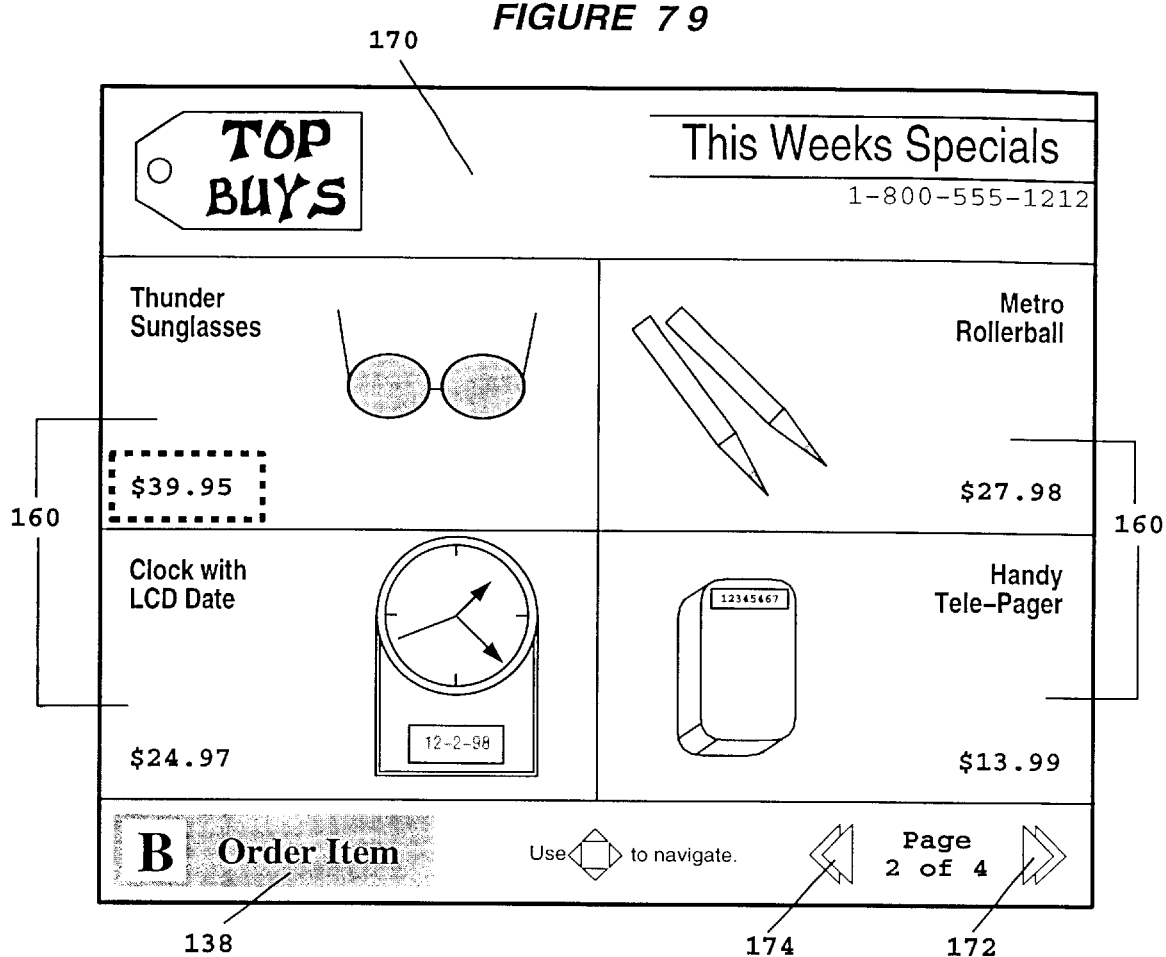
FIG. 79 illustrates page 2 in the sequence of pages initially presented in FIG. 78, here the viewer has pressed page forward while on page 1, bringing the viewer to page 2. Like the page in FIG. 78, this page also includes a grid. In this example, the grid is a 2 wide×2 tall grid.
Figure 80:
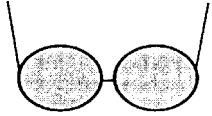
FIG. 80 illustrates the pages from FIG. 79, here the viewer has moved focus from the "Thunder Sunglasses" cell to "Clock with LCD Date" cell.

If the viewer 12 presses the page-forward key 92 on the input device 13, focus moves to page 2, as shown in FIG. 79. Page 2 also contains a two-column by two-row grid of cells 160. The page-back image 174, as well as the page-forward image 172, display to inform the viewer that the viewer may either move backward to page 1 or forward to page 3. If the viewer presses the down key 62 on the input device, focus moves from the "Thunder Sunglasses" cell to the "Clock with LCD Date" cell (see FIG. 80).

Figure 81:
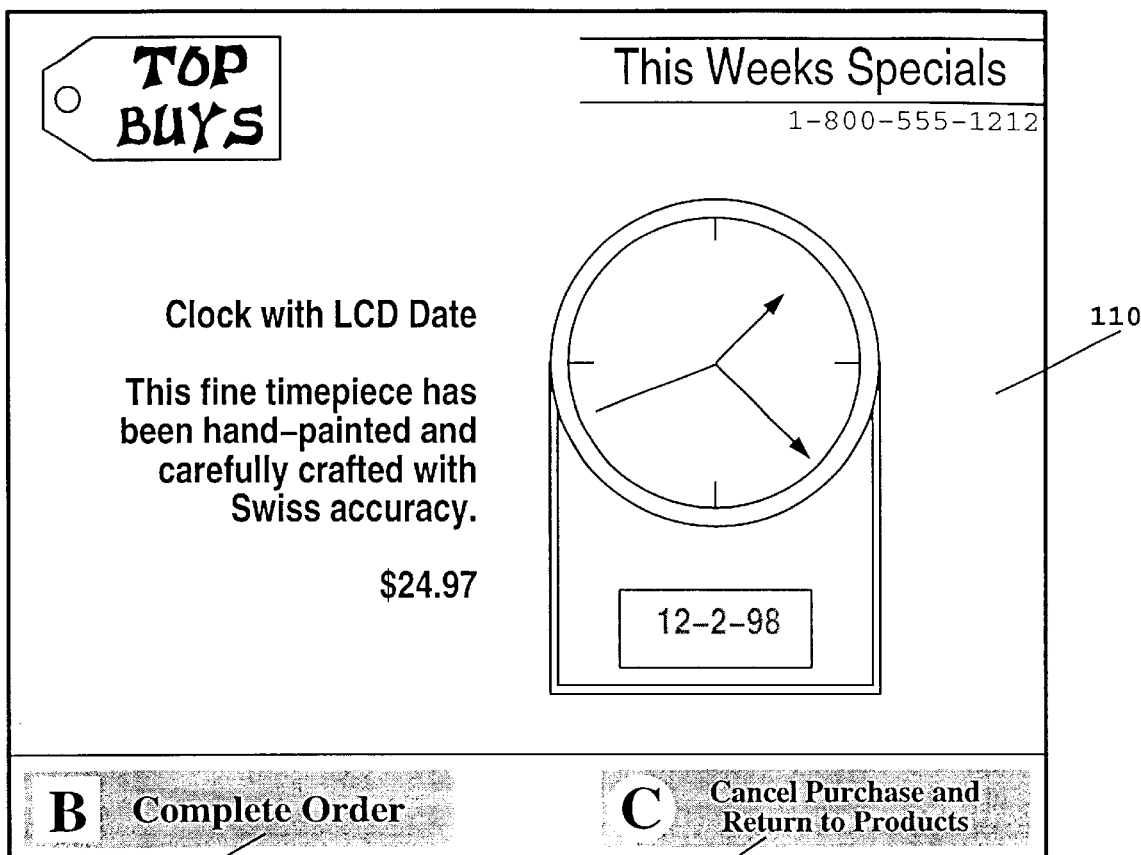
FIG. 81 illustrates a new screen displayed as a result of the viewer pressing "B" for "Buy" on the page illustrated in FIG. 80.
Figure 82:
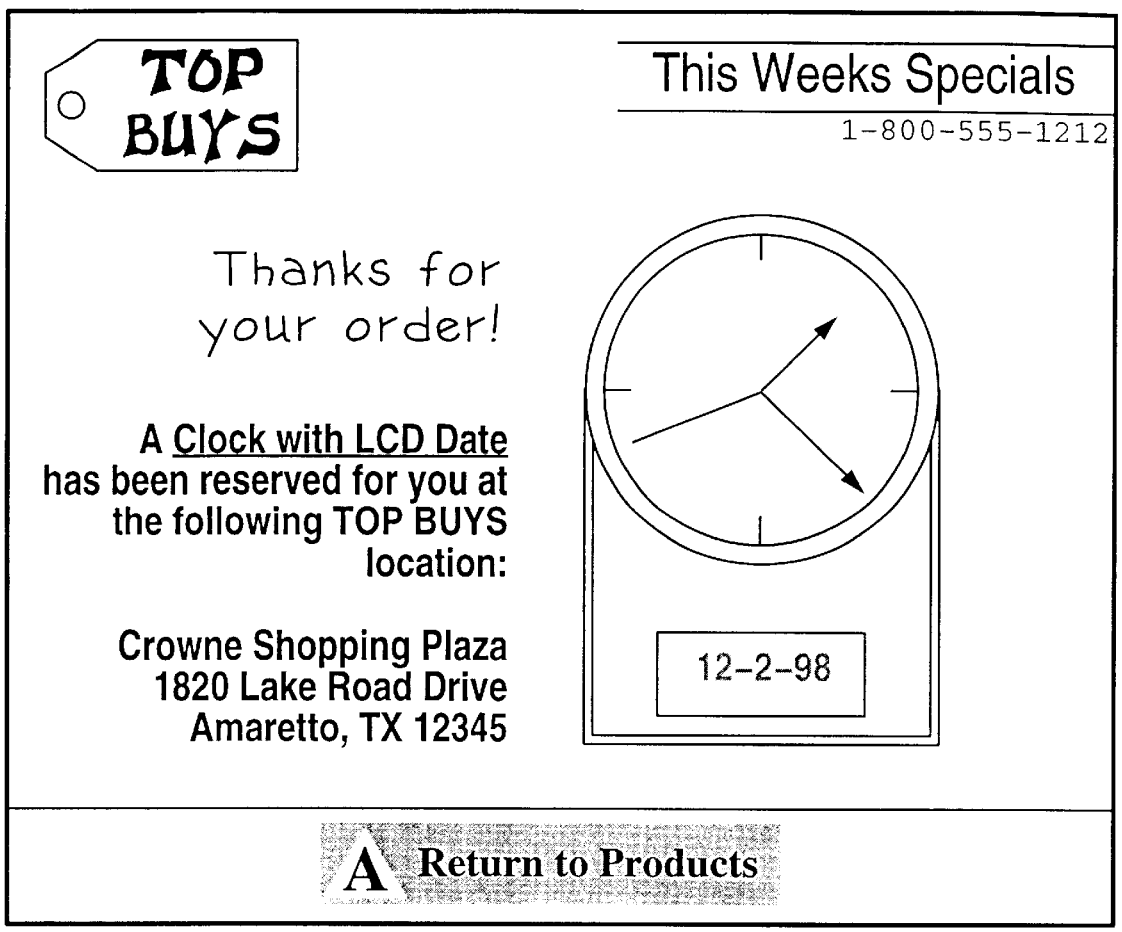
FIG. 82 illustrates a new screen displayed as a result of the viewer pressing "B" for "Complete Order" on the page illustrated in FIG. 81.

If the viewer 12 presses the "B" function key 74 to order the item in the cell 160 having focus, a larger image of the item the viewer wants to order is displayed, as shown in FIG. 81, along with a textual description, the "B" image 138 to indicate the viewer may complete the order, and the "C" image 140 to indicate the viewer ma y cancel the purchase. The screen 110 contains drawables 134 and the background image, but this particular screen does not contain any nodes. If the viewer decides to complete the order by pressing the "B" function key 74 on the input device 13, then the viewer may see a confirmation screen, such as the one shown in FIG. 82.

The Instant Pruning Search Interface

The instant pruning search interface searches for data meeting multiple search key criteria. The pruning search interface uses the screen 110, category item icon nodes 120, and menu item icon nodes 122 to provide the viewer 12 with search keys and specific search values for each search key. Each search key is associated with a specific category item node. The specific search values for each search key are contained in the list of menu item nodes associated with the category item nodes.

When a particular search key is given a specific value to search for, the range of specific values for all other search keys is pruned so that the viewer 12 does not choose a particular combination of values for the search keys that produces an empty list of matches. Based on the search value set for the first search key, the list of possible values for the second search key may be pruned to yield matches. For example, the viewer might want to find a restaurant in a particular area. The viewer may have two search keys available, such as atmosphere and cuisine. If the viewer sets a search value of "casual" for the atmosphere search key, then a search value such as "steak" may not appear as a choice for the cuisine search key if no restaurants are available in the area having a casual atmosphere and also serving steak. The default value for the search keys is "Any" or "All." If the viewer does not change the default value for a particular search key, then that search key will not limit the list of matches. In addition, the screen 110 configured as a search interface typically contains dynamic text within a current search criteria text box 180 (e.g., see FIG. 83) showing the viewer the current values set for each search key.

Figure 83:
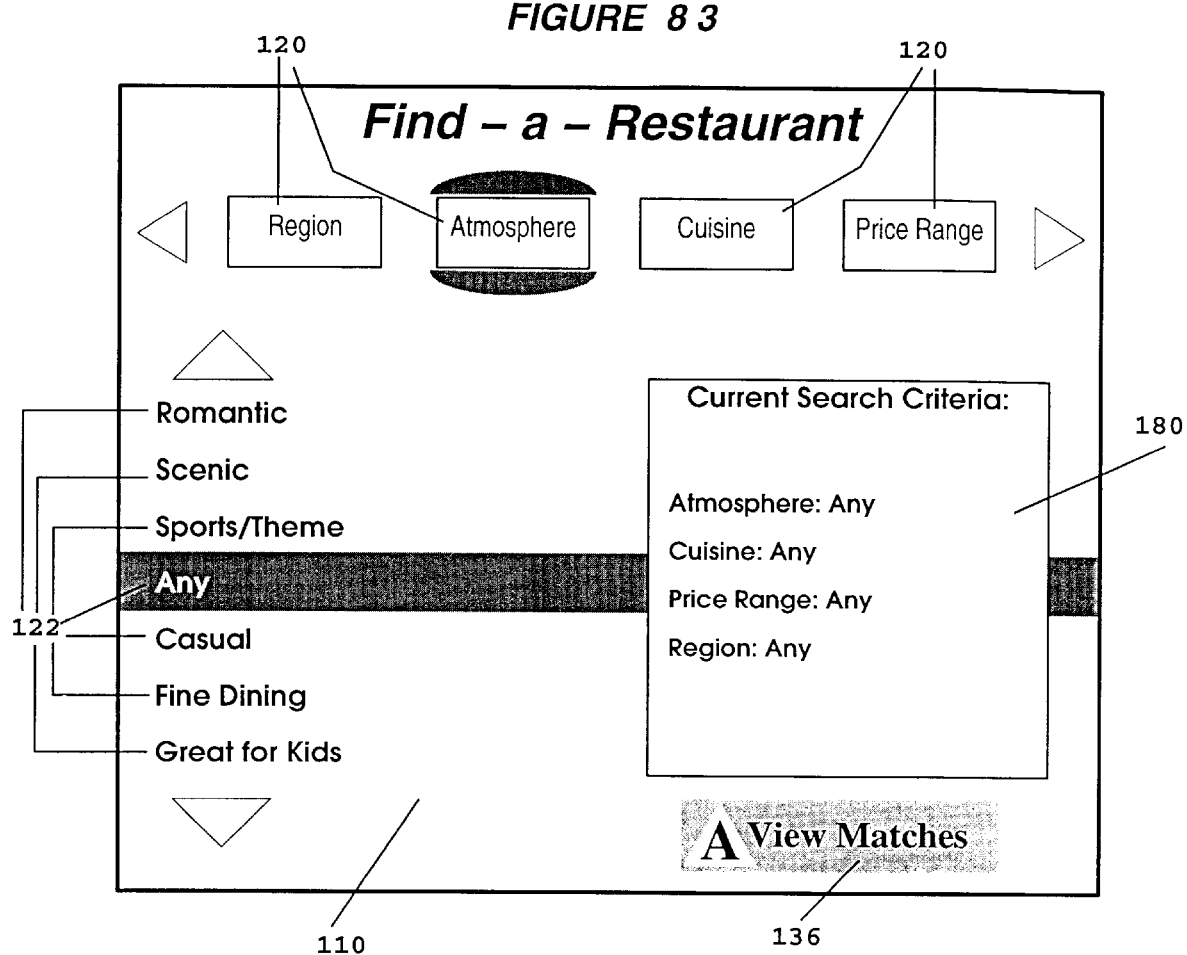
FIG. 83 illustrates a screen configured to operate as an instant pruning search interface.
Figure 85:
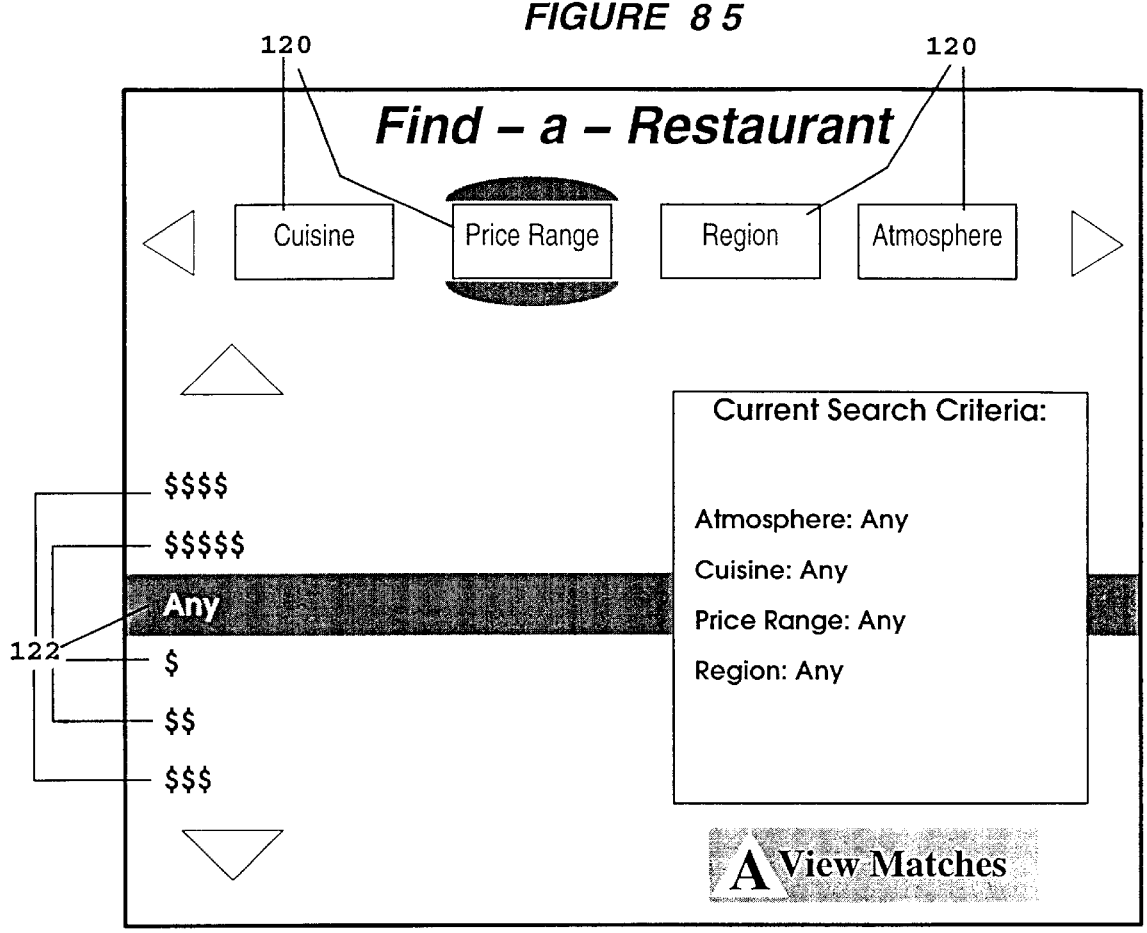
FIG. 85 illustrates the instant pruning search interface from FIG. 84 after the viewer has scrolled to "Price Range"
Figure 86:
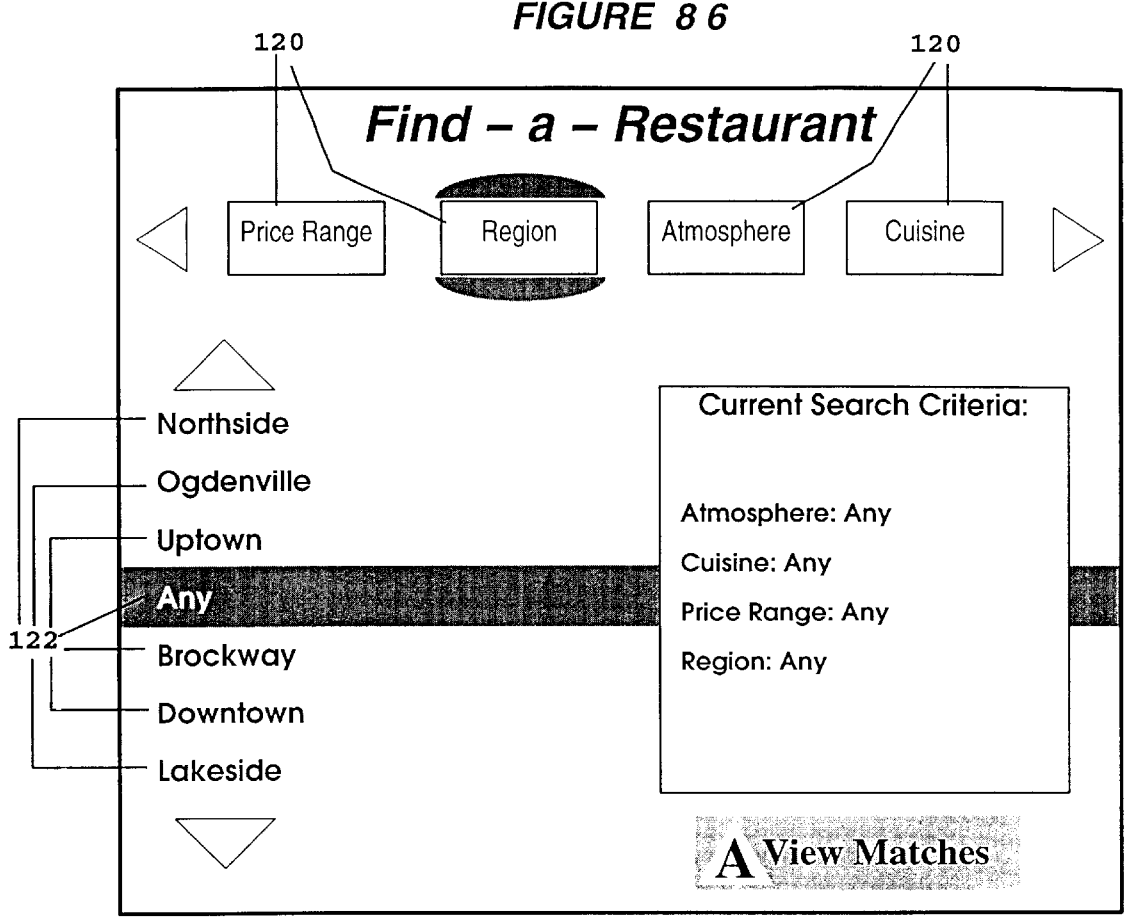
FIG. 86 illustrates the instant pruning search interface from FIG. 85 after the viewer has scrolled to "Region"

In one embodiment of the present invention, the pruning search interface is demonstrated in the context of selecting a restaurant, as shown in FIGS. 83–109. The screen 110, configured as a pruning search interface, may contain, for example, four search keys, which are the same as the category item nodes 120, as shown in FIG. 83. The "Atmosphere" search key has focus, and its associated search values are the menu item icon nodes 122. All search keys initially have the default search value of "Any." The "A" image 136 indicates that the viewer 12 may see the list of all matches based on the current search criteria by pressing the "A" function key 72 on the input device 13. The viewer may scroll the search keys in the same way the category item nodes may be scrolled (see FIGS. 84–86).

Figure 87:
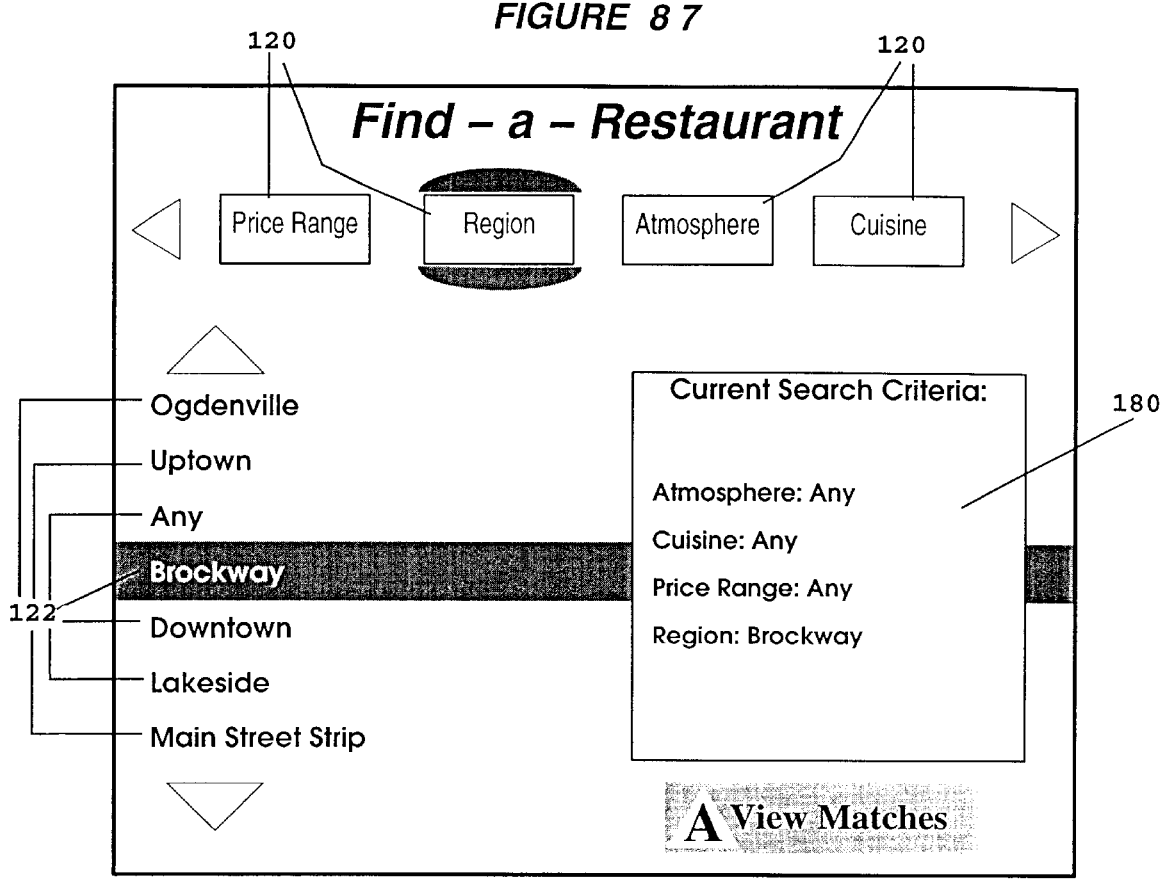
FIG. 87 illustrates the instant pruning search interface from FIG. 86 after the viewer has scrolled to the menu item "Brockway", as soon as the viewer scrolls to "Brockway", the Current Search Criteria text area is updated to indicate the viewer wants to cull the list of results to include only those restaurants located in "Brockway"
Figure 88:
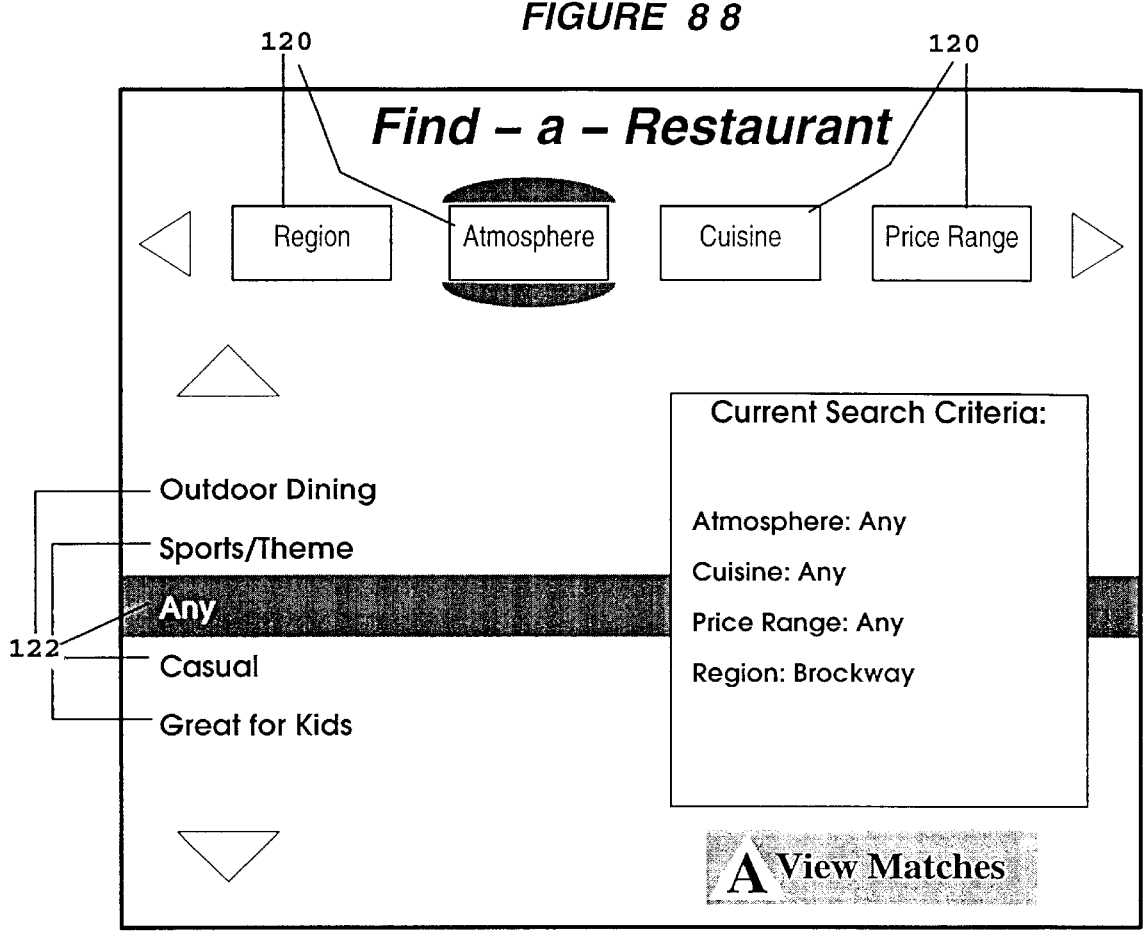
FIG. 88 illustrates the instant pruning search interface from FIG. 87 after the viewer has scrolled back to "Atmosphere"

If the viewer 12 scrolls to the "Region" search key 120 and selects the "Brockway" search value 122, the current search criteria text box 180 is modified to show selection of the new search value (see FIG. 87). If the viewer then scrolls from the "Region" search key to the "Atmosphere "search key, the list of search values is reduced or pruned from the original list shown in FIG. 83 to display only types of atmospheres available for the region of "Brockway" (see FIG. 88).

Figure 84:
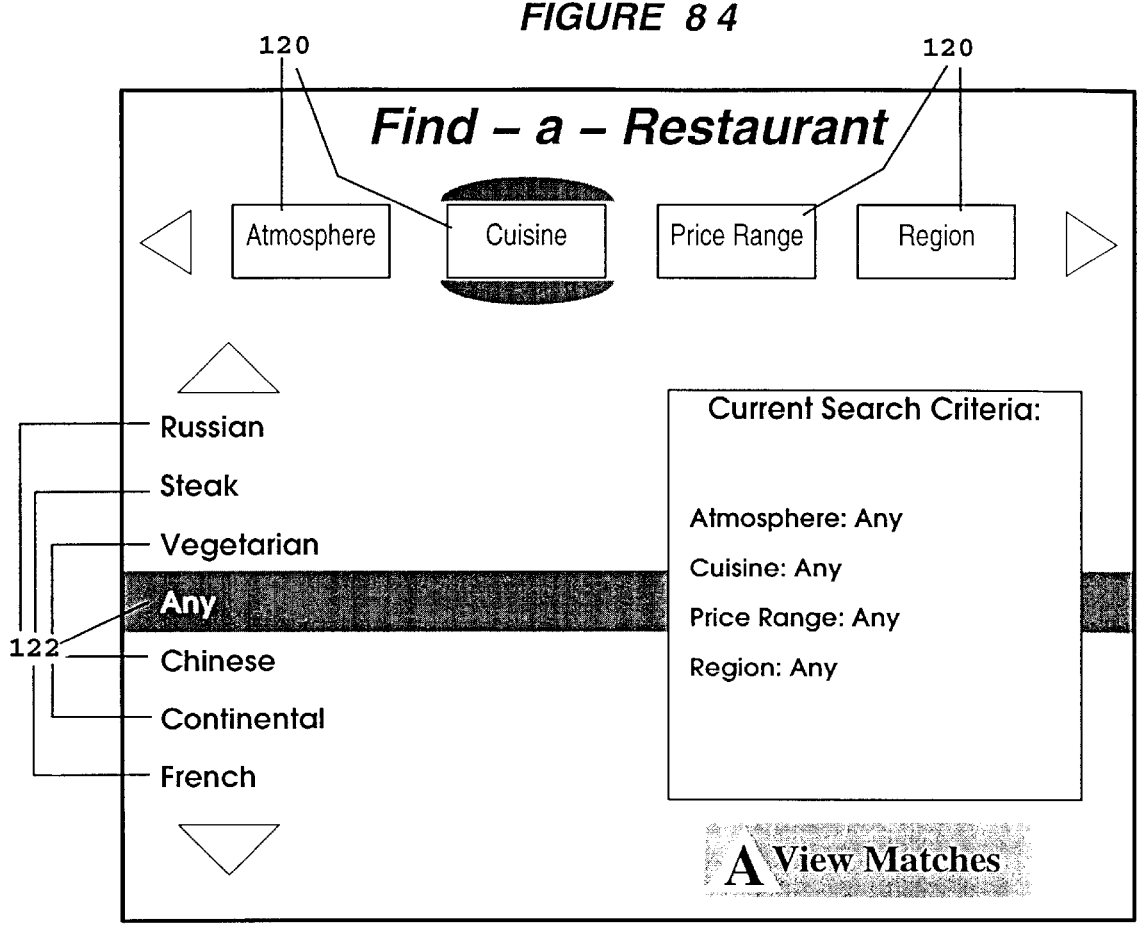
FIG. 84 illustrates the instant pruning search interface originally presented in FIG. 83 after the viewer has scrolled to "Cuisine"
Figure 89:
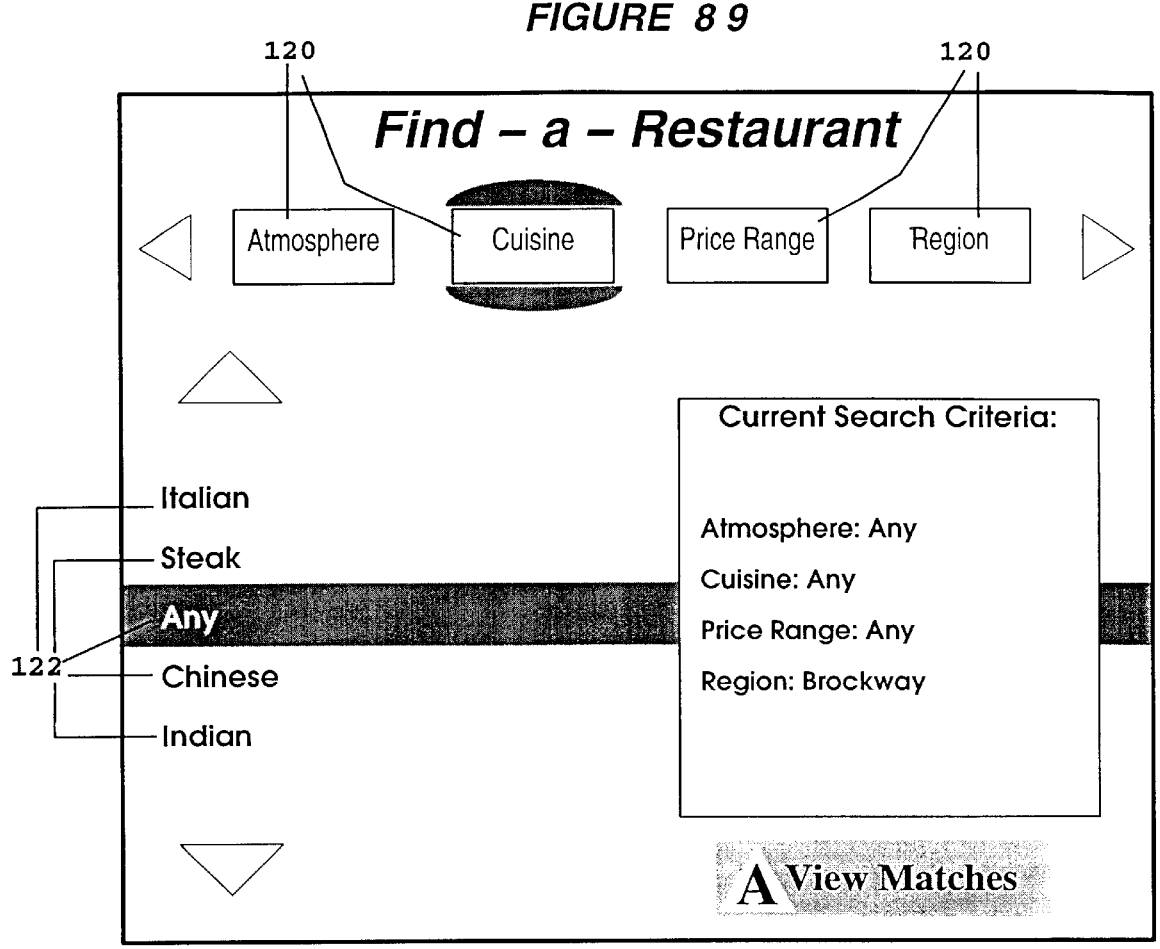
FIG. 89 illustrates the instant pruning search interface from FIG. 88 after the viewer has scrolled back to "Cuisine"
Figure 90:
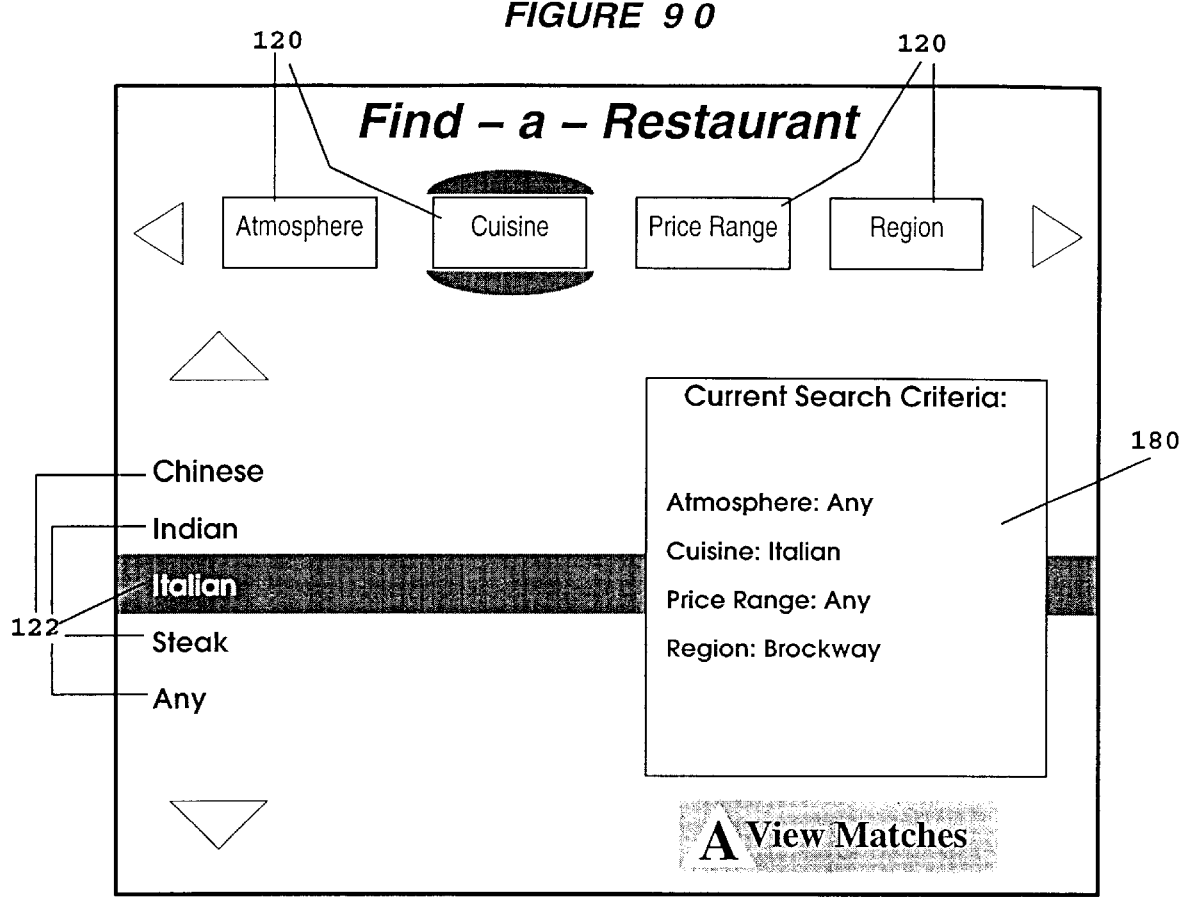
FIG. 90 illustrates the instant pruning search interface from FIG. 89 after the viewer has scrolled to the "Italian" menu item, now the viewer has two search key values in the search for a restaurant: "Region: Brockway" and "Cuisine: Italian"

After the viewer 12 further scrolls from the "Atmosphere" search key 120 to the "Cuisine" search key, the list of search values 122 is pruned from the original list shown in FIG. 84 to display only types of cuisine available for the region of "Brockway" (see FIG. 89). If the viewer scrolls from the "Any" search value to the "Italian" search value and selects the "Italian" search value, the current search criteria text box 180 is updated to reflect setting the new search value (see FIG. 90).

Figure 91:
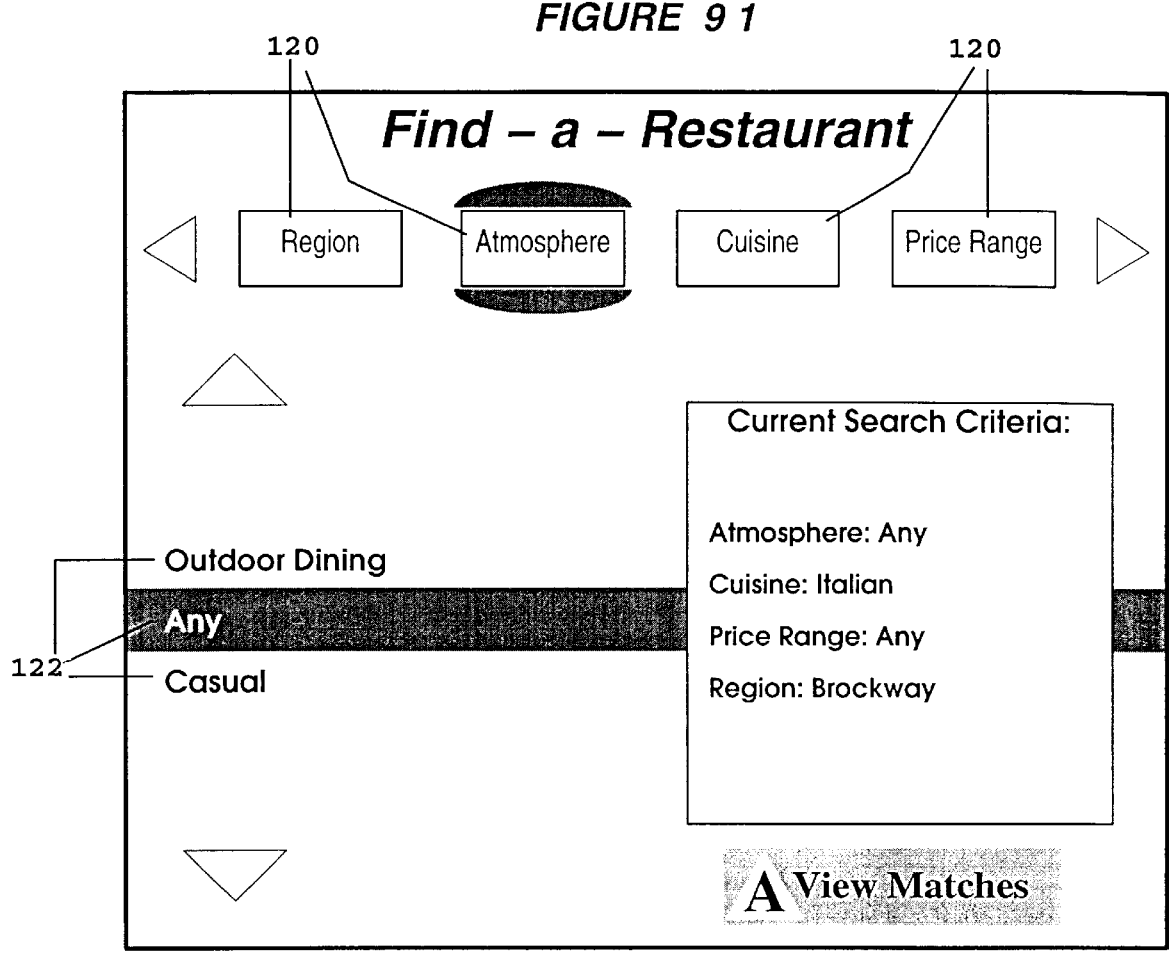
FIG. 91 illustrates the instant pruning search interface from FIG. 90 after the viewer has scrolled back to the "Atmosphere" category item, once again, the list of search key values has been reduced even more.
Figure 92:
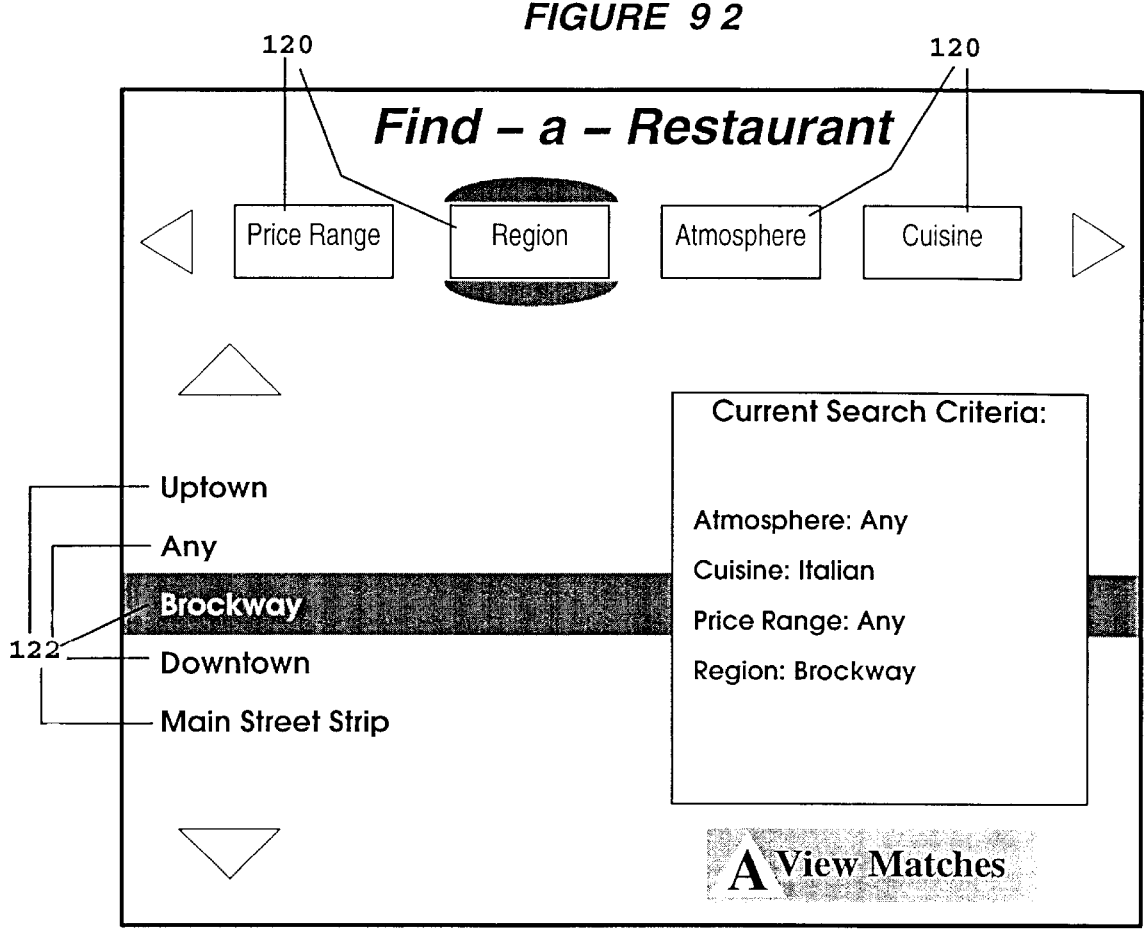
FIG. 92 illustrates the instant pruning search interface from FIG. 91 after the viewer has scrolled to the "Region" category.

The viewer 12 may then scroll from the "Cuisine" search key 120 to the "Atmosphere" search key, resulting in the list of search values 122 being further pruned to reflect types of atmospheres available for Italian restaurants in the region of "Brockway" (see FIG. 91). Scrolling from the "Atmosphere" search key to the "Region" search key, results in the search values being pruned to display only regions having Italian restaurants (see FIG. 92).

Figure 93:
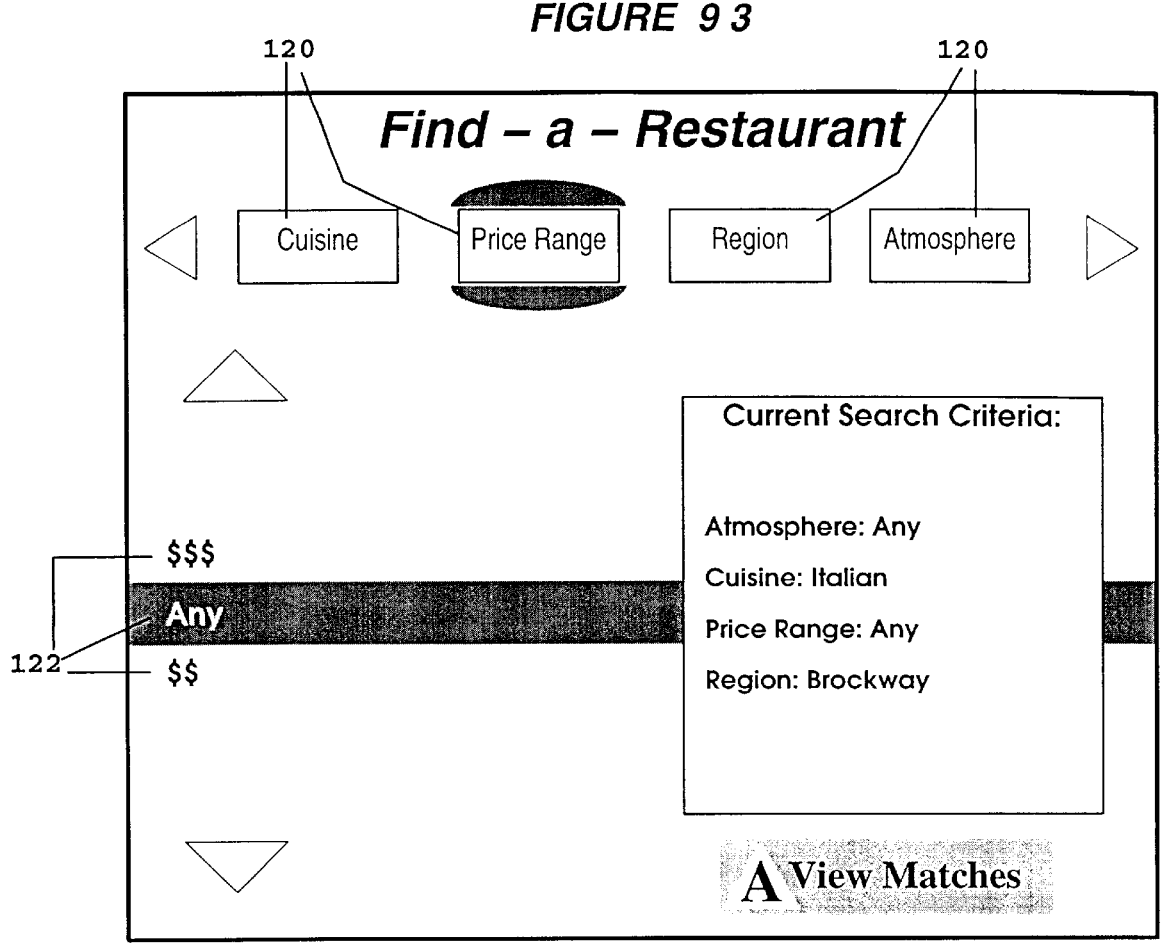
FIG. 93 illustrates the instant pruning search interface from FIG. 92 after the viewer has scrolled to the "Price Range" category, note the list only contains two options.
Figure 94:
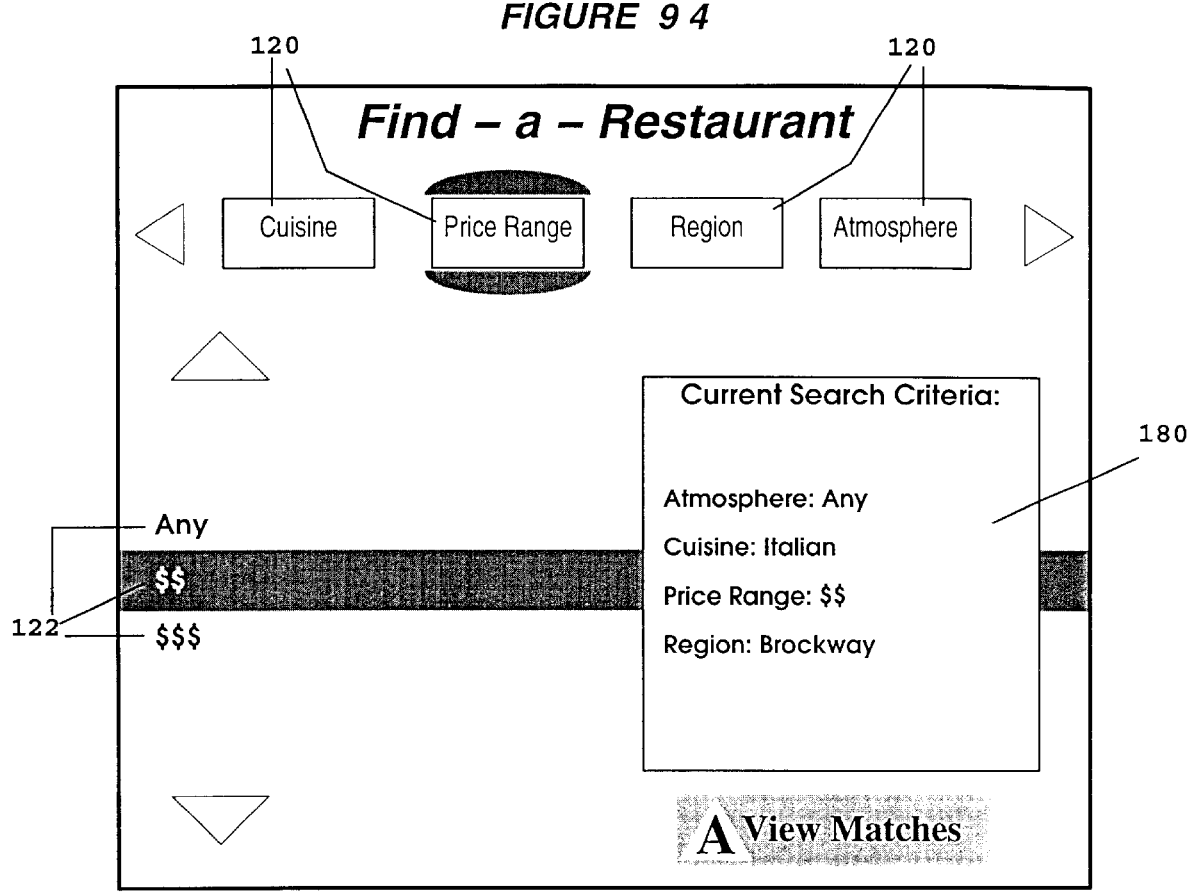
FIG. 94 illustrates the instant pruning search interface from FIG. 93 after the viewer has scrolled through the options to "$$", the "Current Search Criteria" text area is immediately updated to indicate the viewer wishes to further limit the list of matching restaurants to the "Italian" restaurants in "Brockway" with a price range of "$$"

If the viewer 12 scrolls from the "Region" search key 120 to the "Price Range" search key, the list of search values 122 is pruned to display only price ranges for Italian restaurants in the region of "Brockway" (see FIG. 93). If the viewer selects the "$$" search value for the "Price Range" search key, this selection is indicated in the current search criteria text box 180 (see FIG. 94)

Figure 95:
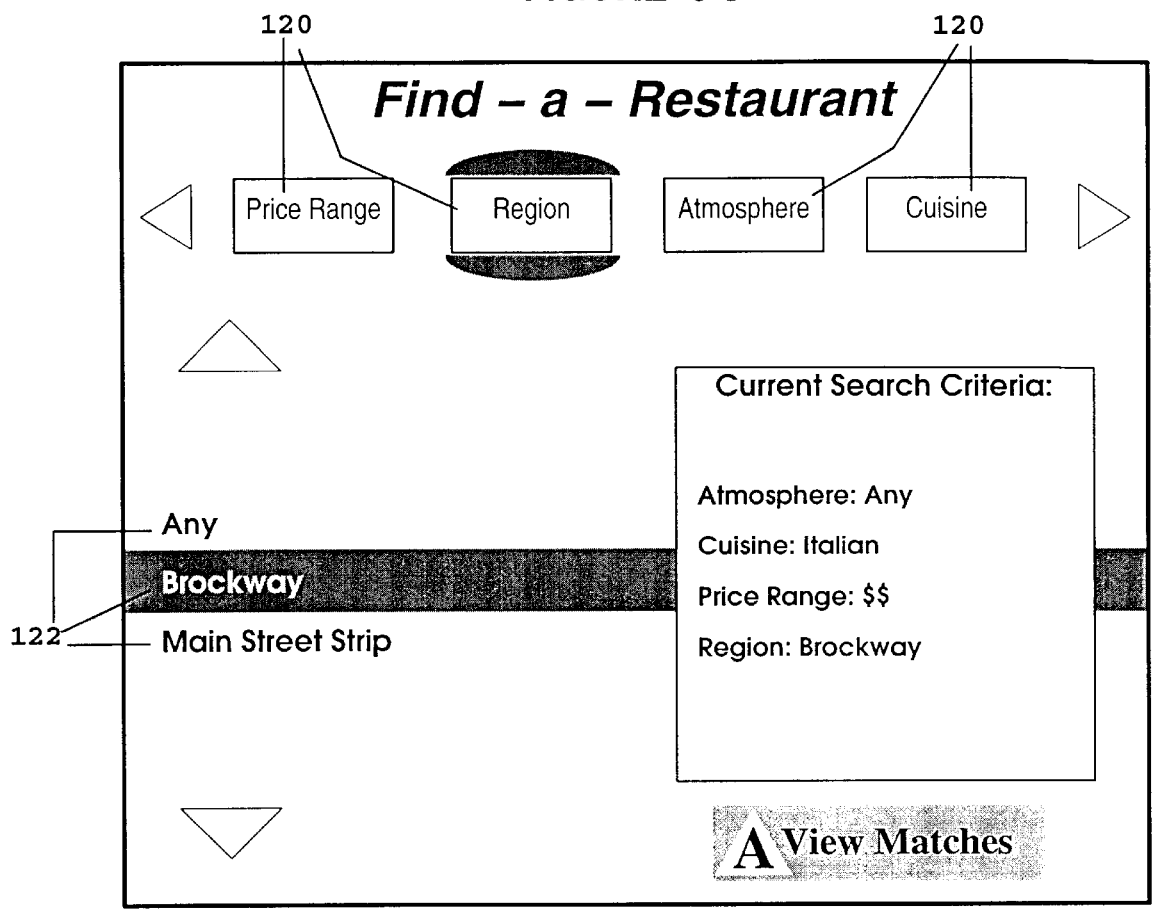
FIG. 95 illustrates the instant pruning search interface from FIG. 94 after the viewer has scrolled back to the "Region" category, now, only the "Regions" with "Italian" restaurants with a price range of "$$" are displayed as options.
Figure 96:
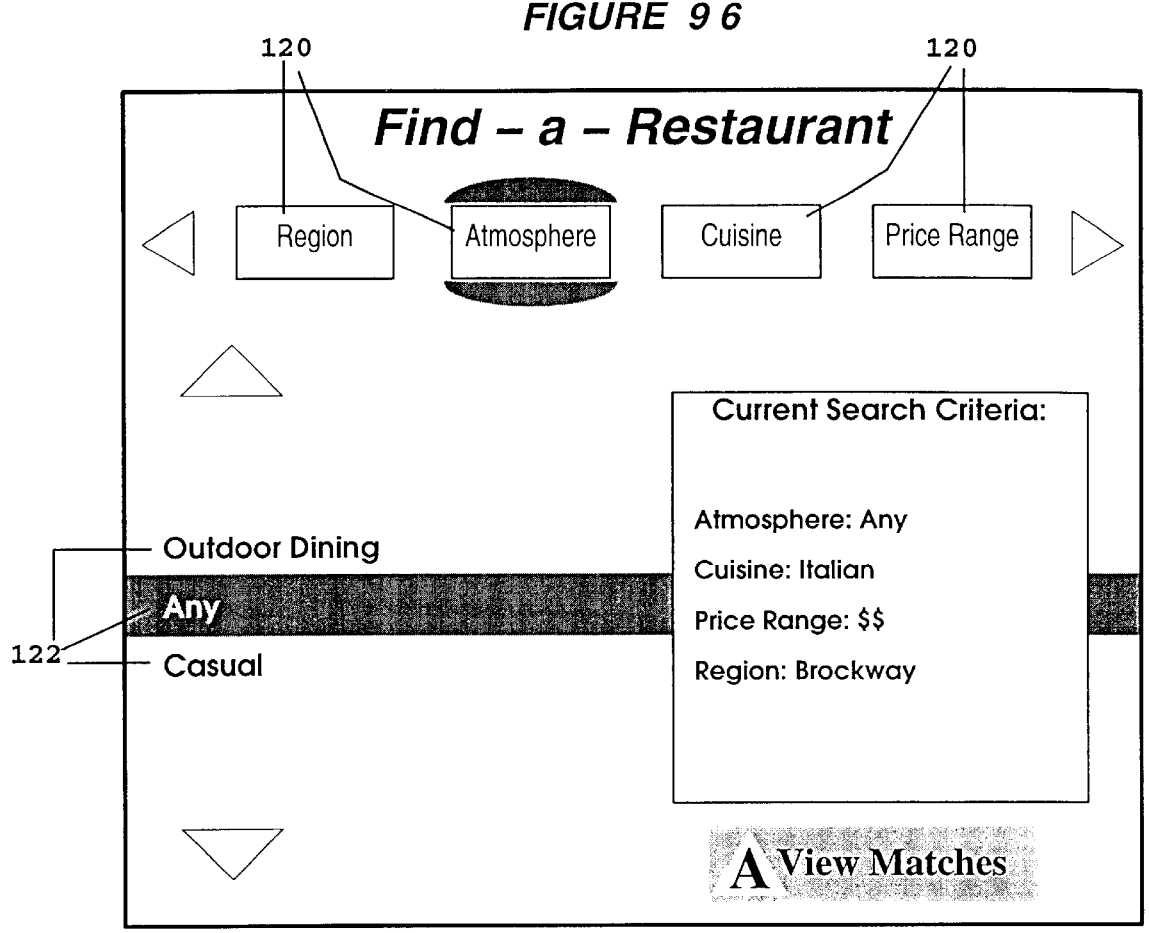
FIG. 96 illustrates the instant pruning search interface from FIG. 95 after the viewer has scrolled to the "Atmosphere" category item, this list is short, including only those atmospheres of restaurants in the "Brockway" area serving "Italian" cuisine having a price range of "$$"
Figure 97:
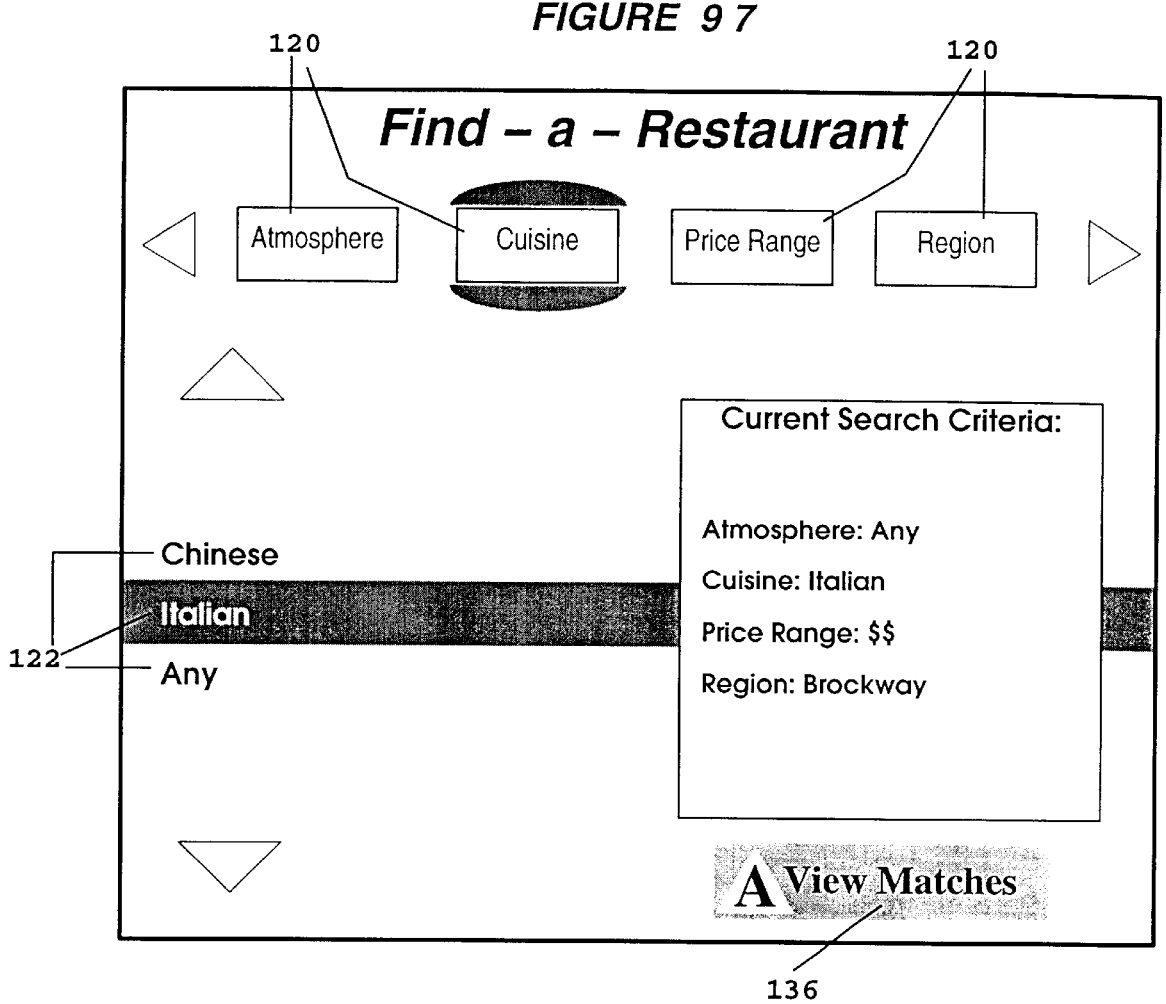
FIG. 97 illustrates the instant pruning search interface from FIG. 96 after the viewer has scrolled to the "Cuisine" category item, here the list only includes cuisine of restaurants in the "Brockway" area with a price range of "$$"

After the viewer 12 scrolls from the "Price Range" search key 120 to the "Region" search key, the list of search values 122 for the "Region" search key is further pruned to contain only regions having Italian restaurants with a price range of "$$" (see FIG. 95). Similarly, scrolling from the "Region" search key to the "Atmosphere" search key results in the list of search values for the "Atmosphere" search key including only those types of atmospheres for Italian restaurants with a price range of "$$" in the region of "Brockway" (see FIG. 96). After the viewer scrolls from the "Atmosphere" search key to the "Cuisine" search key, the list of search values for the "Cuisine" search key is pruned to include only types of cuisine for restaurants in the region of "Brockway" having a price range of "$$" (see FIG. 97).

Figure 98:
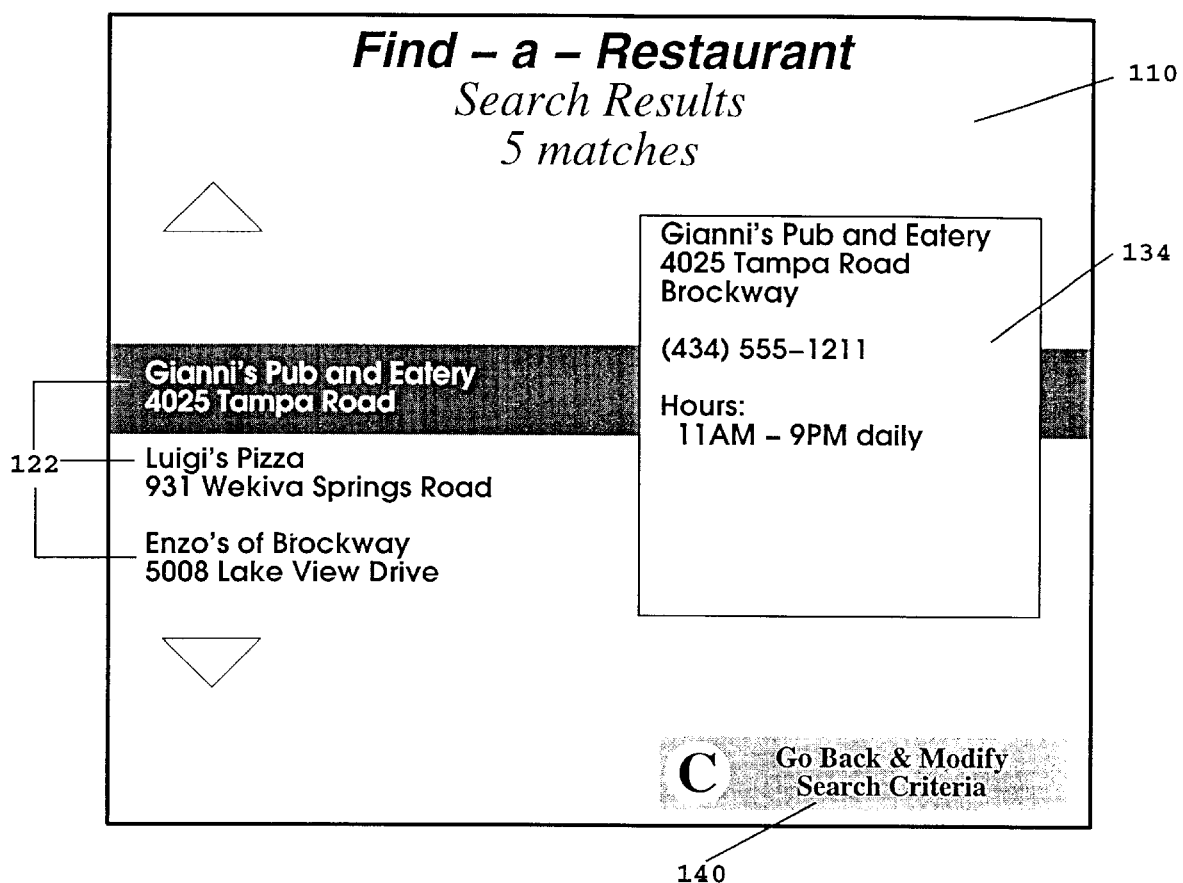
FIG. 98 illustrates a new screen activated as a result of the viewer pressing the "A" button on the screen illustrated in FIG. 97, the FIG. 98 screen contains the list of matches resulting from the search requested in the instant pruning search interface illustrated in FIG. 97.

The "A" image 136 indicates that the viewer 12 may view the results of a search using the search values specified in the current search criteria text box 180 by pressing the "A" function key 72 on the input device 13. If the viewer does view the search results, the screen 110 displayed contains a list of menu item icon nodes 122 for matching restaurants, as shown in FIG. 98. The menu item node labeled "Gianni's Pub and Eatery" has focus, and it also has a drawable 134 containing additional information about the restaurant. The "C" image 140 indicates that the viewer may return to the pruning search interface screen to modify search criteria selected by pressing the "C" function key 76 on the input device.

Figure 99:
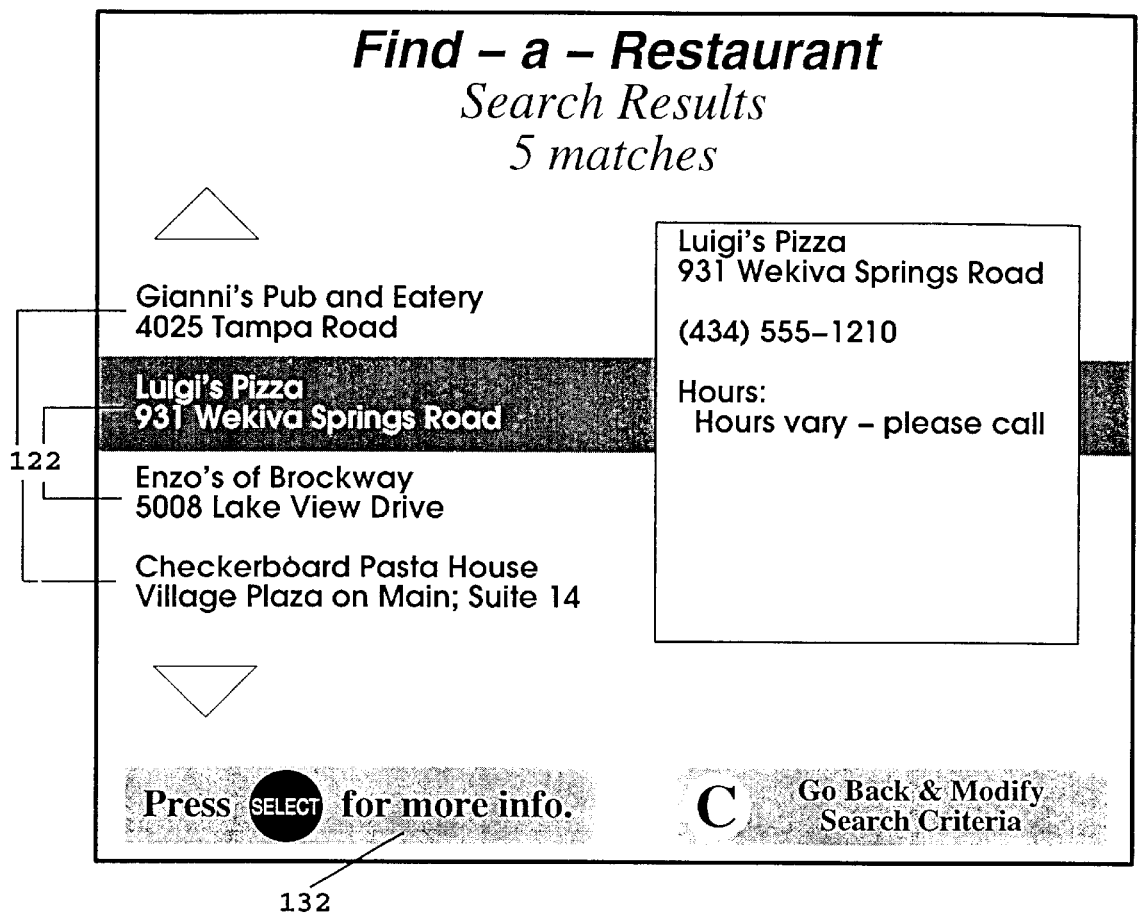
FIG. 99 illustrates the screen originally presented in FIG. 98 after the viewer has scrolled down once, here the viewer is prompted to press "select" for this particular restaurant to see more information.
Figure 100:
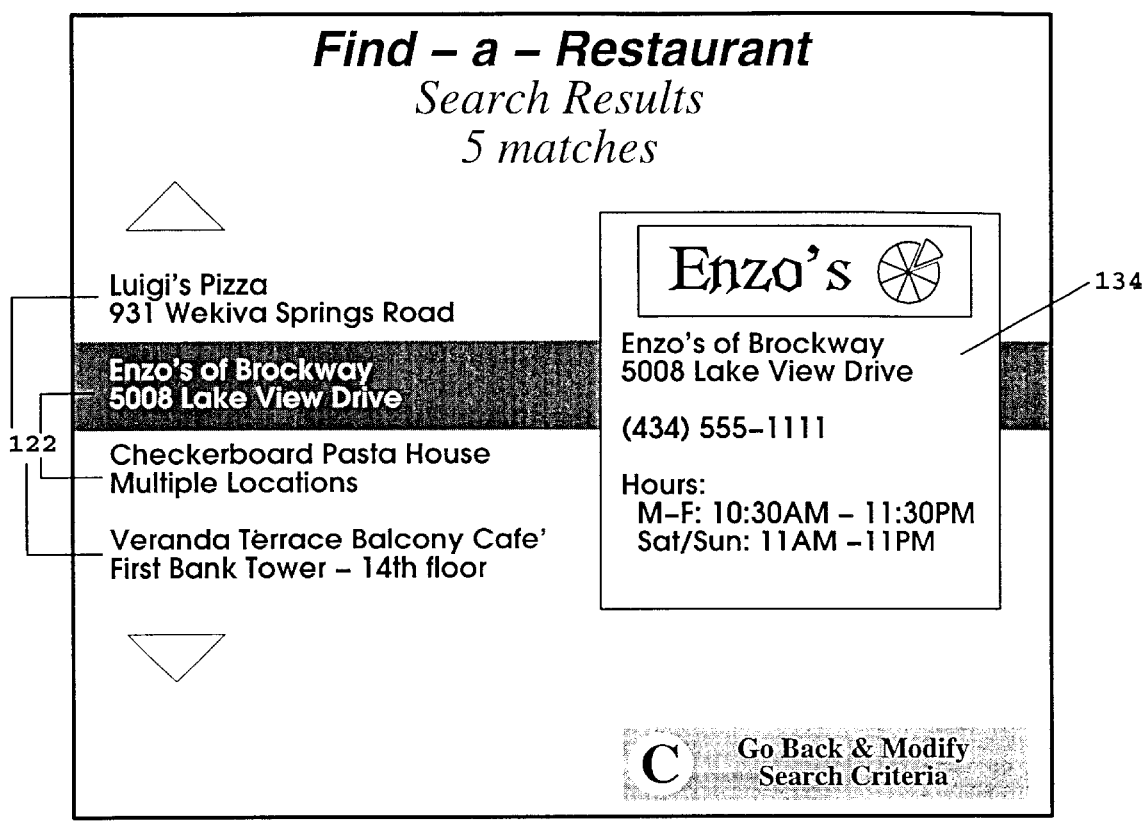
FIG. 100 illustrates the screen from FIG. 99 after the viewer has scrolled down once, here the text area on the right includes an image/logo associated with the currently "focused" restaurant.
Figure 101:
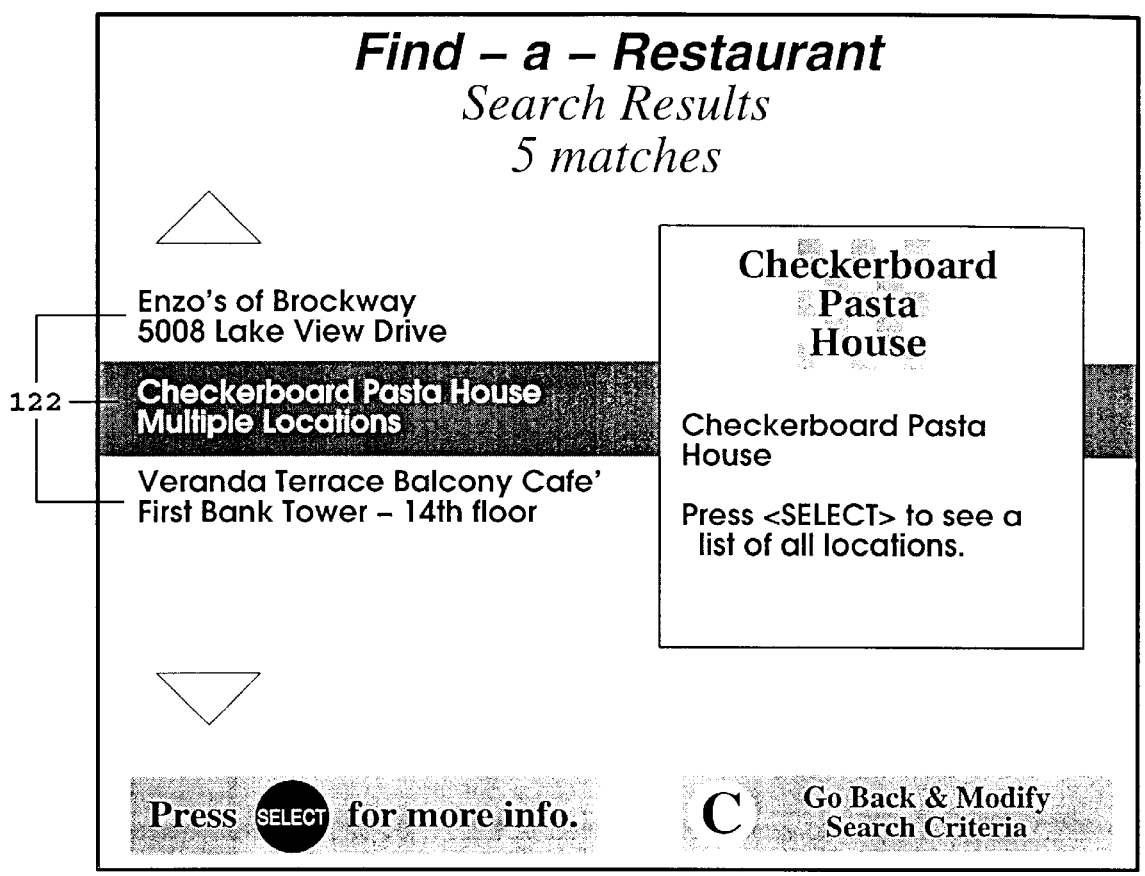
FIG. 101 illustrates the screen from FIG. 100 after the viewer has scrolled down once more, here the text area on the right includes an image associated with the currently "focused" restaurant, also, the viewer is told that there is more than one location for this restaurant and that to see the list of locations, the "select" button should be pressed.
Figure 102:
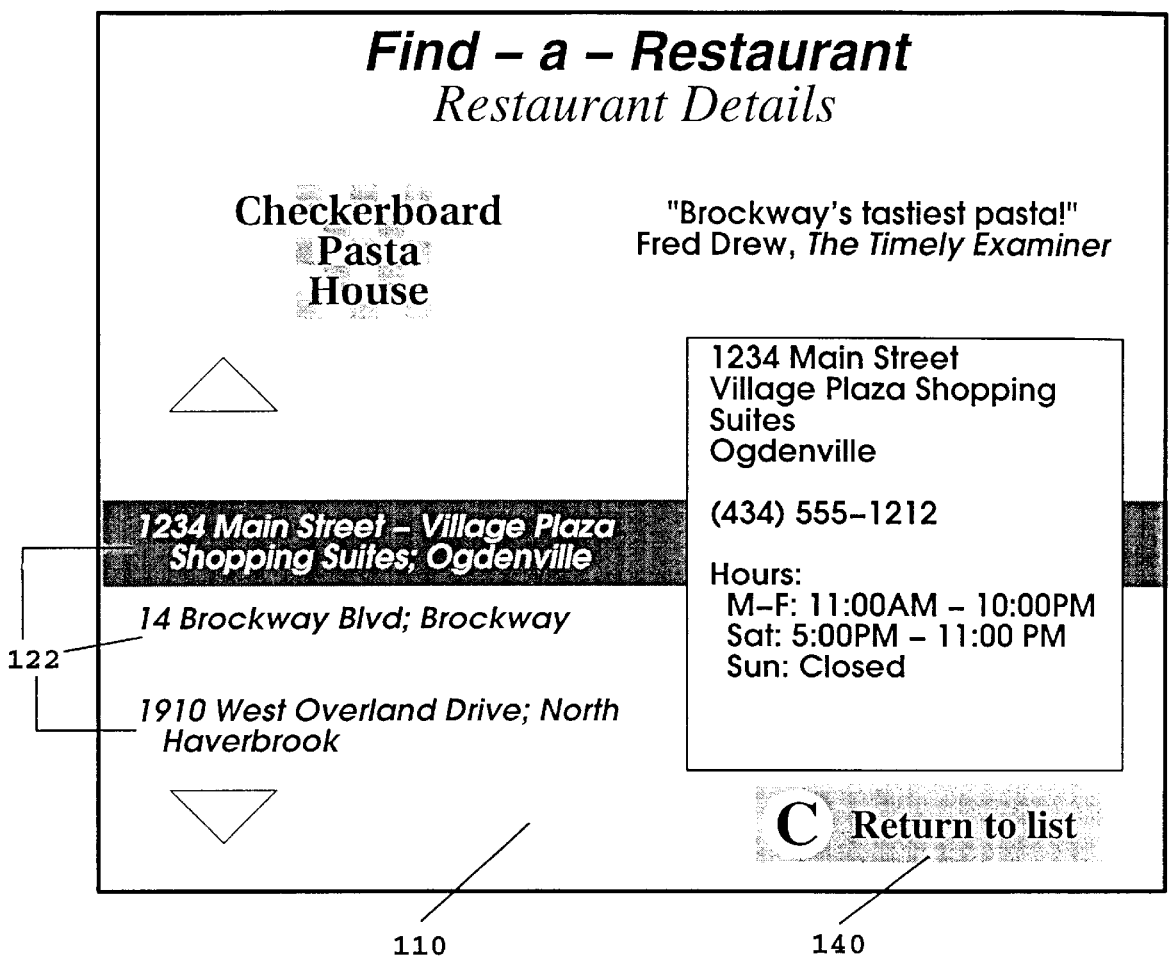
FIG. 102 illustrates a new screen activated as a result of the viewer having pressed "select" on the screen illustrated in FIG. 101, here the viewer is shown a list of all the locations for the "Checkerboard Pasta House"

If the viewer 12 scrolls down from the menu item icon node 122 for "Gianni's Pub and Eatery" to the node for "Luigi's Pizza," the selection button 132 appears to indicate that additional information is available for "Luigi's Pizza" by pressing the selection key 68 on the input device 13 (see FIG. 99). If the viewer chooses instead to scroll down from the menu item node for "Luigi's Pizza" to the node for "Enzo's of Brockway," the associated drawable 134 appears and contains both text and an image of the restaurant's logo (see FIG. 100). If the viewer continues to scroll down from the menu item node for "Enzo's of Brockway" to the node for "Checkerboard Pasta House" (see FIG. 101), and then selects the "Checkerboard Pasta House" menu item node, the screen 110 shown in FIG. 102 provides more information about the restaurant selected, including a list of each of the restaurant's locations, hours, and phone numbers. The "C" image 140 indicates that the viewer may return to the list of matching restaurants by pressing the "C" function key 76 on the input device.

Figure 104:
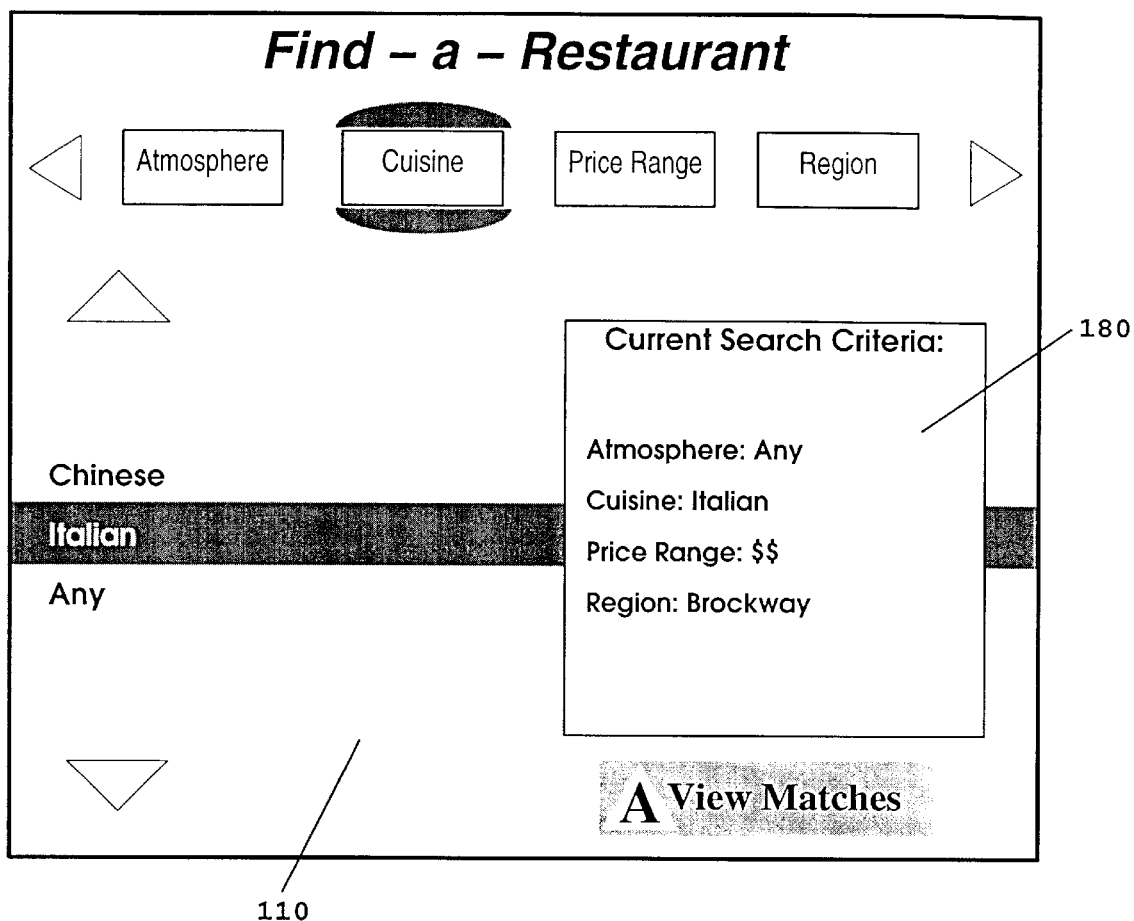
FIG. 104 illustrates the screen last presented in FIG. 97 after the viewer has returned from the list of locations for "Checkerboard Pasta House" and then again from the list of matches to the originally submitted search.
Figure 105:
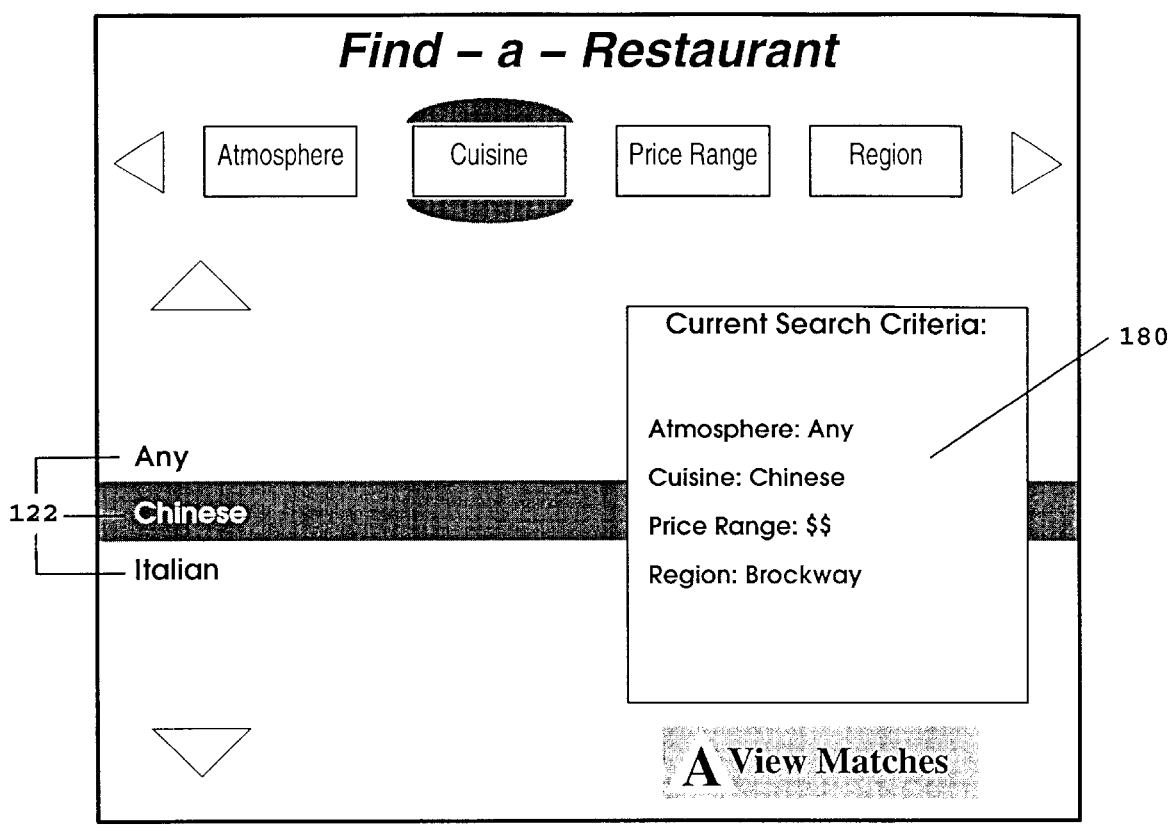
FIG. 105 illustrates the screen from FIG. 104 after the viewer has changed the "Cuisine" search criteria from "Italian" to "Chinese"

The viewer 12 may want to see information for the "Brockway" location (see FIG. 103), and then return to the pruning search interface screen 110. To return, the viewer "pops" screens back by pressing the "C" function key 76 on the input device 13 to return to the list of matching restaurants (as shown in FIG. 101), and then pressing the "C" function key again to return to the pruning search interface screen, as shown in FIG. 104. The current search values are still specified in the current search criteria text box 180. If the viewer scrolls up from the "Italian" search value 122 to the "Chinese" search value and selects the "Chinese" search value, the change in type of cuisine is reflected in the current search criteria text box (see FIG. 105).

Figure 106:
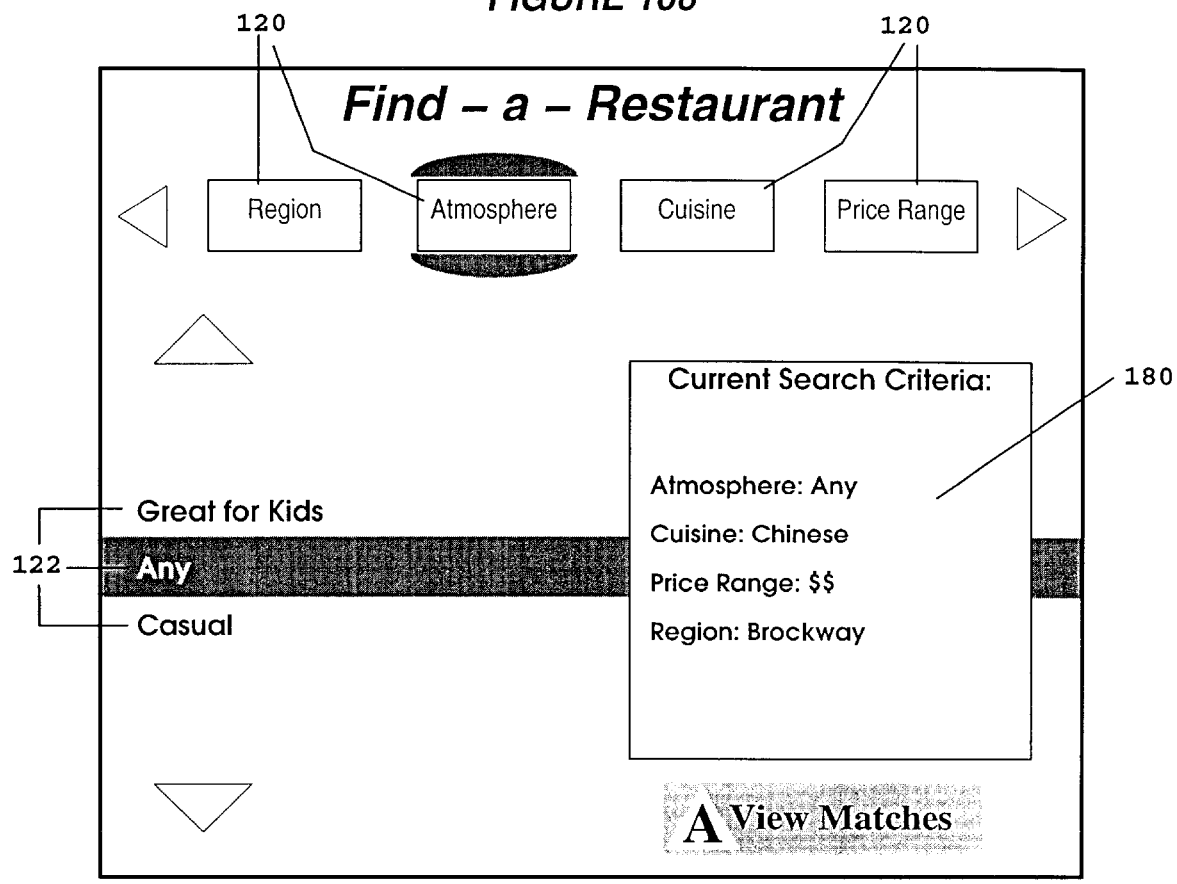
FIG. 106 illustrates the screen from FIG. 105 after the viewer has scrolled to the "Atmosphere" category.
Figure 107:
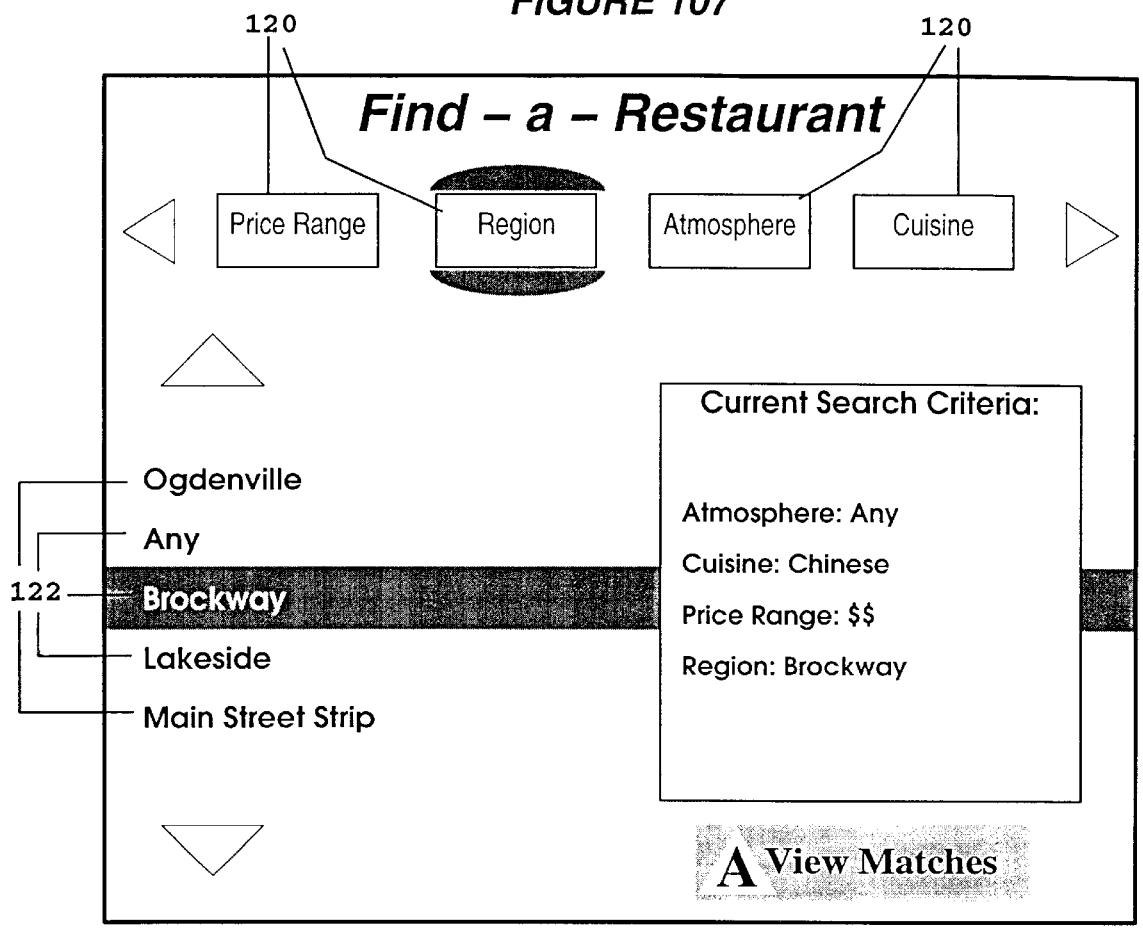
FIG. 107 illustrates the screen from FIG. 106 after the viewer has scrolled to the "Region" category.

After the viewer 12 scrolls from the "Cuisine" search key 120 to the "Atmosphere" search key, the list of search values 122 for the "Atmosphere" search key is pruned to display only types of atmosphere for Chinese restaurants having a price range of "$$" in the region of "Brockway" (see FIG. 106). Scrolling from the "Atmosphere" search key to the "Region" search key causes the list of search values for the "Region" search key to be pruned to display only regions having Chinese restaurants with a price range of" $$" (see FIG. 107).

Figure 108:
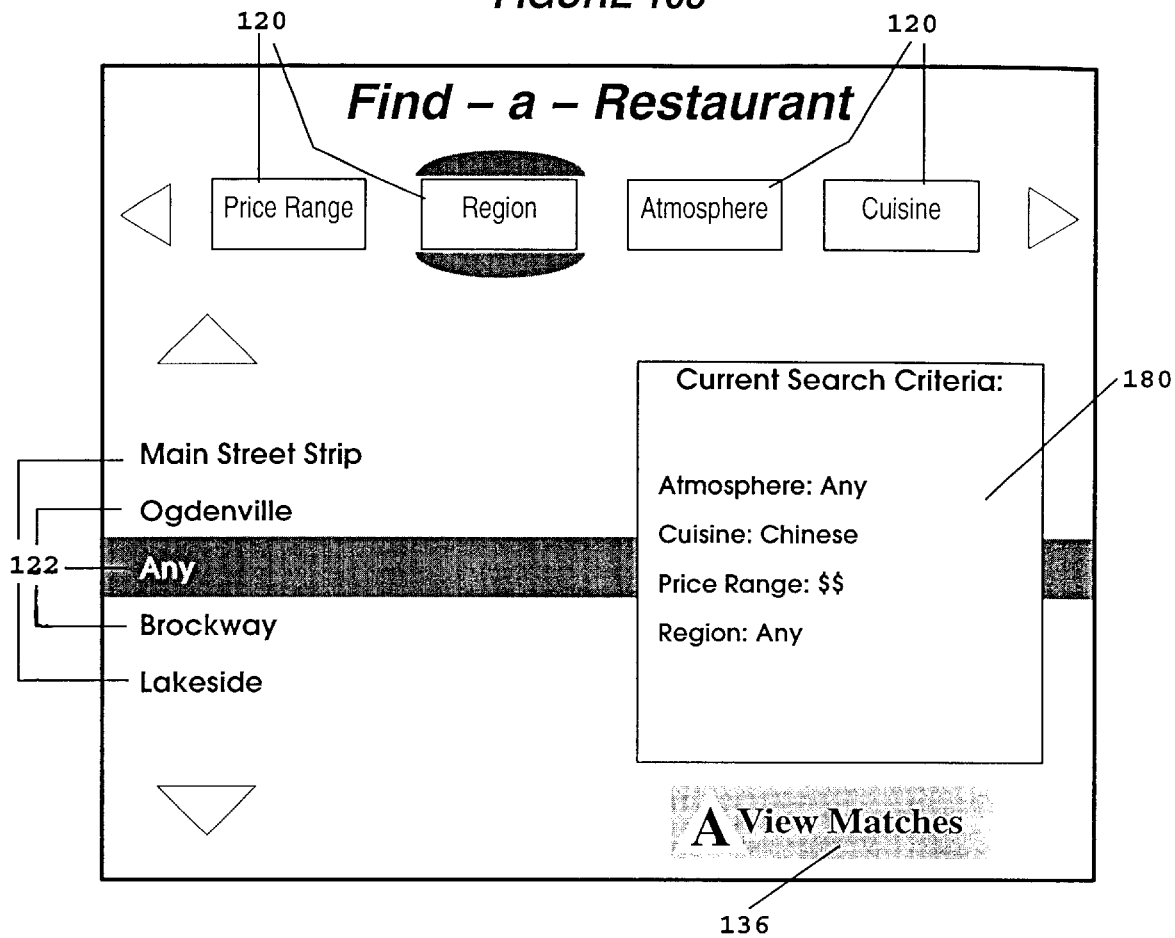
FIG. 108 illustrates the screen from FIG. 107 after the viewer has changed the "Region" search criteria from "Brockway" to "Any"
Figure 109:
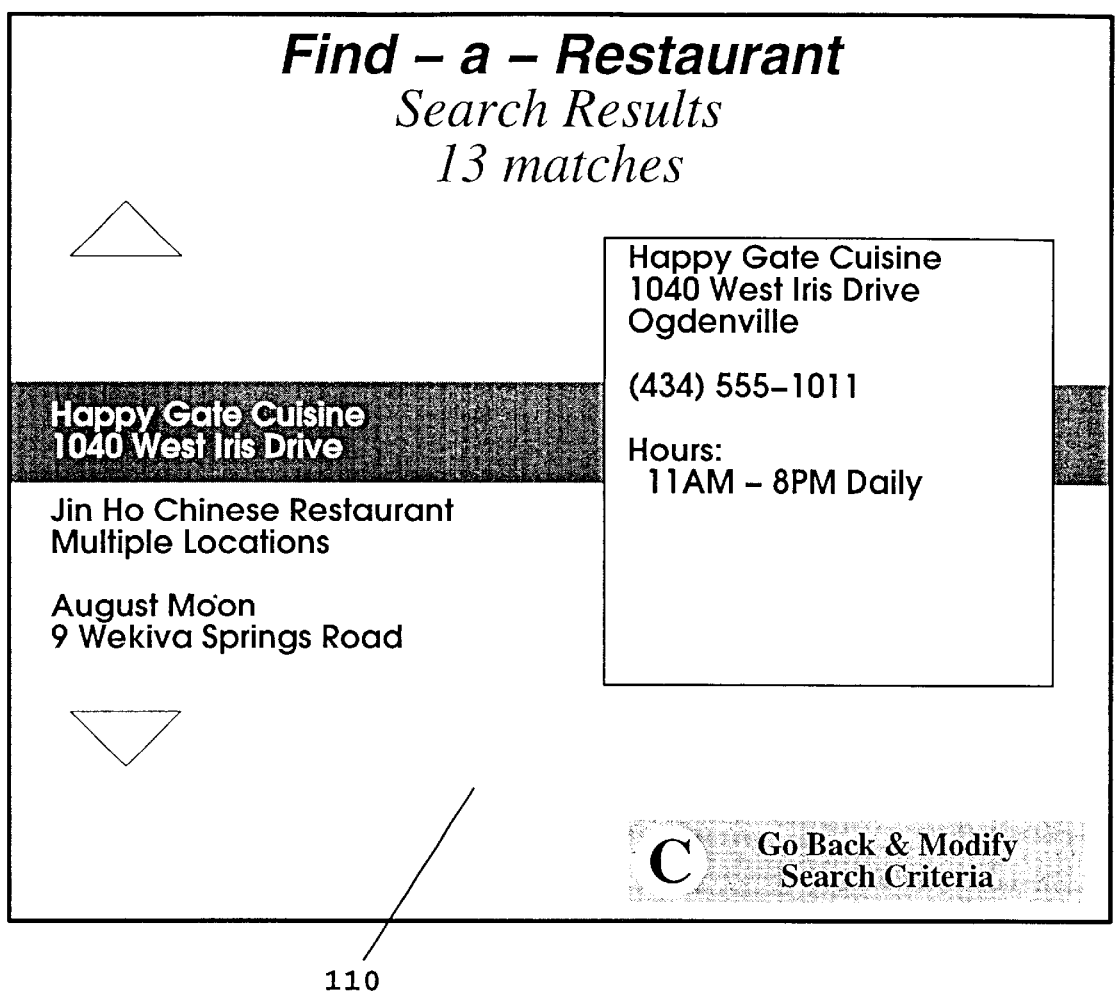
FIG. 109 illustrates a new screen activated as a result of the viewer having pressed "A" and using the search criteria (Chinese, $$), the database was searched and the restaurants listed on the screen in this figure are the matches from that search.

If the viewer 12 scrolls up from the "Brockway" search value 122 to the "Any" search value and selects the "Any" search value for the "Region" search key 120, the change in search value selected is reflected in the current search criteria text box 180, as shown in FIG. 108. The viewer may see search results by pressing the "A" function key 72 on the input device 13 (see FIG. 109).

The present invention may, of course, be carried out in ways other than those set forth without parting from the spirit and essential characteristics of the invention. The present embodiments are to be considered in all respects as illustrative and not restrictive, and all changes coming within the meaning and equivalency range of the following claims are intended to be embraced.

What is claimed:

1. A navigational user interface system for interactive television, comprising:
   (a) means for displaying pages, the pages being displayed individually and in consecutive order, and the pages having cells from which a selection can be made;
   (b) first stationary means for focusing on a selected page and displaying related cells containing a series of choices; and
   (c) second stationary means for focusing on a selected cell and displaying a drawable containing information about the cell,
      wherein the cells rotate into and out of the second stationary focus means, and wherein the cells are contained within a grid of cells having rows and columns, each row of,cells being scrollable to the left and to the right, and each scroll giving focus to a different cell in the row until the last cell in the row in the direction of scrolling receives focus, at which point further scrolling in the same direction causing focus to remain with the last cell.

2. The navigational user interface system of claim 1, further comprising a user input means for movement control and choice selection.

3. The navigational user interface system of claim 2, wherein the pages contain cells representing various retailers and items of merchandise for purchase, the user input means focusing on a desired cell for selection and selecting the desired cell, and the item of merchandise being displayed for viewer purchasing.

4. The navigational user interface system of claim 1, wherein the cells are contained within a grid of cells having rows and columns, each column of cells being scrollable up and down, and each scroll giving focus to a different cell in the column until the last cell in the column in the direction of scrolling receives focus, at which point further scrolling in the same direction causing focus to remain with the last cell.

5. A navigational user interface system for interactive television, comprising:
   (a) a display;
   (b) an interface generation means coupled to the display for displaying a first axis and a second axis, the interface generation means also displaying a drawable,
   (c) a category item contained and displayed within the first axis;
   (d) a menu item contained and displayed within the second axis;
   (e) a user input means coupled to the interface generation means, the user input means including movement control for focusing on a desired display element for selection, the user input means focusing on selected ones of the category item and the interface generation means displaying related menu items corresponding to the selected category item, and the user input means focusing on selected ones of the menu items and the interface generation means displaying related drawables corresponding to the selected menu item; and
   (f) a pruning means for eliminating options from a list for presenting a choice of options having user defined characteristics, wherein the pruning means presents a choice of restaurants having user defined first and second characteristics,
      wherein focusing on the category item is accomplished by rotating category item nodes into and out of focus on the first axis, and wherein focusing on the menu item is accomplished by rotating the menu item nodes into and out of focus on the second axis, and
      wherein the category items are category icons representing various first level characteristics of a restaurant, and the menu items are menu icons representing various second level characteristics of a restaurant corresponding to the various first level characteristics of the category icons.

6. The navigational user interface system of claim 5, wherein the input generation means also displaying related drawables corresponding to the selected category item.

7. The navigational user interface system of claim 5, wherein the user input means having a selecting means for selecting an option.

8. The navigational user interface system of claim 5, wherein the category items are category icons representing various show genres, and the menu items are menu icons representing shows corresponding to the various show genres of the category icons.

9. The navigational user interface system of claim 8, wherein the user input means focusing on selected category icons and the interface generation means displaying related menu icons representing shows corresponding to the selected category icon representing a desired show genre, and the user input means focusing on the selected menu icon and the interface generation means displaying a related drawable corresponding to the selected menu icon.

10. The navigational user interface system of claim 9, wherein the drawable contains previews of the show corresponding to the selected menu icon.

11. The navigational user interface system of claim 9, wherein the interface generation means displaying a select icon when a selected menu icon is in focus.

12. The navigational user interface system of claim 9, wherein the user input means selects a show corresponding to the focused menu icon for viewing, and the selected show is delivered to the display.

13. The navigational user interface system of claim 5, further comprising cells containing choices.

14. The navigational user interface system of claim 13, wherein the user input means focusing on a desired cell, the selecting means for selecting the focused cell.

15. The navigational user interface system of claim 13, wherein the interface generation means displaying a page corresponding to the selected focused cell.

16. The navigational user interface system of claim 5, further comprising pages, the pages are generated and displayed by the interface generation means.

17. The navigational user interface system of claim 16, wherein the pages are displayed individually and in consecutive order, and the pages having cells from which a selection can be made.

18. A navigational user interface method for interactive television, comprising:
   (a) displaying a first axis and a second axis;
   (b) displaying a drawable;
   (c) displaying a category item contained and displayed within the first axis;
   (d) displaying a menu item contained and displayed within the second axis;
   (e) focusing on selected ones of the category item and displaying related menu items corresponding to the selected category item;
   (f) focusing on selected ones of the menu items displaying related drawables corresponding to the selected menu item; and (g) eliminating options from a list and presenting a choice of options having user defined characteristics, wherein the category items are category icons representing various first level characteristics of a restaurant, and the menu items are menu icons representing various second level characteristics of a restaurant corresponding to the various first level characteristics of the category icons, and wherein focusing on the category item is accomplished by rotating category item nodes into and out of focus on the first axis, and wherein focusing on the menu item is accomplished by rotating the menu item nodes into and out of focus on the second axis.

19. The navigational user interface method of claim 18, wherein focusing on selected ones of the category item also displays related drawables corresponding to the selected category item.

20. The navigational user interface method of claim 18, further comprising selecting a presented option.

21. The navigational user interface method of claim 18, wherein focusing on the category item indicates a particular choice of show genre, and focusing on the menu item indicates a particular choice of show.

22. The navigational user interface method of claim 21, wherein focusing on selected category item generates menu items having shows corresponding to the selected category item's show genre, and focusing on the selected menu item and generating the drawable corresponding to the selected menu item.

23. The navigational user interface method of claim 22, further comprising previewing the show corresponding to the selected menu icon in the drawable.

24. The navigational user interface method of claim 22, further comprising generating and displaying a select icon when a selected menu icon is in focus.

25. The navigational user interface method of claim 22, further comprising selecting a show corresponding to the focused menu icon for viewing, and delivering the selected show to a display.

26. The navigational user interface method of claim 18, further comprising presenting a choice of restaurants having user defined first and second characteristics.

27. The navigational user interface method of claim 18, further comprising displaying cells containing choices.

28. The navigational user interface method of claim 27, further comprising focusing on a desired cell, and selecting the focused cell.

29. The navigational user interface method of claim 27, further comprising displaying a page corresponding to the selected focused cell.

30. The navigational user interface method of claim 18, further comprising displaying pages.

31. The navigational user interface method of claim 30, wherein the pages are displayed individually and in consecutive order, and the pages having cells from which a selection can be made.

\* \* \* \* \*

UNITED STATES PATENT AND TRADEMARK OFFICE
CERTIFICATE OF CORRECTION

PATENT NO. : 6,678,891 B1
DATED : January 13, 2004
INVENTOR(S) : Wilcox et al.

It is certified that error appears in the above-identified patent and that said Letters Patent is hereby corrected as shown below:

<u>Title page,</u>
Item [75], Inventors, delete "Praveen Roa," and insert therefore -- Praveen Rao --.
Item [74], *Attorney, Agent, or Firm*, delete "Hubert J. Bernhardt, III" and insert therefore -- Hubert J. Barnhardt III --.

<u>Column 4,</u>
Line 32, delete "viewers" and insert therefore -- viewer --.

<u>Column 9,</u>
Line 15, insert a period between "thereof" and "The".

<u>Column 10,</u>
Line 9, delete "Pop" and insert therefore -- Pop: --.

<u>Column 12,</u>
Line 20, delete "ram 54" and insert therefore -- RAM 54 --.
Line 21, delete "ram," and insert therefore -- RAM, --

<u>Column 14,</u>
Line 61, delete "b.e" and insert therefore -- be --.

<u>Column 20,</u>
Line 60, delete "1!16," and insert therefore -- 116, --.

UNITED STATES PATENT AND TRADEMARK OFFICE
CERTIFICATE OF CORRECTION

PATENT NO. : 6,678,891 B1
DATED : January 13, 2004
INVENTOR(S) : Wilcox et al.

It is certified that error appears in the above-identified patent and that said Letters Patent is hereby corrected as shown below:

Column 24,
Line 11, delete "has".

Column 30,
Line 32, delete "ma y" and insert therefore -- may --.

Signed and Sealed this

Seventh Day of September, 2004

JON W. DUDAS
*Director of the United States Patent and Trademark Office*